(12) United States Patent
Negus et al.

(10) Patent No.: US 9,713,019 B2
(45) Date of Patent: Jul. 18, 2017

(54) SELF ORGANIZING BACKHAUL RADIO

(71) Applicant: CBF Networks, Inc., San Jose, CA (US)

(72) Inventors: Kevin J. Negus, Jackson, WY (US); James A. Proctor, Jr., Melbourne Beach, FL (US)

(73) Assignee: CBF NETWORKS, INC., Santa Clara, CA (US)

( * ) Notice: Subject to any disclaimer, the term of this patent is extended or adjusted under 35 U.S.C. 154(b) by 327 days.

(21) Appl. No.: 14/624,365

(22) Filed: Feb. 17, 2015

(65) Prior Publication Data
US 2015/0230105 A1 Aug. 13, 2015

Related U.S. Application Data

(63) Continuation-in-part of application No. 14/502,471, filed on Sep. 30, 2014, now abandoned, which is a
(Continued)

(51) Int. Cl.
*H04W 24/02* (2009.01)
*H04W 72/04* (2009.01)
(Continued)

(52) U.S. Cl.
CPC .......... *H04W 24/02* (2013.01); *H04B 7/0408* (2013.01); *H04W 48/16* (2013.01);
(Continued)

(58) Field of Classification Search
CPC ...... H04B 7/0408; H04B 7/0697; H04B 7/10; H04W 24/02; H04W 48/16; H04W 72/0406; H04W 72/082; H04W 84/18
(Continued)

(56) References Cited

U.S. PATENT DOCUMENTS

D307,274 S  4/1990 Sasaki et al.
D335,128 S  4/1993 Soren
(Continued)

FOREIGN PATENT DOCUMENTS

EP  2745539  6/2014
EP  2767102  8/2014
(Continued)

OTHER PUBLICATIONS

Office Action in U.S. Appl. No. 14/666,294 dated Apr. 8, 2016.
(Continued)

*Primary Examiner* — Mohammad Anwar
*Assistant Examiner* — Kokou R Detse
(74) *Attorney, Agent, or Firm* — Nixon Peabody LLP

(57) ABSTRACT

A self-organizing backhaul radio (SOBR) and related arrangements are disclosed. A "primary" link between an first SOBR enabled radio and a second SOBR radio includes a secondary transmission link, referred to as a signature control channel (SCC), as a spread spectrum modulated signal embedded within and transmitted simultaneously with the primary link. The SCC transmissions from the first SOBR radio may be utilized by other SOBR enabled radios to determine an interference level to or from the first SOBR radio's primary link. The SCC transmission may be utilized to allow transmit beam forming between SOBR-enabled radios without damaging other friendly SOBR radios within the propagation distance of the transmitted signals based upon the detection of the SCC transmissions.

30 Claims, 61 Drawing Sheets

Related U.S. Application Data continuation-in-part of application No. 14/098,456, filed on Dec. 5, 2013, now Pat. No. 8,989,762, and a continuation-in-part of application No. 14/337,744, filed on Jul. 22, 2014, now Pat. No. 9,055,463, which is a continuation of application No. 13/645,472, filed on Oct. 4, 2012, now Pat. No. 8,811,365, which is a continuation of application No. 13/371,366, filed on Feb. 10, 2012, now Pat. No. 8,311,023, which is a continuation of application No. 13/212,036, filed on Aug. 17, 2011, now Pat. No. 8,238,318.

(51) Int. Cl.
| | |
|---|---|
| H04W 72/08 | (2009.01) |
| H04B 7/0408 | (2017.01) |
| H04W 48/16 | (2009.01) |
| H04W 84/18 | (2009.01) |
| H04B 7/06 | (2006.01) |
| H04B 7/10 | (2017.01) |

(52) U.S. Cl.
CPC ..... *H04W 72/0406* (2013.01); *H04W 72/082* (2013.01); *H04B 7/0697* (2013.01); *H04B 7/10* (2013.01); *H04W 84/18* (2013.01)

(58) Field of Classification Search
USPC .......................................................... 370/329
See application file for complete search history.

(56) References Cited

U.S. PATENT DOCUMENTS

| | | |
|---|---|---|
| D349,897 S | 8/1994 | Soren et al. |
| D373,771 S | 9/1996 | Messelhi |
| 5,579,367 A | 11/1996 | Raymond et al. |
| D376,367 S | 12/1996 | Mailandt |
| D376,600 S | 12/1996 | Vallilee et al. |
| 5,604,744 A | 2/1997 | Andersson et al. |
| 5,809,422 A | 9/1998 | Raleigh et al. |
| D401,592 S | 11/1998 | Nishimura et al. |
| 5,890,055 A | 3/1999 | Chu et al. |
| RE36,591 E | 2/2000 | Hayashi et al. |
| 6,253,060 B1 | 6/2001 | Komara et al. |
| 6,310,584 B1 | 10/2001 | Reece et al. |
| D455,420 S | 4/2002 | Arpe |
| 6,377,217 B1 | 4/2002 | Zhu et al. |
| 6,462,710 B1 | 10/2002 | Carson et al. |
| 6,463,303 B1 | 10/2002 | Zhao |
| 6,486,828 B1 | 11/2002 | Cahn et al. |
| 6,529,172 B2 | 3/2003 | Zimmerman |
| 6,675,012 B2 | 1/2004 | Gray |
| 6,912,195 B2 | 6/2005 | Vook et al. |
| D507,263 S | 7/2005 | Narita |
| 6,985,123 B2 | 1/2006 | Gottl |
| 6,995,712 B2 | 2/2006 | Boyanov |
| 7,027,837 B1 | 4/2006 | Uhlik et al. |
| 7,113,806 B2 | 9/2006 | Gray |
| 7,120,138 B2 | 10/2006 | Soomro et al. |
| 7,155,230 B2 | 12/2006 | Tsien |
| 7,158,759 B2 | 1/2007 | Hansen et al. |
| 7,171,223 B2 | 1/2007 | Herscovich et al. |
| 7,221,722 B2 | 5/2007 | Thomas et al. |
| 7,260,141 B2 | 8/2007 | Bierly et al. |
| 7,280,067 B2 | 10/2007 | Chiodini |
| 7,280,082 B2 | 10/2007 | Theobold et al. |
| 7,292,663 B1 | 11/2007 | Van Wechel et al. |
| 7,327,763 B2 | 2/2008 | Ophir et al. |
| D565,534 S | 4/2008 | Ingalsbe et al. |
| 7,394,439 B1 | 7/2008 | Johnson et al. |
| 7,400,612 B2 | 7/2008 | Yamaura |
| 7,403,501 B2 | 7/2008 | Bordonaro et al. |
| 7,499,964 B2 | 3/2009 | Busch et al. |
| D595,274 S | 6/2009 | Skottke et al. |
| D596,627 S | 7/2009 | Cho et al. |
| 7,583,933 B2 | 9/2009 | Hansen et al. |
| 7,587,177 B1 | 9/2009 | Kwong |
| 7,593,729 B2 | 9/2009 | Barak et al. |
| 7,599,290 B2 | 10/2009 | Dos Remedios et al. |
| D604,724 S | 11/2009 | Vorreiter et al. |
| 7,616,554 B2 | 11/2009 | Asai et al. |
| 7,620,370 B2 | 11/2009 | Barak et al. |
| 7,623,060 B1 | 11/2009 | Chhabra et al. |
| D619,571 S | 7/2010 | Lee |
| 7,756,519 B2 | 7/2010 | Barak et al. |
| D622,256 S | 8/2010 | Lockenwitz |
| 7,813,318 B2 | 10/2010 | Hu |
| 7,834,800 B1 | 11/2010 | Chhabra et al. |
| 7,840,187 B2 | 11/2010 | Ji |
| 7,848,241 B2 | 12/2010 | Natarajan et al. |
| 7,864,744 B2 | 1/2011 | Song et al. |
| 7,881,273 B2 | 2/2011 | Yamaura |
| 7,948,942 B2 | 5/2011 | Zhang et al. |
| 7,978,144 B2 | 7/2011 | Tanabe et al. |
| D643,025 S | 8/2011 | Podduturi |
| 8,031,618 B2 | 10/2011 | Hu |
| 8,055,213 B2 | 11/2011 | Hui et al. |
| 8,078,109 B1 | 12/2011 | Mulcay |
| 8,150,955 B2 | 4/2012 | Busch et al. |
| 8,175,079 B2 | 5/2012 | Alapuranen et al. |
| 8,175,535 B2 | 5/2012 | Mu |
| 8,228,884 B2 | 7/2012 | Yamaura |
| 8,233,908 B2 | 7/2012 | Cho et al. |
| 8,238,318 B1 | 8/2012 | Negus |
| 8,249,527 B2 | 8/2012 | Rybicki |
| 8,290,503 B2 | 10/2012 | Sadek et al. |
| 8,300,590 B1 | 10/2012 | Negus et al. |
| 8,311,023 B1 | 11/2012 | Negus |
| 8,385,305 B1 | 2/2013 | Negus et al. |
| 8,422,540 B1 | 4/2013 | Negus et al. |
| 8,467,363 B2 | 6/2013 | Lea et al. |
| 8,487,813 B2 | 7/2013 | Leiba et al. |
| 8,502,733 B1 | 8/2013 | Negus et al. |
| 8,503,383 B2 | 8/2013 | Hu et al. |
| 8,638,839 B2 | 1/2014 | Negus et al. |
| D704,174 S | 5/2014 | Negus et al. |
| 8,761,100 B2 | 6/2014 | Negus et al. |
| 8,811,365 B2 | 8/2014 | Negus |
| 8,824,442 B2 | 9/2014 | Lea et al. |
| 8,830,943 B2 | 9/2014 | Negus et al. |
| 8,872,715 B2 | 10/2014 | Lea et al. |
| 8,928,542 B2 | 1/2015 | Lea et al. |
| 8,942,216 B2 | 1/2015 | Negus et al. |
| 8,948,235 B2 | 2/2015 | Negus et al. |
| 8,982,772 B2 | 3/2015 | Fischer et al. |
| 8,989,762 B1 | 3/2015 | Negus et al. |
| 9,001,809 B2 | 4/2015 | Lea et al. |
| 9,049,611 B2 | 6/2015 | Negus et al. |
| 9,055,463 B2 | 6/2015 | Negus et al. |
| 9,178,558 B2 | 11/2015 | Lea et al. |
| 9,179,240 B2 | 11/2015 | Negus et al. |
| 9,226,295 B2 | 12/2015 | Negus et al. |
| 9,226,315 B2 | 12/2015 | Negus et al. |
| 9,282,560 B2 | 3/2016 | Negus |
| 9,350,411 B2 | 5/2016 | Lea et al. |
| 9,374,822 B2 | 6/2016 | Negus et al. |
| 9,572,163 B2 | 2/2017 | Negus et al. |
| 9,577,700 B2 | 2/2017 | Lea et al. |
| 9,577,733 B2 | 2/2017 | Negus et al. |
| 2001/0030939 A1 | 10/2001 | Vijayan et al. |
| 2001/0035844 A1 | 11/2001 | Reece et al. |
| 2001/0050927 A1 | 12/2001 | Johnson |
| 2002/0048062 A1 | 4/2002 | Sakamoto et al. |
| 2002/0060993 A1 | 5/2002 | Dent |
| 2002/0064141 A1 | 5/2002 | Sakakura |
| 2002/0160769 A1 | 10/2002 | Gray |
| 2002/0176437 A1 | 11/2002 | Busch et al. |
| 2003/0002456 A1 | 1/2003 | Soomro et al. |
| 2003/0040319 A1 | 2/2003 | Hansen et al. |
| 2003/0222818 A1 | 12/2003 | Regnier et al. |
| 2004/0006573 A1 | 1/2004 | Takashi |
| 2004/0033789 A1 | 2/2004 | Tsien |
| 2004/0116112 A1 | 6/2004 | Gray |
| 2004/0137924 A1 | 7/2004 | Herscovich et al. |

(56) References Cited

U.S. PATENT DOCUMENTS

| | | |
|---|---|---|
| 2004/0151238 A1 | 8/2004 | Masenten |
| 2004/0165650 A1 | 8/2004 | Miyazaki et al. |
| 2004/0179549 A1 | 9/2004 | Ophir et al. |
| 2005/0026616 A1 | 2/2005 | Cavalli et al. |
| 2005/0068231 A1 | 3/2005 | Regnier et al. |
| 2005/0075078 A1 | 4/2005 | Makinen et al. |
| 2005/0206554 A1 | 9/2005 | Yamaura |
| 2005/0215266 A1 | 9/2005 | Tsien et al. |
| 2005/0219140 A1 | 10/2005 | Browne et al. |
| 2005/0270218 A1 | 12/2005 | Chiodini |
| 2006/0056365 A1 | 3/2006 | Das et al. |
| 2006/0079290 A1 | 4/2006 | Seto et al. |
| 2006/0109815 A1 | 5/2006 | Ozer et al. |
| 2006/0141929 A1 | 6/2006 | Lockie et al. |
| 2006/0164271 A1 | 7/2006 | Hirt et al. |
| 2006/0209746 A1 | 9/2006 | Asai et al. |
| 2006/0253526 A1 | 11/2006 | Welch et al. |
| 2006/0273952 A1 | 12/2006 | Krikorian et al. |
| 2007/0054683 A1 | 3/2007 | Hansen et al. |
| 2007/0097899 A1 | 5/2007 | Larsson et al. |
| 2007/0105562 A1 | 5/2007 | Ji |
| 2007/0117517 A1 | 5/2007 | Hui |
| 2007/0146225 A1 | 6/2007 | Boss et al. |
| 2007/0149230 A1 | 6/2007 | Song |
| 2007/0155431 A1 | 7/2007 | Munzner et al. |
| 2007/0160020 A1 | 7/2007 | Osann |
| 2007/0218890 A1 | 9/2007 | Cho et al. |
| 2007/0243878 A1 | 10/2007 | Taira et al. |
| 2007/0264935 A1 | 11/2007 | Mohebbi |
| 2008/0014948 A1 | 1/2008 | Scheinert |
| 2008/0043882 A1 | 2/2008 | Zhang et al. |
| 2008/0080364 A1 | 4/2008 | Barak et al. |
| 2008/0089279 A1 | 4/2008 | Hu et al. |
| 2008/0089280 A1 | 4/2008 | Hu |
| 2008/0090575 A1 | 4/2008 | Barak et al. |
| 2008/0090581 A1 | 4/2008 | Hu |
| 2008/0100494 A1 | 5/2008 | Yamaura |
| 2008/0159212 A1 | 7/2008 | Zhang et al. |
| 2008/0181282 A1 | 7/2008 | Wala et al. |
| 2008/0214199 A1 | 9/2008 | Ji |
| 2008/0240307 A1 | 10/2008 | Wang et al. |
| 2008/0242232 A1 | 10/2008 | Zavadsky et al. |
| 2008/0274745 A1 | 11/2008 | Barak et al. |
| 2009/0010238 A1 | 1/2009 | Barak et al. |
| 2009/0052411 A1 | 2/2009 | Leung et al. |
| 2009/0067526 A1 | 3/2009 | Ratermann et al. |
| 2009/0092101 A1 | 4/2009 | Busch et al. |
| 2009/0111463 A1 | 4/2009 | Simms et al. |
| 2009/0121963 A1 | 5/2009 | Greene |
| 2009/0143017 A1 | 6/2009 | Barak et al. |
| 2009/0252127 A1 | 10/2009 | Rangarajan et al. |
| 2009/0252134 A1 | 10/2009 | Schlicht et al. |
| 2009/0274130 A1 | 11/2009 | Boch |
| 2009/0304055 A1 | 12/2009 | Nino et al. |
| 2009/0312022 A1 | 12/2009 | Viorel et al. |
| 2009/0323621 A1 | 12/2009 | Touboul et al. |
| 2010/0009694 A1 | 1/2010 | Fischer |
| 2010/0033396 A1 | 2/2010 | Tanabe et al. |
| 2010/0046439 A1 | 2/2010 | Chen et al. |
| 2010/0056205 A1 | 3/2010 | Fuss |
| 2010/0157970 A1 | 6/2010 | Gotman et al. |
| 2010/0197317 A1 | 8/2010 | Sadek et al. |
| 2010/0202391 A1 | 8/2010 | Palanki et al. |
| 2010/0246554 A1 | 9/2010 | Alapuranen et al. |
| 2010/0261423 A1 | 10/2010 | Stanforth et al. |
| 2010/0272006 A1 | 10/2010 | Bertrand et al. |
| 2010/0309048 A1 | 12/2010 | Polisetty et al. |
| 2011/0044279 A1 | 2/2011 | Johansson et al. |
| 2011/0070855 A1 | 3/2011 | Mariotti |
| 2011/0075586 A1 | 3/2011 | Hu et al. |
| 2011/0085525 A1 | 4/2011 | Patini |
| 2011/0096729 A1 | 4/2011 | Yamaura |
| 2011/0103292 A1 | 5/2011 | Pasad et al. |
| 2011/0164186 A1 | 7/2011 | Sadek et al. |
| 2011/0182174 A1 | 7/2011 | Pi et al. |
| 2011/0206155 A1 | 8/2011 | Fujimura et al. |
| 2011/0218005 A1 | 9/2011 | Jeon et al. |
| 2011/0235514 A1 | 9/2011 | Huang et al. |
| 2011/0250852 A1 | 10/2011 | Greene |
| 2011/0310767 A1 | 12/2011 | Hu |
| 2012/0058777 A1 | 3/2012 | Nguyen et al. |
| 2012/0063472 A1 | 3/2012 | Le Pallec et al. |
| 2012/0108284 A1 | 5/2012 | Patel et al. |
| 2012/0122477 A1 | 5/2012 | Sadek et al. |
| 2012/0135724 A1 | 5/2012 | Lewis et al. |
| 2012/0184222 A1 | 7/2012 | Seok |
| 2012/0213086 A1 | 8/2012 | Matsuura et al. |
| 2013/0039200 A1 | 2/2013 | Park et al. |
| 2013/0089041 A1 | 4/2013 | Negus et al. |
| 2013/0089042 A1 | 4/2013 | Negus et al. |
| 2013/0089083 A1 | 4/2013 | Negus et al. |
| 2013/0095765 A1 | 4/2013 | Greene |
| 2013/0100897 A1 | 4/2013 | Negus |
| 2013/0121272 A1 | 5/2013 | Barbieri et al. |
| 2013/0130708 A1 | 5/2013 | Chhaya et al. |
| 2013/0272217 A1 | 10/2013 | Negus et al. |
| 2013/0273974 A1 | 10/2013 | Lea et al. |
| 2013/0288593 A1 | 10/2013 | Norin et al. |
| 2013/0293419 A1 | 11/2013 | Negus et al. |
| 2014/0120966 A1 | 5/2014 | Fischer et al. |
| 2014/0184455 A1 | 7/2014 | Lea et al. |
| 2014/0329562 A1 | 11/2014 | Proctor, Jr. et al. |
| 2015/0016362 A1 | 1/2015 | Negus et al. |
| 2015/0016561 A1 | 1/2015 | Negus et al. |
| 2015/0049720 A1 | 2/2015 | Negus et al. |
| 2015/0084826 A1 | 3/2015 | Lea et al. |
| 2015/0139160 A1 | 5/2015 | Fischer et al. |
| 2015/0156777 A1 | 6/2015 | Negus et al. |
| 2015/0200709 A1 | 7/2015 | Negus et al. |
| 2015/0372738 A1 | 12/2015 | Negus et al. |
| 2016/0013831 A1 | 1/2016 | Lea et al. |
| 2016/0095107 A1 | 3/2016 | Negus et al. |
| 2016/0095121 A1 | 3/2016 | Negus et al. |
| 2016/0135191 A1 | 5/2016 | Negus et al. |
| 2016/0135192 A1 | 5/2016 | Negus |
| 2016/0192374 A1 | 6/2016 | Negus |
| 2016/0248467 A1 | 8/2016 | Lea et al. |
| 2016/0278093 A1 | 9/2016 | Negus et al. |
| 2016/0285532 A1 | 9/2016 | Negus et al. |
| 2016/0285611 A1 | 9/2016 | Fischer et al. |
| 2016/0316477 A1 | 10/2016 | Negus et al. |
| 2017/0026978 A1 | 1/2017 | Negus et al. |

FOREIGN PATENT DOCUMENTS

| | | | |
|---|---|---|---|
| EP | 2839693 | | 2/2015 |
| EP | 2843863 A1 | | 3/2015 |
| WO | WO 2007146685 | | 12/2007 |
| WO | WO 2007146685 A1 * | 12/2007 | ............ H01Q 1/246 |
| WO | WO 2008007375 A2 | | 1/2008 |
| WO | WO 2011030960 | | 3/2011 |
| WO | WO 2011080299 | | 7/2011 |
| WO | WO 2013025413 A1 | | 2/2013 |
| WO | WO 2013055947 A1 | | 4/2013 |
| WO | WO 2013158237 A2 | | 10/2013 |
| WO | WO 2014040083 A2 | | 3/2014 |

OTHER PUBLICATIONS

Notice of Allowance in U.S. Appl. No. 15/060,013, dated Jun. 9, 2016.

Amendment and Response to Office Action in U.S. Appl. No. 13/632,993, dated Jul. 27, 2015.

Notice of Allowance in U.S. Appl. No. 13/632,993, dated Aug. 21, 2015.

Applicant Response and Amendment in U.S. Appl. No. 14/502,471, dated Jul. 2, 2015.

Office Action in U.S. Appl. No. 14/502,471, dated Jul. 22, 2015.

Office Action in U.S. Appl. No. 14/552,431, dated Jul. 14, 2015.

Applicant Response and Amendment in U.S. Appl. No. 14/552,431, dated Aug. 10, 2015.

Notice of Allowance in U.S. Appl. No. 14/552,431, dated Aug. 19, 2015.

(56) References Cited

OTHER PUBLICATIONS

Amendment for U.S. Appl. No. 14/608,024, dated Aug. 3, 2015.
Notice of Allowance for U.S. Appl. No. 14/608,024, dated Nov. 23, 2015.
Office Action in U.S. Appl. No. 14/686,674, dated Jul. 23, 2015.
Amendment and Response to Office Action in U.S. Appl. No. 14/686,674, dated Aug. 31, 2015.
Notice of Allowance in U.S. Appl. No. 14/686,674, dated Oct. 5, 2015.
Office Action in U.S. Appl. No. 14/688,550, dated Jul. 29, 2015.
Amendment and Response to Office Action in U.S. Appl. No. 14/688,550, dated Oct. 29, 2015.
Notice of Allowance in U.S. Appl. No. 14/688,550, dated Dec. 4, 2015.
Notice of Allowance in U.S. Appl. No. 14/837,797, dated Dec. 30, 2015.
Notice of Allowance in U.S. Appl. No. 14/839,018, dated Dec. 21, 2015.
Notice of Allowance in U.S. Appl. No. 14/950,354, dated Feb. 17, 2016.
Notice of Allowance in U.S. Appl. No. 14/988,578, dated Mar. 30, 2016.
Extended European Search Report in European Patent Application No. 12824072.8, dated Jul. 15, 2015.
Notice of Allowance in U.S. Appl. No. 13/934,175, dated May 28, 2015.
Partial European Search Report in European Patent Application No. 12839752.8, dated Jun. 16, 2015.
Notice of Allowance in U.S. Appl. No. 14/632,624, dated May 26, 2015.
U.S. Appl. No. 14/686,674, filed Apr. 14, 2015.
U.S. Appl. No. 14/688,550, filed Apr. 16, 2015.
Zarikoff, B.W., et al. "Detection of Pulsed Radar in a Time Division Duplexed System," Vehicular Technology Conference (VTC Spring), 2011, IEEE 73rd.
Office Action in U.S. Appl. No. 14/151,190 dated Mar. 28, 2014.
Applicant Initiated Interview Summary in U.S. Appl. No. 14/151,190, dated May 29, 2014.
Amendment and Response to Office Action in U.S. Appl. No. 14/151,190, dated Jun. 30, 2014.
Examiner Initiated Interview Summary in U.S. Appl. No. 14/151,190, dated Oct. 14, 2014.
Notice of Allowance in U.S. Appl. No. 14/151,190, dated Oct. 14, 2014.
Office Action in U.S. Appl. No. 14/098,456 dated Apr. 4, 2014.
Amendment and Response to Office Action in U.S. Appl. No. 14/098,456, dated Jul. 7, 2014.
Amendment and Response to Office Action in U.S. Appl. No. 14/098,456, dated Jul. 15, 2014.
Office Action in U.S. Appl. No. 14/098,456, dated Jul. 30, 2014.
Amendment and Response to Office Action in U.S. Appl. No. 14/098,456, dated Sep. 26, 2014.
Notice of Allowance in U.S. Appl. No. 14/098,456, dated Oct. 8, 2014.
Amendment After Notice of Allowance in U.S. Appl. No. 14/098,456, dated Jan. 8, 2015.
U.S. Appl. No. 14/608,024, filed Jan. 28, 2015.
Office Action in U.S. Appl. No. 14/608,024, dated Apr. 3, 2015.
"AccessGate—RAN Optimization for Mobile Backhaul Systems," Product Data Sheet, Memotec, 2009, Montreal, Quebec, Canada, 2 pages.
"Advances in Backhaul Synchronization—Maximizing ROI," Application Brief, Symmetricom Inc., 2008, 6 pages.
"Carrier Ethernet Services Overview," Presentation, MEF, Aug. 2008, 32 pages.
"Clock Distribution and Synchronization over Ethernet: IEEE1588v2 and SyncE," Presentation, VITESSE, Sep. 2009, 9 pages.
"Clock Synchronization in Carrier Ethernet Networks—Synchronous Ethernet and 1588v2 on Juniper Networks MX Series 3D Universal Edge Routers," White Paper, Juniper Networks, Inc., 2010, 11 pages.
"DAN2400-PTP—Open SoC Platform for Sub-6GHz Wireless Point-to-Point Systems," DesignArt Networks, Jul. 2008, 2 pages.
"Doubling Capacity in Wireless Channels," Provigent Inc., 2008, 3 pages.
"Evolving Microwave Mobile Backhaul for Next-Generation Networks," White Paper, NEC Corp., Feb. 2008, 4 pages.
"GainSpan GS1011M Low Power Wi-Fi® Module Family," Product Brief—Preliminary, GainSpan Corp., 2009, 2 pages.
"HMC536MS8G / 536MS8GE—GaAs MMIC Positive Control T/R Switch, DC—6 GHz," Data Sheet, Switches—SMT, Hittite Microwave Corp., 2008, pp. 10.295-10.299.
"IEEE 1588v2 (Precision Time Protocol) Testing," Application Note, IXIA, Dec. 2009.
"Information Technology—Open Systems Interconnection—Basic Reference Model: The Basic Model," International Standard, ISO/IEC 7498-1, Second Edition Nov. 15, 1994, Corrected and Reprinted Jun. 15, 1996, 68 pages.
"MGA-21108—Broadband Fully Integrated Matched Low-Noise Amplifier MMIC," Data Sheet, Avago Technologies, Aug. 2009, 21 pages.
"MGA-22003—2.3-2.7 GHz 3×3mm WiMAX/WiBro and WiFi Linear Amplifier Module," Data Sheet, Avago Technologies, Mar. 2010, 15 pages.
"MGA-23003—3.3-3.8 GHz 3×3mm WiMAX Power Amplifier," Data Sheet, Avago Technologies, Mar. 2010, 16 pages.
"MGA-25203—5.1-5.9GHz 3×3mm WiFi and WiMAX Power Amplifier," Data Sheet, Avago Technologies, Mar. 2010, 14 pages.
"MGA-43328—High Linearity Wireless Data Power Amplifier for 2.5 to 2.7 GHz Applications," Application Note, Avago Technologies, Apr. 2010, 10 pages.
"MGA-43328—(2.5-2.7) GHz 29dBm High Linearity Wireless Data Power Amplifier," Data Sheet, Avago Technologies, Mar. 2010, 19 pages.
"MGA-645T6—Low Noise Amplifier with Bypass/Shutdown Mode in Low Profile Package," Data Sheet, Avago Technologies, Nov. 2009, 16 pages.
"MGA-655T6—Low Noise Amplifier with Bypass Mode in Low Profile Package," Data Sheet, Avago Technologies, Nov. 2009, 14 pages.
"MGA-675T6—Low Noise Amplifier with Shutdown Mode in Low Profile Package for 4.9-6 GHz Application," Data Sheet, Avago Technologies, Nov. 2009, 16 pages.
"Part 11: Wireless LAN Medium Access Control (MAC) and Physical Layer (PHY) Specifications—Amendment 5: Enhancements for Higher Throughput," IEEE Standard for Information Technology—Telecommunications and Information Exchange Between Systems—Local and Metropolitan Area Networks—Specific Requirements, IEEE Computer Society, IEEE Std 802.11, Sep. 2009, 536 pages.
"Part 11: Wireless LAN Medium Access Control (MAC) and Physical Layer (PHY) Specifications," IEEE Standard for Information Technology—Telecommunications and Information Exchange Between Systems—Local and Metropolitan Area Networks—Specific requirements, IEEE Computer Society, IEEE Std 802.11, Jun. 2007, 1233 pages.
"Part 16: Air Interface for Fixed and Mobile Broadband Wireless Access Systems—Amendment 2: Physical and Medium Access Control Layers for Combined Fixed and Mobile Operation in Licensed Bands and Corrigendum 1," IEEE Standard for Local and Metropolitan Area Networks, IEEE Computer Society and the IEEE Microwave Theory and Techniques Society, IEEE Std 802.16e—2005 and IEEE Std 802.16/2004/Cor1-2005, Feb. 2006, 864 pages.
"Part 16: Air Interface for Fixed Broadband Wireless Access Systems," IEEE Standard for Local and Metropolitan Area Networks, IEEE Std 802.16, IEEE Computer Society and the IEEE Microwave Theory and Techniques Society, Oct. 2004, 895 pages.
"PC203—PC203-10—Basestation PHY Processor," Wireless Communications Processors, Product Brief, picoChip Flexible Wireless, 2008, 4 pages.

(56) References Cited

OTHER PUBLICATIONS

"SC-FDMA—Single Carrier FDMA in LTE," Data Sheet, IXIA Corp., Nov. 2009, 16 pages.
"Spectrum Sharing: The Promise and the Reality", RYSAVY Research, LLC, White Paper, Jul. 2012, pp. 1-12, available at http://www.rysavy.com.
"Technical Report: Electromagenetic Compatibility and Radio Spectrum Matters (ERM); System Reference Document (SRdoc); Mobile Broadband Services in the 2 300 MHz—2400 MHz frequency band under Licensed Shared Access Regime", ETSI TR 103 113 V1.1.1 (Jul. 2013), European Telecommunications Standards Institute, France, 2013, pp. 1-37.
"Understanding MPLS-TP and Its Benefits," White Paper, Cisco Systems Inc., 2009, 6 pages.
"WiMAX/WiBro RF MxFE Transceiver, AD9352," Data Sheet, Analog Devices, 2007.
"WiMAX RF MxFE Transceiver, AD9352-5," Data Sheet, Analog Devices, 2008.
"WiMAX RF MxFE Transceiver, AD9353," Data Sheet, Analog Devices, 2007.
"WiMAX/WiBro RF MxFE MISO Transceiver, AD9354," Data Sheet, Analog Devices, 2008-2009.
"WiMAX/WiBro RF MxFE MISO Transceiver, AD9355," Data Sheet, Analog Devices, 2008-2009.
"WiMAX/BWA/WiBRO/LTE RF MxFE 2×2 MIMO Transceiver, AD9356," Data Sheet, Analog Devices, 2010.
"WiMAX/BWA/LTE RF MxFE 2×2 MIMO Transceiver, AD9357," Data Sheet, Analog Devices, 2010.
Baum, D.S. et al., "An Interim Channel Model for Beyond-3G Systems—Extending the 3GPP Spatial Channel Model (SCM)," IEEE, Vehicular Technology Conference, vol. 5, 2005, pp. 3132-3136.
Beller, D. et al., "MPLS-TP—The New Technology for Packet Transport Networks," Alcatel-Lucent Deutschland AG, Stuttgart, 2009, 11 pages.
Chundury, R., "Mobile Broadband Backhaul: Addressing the Challenge," Planning Backhaul Networks, Ericsson Review, 2008, pp. 4-9.
Conrat, J-M. et al., "Typical MIMO Propagation Channels in Urban Macrocells at 2 GHz," EURASIP Journal on Wireless Communications and Networking, vol. 2007, Iss. 2, Jan. 2007, 9 pages.
Coon, J.P. et al., "Adaptive Frequency-Domain Equalization for Single-Carrier Multiple-Input Multiple-Output Wireless Transmissions," IEEE Transactions on Signal Processing, vol. 53, No. 8, Aug. 2005, pp. 3247-3256.
Coon, J.P. et al., "An Investigation of MIMO Single-Carrier Frequency-Domain MMSE Equalization," Centre for Communications Research, University of Bristol, Sep. 2002, 4 pages.
Durgin, G.D., "Wideband Measurements of Angle and Delay Dispersion for Outdoor and Indoor Peer-to-Peer Radio Channels at 1920 MHz," IEEE Transactions on Antennas and Propagation, vol. 51, No. 5, May 2003, pp. 936-944.
Falconer, D.D. et al., "Broadband Wireless Using Single Carrier and Frequency Domain Equalization," Invited Overview Paper for WPMC '02, Honolulu, Oct. 2002, 10 pages.
Falconer, D.D. et al., "Frequency Domain Equalization for Single-Carrier Broadband Wireless Systems," Wideband Wireless Access Technologies to Broadband Internet, IEEE Communications Magazine, Apr. 2002, pp. 58-66.
Frost, D. et al., "MPLS Transport Profile Data Plane Architecture," Internet Engineering Task Force, RFC 5960, Aug. 2010, 16 pages.
Gao, S.C. et al., "Dual-polarized slot coupled planar antenna with wide bandwidth," IEEE Trans. Antennas and Propagation, vol. 51, No. 3, pp. 441-448, 2003.
Garner, G.M., "IEEE 1588 Version 2," ISPCS Ann Arbor '08, Sep. 2008, 89 pages.
Hentschel, T. et al., "The Digital Front-End—Bridge Between RFand Baseband-Processing," Software Defined Radio: Enabling Technologies by Walter Tuttlebee, Chapter 6, Jun. 2002, 58 pages.

Lashkarian, N., "Reconfigurable Digital Front-end Architecture for Wireless Base-Station Transmitters: Analysis, Design and FPGA Implementation," Seminar Presentation, University of California, Berkeley, Apr. 2006, 86 pages.
Nathanzon, G. et al., "Cost-Effective Backhaul Alternatives for WiMAX Networks: Challenges & Solutions," Provigent Inc., Jun. 2008, 16 pages.
Padhi, S.K. et al., "A Dual Polarized Aperture Coupled Circular Patch Antenna Using a C-Shaped Coupling Slot," IEEE Transactions on Antennas and Propagation, vol. 51, No. 12, Dec. 2003, pp. 3295-3298.
Pancaldi, F. et al., "Single-Carrier Frequency Domain Equalization—A Focus on Wireless Applications," IEEE Signal Processing Magazine, Sep. 2008, 22 pages.
Pozar, D.M. et al., "Improved coupling for aperature-coupled microstrip antennas," Electron. Lett., vol. 27, No. 13, pp. 1129-1131, 1991.
Pozar, D.M., "A microstrip antenna aperature-coupled to a microstripline," Electron. Lett., vol. 21, No. 2, pp. 49-50, 1985.
Sharony, J., "Introduction to Wireless MIMO—Theory and Applications," CEWIT—Center of Excellence in Wireless and Informational Technology, Stony Brook University, IEEE LI, Nov. 15, 2006, 63 pages.
Soffer, R., "Microwave Wireless Backhaul for LTE Networks—Meeting the Rapidly-Increasing Demand for Mobile Data," Provigent Inc., Jan. 2010, 18 pages.
Soffer, R., "ProviBand—Next Generation Wireless Backhaul Technology," Technical White Paper, Provigent Inc., Jan. 2006, 13 pages.
Stuber, G.L. et al., "Broadband MIMO-OFDM Wireless Communications," Invited Paper, Proceedings of the IEEE, vol. 92, No. 2, Feb. 2004, pp. 271-294.
Tubbax, J., "OFDM Versus Single Carrier with Cyclic Prefix: A System-based Comparison for Binary Modulation," IMEC, Belgium, Jan. 2011, 4 pages.
Part 1 of 2: "TV Whitespaces" reuse: A detailed description of the program is provided in FCC order FCC-10-174A1, and the rules for unlicensed devices that operate in the TV bands are set forth in 47 C.P.R. §§ 15.701-.717. See Title 47—Telecommunication; Chapter I—Federal Communications Commission; Subchapter A—General, Part 15-Radio Frequency Devices, Subpart H—Television Band Devices (Available online at http://www.ecfr.gov/cgi-bin/text-idx?c=ecfr&SID=30f46f0753577b10de41d650c7adf941&rgn=div6&view=text&node=47:1.0.1.1.16.8&idno=47:1.0.1.1.16.8 &idno=47, retrieved Feb. 25, 2015).
Notice of Allowance in U.S. Appl. No. 13/212,036, dated Apr. 3, 2012.
Office Action in U.S. Appl. No. 13/271,051, dated Jun. 14, 2013.
Amendment and Response to Office Action in U.S. Appl. No. 13/271,051, filed Dec. 16, 2013.
Notice of Allowance in U.S. Appl. No. 13/271,051, dated Feb. 3, 2014.
Office Action in U.S. Appl. No. 13/371,346, dated Sep. 26, 2012.
Amendment and Response to Office Action in U.S. Appl. No. 13/371,346, filed Dec. 21, 2012.
Applicant Initiated Interview Summary in U.S. Appl. No. 13/371,346, filed Jan. 10, 2013.
Supplemental Amendment and Response to Office Action in U.S. Appl. No. 13/371,346, filed Jan. 25, 2013.
Notice of Allowance in U.S. Appl. No. 13/371,346, dated Apr. 2, 2013.
Office Action in U.S. Appl. No. 13/371,366, dated Apr. 19, 2012.
Amendment and Response to Office Action in U.S. Appl. No. 13/371,366, dated Jul. 19, 2012.
Notice of Allowance in U.S. Appl. No. 13/371,366, dated Sep. 21, 2012.
Office Action in U.S. Appl. No. 13/415,778, mailed Apr. 26, 2012.
Applicant Initiated Interview Summary in U.S. Appl. No. 13/415,778, filed Jul. 5, 2012.
Amendment and Response to Office Action in U.S. Appl. No. 13/415,778, dated Jul. 26, 2012.
Notice of Allowance in U.S. Appl. No. 13/415,778, mailed Sep. 17, 2012.
Office Action in U.S. Appl. No. 13/448,294, dated on Jun. 21, 2012.

(56) References Cited

OTHER PUBLICATIONS

Amendment and Response to Office Action in U.S. Appl. No. 13/448,294, dated Sep. 21, 2012.
Notice of Allowance in U.S. Appl. No. 13/448,294, dated Oct. 23, 2012.
Notice of Allowance in U.S. Appl. No. 13/536,927, dated Feb. 19, 2013.
Notice of Allowance in U.S. Appl. No. 29/429,634 dated Dec. 5, 2013.
Office Action in U.S. Appl. No. 13/632,961, dated May 6, 2014.
Office Action in U.S. Appl. No. 13/632,993, dated Jan. 30, 2015.
Notice of Allowance in U.S. Appl. No. 13/633,028, dated May 1, 2014.
Office Action in U.S. Appl. No. 13/645,472, dated May 24, 2013.
Amendment and Response to Office Action in U.S. Appl. No. 13/645,472, dated Nov. 25, 2013.
Supplemental Amendment and Response to Office Action in U.S. Appl. No. 13/645,472, dated Jan. 27, 2014.
Notice of Allowance in U.S. Appl. No. 13/645,472, dated Apr. 4, 2014.
Notice of Allowance in U.S. Appl. No. 13/748,544, dated Aug. 15, 2014.
Notice of Allowance in U.S. Appl. No. 13/898,429, dated Apr. 8, 2014.
Office Action in U.S. Appl. No. 13/934,175, dated Oct. 15, 2014.
Notice of Allowance in U.S. Appl. No. 14/197,158, dated Sep. 3, 2014.
Examiner Initiated Interview Summary in U.S. Appl. No. 14/197,158, filed Sep. 3, 2014.
Examiner Initiated Interview Summary in U.S. Appl. No. 14/199,734, dated Jun. 13, 2014.
Notice of Allowance in U.S. Appl. No. 14/199,734, dated Jun. 13, 2014.
Notice of Allowance in U.S. Appl. No. 14/336,958, dated Nov. 26, 2014.
Preliminary Amendment and Response in U.S. Appl. No. 14/337,744, dated Aug. 20, 2014.
Applicant Response and Amendment in U.S. Appl. No. 14/337,744, dated Oct. 6, 2014.
Notice of Allowance in U.S. Appl. No. 14/337,744, dated Jan. 12, 2015.
Office Action in U.S. Appl. No. 14/502,471, dated Jan. 5, 2015.
Notice of Allowance in U.S. Appl. No. 14/498,959, dated Jan. 12, 2015.
Office Action in U.S. Appl. No. 14/552,431, dated Mar. 12, 2015.
International Search Report and Written Opinion for PCT Application No. PCT/US2012/049948 dated Oct. 22, 2012.
International Search Report and Written Opinion for PCT Application No. PCT/US2012/059797 dated Jan. 2, 2013.
International Search Report and Written Opinion for PCT Application No. PCT/US2013/029731 dated May 13, 2013.
International Search Report and Written Opinion in PCT Application No. PCT/US013/48782, dated Jul. 29, 2013.
Extended European Search Report in European Patent Application No. 14177662.5, dated Feb. 3, 2015.
U.S. Appl. No. 14/552,431, filed Nov. 24, 2014.
U.S. Appl. No. 14/632,624, filed Feb. 26, 2015.

* cited by examiner $$H = \begin{bmatrix} h_{11} & h_{12} \\ h_{21} & h_{22} \end{bmatrix} \qquad \text{Eq 3Q-1}$$

Where, H is a matrix of order M by N. ( M rows and N columns)

$h_{mn}$ is a complex number (potentially with a dependence on frequency) and represents the gain and phase of the wireless channel from the $m^{th}$ transmitter to the $n^{th}$ receiver Partial Listing of permissible frequencies of operation
for fixed point to point microwave operation T1 Incumbent and T2 Deployment

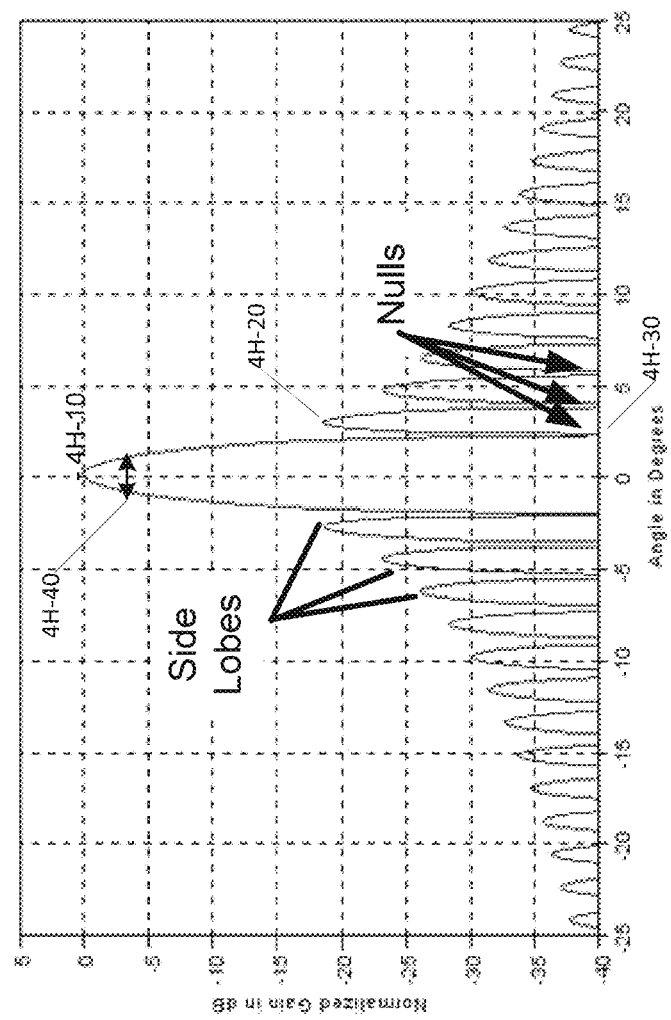
FIG. 4H – Example Antenna Pattern

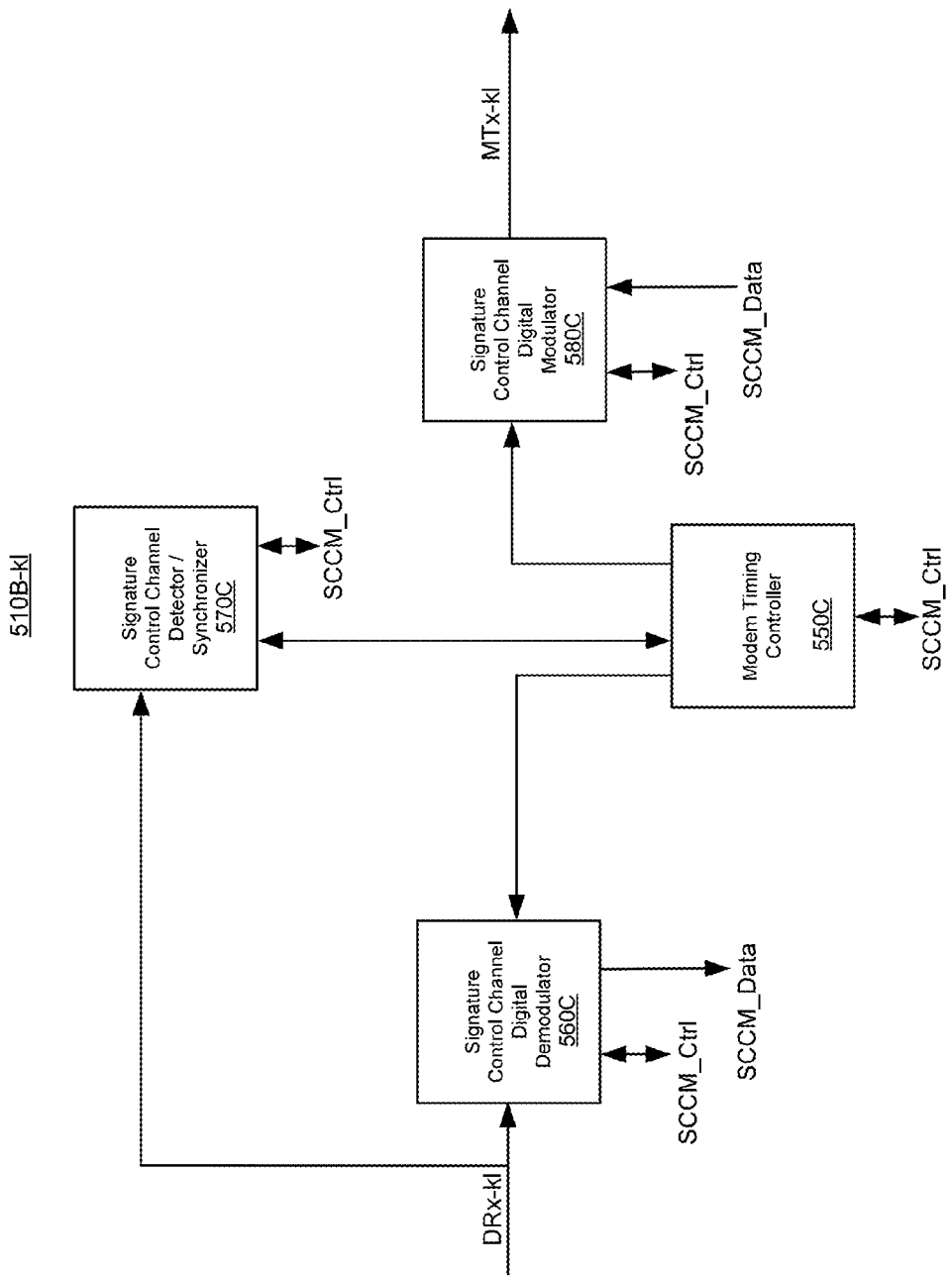

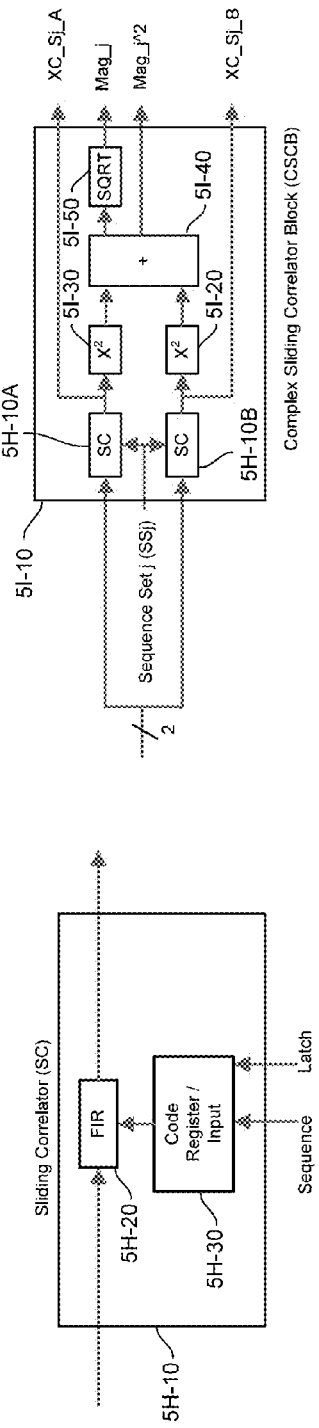
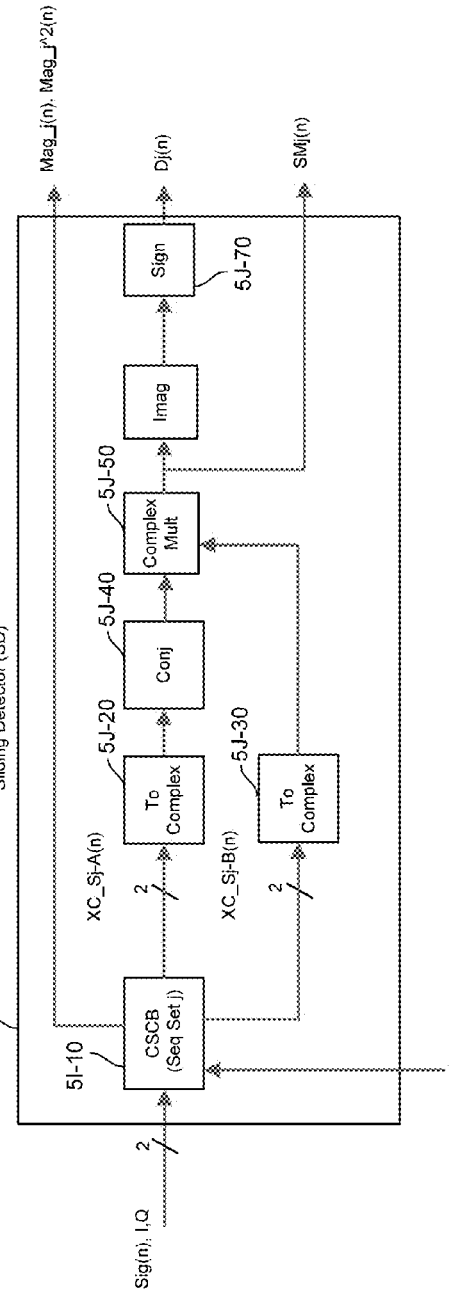
FIG. 5H
FIG. 5I
FIG. 5J

| Example Registry Entries | | | | |
|---|---|---|---|---|
| FCC ID | MHLD12 | DOD345 | KRM123 | LLS234 |
| MAC Address | N/A | 01:2E:AF:4B:FF:1A | 00:1C:48:00:03:1A | 00:1C:48:01:A1:FA |
| Lat | 28.087617 | 37.795157 | 40.70686 | 37.409629 |
| Long | -80.649492 | -122.402732 | -74.011128 | -122.026175 |
| Address | 1333 Gateway Dr., Melbourne, FL 32901 | 600 Montgomery St, San Francisco, CA 94111 | 11 Wall Street New York, NY 10005 | 1194 N. Mathilda Ave. Sunnyvale, CA |
| Tier | 1-Legacy | 1-Incumbent | 2 | 3 |
| Tx Power | 30 | 30 | N/A | N/A |
| Antenna Type | fixed 3 m dish | Adaptive | N/A | N/A |
| Azimuth (Deg) | 265 | | 15 N/A | N/A |
| Elevation (m) | 105 | | 15 | |
| Equipment ID | XXXXXX | FB0723 | FB0723 | 2 |
| Using Common Control Channel | N/A | Y, 33 | N | Y, 66 |
| M-ACTUAL | N/A | N/A | | |
| M-TOT | N/A | N/A | | 4 |
| M-REG | 8 | 8 | 8 | 8 |
| Registered Channels(1..M-REG) | 1,2,3,4,67,68,69,70 | 34,35,36 | 2,3,4,5,6,7,8,9 | 2,3,90,91 |
| Duplexing Mode | FDD | TDD | TDD | FDD |
| Licensed C/I (dB) | N/A | N/A | 20 N/A | |
| SIP Address | N/A | 01:2E:AF:FF:1A@ABS.FCC.gov | 00:1C:48:00:11:A@ABSRegistry.com | 00:1C:48:01:A1FA@ABSRegistry.com |
| P-MAX (dBm) | N/A | N/A | 30 | 35 |
| P-NOM (dBm) | N/A | N/A | 20 | 15 |
| P-Allow (dBm) | N/A | N/A | 25 | 20 |
| Date Occupied | 1/1/67 | 1/1/14 | 4/1/13 | 5/1/14 |
| Date Licensed | 1/1/67 | 8/1/13 | 3/1/13 | 1/1/13 |
| Geographic Region | 12467 | 89034 | 12460 | 12459 |

FIG. 8A

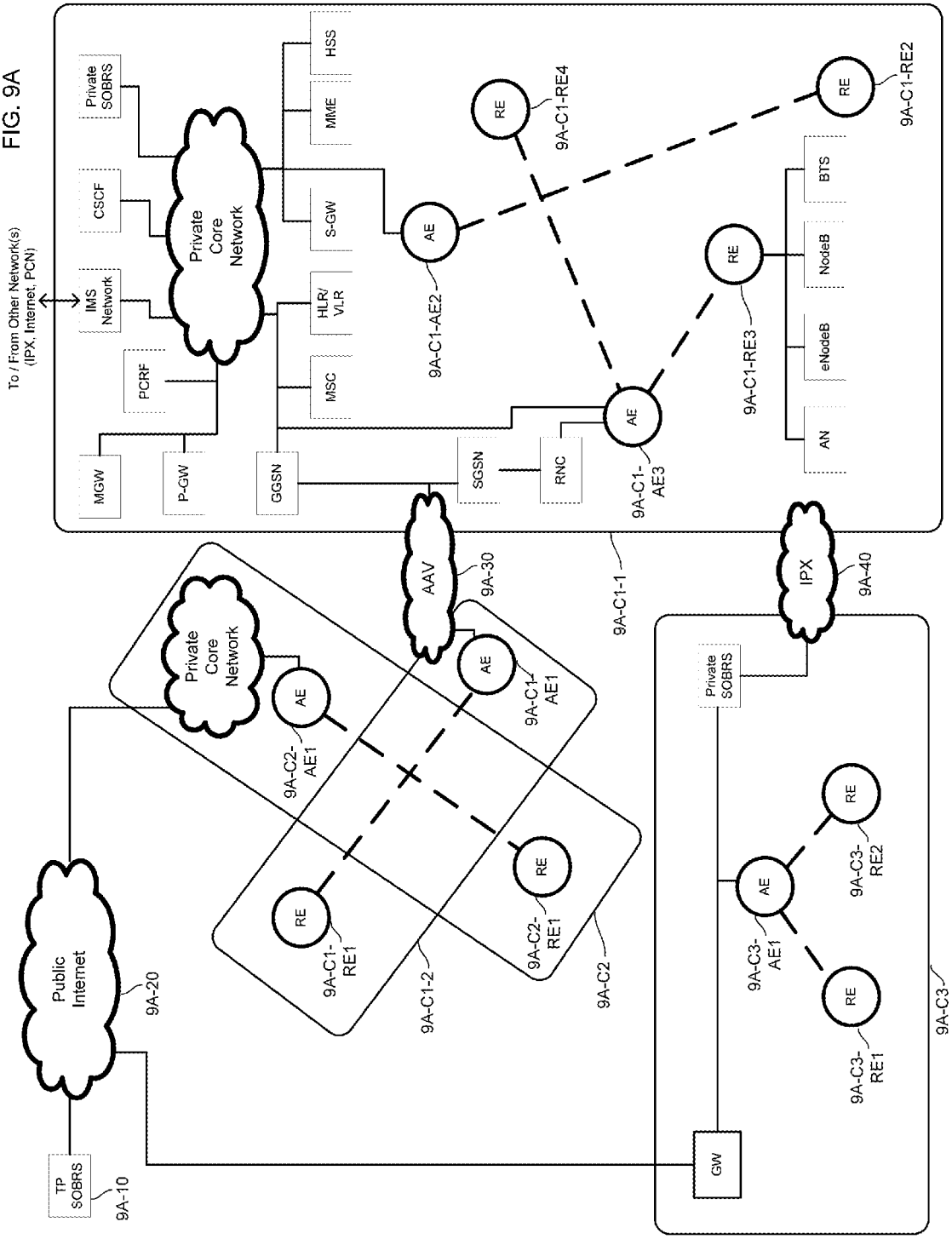

SELF ORGANIZING BACKHAUL RADIO

PRIORITY

The present application is a continuation-in-part of U.S. patent application Ser. No. 14/502,471, filed Sep. 30, 2014, which is a continuation-in-part of U.S. patent application Ser. No. 14/098,456, filed Dec. 5, 2013 and U.S. patent application Ser. No. 14/337,744, filed Jul. 22, 2014, which is a continuation of U.S. patent application Ser. No. 13/645,472, filed on Oct. 4, 2012, (U.S. Pat. No. 8,811,365) which is a continuation application of U.S. patent application Ser. No. 13/371,366, filed on Feb. 10, 2012, (U.S. Pat. No. 8,311,023) which is a continuation application of U.S. patent application Ser. No. 13/212,036, filed on Aug. 17, 2011, (U.S. Pat. No. 8,238,318), the disclosures of which are hereby incorporated herein by reference in their entireties.

BACKGROUND

1. Field

The present disclosure relates generally to data networking and in particular to a backhaul radio for connecting remote edge access networks to core networks.

2. Related Art

Data networking traffic has grown at approximately 100% per year for over 20 years and continues to grow at this pace. Only transport over optical fiber has shown the ability to keep pace with this ever-increasing data networking demand for core data networks. While deployment of optical fiber to an edge of the core data network would be advantageous from a network performance perspective, it is often impractical to connect all high bandwidth data networking points with optical fiber at all times. Instead, connections to remote edge access networks from core networks are often achieved with wireless radio, wireless infrared, and/or copper wireline technologies.

Radio, especially in the form of cellular or wireless local area network (WLAN) technologies, is particularly advantageous for supporting mobility of data networking devices. However, cellular base stations or WLAN access points inevitably become very high data bandwidth demand points that require continuous connectivity to an optical fiber core network.

When data aggregation points, such as cellular base station sites, WLAN access points, or other local area network (LAN) gateways, cannot be directly connected to a core optical fiber network, then an alternative connection, using, for example, wireless radio or copper wireline technologies, must be used. Such connections are commonly referred to as "backhaul."

Many cellular base stations deployed to date have used copper wireline backhaul technologies such as T1, E1, DSL, etc. when optical fiber is not available at a given site. However, the recent generations of HSPA+ and LTE cellular base stations have backhaul requirements of 100 Mb/s or more, especially when multiple sectors and/or multiple mobile network operators per cell site are considered. WLAN access points commonly have similar data backhaul requirements. These backhaul requirements cannot be practically satisfied at ranges of 300 m or more by existing copper wireline technologies. Even if LAN technologies such as Ethernet over multiple dedicated twisted pair wiring or hybrid fiber/coax technologies such as cable modems are considered, it is impractical to backhaul at such data rates at these ranges (or at least without adding intermediate repeater equipment). Moreover, to the extent that such special wiring (i.e., CAT 5/6 or coax) is not presently available at a remote edge access network location; a new high capacity optical fiber is advantageously installed instead of a new copper connection.

Rather than incur the large initial expense and time delay associated with bringing optical fiber to every new location, it has been common to backhaul cell sites, WLAN hotspots, or LAN gateways from offices, campuses, etc. using microwave radios. An exemplary backhaul connection using the microwave radios 132 is shown in FIG. 1. Traditionally, such microwave radios 132 for backhaul have been mounted on high towers 112 (or high rooftops of multi-story buildings) as shown in FIG. 1, such that each microwave radio 132 has an unobstructed line of sight (LOS) 136 to the other. These microwave radios 132 can have data rates of 100 Mb/s or higher at unobstructed LOS ranges of 300 m or longer with latencies of 5 ms or less (to minimize overall network latency).

Traditional microwave backhaul radios 132 operate in a Point-to-point (PTP) configuration using a single "high gain" (typically>30 dBi or even>40 dBi) antenna at each end of the link 136, such as, for example, antennas constructed using a parabolic dish. Such high gain antennas mitigate the effects of unwanted multipath self-interference or unwanted co-channel interference from other radio systems such that high data rates, long range and low latency can be achieved. These high gain antennas however have narrow radiation patterns.

Furthermore, high gain antennas in traditional microwave backhaul radios 132 require very precise, and usually manual, physical alignment of their narrow radiation patterns in order to achieve such high performance results. Such alignment is almost impossible to maintain over extended periods of time unless the two radios have a clear unobstructed line of sight (LOS) between them over the entire range of separation. Furthermore, such precise alignment makes it impractical for any one such microwave backhaul radio to communicate effectively with multiple other radios simultaneously (i.e., a "point-to-multipoint" (PMP) configuration).

In wireless edge access applications, such as cellular or WLAN, advanced protocols, modulation, encoding and spatial processing across multiple radio antennas have enabled increased data rates and ranges for numerous simultaneous users compared to analogous systems deployed 5 or 10 years ago for obstructed LOS propagation environments where multipath and co-channel interference were present. In such systems, "low gain" (usually <6 dBi) antennas are generally used at one or both ends of the radio link both to advantageously exploit multipath signals in the obstructed LOS environment and allow operation in different physical orientations as would be encountered with mobile devices. Although impressive performance results have been achieved for edge access, such results are generally inadequate for emerging backhaul requirements of data rates of 100 Mb/s or higher, ranges of 300 m or longer in obstructed LOS conditions, and latencies of 5 ms or less.

In particular, "street level" deployment of cellular base stations, WLAN access points or LAN gateways (e.g., deployment at street lamps, traffic lights, sides or rooftops of single or low-multiple story buildings) suffers from problems because there are significant obstructions for LOS in urban environments (e.g., tall buildings, or any environments where tall trees or uneven topography are present).

FIG. 1 illustrates edge access using conventional unobstructed LOS PTP microwave radios 132. The scenario depicted in FIG. 1 is common for many $2^{nd}$ Generation (2G)

and 3rd Generation (3G) cellular network deployments using "macrocells". In FIG. 1, a Cellular Base Transceiver Station (BTS) 104 is shown housed within a small building 108 adjacent to a large tower 112. The cellular antennas 116 that communicate with various cellular subscriber devices 120 are mounted on the towers 112. The PTP microwave radios 132 are mounted on the towers 112 and are connected to the BTSs 104 via an nT1 interface. As shown in FIG. 1 by line 136, the radios 132 require unobstructed LOS.

The BTS on the right 104a has either an nT1 copper interface or an optical fiber interface 124 to connect the BTS 104a to the Base Station Controller (BSC) 128. The BSC 128 either is part of or communicates with the core network of the cellular network operator. The BTS on the left 104b is identical to the BTS on the right 104a in FIG. 1 except that the BTS on the left 104b has no local wireline nT1 (or optical fiber equivalent) so the nT1 interface is instead connected to a conventional PTP microwave radio 132 with unobstructed LOS to the tower on the right 112a. The nT1 interfaces for both BTSs 104a, 104b can then be backhauled to the BSC 128 as shown in FIG. 1.

FIG. 2A is a block diagram of the major subsystems of a conventional PTP microwave radio 200A for the case of Time-Division Duplex (TDD) operation, and FIG. 2B is a block diagram of the major subsystems of a conventional PTP microwave radio 200B for the case of Frequency-Division Duplex (FDD) operation.

As shown in FIG. 2A and FIG. 2B, the conventional PTP microwave radio traditionally uses one or more (i.e. up to "n") T1 interfaces 204A and 204B (or in Europe, E1 interfaces). These interfaces (204A and 204B) are common in remote access systems such as 2G cellular base stations or enterprise voice and/or data switches or edge routers. The T1 interfaces are typically multiplexed and buffered in a bridge (e.g., the Interface Bridge 208A, 208B) that interfaces with a Media Access Controller (MAC) 212A, 212B.

The MAC 212A, 212B is generally denoted as such in reference to a sub-layer of Layer 2 within the Open Systems Interconnect (OSI) reference model. Major functions performed by the MAC include the framing, scheduling, prioritizing (or "classifying"), encrypting and error checking of data sent from one such radio at FIG. 2A or FIG. 2B to another such radio. The data sent from one radio to another is generally in a "user plane" if it originates at the T1 interface(s) or in the "control plane" if it originates internally such as from the Radio Link Controller (RLC) 248A, 248B shown in FIG. 2A or FIG. 2B.

With reference to FIGS. 2A and 2B, the Modem 216A, 216B typically resides within the "baseband" portion of the Physical (PHY) layer 1 of the OSI reference model. In conventional PTP radios, the baseband PHY, depicted by Modem 216A, 216B, typically implements scrambling, forward error correction encoding, and modulation mapping for a single RF carrier in the transmit path. In receive, the modem typically performs the inverse operations of demodulation mapping, decoding and descrambling. The modulation mapping is conventionally Quadrature Amplitude Modulation (QAM) implemented with In-phase (I) and Quadrature-phase (Q) branches.

The Radio Frequency (RF) 220A, 220B also resides within the PHY layer of the radio. In conventional PTP radios, the RF 220A, 220B typically includes a single transmit chain (Tx) 224A, 224B that includes I and Q digital to analog converters (DACs), a vector modulator, optional upconverters, a programmable gain amplifier, one or more channel filters, and one or more combinations of a local oscillator (LO) and a frequency synthesizer. Similarly, the RF 220A, 220B also typically includes a single receive chain (Rx) 228A, 228B that includes I and Q analog to digital converters (ADCs), one or more combinations of an LO and a frequency synthesizer, one or more channel filters, optional downconverters, a vector demodulator and an automatic gain control (AGC) amplifier. Note that in many cases some of the one or more LO and frequency synthesizer combinations can be shared between the Tx and Rx chains.

As shown in FIGS. 2A and 2B, conventional PTP radios 200A, 200B also include a single power amplifier (PA) 232A, 232B. The PA 232A, 232B boosts the transmit signal to a level appropriate for radiation from the antenna in keeping with relevant regulatory restrictions and instantaneous link conditions. Similarly, such conventional PTP radios 232A, 232B typically also include a single low-noise amplifier (LNA) 236, 336 as shown in FIGS. 2A and 2B. The LNA 236A, 236B boosts the received signal at the antenna while minimizing the effects of noise generated within the entire signal path.

As described above, FIG. 2A illustrates a conventional PTP radio 200A for the case of TDD operation. As shown in FIG. 2A, conventional PTP radios 200A typically connect the antenna 240A to the PA 232A and LNA 236A via a band-select filter 244A and a single-pole, single-throw (SPST) switch 242A.

As described above, FIG. 2B illustrates a conventional PTP radio 200B for the case of FDD operation. As shown in FIG. 2B, in conventional PTP radios 200B, then antenna 240B is typically connected to the PA 232B and LNA 236B via a duplexer filter 244B. The duplexer filter 244B is essentially two band-select filters (tuned respectively to the Tx and Rx bands) connected at a common point.

In the conventional PTP radios shown in FIGS. 2A and 2B, the antenna 240A, 240B is typically of very high gain such as can be achieved by a parabolic dish so that gains of typically >30 dBi (or even sometimes >40 dBi), can be realized. Such an antenna usually has a narrow radiation pattern in both the elevation and azimuth directions. The use of such a highly directive antenna in a conventional PTP radio link with unobstructed LOS propagation conditions ensures that the modem 216A, 216B has insignificant impairments at the receiver (antenna 240A, 240B) due to multipath self-interference and further substantially reduces the likelihood of unwanted co-channel interference due to other nearby radio links.

Although not explicitly shown in FIGS. 2A and 2B, the conventional PTP radio may use a single antenna structure with dual antenna feeds arranged such that the two electromagnetic radiation patterns emanated by such an antenna are nominally orthogonal to each other. An example of this arrangement is a parabolic dish. Such an arrangement is usually called dual-polarized and can be achieved either by orthogonal vertical and horizontal polarizations or orthogonal left-hand circular and right-hand circular polarizations.

When duplicate modem blocks, RF blocks, and PA/LNA/switch blocks are provided in a conventional PTP radio, then connecting each PHY chain to a respective polarization feed of the antenna allows theoretically up to twice the total amount of information to be communicated within a given channel bandwidth to the extent that cross-polarization self-interference can be minimized or cancelled sufficiently. Such a system is said to employ "dual-polarization" signaling. Such systems may be referred to as having two "streams" of information, whereas multiple input multiple output (MIMO) systems utilizing spatial multiplexing may achieve successful communications using even more than two streams in practice.

When an additional circuit (not shown) is added to FIG. 2A that can provide either the RF Tx signal or its anti-phase equivalent to either one or both of the two polarization feeds of such an antenna, then "cross-polarization" signaling can be used to effectively expand the constellation of the modem within any given symbol rate or channel bandwidth. With two polarizations and the choice of RF signal or its anti-phase, then an additional two information bits per symbol can be communicated across the link. Theoretically, this can be extended and expanded to additional phases, representing additional information bits. At the receiver, for example, a circuit (not shown) could detect if the two received polarizations are anti-phase with respect to each other, or not, and then combine appropriately such that the demodulator in the modem block can determine the absolute phase and hence deduce the values of the two additional information bits. Cross-polarization signaling has the advantage over dual-polarization signaling in that it is generally less sensitive to cross-polarization self-interference but for high order constellations such as 64-QAM or 256-QAM, the relative increase in channel efficiency is smaller.

In the conventional PTP radios shown in FIGS. 2A and 2B, substantially all the components are in use at all times when the radio link is operative. However, many of these components have programmable parameters that can be controlled dynamically during link operation to optimize throughout and reliability for a given set of potentially changing operating conditions. The conventional PTP radios of FIGS. 2A and 2B control these link parameters via a Radio Link Controller (RLC) 248A, 248B. The RLC functionality is also often described as a Link Adaptation Layer that is typically implemented as a software routine executed on a microcontroller within the radio that can access the MAC 212A, 212B, Modem 216A, 216B, RF 220A, 220B and/or possibly other components with controllable parameters. The RLC 248A, 248B typically can both vary parameters locally within its radio and communicate with a peer RLC at the other end of the conventional PTP radio link via "control frames" sent by the MAC 212A, 212B with an appropriate identifying field within a MAC Header.

Typical parameters controllable by the RLC 248A, 248B for the Modem 216A, 216B of a conventional PTP radio include encoder type, encoding rate, constellation selection and reference symbol scheduling and proportion of any given PHY Protocol Data Unit (PPDU). Typical parameters controllable by the RLC 248A, 248B for the RF 220A, 220B of a conventional PTP radio include channel frequency, channel bandwidth, and output power level. To the extent that a conventional PTP radio employs two polarization feeds within its single antenna, additional parameters may also be controlled by the RLC 248A, 248B as self-evident from the description above.

In conventional PTP radios, the RLC 248A, 248B decides, usually autonomously, to attempt such parameter changes for the link in response to changing propagation environment characteristics such as, for example, humidity, rain, snow, or co-channel interference. There are several well-known methods for determining that changes in the propagation environment have occurred such as monitoring the receive signal strength indicator (RSSI), the number of or relative rate of FCS failures at the MAC 212A, 212B, and/or the relative value of certain decoder accuracy metrics. When the RLC 248A, 248B determines that parameter changes should be attempted, it is necessary in most cases that any changes at the transmitter end of the link become known to the receiver end of the link in advance of any such changes. For conventional PTP radios, and similarly for many other radios, there are at least two well-known techniques that in practice may not be mutually exclusive. First, the RLC 248A, 248B may direct the PHY, usually in the Modem 216A, 216B relative to FIGS. 2A and 2B, to pre-pend a PHY layer convergence protocol (PLCP) header to a given PPDU that includes one or more (or a fragment thereof) given MPDUs wherein such PLCP header has information fields that notify the receiving end of the link of parameters used at the transmitting end of the link. Second, the RLC 248A, 248B may direct the MAC 212A, 212B to send a control frame, usually to a peer RLC 248A, 248B, including various information fields that denote the link adaptation parameters either to be deployed or to be requested or considered.

The foregoing describes at an overview level the typical structural and operational features of conventional PTP radios which have been deployed in real-world conditions for many radio links where unobstructed (or substantially unobstructed) LOS propagation was possible. The conventional PTP radio on a whole is completely unsuitable for obstructed LOS PTP or PMP operation.

More recently, as briefly mentioned, there has been significant adoption of so called multiple input multiple output (MIMO) techniques, which utilizes spatial multiplexing of multiple information streams between a plurality of transmission antennas to a plurality of receive antennas. The adoption of MIMO has been most beneficial in wireless communication systems for use in environments having significant multipath scattering propagation. One such system is IEEE802.11n for use in home networking Attempts have been made to utilize MIMO and spatial multiplexing in line of sight environments having minimal scattering, which have generally been met with failure, in contrast to the use of cross polarized communications. For example IEEE802.11n based Mesh networked nodes deployed at streetlight elevation in outdoor environments often experience very little benefit from the use of spatial multiplexing due to the lack of a rich multipath propagation environment. Additionally, many of these deployments have limited range between adjacent mesh nodes due to physical obstructions resulting in the attenuation of signal levels.

Radios and systems with MIMO capabilities intended for use in both near line of sight (NLOS) and line of sight (LOS) environments are disclosed in U.S. patent application Ser. No. 13/212,036, now U.S. Pat. No. 8,238,318, and Ser. No. 13/536,927, both of which are incorporated herein by reference, and are referred to herein by the term "Intelligent Backhaul Radio" (IBR).

FIGS. 3A and 3B illustrate exemplary embodiments of the disclosed IBRs. In FIGS. 3A and 3B, the IBRs include interfaces 304A, interface bridge 308A, MAC 312A, modem 324A, channel MUX 328A, RF 332A, which includes Tx1 . . . TxM 336A and Rx1 . . . RxN 340A, IBR Antenna Array 348A (includes multiple antennas 352A), a Radio Link Controller (RLC) 356A and a Radio Resource Controller (RRC) 360A. The IBR may optionally include an "Intelligent Backhaul Management System" (or "IBMS") agent 370B as shown in FIG. 3B. It will be appreciated that the components and elements of the IBRs may vary from that illustrated in FIGS. 3A and 3B.

Embodiments of such intelligent backhaul radios, as disclosed in the foregoing references, include one or more demodulator cores within modem 324A, wherein each demodulator core demodulates one or more receive symbol streams to produce a respective receive data interface stream; a plurality of receive RF chains 340A within IBR RF 332A to convert from a plurality of receive RF signals from IBR Antenna Array 348A, to a plurality of respective receive chain output signals; a frequency selective receive path channel multiplexer within IBR Channel multiplexer 328A, interposed between the one or more demodulator cores and the plurality of receive RF chains, to produce the one or more receive symbol streams provided to the one or more demodulator cores from the plurality of receive chain output signals; an IBR Antenna Array (348A) including: a plurality of directive gain antenna elements 352A; and one or more selectable RF connections that selectively couple certain of the plurality of directive gain antenna elements to certain of the plurality of receive RF chains, wherein the number of directive gain antenna elements that can be selectively coupled to receive RF chains exceeds the number of receive RF chains that can accept receive RF signals from the one or more selectable RF connections; and a radio resource controller, wherein the radio resource controller sets or causes to be set the specific selective couplings between the certain of the plurality of directive gain antenna elements and the certain of the plurality of receive RF chains.

The intelligent backhaul radio may further include one or more modulator cores within IBR Modem 324A, wherein each modulator core modulates a respective transmit data interface stream to produce one or more transmit symbol streams; a plurality of transmit RF chains 336A within IBR RF 332A, to convert from a plurality of transmit chain input signals to a plurality of respective transmit RF signals; a transmit path channel multiplexer within IBR Channel MUX 328A, interposed between the one or more modulator cores and the plurality of transmit RF chains, to produce the plurality of transmit chain input signals provided to the plurality of transmit RF chains from the one or more transmit symbol streams; and, wherein the IBR Antenna Array 348A further includes a plurality of RF connections to couple at least certain of the plurality of directive gain antenna elements to the plurality of transmit RF chains.

The primary responsibility of the RLC 356A in exemplary intelligent backhaul radios is to set or cause to be set the current transmit "Modulation and Coding Scheme" (or "MCS") and output power for each active link. For links that carry multiple transmit streams and use multiple transmit chains and/or transmit antennas, the MCS and/or output power may be controlled separately for each transmit stream, chain, or antenna. In certain embodiments, the RLC operates based on feedback from the target receiver for a particular transmit stream, chain and/or antenna within a particular intelligent backhaul radio.

The intelligent backhaul radio may further include an intelligent backhaul management system agent 370B that sets or causes to be set certain policies relevant to the radio resource controller, wherein the intelligent backhaul management system agent exchanges information with other intelligent backhaul management system agents within other intelligent backhaul radios or with one or more intelligent backhaul management system servers.

FIG. 3C illustrates an exemplary embodiment of an IBR Antenna Array 348A. FIG. 3C illustrates an antenna array having Q directive gain antennas 352A (i.e., where the number of antennas is greater than 1). In FIG. 3C, the IBR Antenna Array 348A includes an IBR RF Switch Fabric 312C, RF interconnections 304C, a set of Front-ends 308C and the directive gain antennas 352A. The RF interconnections 304C can be, for example, circuit board traces and/or coaxial cables. The RF interconnections 304C connect the IBR RF Switch Fabric 312C and the set of Front-ends 308C. Each Front-end 308C is associated with an individual directive gain antenna 352A, numbered consecutively from 1 to Q.

FIG. 3D illustrates an exemplary embodiment of the Front-end circuit 308C of the IBR Antenna Array 348A of FIG. 3C for the case of TDD operation, and FIG. 3E illustrates an exemplary embodiment of the Front-end circuit 308C of the IBR Antenna Array 348A of FIG. 3C for the case of FDD operation. The Front-end circuit 308C of FIG. 3E includes a transmit power amplifier PA 304D, a receive low noise amplifier LNA 308D, SPDT switch 312D and band-select filter 316D. The Front-end circuit 308C of FIG. 3E includes a transmit power amplifier PA 304E, receive low noise amplifier LNA 308E, and duplexer filter 312E. These components of the Front-end circuit are substantially conventional components available in different form factors and performance capabilities from multiple commercial vendors.

As shown in FIGS. 3D and 3E, each Front-end 308E also includes an "Enable" input 320D, 320E that causes substantially all active circuitry to power-down. Power-down techniques are well known. Power-down is advantageous for IBRs in which not all of the antennas are utilized at all times. It will be appreciated that alternative embodiments of the IBR Antenna Array may not utilize the "Enable" input 320D, 320E or power-down feature. Furthermore, for embodiments with antenna arrays where some antenna elements are used only for transmit or only for receive, then certain Front-ends (not shown) may include only the transmit or only the receive paths of FIGS. 3D and 3E as appropriate.

FIG. 3F illustrates an alternative embodiment of an IBR Antenna Array 348A and includes a block diagram of an IBR antenna array according to one embodiment of the invention relating to the use of dedicated transmission and reception antennas. In some IBR embodiments the embodiment of FIG. 3C may be replaced with the embodiments described in relation to FIG. 3F. For instance, such substitution may be made in use with any of FDD, TDD, or even non-conventional duplexing systems. FIG. 3F illustrates an antenna array having $Q_R+Q_T$ directive gain antennas 352A (i.e., where the number of antennas is greater than 1). In FIG. 3F, the IBR Antenna Array 348A includes an IBR RF Switch Fabric 312F, RF interconnections 304C, a set of Front-ends 309F and 310F and the directive gain antennas 352A. The RF interconnections 304C can be, for example, circuit board traces and/or coaxial cables. The RF interconnections 304C connect the IBR RF Switch Fabric 312F and the set of Front-end Transmission Units 309F and the set of Front-end Reception Units 310F. Each Front-end transmission unit 309F is associated with an individual directive gain antenna 352A, numbered consecutively from 1 to $Q_T$. Each Front-end reception unit 310F is associated with an individual directive gain antenna 352A, numbered consecutively from 1 to $Q_R$. The present embodiment may be used, for example, with the antenna array embodiments of FIG. 3I, 3J, or embodiments described elsewhere. Such dedicated transmission antennas are coupled to front-end transmission units 309F and include antenna element 352A.

In alternative embodiment, the IBR RF Switch fabric 312F may be bypassed for the transmission signals when the number of dedicated transmission antennas and associated front-end transmission units ($Q_T$) is equal to the number of RF transmission signals RF-Tx-M (e.g. $Q_T$=M), resulting in directly coupling the IBR RF 336A transmissions to respective transmission front-end transmission units 309F. The dedicated reception antennas, including an antenna element 352A in some embodiments, are coupled to front-end reception units 310F, which in the present embodiment are coupled to the IBR RF Switch Fabric. In an additional alternative embodiment, the IBR RF Switch fabric 312F may be bypassed for the reception signals when the number of dedicated reception antennas and associated front-end reception units ($Q_R$) is equal to the number of RF reception signals RF-Rx-N (e.g. $Q_R$=N), resulting in directly coupling the IBR RF 340A reception ports to respective front-end reception units 310F.

FIG. 3G is a block diagram of a front-end transmission unit according to one embodiment of the invention relating to the use of dedicated transmission and reception antennas, and FIG. 3H is a block diagram of a front-end reception unit according to one embodiment of the invention relating to the use of dedicated transmission and reception antennas. As shown in FIGS. 3G and 3H, each Front-end 309F and 310F also includes a respective "Enable" input 325F, 330F that causes substantially all respective active circuitry to power-down, and any known power-down technique may be used. Power-down is advantageous for IBRs in which not all of the antennas are utilized at all times. It will be appreciated that alternative embodiments of the IBR Antenna Array may not utilize the "Enable" input 325F, 330F or any power-down feature. Furthermore, for some embodiments associated with FIG. 3F for example (with antenna arrays where some antenna elements are used only for transmit or only for receive) then certain Front-ends may include only the transmit 309F or only the receive paths 310F of FIGS. 3G and 3H as appropriate. With respect to FIG. 3G, Bandpass filter 340G receives transmission signal RF-SW-Tx-qt, provides filtering and couples the signal to power amplifier 304G, then to low pass filter 350G. The output of the lowpass filter is then coupled to dedicated transmission antenna, which includes directive antenna element 352A. With respect to FIG. 3H, directive antenna element 352A is a dedicated receive only antenna and coupled to receive filter 370H, when is in turn coupled to LNA 308H. The resulting amplified receive signal is coupled to band bass filter 360H, which provides output RF-SW-Rx-qr.

As described above, each Front-end (FE-q) corresponds to a particular directive gain antenna 352A. Each antenna 352A has a directivity gain Gq. For IBRs intended for fixed location street-level deployment with obstructed LOS between IBRs, whether in PTP or PMP configurations, each directive gain antenna 352A may use only moderate directivity compared to antennas in conventional PTP systems at a comparable RF transmission frequency.

As described in greater detail in U.S. patent application Ser. No. 13/212,036, now U.S. Pat. No. 8,238,318, and Ser. No. 13/536,927 and incorporated herein by reference, various antenna configurations may be utilized in point-to-point and point-to-multipoint embodiments of the current invention. With reference to FIG. 3I, a block diagram of an exemplary IBR antenna array is depicted. Such an array may also be used in part or in entirety as a receive and/or transmit antenna array for an IBR device according to one embodiment of the invention. As the array includes a plurality of antenna panels (310I-A.D, 330I, for example), each panel may include one of the antenna structures or individual antennas including the antenna structures. In an IBR device, normally two such antenna arrays including some or all of the antenna panels depicted in FIG. 3I would be utilized with an azimuthal directional bias different for each array or for each collection of one or more such antenna panels to optimize link performance between the instant IBR and the source and destination devices.

While FIG. 3I is a diagram of an exemplary horizontally arranged intelligent backhaul radio antenna array, FIG. 3J is a diagram of an exemplary vertically arranged intelligent backhaul radio antenna array that may also be used in part or in entirety as a receive and/or transmit antenna array for an IBR device according to one embodiment of the invention. The depicted antenna arrays shown in FIGS. 3I and 3J are intended for operation in the 5 to 6 GHz band. Analogous versions of the arrangement shown in FIGS. 3I and 3J are possible for any bands within the range of at least 500 MHz to 100 GHz as will be appreciated by those of skill in the art of antenna design.

The exemplary transmit directive antenna elements depicted in FIGS. 3I and 3J include multiple dipole radiators arranged for either dual slant 45 degree polarization (FIG. 3I) or dual vertical and horizontal polarization (FIG. 3J) with elevation array gain as described in greater detail in U.S. patent application Ser. No. 13/536,927 and incorporated herein. In one exemplary embodiment, each transmit directive antenna element has an azimuthal beam width of approximately 100-120 degrees and an elevation beam width of approximately 15 degrees for a gain Gqt of approximately 12 dB.

The receive directive antenna elements depicted in FIGS. 3I and 3J include multiple patch radiators arranged for either dual slant 45 degree polarization or dual vertical and horizontal polarization with elevation array gain and azimuthal array gain as described in greater detail in U.S. patent application Ser. No. 13/536,927 and incorporated herein. In one exemplary embodiment, each receive directive antenna element has an azimuthal beam width of approximately 40 degrees and an elevation beam width of approximately 15 degrees for a gain Gqr of approximately 16 dB.

Preliminary measurements of exemplary antenna arrays similar to those depicted in FIG. 3I show isolation of approximately 40 to 50 dB between individual transmit directive antenna elements and individual receive directive antenna elements of same polarization with an exemplary circuit board and metallic case behind the radiating elements and a plastic ray dome in front of the radiating elements. Analogous preliminary measurements of exemplary antenna arrays similar to those depicted in FIG. 3J show possible isolation improvements of up to 10 to 20 dB for similar directive gain elements relative to FIG. 3I.

Other directive antenna element types are also known to those of skill in the art of antenna design including certain types described in greater detail in U.S. patent application Ser. No. 13/536,927 and incorporated herein.

In the exemplary IBR Antenna Array 348A illustrated in FIG. 3A through FIG. 3J, the total number of individual antenna elements 352A, Q, is greater than or equal to the larger of the number of RF transmit chains 336A, M, and the number of RF receive chains 340A, N. In some embodiments, some or all of the antennas 352A may be split into pairs of polarization diverse antenna elements realized by either two separate feeds to a nominally single radiating element or by a pair of separate orthogonally oriented radiating elements. Such cross polarization antenna pairs enable either increased channel efficiency or enhanced signal diversity as described for the conventional PTP radio. The cross-polarization antenna pairs as well as any non-polarized antennas are also spatially diverse with respect to each other. Additionally, the individual antenna elements may also be oriented in different directions to provide further channel propagation path diversity.

Additional exemplary embodiments of alternative antenna elements, and antenna arrays are disclosed in U.S.

patent application Ser. No. 14/199,734 and U.S. Pat. No. 8,872,715, entitled "Backhaul Radio With A Substrate TAB-FED Antenna Assembly", the disclosures of which are hereby incorporated herein by reference in their entirety. Examples of embodiments disclosed within the incorporated specification of U.S. patent application Ser. No. 14/199,734 (the '734 application specification) are depicted in FIGS. 3K-3P; detailed descriptions of FIGS. 3K-3P may be found in the specification of U.S. patent application Ser. No. 14/199,734, previously incorporated by reference herein, corresponding to FIG. 5C, FIG. 8A, FIG. 8F, FIG. 10A, FIG. 10B, and FIG. 13B, respectively, of the '734 application specification.

The foregoing discussion related to intelligent backhaul radios and relate diagrams have include the use of frequency division duplexing (FDD) and time division duplexing (TDD) techniques and architectures. Such architectures, as discussed, include support of both single input and single output (SISO) supporting single stream operation, and multiple input/multiple output (MIMO) multiple stream operation support. Additional embodiments supporting SISO and MIMO technology in specific embodiments include the use so-called zero division duplexed (ZDD) intelligent backhaul radios (ZDD-IBR), as disclosed in U.S. patent application Ser. No. 13/609,156, now U.S. Pat. No. 8,422,540, which is additionally incorporated herein by reference.

Embodiments of the ZDD systems provide for the operation of a IBR wherein the ZDD-IBR transmitter and receiver frequencies are close in frequency to each other so as to make the use of frequency division duplexing, as known in the art, impractical. Arrangements of ZDD operation disclosed in the foregoing referenced application include so-called "co-channel" embodiments wherein the transmit frequency channels in use by a ZDD-IBR, and the receive frequencies are partially or entirely overlapped in the frequency spectrum. Additionally disclosed embodiments of ZDD-IBRs include so-called "co-band" ZDD operation wherein the channels of operation of the ZDD-IBR are not directly overlapped with the ZDD-IBR receive channels of operation, but are close enough to each other so as to limit the performance the system. For example, at specific receiver and transmitter frequency channel separation, the frequency selectivity of the channel selection filters in an IBR transmitter and receiver chains may be insufficient to isolate the receiver(s) from the transmitter signal(s) or associated noise and distortion, resulting in significant desensitization of the IBR's receiver(s) performance at specific desired transmit power levels, without the use of disclosed ZDD techniques. Embodiments of the disclosed ZDD-IBRs include the use of radio frequency, intermediate frequency and base band cancelation of reference transmitter and interference signals from the ZDD-IBR receivers in a MIMO configuration. Such disclosed ZDD techniques utilize the estimation of the channels from the plurality of IBR transmitters to the plurality of IBR receivers of the same intelligent backhaul radio, and the adaptive filtering of the reference signals based upon the channel estimates so as to allow the cancelation the transmitter signals from the receivers utilizing such estimated cancelation signals. Such ZDD techniques allow for increased isolation between the desired receive signals and the ZDD-IBR's transmitters in various embodiments including MIMO (and SISO) configurations.

The support for MIMO operation (FDD, TDD, or ZDD) is highly dependent upon the radio propagation environment between the two radios in communication with each other. The following discussion provides for a general discussion relating to the MIMO channel, and will provide a basis for further discussion. Referring now to FIG. 3Q the MIMO channel matrix is depicted. Transceiver MIMO Station 3Q-05 is in communication with MIMO Station 3Q-10 utilizing MIMO channel matrix (Eq. 3Q-1) of FIG. 3R between the two stations of FIG. 3Q. In an example of a two-by-two MIMO system, two spatial streams are utilized between the two MIMO stations. The channel propagation matrix of Eq. 3KQ-1 is of order M by N (M rows and N columns). A particular element of the channel propagation matrix, $h_{mn}$, represents the frequency response of the wireless channel from the $n^{th}$ transmitter to the $m^{th}$ receiver. Therefore each element of the channel propagation matrix H has an individual complex number, if the channel is "frequency flat," or a complex function of frequency, if the channel is "frequency selective," which represents the amplitude and phase of the propagation channel between one transmitter and one receiver of MIMO Stations 3Q-05 and 3Q-10. Often, the channel propagation matrix and the individual propagation coefficients are frequency selective, meaning that the complex value of the coefficients vary as a function of frequency as mentioned. In a rich, multipath scattering environment, as depicted in FIG. 3S, in which sufficient signal strength reaches an intended receiver but is scattered amongst the various structures between a particular MIMO transmitter and MIMO receiver, the spatial distribution of the arriving signals is referred to as a rich multipath environment in which there is a significant angular scattering among the receiving signals at the intended receiver.

In order to separate the MIMO streams received at an intended receiver, such as MIMO Station 3Q-05 or MIMO Station 3Q-10, the channel propagation matrix H must be determined, as known in the art. The process of determining the channel propagation matrix is often performed utilizing pilot channels, preambles, and/or symbols or other known reference information. Examples of prior art systems utilizing such techniques include IEEE 802.11n, LTE, or HSPA, as well as various embodiments of intelligent backhaul radios per U.S. Pat. Nos. 8,238,818, 8,422,540 and U.S. patent application Ser. No. 13/536,927 as incorporated in their entireties herein.

In order for MIMO systems (including the foregoing mentioned MIMO systems) to support a plurality of spatial MIMO streams, the order of the propagation matrix (referenced as Eq. 3Q-1) must equal or exceed the desired number of streams. While this condition is necessary, it is not sufficient. The rank of the matrix must also equal or exceed the number of desired spatial streams. The rank of a matrix is the maximum number of linearly independent column vectors of the propagation matrix. Such terminology is known in the art with respect to linear algebra. The number of supportable MIMO streams must be less than or equal to the rank of the channel propagation matrix. When the propagation coefficients from multiple transmitters of a MIMO station to a plurality of intended receive antennas are correlated, the number of linearly independent column vectors of the channel propagation matrix H is reduced and consequently the system will support fewer MIMO streams. Such a condition often occurs in environments where a small angular spread at the desired intended receiver is present, such as is the case with a line-of-sight environment where the two MIMO stations are a significant distance apart, such that the angular resolution of the receiving antennas at MIMO Station 3Q-10 is insufficient to resolve and separate the signals transmitted from the plurality of transmitters at MIMO Station 3Q-05. Such a condition is referred to as an ill-conditioned channel matrix for the desired number of streams in the MIMO system, due to the rank of the channel propagation matrix (i.e. the number of linearly independent column vectors) being less than the desired number of MIMO streams between the two MIMO stations. The reasoning behind the rank of the channel propagation matrix being required to be greater than or equal to the desired number of MIMO streams is related to how the individual streams are separated from one another at the intended receiving MIMO station. As is known in the art, the MIMO performance is quite sensitive to the invertability of the channel propagation matrix. Such invertability, as previously mentioned, may be compromised by the receiving antenna correlation, which may be caused by close antenna spacing or small angular spread at the intended MIMO receiver. The line-of-sight condition between two MIMO stations may result in such a small angular spread between the MIMO receivers, resulting in the channel matrix being noninvertible or degenerate. Multipath fading, which often results from large angular spreads amongst individual propagation proponents between two antennas, enriches the condition of the channel propagation matrix, making the individual column vectors linearly independent and allowing the channel propagation matrix to be invertible. The inversion of the channel propagation matrix results in weights (vectors), which are utilized with the desired receive signals to separate the linear combination of transmitted streams into individual orthogonal streams, allowing for proper reception of each individual stream from spatially multiplexed composite information streams. In a line-of-sight environment, all of the column vectors of the channel propagation matrix H may be highly correlated, resulting in a matrix rank of 1 or very close to 1. Such a matrix is noninvertible and ill-conditioned, resulting in the inability to support spatial multiplexing and additional streams (other than by the use of polarization multiplexing, which provides for only two streams as discussed).

FIG. 3S illustrates an exemplary deployment of intelligent backhaul radios (IBRs). As shown in FIG. 3S, the IBRs 300S are deployable at street level with obstructions such as trees 303S, hills 308S, buildings 312S, etc. between them. Embodiments of intelligent backhaul radios (IBRs) are discussed in co-pending U.S. patent application Ser. No. 13/212,036, now U.S. Pat. No. 8,238,318, and Ser. No. 13/536,927, the entire contents of which is incorporated herein. The IBRs 300S are also deployable in configurations that include point-to-multipoint (PMP), as shown in FIG. 3S, as well as point-to-point (PTP). In other words, each IBR 300S may communicate with more than one other IBR 300S.

For 3G and especially for 4$^{th}$ Generation (4G), cellular network infrastructure is more commonly deployed using "microcells" or "picocells." In this cellular network infrastructure, compact base stations (eNodeBs) 316L are situated outdoors at street level. When such eNodeBs 316L are unable to connect locally to optical fiber or a copper wireline of sufficient data bandwidth, then a wireless connection to a fiber "point of presence" (POP) requires obstructed LOS capabilities, as described herein.

For example, as shown in FIG. 3S, the IBRs 300S include an Aggregation End IBR (AE-IBR) and Remote End IBRs (RE-IBRs). The eNodeB 316S of the AE-IBR is typically connected locally to the core network via a fiber POP 320S. The RE-IBRs and their associated eNodeBs 316S are typically not connected to the core network via a wireline connection; instead, the RE-IBRs are wirelessly connected to the core network via the AE-IBR. As shown in FIG. 3S, the wireless connection between the IBRs include obstructions (i.e., there may be an obstructed LOS connection between the RE-IBRs and the AE-IBR). Note that the Tall Building 312S substantially impedes the signal transmitted from RE-IBR 300S to AR-IBR 300S. Additionally, in at least one example scenario, the tree (303S) provides unacceptable signal attenuation between an RE-IBR 300S and the AE-IBR 300S.

As discussed above, the advances in cellular communications, and more specifically the Third Generation Partnership Program's (3GPP, www.3GPP.org) Long Term Evolution (LTE), and associated cellular "off load" use of IEEE 802.11 communication protocols continues to drive the data backhaul requirements of cellular infrastructure sites to ever increasing levels. The need for an increasing number of wireless backhaul links to satisfy the cellular backhaul demand demands the use of potentially congested wireless spectrum resources.

The Federal Communications Commission (FCC) has allowed for the use of currently licensed broadcast television spectrum for use by unlicensed devices. This program has been commonly referred to as the "TV Whitespaces" reuse (http://www.fcc.gov/topic/white-space). A detailed description of the program is provided in FCC order FCC-10-174A1, and the rules for unlicensed devices that operate in the TV bands are set forth in 47 C.F.R. §§15.701-.717. See TITLE 47—Telecommunication; CHAPTER I—FEDERAL COMMUNICATIONS COMMISSION; SUBCHAPTER A—GENERAL, PART 15—RADIO FREQUENCY DEVICES, Subpart H--TELEVISION BAND DEVICES (http://www.ecfr.gov/cgi-bin/text-idx?c=ecfr&SID=30f46f0 753577b10de41d650c7adf941&rgn=div6&view=text&node=4 7:1.0.1.1.16.8&idno=47).

The TV Whitespaces program provides for a reuse of underutilized spectrum resources for public use by unlicensed devices (TV Band Devices). Further, so-called "Incumbent Services" remain protected from interference from the TV Band Devices (TVBDs) by a set of operating rules and concepts including (selectively extracted from CFR 47 §15.703 Definitions):

(a) Available channel. A six-megahertz television channel, which is not being used by an authorized service at or near the same geographic location as the TVBD and is acceptable for use by an unlicensed device under the provisions of this subpart.

(b) Contact verification signal. An encoded signal broadcast by a fixed or Mode II device for reception by Mode I devices to which the fixed or Mode II device has provided a list of available channels for operation. Such signal is for the purpose of establishing that the Mode I device is still within the reception range of the fixed or Mode II device for purposes of validating the list of available channels used by the Mode I device and shall be encoded to ensure that the signal originates from the device that provided the list of available channels. A Mode I device may respond only to a contact verification signal from the fixed or Mode II device that provided the list of available channels on which it operates. A fixed or Mode II device shall provide the information needed by a Mode I device to decode the contact verification signal at the same time it provides the list of available channels.

(c) Fixed device. A TVBD that transmits and/or receives radiocommunication signals at a specified fixed location. A fixed TVBD may select channels for operation itself from a list of available channels provided by a TV bands database, initiate and operate a network by sending enabling signals to one or more fixed TVBDs and/or personal/portable TVBDs. Fixed devices may provide to a Mode I personal/portable device a list of available channels on which the Mode I device may operate under the rules, including available channels above 512 MHz (above TV channel 20) on which the fixed TVBD also may operate and a supplemental list of available channels above 512 MHz (above TV channel 20) that are adjacent to occupied TV channels on which the Mode I device, but not the fixed device, may operate.

(d) Geo-location capability. The capability of a TVBD to determine its geographic coordinates within the level of accuracy specified in §15.711(b)(1), i.e. 50 meters. This capability is used with a TV bands database approved by the FCC to determine the availability of TV channels at a TVBD's location.

(e) Mode I personal/portable device. A personal/portable TVBD that does not use an internal geo-location capability and access to a TV bands database to obtain a list of available channels. A Mode I device must obtain a list of available channels on which it may operate from either a fixed TVBD or Mode II personal/portable TVBD. A Mode I device may not initiate a network of fixed and/or personal/portable TVBDs nor may it provide a list of available channels to another Mode I device for operation by such device.

(f) Mode II personal/portable device. A personal/portable TVBD that uses an internal geo-location capability and access to a TV bands database, either through a direct connection to the Internet or through an indirect connection to the Internet by way of fixed TVBD or another Mode II TVBD, to obtain a list of available channels. A Mode II device may select a channel itself and initiate and operate as part of a network of TVBDs, transmitting to and receiving from one or more fixed TVBDs or personal/portable TVBDs. A Mode II personal/portable device may provide its list of available channels to a Mode I personal/portable device for operation on by the Mode I device.

(g) Network initiation. The process by which a fixed or Mode II TVBD sends control signals to one or more fixed TVBDs or personal/portable TVBDs and allows them to begin communications.

(h) Operating channel. An available channel used by a TVBD for transmission and/or reception.

(i) Personal/portable device. A TVBD that transmits and/or receives radiocommunication signals at unspecified locations that may change. Personal/portable devices may only transmit on available channels in the frequency bands 512-608 MHz (TV channels 21-36) and 614-698 MHz (TV channels 38-51).

(j) Receive site. The location where the signal of a full service television station is received for rebroadcast by a television translator or low power TV station, including a Class A TV station, or for distribution by a Multiple Video Program Distributor (MVPD) as defined in 47 U.S.C. 602(13).

(k) Sensing only device. A personal/portable TVBD that uses spectrum sensing to determine a list of available channels. Sensing only devices may transmit on any available channels in the frequency bands 512-608 MHz (TV channels 21-36) and 614-698 MHz (TV channels 38-51).

(l) Spectrum sensing. A process whereby a TVBD monitors a television channel to detect whether the channel is occupied by a radio signal or signals from authorized services.

(m) Television band device (TVBD). Intentional radiators that operate on an unlicensed basis on available channels in the broadcast television frequency bands at 54-60 MHz (TV channel 2), 76-88 MHz (TV channels 5 and 6), 174-216 MHz (TV channels 7-13), 470-608 MHz (TV channels 14-36) and 614-698 MHz (TV channels 38-51).

(n) TV bands database. A database system that maintains records of all authorized services in the TV frequency bands, is capable of determining the available channels as a specific geographic location and provides lists of available channels to TVBDs that have been certified under the Commission's equipment authorization procedures. TV bands databases that provide lists of available channels to TVBDs must receive approval by the Commission.

Under the white spaces rules, TVBDs (other than TVBDs that rely on spectrum sensing) have the requirement of registering with the TV bands database, and determining available channels of operation. This process requires providing the database the FCC_ID, serial number, geographic location, and other information to the database, to receive a list of available channels for operation. TVBDs are further required to periodically re-register with the database to re-determine available channels of operation. An example of a database entry information for a Fixed TVDB is provided within CFR 47 §15.713 TV bands database (f) Fixed TVBD registration (extraction follows).

(1) Prior to operating for the first time or after changing location, a fixed TVBD must register with the TV bands database by providing the information listed in paragraph (f)(3) of this section.

(2) The party responsible for a fixed TVBD must ensure that the TVBD registration database has the most current, up-to-date information for that device.

(3) The TVBD registration database shall contain the following information for fixed TVBDs:
  (i) FCC identifier (FCC ID) of the device;
  (ii) Manufacturer's serial number of the device;
  (iii) Device's geographic coordinates (latitude and longitude (NAD 83) accurate to ±/−50 m);
  (iv) Device's antenna height above ground level (meters);
  (v) Name of the individual or business that owns the device;
  (vi) Name of a contact person responsible for the device's operation;
  (vii) Address for the contact person;
  (viii) E-mail address for the contact person;
  (ix) Phone number for the contact person.

The foregoing is intended to provide a brief overview of the concepts and rules associated with the TV White spaces device operation.

While suitable for use by some wireless applications, such a system is not ideal for use in many highly reliable wireless backhaul applications. As one example, the lack of protection from interference for TVBD registered devices is a significant impediment for achieving a highly reliable data link for backhaul applications in view of interference from unlicensed or other wireless devices, including other TVBD devices. As another example, there is no approach for devices to arbitrate interference amongst one another. There are significant number of other deficiencies of the TV white spaces rules making them non-ideal for use in other bands, and in other applications of use such as cellular backhaul.

SUMMARY

The following summary of the invention is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

This application discloses various embodiments of self-organizing backhaul radios (SOBR). Specific disclosures associated with the advanced backhaul services may be referred to with terminology related to "ABS" or other terms disclosed in U.S. patent application Ser. No. 14/502,471. It should be understood that specific disclosures and embodiments relating to the ABS Radios would also apply to certain embodiments of the SOBR radios. The disclosures of various embodiments of ABS services and ABS radios should not be taken as limiting to embodiments of the SOBR embodiments and components. First, embodiments of Advanced Backhaul Services (ABS) and radios will be introduced and summarized, followed by various embodiments of the Self Organizing Backhaul Radio (SOBR) and SOBR Systems.

Various embodiments of the present invention provide for incorporation of a "Tiered" group of devices and/or licenses associated with providing a hierarchical set of interference protection mechanisms for members of each tier of service in a wireless backhaul (or other) application. Exemplary systems, devices, and methods are disclosed in various embodiments to allow for the efficient operation of such a tiered service. As previously described, the TV Whitespaces rules do not provide for mechanisms or devices allowing for such an efficient tiered service. Embodiments of the invention provide a tiered service, which allows for interference protection among devices belonging to one or more tiers of the service, from other devices within the same tier of service, or other tiers of service. Embodiments of the invention include mechanisms, apparatus, and methods that provide for the identification of other devices of the same or differing tier of service, and mitigate interference to or from the device based upon intercommunication between the devices, and/or via a central registry database.

According to other aspects of the invention, a first tiered service radio is disclosed for operating in a radio frequency band according to rules for operation allowing for radios of multiple tiers of service, including a plurality of receive RF chains; one or more transmit RF chains; an antenna array having a plurality of directive gain antenna elements, wherein each directive gain antenna element is couplable to at least one receive RF or transmit RF chain; and an interface bridge configured to couple the radio to a data network; wherein the tiered service radio is configured to perform each of the following: communicate with a network based registry to determine registry information associated with any registered radios meeting specific criteria, wherein the specific criteria includes at least information associated with at least higher priority tiered service radio devices to that of the first tiered service radio; scan one or more radio frequency channels for the presence of signature radio signals transmitted from one or more other tiered service radios to generate scan data, and wherein the radio includes at least one adjustable network parameter that is adjustable based on the scan data, wherein said scanned one or more radio frequency channels are selected based upon said registry information, and wherein the at least one network parameter is adjusted to reduce a potential of interference of the first tiered service radio with both the other tiered service radios or said registered radios, wherein the adjusting the at least one network parameter includes one or more of: selecting a frequency channel utilized between the first tiered service radio and a second tiered service radio; adjusting the effective radiation pattern of the first tiered service radio; selecting one or more of the plurality of directive gain antenna elements; and adjusting the physical configuration or arrangement of the one or more of the plurality of directive gain antenna elements.

In some embodiments, the tiered service radio is further configured to generate a scan report based on the scan data and transmit the scan report to a server.

In some embodiments, the signals include a signal licensed by the Federal Communications Commission (FCC) under service having at least three tiers of service, wherein said tiers include at least legacy point to point backhaul devices at the highest tier and listed in said registry, registered and licensed devices at a second tier, and unlicensed and registered devices at a third and lower tier.

In some embodiments, the adjusting the effective radiation pattern includes one or more of: steering the effective radiation pattern in elevation; and steering the effective radiation pattern in azimuth.

In some embodiments, the adjusting the effective radiation pattern includes: calculating digital beam former weights based upon at least one constraint related to the potential of interference; and applying the digital beam former weights.

In some embodiments, the constraint is selected from the group consisting of: properties related to or derived from said scan result; a direction in which signal transmission is to be limited; parameters which reduce the potential for interfering with one or more of said registered radios meeting said specific criteria; parameters which increase the likelihood of said first and said second tiered service radios meeting performance goals with respect to an interposed wireless communication link; a restriction of use of specific transceivers or specific antennas of a plurality of transceivers or antennas; a use of specific polarizations for transmission; attributes of a collective transmission radiation pattern associated with a plurality of transmitters; a frequency or geometric translation of beam forming weights between receiver weights and transmitter weights; a change in antennas used or selected; a change in operating frequency; and combinations thereof. In some embodiments, the scan report includes one more selected from the group consisting of: the location of said first tiered service radio; the latitude and longitudinal coordinates of one or more tiered service radios; configuration information related to the first tiered service radio; capability information related to the first tiered service radio; a transmission power capability of said first tiered service radio; operating frequency capability of said first tiered service radio; antenna property information related to one or more antenna for use in reception or transmission by said first tiered service radio; received signal parameters or demodulated information from another tiered service radio; received signal parameters from a tiered service radio; and combinations thereof.

In some embodiments, the tiered service radio is further configured to assess performance after adjustment of the at least one adjustable network parameter.

In some embodiments, the performance of said first tiered service radio is assessed by one or more selected from the group consisting of: performing additional scans; performing additional scans with specific search criteria; performing additional scans with limitations in frequency, azimuth, elevation, or time; performing additional scans with a modified antenna selection configuration; performing additional scans using antennas intended for transmission during normal operation for reception during the additional scanning process; performing transmission of a signal from the first tiered service radio to the second tiered service radio; receiving a signal from the second tiered service radio by the first tiered service radio.

In some embodiments, the first tiered service radio is configured to align the antenna array with the second tiered service radio prior to the scan based on at least one criterion.

In some embodiments, the at least one criterion is based at least in part upon a signal transmitted from the second tiered service radio.

In some embodiments, the at least one criterion includes a GPS location and a compass direction.

In some embodiments, the specific criteria includes a geographic region.

In some embodiments, the specific criteria includes a tier of service of the first tiered service radio.

In some embodiments, the specific criteria includes a date on which service commenced for any tiered service radio registered in the registry.

In some embodiments, at least one of said signature radio signals transmitted from the one or more tiered service radios are transmitted inline with information symbols in time from at least one of the tiered service radios.

In some embodiments, at least one of said signature radio signals transmitted from the one or more tiered service radios are transmitted as a spread spectrum signal embedded within and simultaneously with information symbols in time from at least one of the tiered service radios.

In some embodiments, the first tiered service radio transmits a signature radio signal as a first signature during operation with second tiered service radios.

In some embodiments, the first signature is transmitted inline with information symbols in time.

In some embodiments, the first signature is transmitted as a spread spectrum signal embedded within and simultaneously with information symbols.

In some embodiments, the transmitted first signature is transmitted with progressively increasing interference potential for a period of time prior to initiation of full operation between the first and second tiered service radios.

In some embodiments, the progressively increasing interference includes transmission at a power level with an increasing duty cycle over successive periods of time.

In some embodiments, the progressively increasing interference includes transmission at several increasing power levels over successive periods of time.

In some embodiments, the first tiered service radio alters said at least one network parameter based upon detecting information within said registry or otherwise receiving information informing of detected interference related to the transmitted first signature.

In some embodiments, one or more of said other tiered service radios is respectively also one or more of the registered radios meeting the specific criteria.

In some embodiments, the scan data includes one or more of the following: information derived form the reception of signature radio signals; information derived from the reception of signals transmitted from said other tiered service radios; information derived from radios other than tiered service radios; received signal strength information; channel propagation information; tiered service radio identity information; angle of arrival of signal information; received signal strength information, interference information; path loss information; and signal transmission periodicity information.

In some embodiments, said registered radios include devices of the same priority as the first tiered service radio.

In some embodiments, the registered radios include devices of lesser priority as the first tiered service radio.

In some embodiments, the registered radios include devices of any tier or any priority as the first tiered service radio.

In some embodiments, the specific criterion additionally includes devices of the same priority as the first tiered service radio.

In some embodiments, the specific criterion additionally includes devices of lesser priority as the first tiered service radio.

In some embodiments, the specific criterion additionally includes devices of any tier or any priority as the first tiered service radio.

In some embodiments, the scan is performed including a common control channel, said common control channel being a defined channel for signature radio signal transmission and reception commonly known to a group of tiered service radios upon interaction with the registry.

In some embodiments, said specific search criteria includes one or more of the following: information derived form the reception of signature radio signals, information derived from the reception of signals transmitted from said other tiered service radios, information derived from radios other than tiered service radios, received signal strength information, channel propagation information, tiered service radio identity information, angle of arrival of signal information, received signal strength information, interference information, path loss information, and signal transmission periodicity information.

Additional embodiments of the current invention, together with the forgoing embodiments, or individually include the use of Advanced Backhaul Services (ABS) devices with point-to-point and point-to-multipoint radios, such as an IBR, as disclosed in U.S. patent application Ser. No. 13/212,036, now U.S. Pat. No. 8,238,318, and Ser. No. 13/536,927, the entireties of which are hereby incorporated by reference. Additionally, further embodiments individually, or in combination with forgoing embodiments include the use of ABS devices with so-called zero division duplexed (ZDD) intelligent backhaul radios (ZDD-IBR), as disclosed in U.S. patent application Ser. No. 13/609,156, now U.S. Pat. No. 8,422,540, the entirety of which is hereby incorporated by reference.

Various exemplary embodiments of self organizing backhaul radio are disclosed including one or more demodulator cores, wherein each demodulator core is capable of demodulating one or more primary receive symbol streams to produce one or more receive data interface streams; a plurality of receive radio frequency (RF) chains, wherein each receive RF chain is capable of converting from one of a plurality of receive RF signals to a respective one of a plurality of receive chain output signals; an antenna array comprising a plurality of directive gain antenna elements, wherein each directive gain antenna element is couplable to at least one receive RF chain; a frequency selective receive path channel multiplexer to produce one or more composite receive symbol streams from the plurality of receive chain output signals, wherein each respective one of the one or more composite receive symbol streams comprises a linear combination of a respective primary receive symbol stream and a respective signature control channel symbol stream, and wherein each respective signature control channel symbol stream is a spread spectrum modulated signal that carries a respective signature control channel information; and a signature link processor, interposed between the one or more demodulator cores and the frequency selective receive path channel multiplexer, to produce the one or more primary receive symbol streams provided to the one or more demodulator cores from the one or more composite receive symbol streams. Further embodiments include the foregoing, wherein the signature link processor comprises one or more respective signature control channel stream cancellers each for:receiving the respective one of the one or more composite receive symbol streams; receiving the respective signature control channel information as pre-communicated respective signature control channel information. In some embodiments the pre-communicated respective signature control channel information is derived from information communicated to the self-organizing backhaul radio prior to the receiving of the respective signature control channel symbol stream that carries the respective signature control channel information.

Various embodiments additionally include cancelling the respective signature control channel symbol stream from the respective one of the one or more composite receive symbol streams to produce the respective primary receive symbol stream based upon the pre-communicated respective signature control channel information.

Associated with further embodiments of a self-organizing backhaul radio may include the foregoing, or other embodiments and a radio resource controller, wherein the radio resource controller is capable of setting or causing to be set specific selective couplings between the certain of the plurality of directive gain antenna elements and the certain of the plurality of receive RF chains.

In some embodiments, each one of the one or more demodulator cores comprises at least a decoder and a soft decision symbol demapper; and wherein each one of the plurality of receive RF chains includes at least a vector demodulator and two analog to digital converters that are capable of producing the respective one of the plurality of receive chain output signals, each said respective one of the plurality of receive chain output signals comprised of digital baseband quadrature signals.

Specific embodiments further include wherein the set of receive RF chains that can accept receive RF signals from the one or more selectable RF connections is divided between one subset that accepts receive RF signals from directive gain antenna elements with a first polarization and a second subset that accepts receive RF signals from directive gain antenna elements with a second polarization.

In some embodiments, the directive gain antenna elements that can be selectively coupled to receive RF chains are arranged on a plurality of facets with one or more directive gain antenna elements per facet, and wherein each facet is oriented at a different azimuth angle relative to at least one other facet.

In some embodiments the frequency selective receive path channel multiplexer includes at least one of a Space Division Multiple Access (SDMA) combiner or equalizer, a maximal ratio combining (MRC) combiner or equalizer, a minimum mean squared error (MMSE) combiner or equalizer, an Eigen Beam Forming (EBF) combiner or equalizer, a receive beam forming (BF) combiner or equalizer, a Zero Forcing (ZF) combiner or equalizer, a channel estimator, a Maximal Likelihood (DL) detector, an Interference Canceller (IC), a VBLAST combiner or equalizer, a Discrete Fourier Transformer (DFT), a Fast Fourier Transformer (FFT), or an Inverse Fast Fourier Transformer (IFFT).

In some embodiments, the antenna array further includes: one or more selectable RF connections for selectively coupling certain of the plurality of directive gain antenna elements to certain of the plurality of receive RF chains, said certain of the plurality of receive RF chains including at least one receive RF chain coupled to the frequency selective receive path channel multiplexer, wherein the number of directive gain antenna elements that can be selectively coupled to receive RF chains exceeds the number of receive RF chains that can accept receive RF signals from the one or more selectable RF connections; wherein the backhaul radio is capable of determining an opportunity for a performance enhancement that derives from setting specific selective couplings between the certain of the plurality of directive gain antenna elements and the certain of the plurality of receive RF chains.

In some embodiments, at least one of the one or more selectable RF connections includes at least one RF switch.

In some embodiments at least one of the additional certain of the plurality of receive RF chains is coupled to the frequency selective receive path channel multiplexer.

In some embodiments the performance enhancement of the radio includes one or more of a reduced interference level within one or more of the receive symbol streams, an increased data throughput rate, an improved link diversity, an increased channel efficiency, or an increased signal to interference and noise ratio (SINR).

In some embodiments the self-organizing backhaul radio further includes: one or more transmit RF chains, and wherein the self-organizing backhaul radio is configured to perform each of the following: scan one or more radio frequency channels for the presence of signature radio signals transmitted from one or more other self-organizing backhaul radios to generate scan data, and wherein the radio comprises at least one adjustable network parameter that is adjustable based on the scan data, wherein the scanned one or more radio frequency channels are selected, at least in part, based upon the scan data, wherein the at least one network parameter is adjusted to reduce a potential of interference of the self-organizing backhaul radio with the other self-organizing backhaul radios.

In some embodiments, the adjusting the at least one network parameter includes one or more of: selecting a frequency channel utilized between the self-organizing backhaul radio and a second self-organizing backhaul radio; adjusting the effective radiation pattern of the self-organizing backhaul radio; selecting one or more of the plurality of directive gain antenna elements; and adjusting the physical configuration or arrangement of the one or more of the plurality of directive gain antenna elements.

In some embodiments, the self-organizing backhaul radio, the adjusting the effective radiation pattern includes one or more of: steering the effective radiation pattern in elevation; steering the effective radiation pattern in azimuth.

In some embodiments of the self-organizing backhaul radio, the adjusting the effective radiation pattern includes calculating digital beam former weights based upon at least one constraint related to the potential of interference; and applying the digital beam former weights.

In some embodiments, the constraint includes one or more of: properties related to or derived from the scan result; a direction in which signal transmission is to be limited; parameters which reduce the potential for interfering with one or more of the registered radios meeting said specific criteria; parameters which increase the likelihood of the self-organizing radio and a second self-organizing radios meeting performance goals with respect to an interposed wireless communication link; a restriction of use of specific transceivers or specific antennas of a plurality of transceivers or antennas; a use of specific polarizations for transmission; attributes of a collective transmission radiation pattern associated with a plurality of transmitters; a frequency or geometric translation of beam forming weights between receiver weights and transmitter weights; a change in antennas used or selected; a change in operating frequency.

In some embodiments of the self-organizing backhaul radio, at least a portion of the signature radio signals are transmitted from a self-organizing backhaul radio of the one or more other self-organizing backhaul radios for which no interposed primary link is established with the instant self-organizing backhaul radio.

In some embodiments of the self-organizing backhaul radio, a chip rate of the respective signature control channel is equal to a symbol rate of the respective primary receive symbol stream of at least one of the one or more composite receive symbol streams, for at least a portion of time.

In some embodiments of the self-organizing backhaul radio, a chip rate of the respective signature control channel is equal to a symbol rate of the respective primary receive symbol stream of each of the one or more composite receive symbol streams, for at least a portion of time.

In some embodiments of the self-organizing backhaul radio, the respective signature control channel symbol stream is not present during a respective preamble period of the respective primary receive symbol stream of at least one of the one or more composite receive symbols streams.

In some embodiments of the self-organizing backhaul radio, a timing of the respective signature control channel is synchronized in time with a preamble period of the respective primary receive symbol stream of at least one of the one or more composite receive symbol streams.

In some embodiments of the self-organizing backhaul radio, a timing of a signature sequence of the single signature control channel is further synchronized in frequency, and phase with the preamble period of the respective primary receive symbol stream of the at least one of the one or more composite receive symbol streams.

In some embodiments of the self-organizing backhaul radio, a timing of a signature sequence of the respective signature control channel is offset by a pre-determined amount of time from the preamble period of the respective primary receive symbol stream of the at least one of the one or more composite receive symbol streams.

In some embodiments of the self-organizing backhaul radio, a phase reference of the respective primary receive symbol stream is usable as a phase reference associated with the cancelation of the respective signature control channel stream of the at least one of the one or more composite receive symbol streams.

In some embodiments of the self-organizing backhaul radio, the frequency selective receive path channel multiplexer further produces one or more receive non-composite symbol streams from the plurality of receive chain output signals, wherein each respective one of the one or more non-composite receive symbol streams comprises a respective primary receive symbol stream and does not comprise a respective signature control channel symbol stream.

In some embodiments of the self-organizing backhaul radio, the at least one of the respective primary receive symbol streams of the one or more non-composite receive symbol streams are coupled to a respective demodulator core of the one or more demodulator cores.

In some embodiments of the self-organizing backhaul radio, at least one of the one ore more non-composite receive symbol streams is coupled to the signature link processor.

In some embodiments of the self-organizing backhaul radio, the signature link processor further provides at least one a primary receive symbol stream derived from the at least one of the one or more non-composite receive symbol streams to one of the one or more demodulator cores derived.

In some embodiments of the self-organizing backhaul radio, the frequency selective receive path channel multiplexer further provides at least one of said one or more primary receive symbol streams directly to the one or more demodulator cores.

In some embodiments of the self-organizing backhaul radio, the linear combination associated with at least one of the one or more composite receive symbol streams is performed at least partially simultaneously in time.

In some embodiments of the self-organizing backhaul radio, a plurality of primary receive symbols associated with at least one respective primary receive symbol stream and a plurality of signature control channels symbols associated with at least one respective signature control channel symbol stream are linearly combined simultaneously in time.

In some embodiments of the self-organizing backhaul radio, the information associated with the pre-communicated respective signature control channel information is derived from at least one of the one or more primary receive symbol streams.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

FIG. 3I is a diagram of an alternative view of an exemplary horizontally arranged intelligent backhaul radio antenna array according to one embodiment of the invention.

FIG. 4H illustrates a normalized antenna gain relative to an angle from bore utilizing an exemplary antenna system.

FIG. 5C is an exemplary block diagram of a signature control channel modem.

FIG. 5H is an exemplary block diagram of an embodiment of a Sliding Correlator (SC).

FIG. 5I is an exemplary block diagram of an embodiment of a Complex Sliding Correlator Block (CSCB).

FIG. 5J is an exemplary block diagram of an embodiment of a Sliding Detector (SD).

FIG. 8A is an illustration of exemplary ABS registry entries according to one embodiment of the invention.

FIG. 9A is an exemplary embodiment of a Self-Organizing Backhaul Radio Network and system including a plurality of SOBR enabled IBR links and associated network elements.

DETAILED DESCRIPTION

As mentioned above, the following detailed descriptions include descriptions associated with co-called Advanced Backhaul Services (ABS). This application is a continuation-in-part of U.S. patent application Ser. No. 14/502,471, filed Sep. 30, 2014, and entitled Advanced Backhaul Services (ABS). FIGS. 4A through 8D were previously disclosed in the ABS Application. While specific embodiments in the descriptions discuss Advanced Backhaul Services, in some specific embodiments, the descriptions are applicable to embodiments of Self Organizing Backhaul Radios (SOBR). The use of the terms Advances Backhaul Services or Self Organizing Backhaul Radios should not be considered limiting.

Figures 4A, 4B:
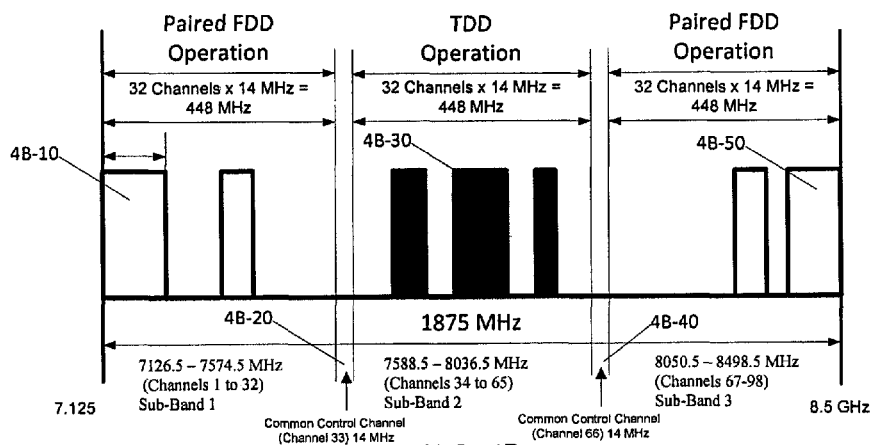
FIG. 4A is a table of a partial listing for the frequency availability for specific radio services 47 C.F.R. §101.101, and a proposed new band of operation for Advanced Backhaul Services.
FIG. 4B illustrates an exemplary deployment for occupancy of services in the 7125 to 8500 MHZ frequency band for legacy radios and Advanced Backhaul Services (ABS) compliant radios amongst other services.

FIG. 4A is a table of a partial listing for the frequency availability for specific radio services 47 C.F.R. §101.101, and a proposed new band of operation for Advanced Backhaul Services (4A-01). The new band for Advanced Backhaul Services is not currently listed as a defined service within the table for fixed microwave services. Specific embodiments of the disclosed invention for an Advance Backhaul service (ABS) operate within a band from 7125 to 8500 MHz, and include a number of tiered services. Currently this band is not under the control of the FCC, but may have fixed point to point services defined for government operation by the Office of Spectrum Management (OSM) within the National Telecommunications & Information Administration (http://www.ntia.doc.gov/office/OSM). The OSM manages the Federal government's use of the radio frequency spectrum, and may be thought of as filling a similar role for the federal government as the FCC does for the commercial sector. Currently, most of this band is defined as government exclusive operation as can be seen within the NTIA's "Redbook" defining spectrum allocations for use by the Federal government (http://www.ntia.doc.gov/files/ntia/publications/redbook/2013/4b_13.pdf). The frequency band (4A-01) is provided as an example only, and other bands of operated are contemplated for use with the embodiments disclosed.

FIG. 4B illustrates an exemplary deployment for occupancy of services in the 7125 to 8500 MHZ frequency band for legacy radios and Advanced Backhaul Services (ABS) compliant radios amongst other services. The services deployed within this band according to embodiments of the invention, may be time division duplex (TDD), frequency division duplexed (FDD) or zero division duplexed (ZDD). FDD systems utilize separate frequency channels for receiving (4B-10) and transmitted signals (4B-50) to each radio, as shown in FIG. 4B. TDD systems utilize a single frequency channel (4B-30) and alternate receiving and transmission with the radio to which they are communicating, allowing for the deployment of such services in the center of the operational band, as shown in FIG. 4B. As previously discussed, ZDD systems utilize signal processing techniques to allow the simultaneous transmitting and receiving of signals on the same frequency channels. Generally ZDD systems could utilize similar channels to those of the TDD operating radios, but this is not a requirement and thus ZDD systems may be able to use any of the FDD or TDD channels.

The spectrum in the embodiment defined in FIG. 4B is partitioned into 3 Sub-Bands:
SB1=7126.5–7574.5 MHz (Channels 1 to 32)
SB2=7588.5–8036.5 MHz (Channels 34 to 65)
SB3=8050.5–8498.5 MHz (Channels 67-98)

Additionally Channels 33 (4B-20) and 66 (4B-40) are defined as Common Control Channels (CCC), to be used for advertising the presence of ABS devices, intercommunication between ABS devices with respect to interference coordination and other control and overhead functions in specific embodiments.

Channelization

In one embodiment, a network-based registry 4C-60/4C-70 (of FIG. 4C) will provide for a maximum number of channels out of the total number of channels available for operation for use by a particular device (or Tier as will be explained associated with FIG. 4C), either dependent, or independent of duplex mode of operation.

As will be discussed associated with subsequent figures, and specific embodiments, ABS services may include multiple groups of "Tiers" of devices, each tier having specific rules by which they must operate and result in interference protection between and among tiers of devices (such devices being referred to as tiered service radios). Such rules may also provide for a fairness to access of channels to prevent some devices from unfairly using more spectrum channels than would be fair to other devices, and preventing a reasonable number of devices within a geographic region to operate simultaneously.

For example, in one embodiment associated with FIG. 4B, the individual channels of operation are 14 MHz in Bandwidth, as is common for fixed wireless in the United States (ranging from 3.5 MHz, 7 MHz, 14 MHz, etc). In other embodiments, such as for use is Europe, channels of 5 MHz, 10 MHz, or other multiples are more common.

Any given link must use and register up to $2^{N_{MAX}}$ channels of 14 MHz each from amongst designated channels. FDD products typically register to transmit in $2^{N_{MAX}-1}$ channels of SB1 in one direction and to transmit in $2^{N_{MAX}-1}$ channels of SB3 in the opposite direction for a given link, however FDD products are not required to use this SB1/SB3 duplex approach.

The selection of the number of channels for operation, as mentioned for some embodiments, may be determined based upon the tier of service a device belongs to, and determined according to parameters provided by accessing a registry and may be specific to a geographic region.

In one example, for Tier 2 products, $N_{MAX}=3$ (e.g. $2^{N_{MAX}}=8$) resulting in 8×14 MHz, or 112 MHz would be typical in most geographic regions. In a related example, For Tier 3 products, $N_{MAX}=2$ (e.g. $2^{N_{MAX}}=4$) resulting in 4×14 MHz, or 56 MHz would be typical in most geographic regions. The total number of channels that can be used by both transmitters in aggregate for any given link is $M_{TOT}=2^{N_{MAX}}$.

In the current embodiment, the $M_{TOT}$ channels can be occupied by either or both transmitters at any time for a given link, and may be dependent on the Tier of service, and geographic region. An example of a geographic region is shown in FIG. 4D by the boundary lines 4D-10, 4D-15, 4D-20, and 4D-25

Continuing with the current exemplary embodiment, $M_{ACTUAL}$ is the actual number of channels (up to $M_{TOT}$), in use at any time. Once a tiered service radio (or tiered device) is registered, (thus, becoming a registered radio) to transmit $M_{REG}$ channels in any of SB1, SB2, or SB3, such a product can transmit subject to sharing rules herein, on 1 to $M_{REG}$ channels contiguously as available. In the current embodiment, non-contiguous Tx channels at a single transmitter are not allowed.

According to the rules of the current embodiment, all transmitters (tiered service radios for example) are fixed and registered prior to first usage (including Tier 3 devices). In an exemplary embodiment, no devices are mobile.

In one embodiment, the registration may include Tx location, antenna parameters, Tx channels(s) (or channel numbers), Tx power (or max tx power), signature parameters (such as code sequences, demodulation parameters, structures, identifiable aspects of the signature radio signals, etc.), acceptable co-channel sharing signatures (or classes of signatures), Tx signaling method(s), signature approach (inline versus embedded), signature power in dB relative to nominal Tx power level, and/or maximum registered Tx power. More detail and specific examples of exemplary registry entries are discussed associated with FIG. 8A in more detail.

Figure 4C:
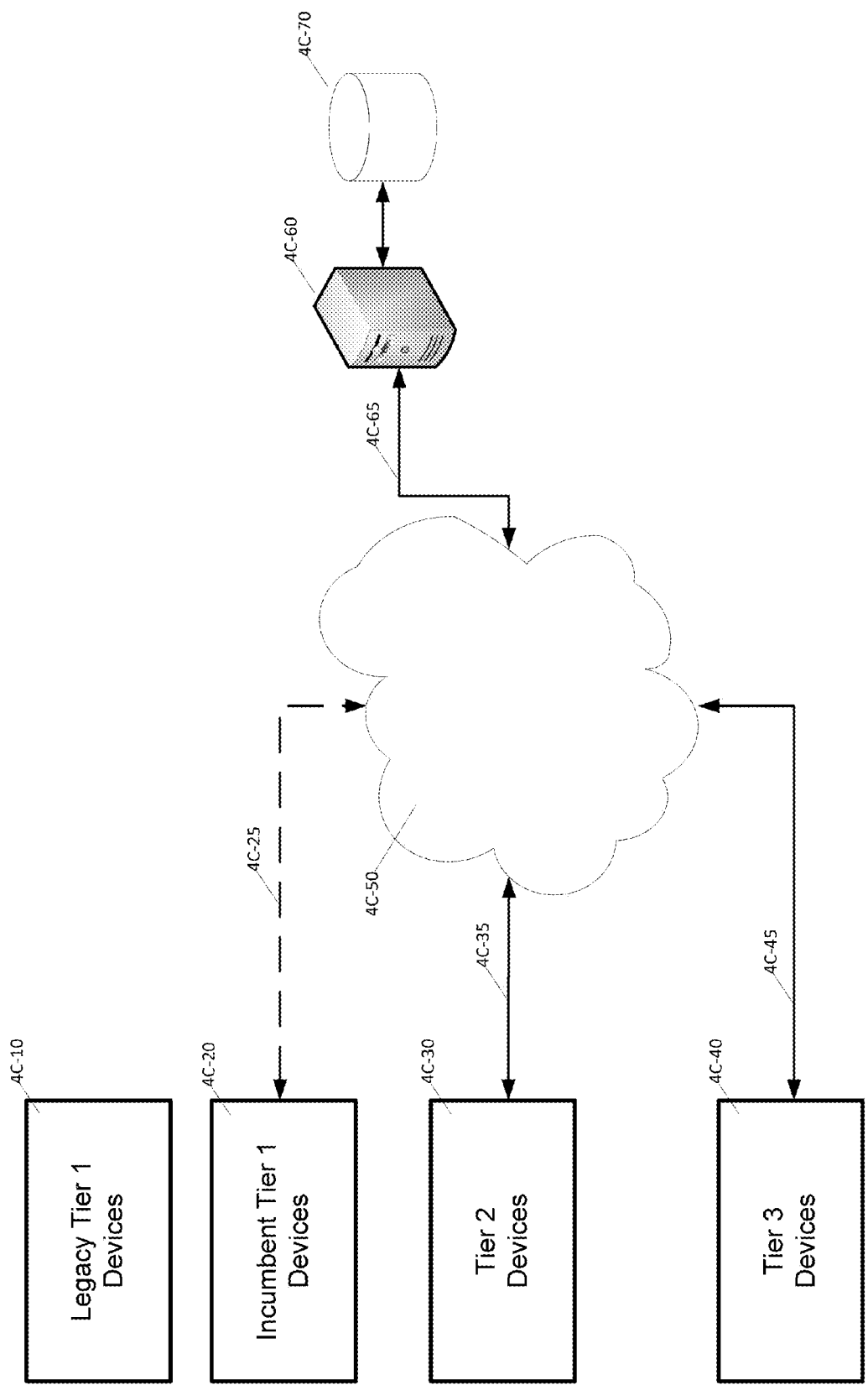
FIG. 4C illustrates an exemplary embodiment of Advanced Backhaul Service tiered service radio interconnection with an exemplary ABS device registry database.
Figure 4D:
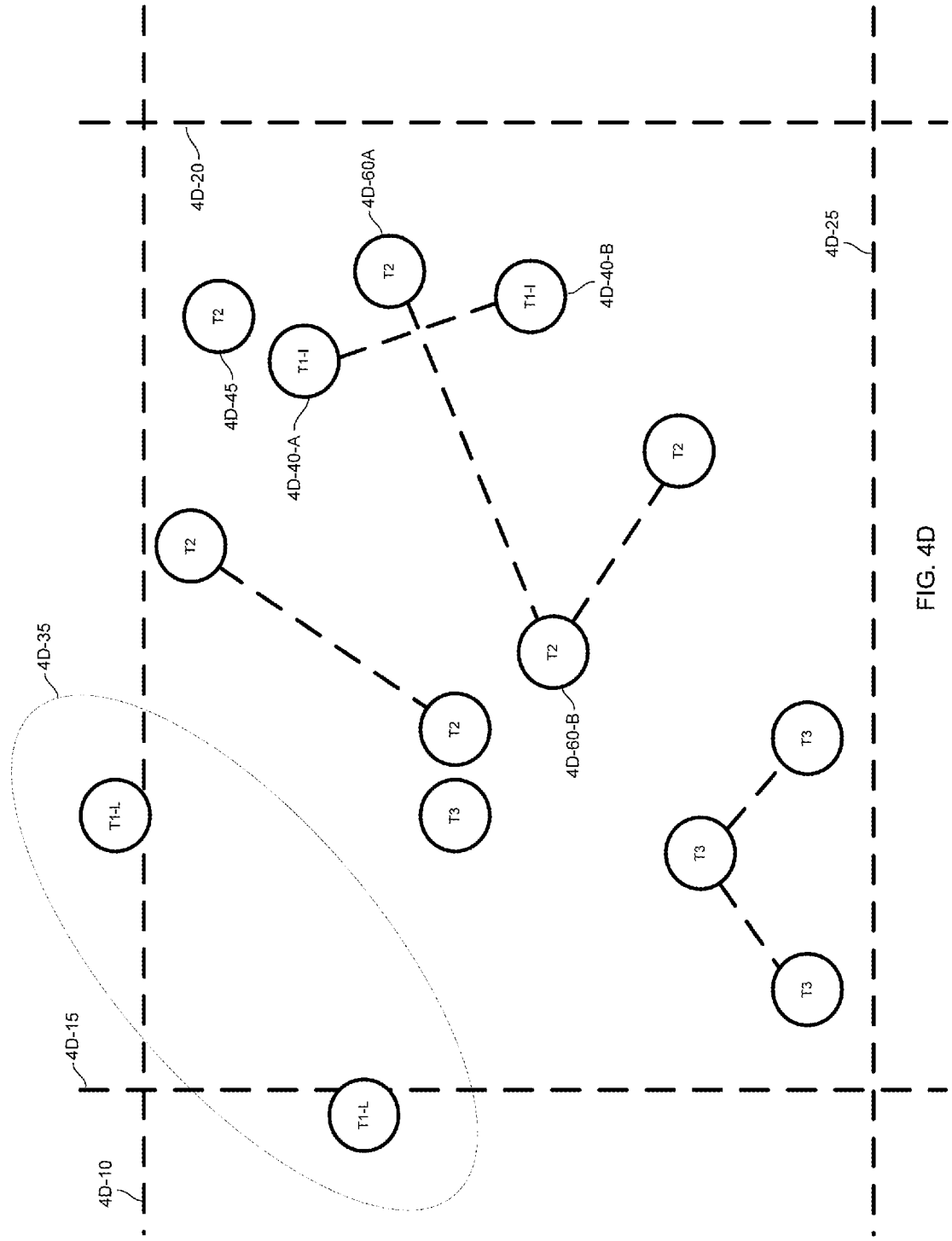
FIG. 4D illustrates an exemplary deployment of an embodiment of Advanced Backhaul Services tiered service radios within an exemplary geographic region.

FIG. 4C illustrates an exemplary embodiment of Advanced Backhaul Service tiered service radio interconnection with an exemplary ABS device registry database. In one embodiment, each tiered service radio (or tiered device) has specific rules and procedures, which are required to be followed, except for a legacy device. The tiered service radios provide for interference protection for legacy devices, or from other devices at the same or lower tier. Membership to a tier varies based upon the specific tier. For example in the embodiment of FIGS. 4A and 4B, utilizing spectrum with fixed point to point devices operating under existing rules, such devices as currently in use for Federal point to point wireless communications would be deemed to be Tier 1 devices 4C-10. Such currently deployed devices would be deemed "legacy" Tier 1 4C-10, where new devices which also belong to existing government users, would be deemed "incumbent" Tier 1 devices 4C-20, and may have specific requirements for the deployed equipment differing from the currently deployed legacy Tier 1 devices. In one embodiment Tier 1 devices 4C-10, 4C-20 would be protected from interference by requiring lower tier devices (4C-30, 4C-40) to perform a registry look up for a specific geographic region. Specific criteria, in some embodiments, is passed to the registry so as to retrieve information related to the registered radios on interest. In this embodiment, it would be a requirement of the devices, of lower tiers of service performing the registry look up, utilizing specific criteria, to be able to determine, or to be provided, their current geographic coordinates. In other embodiments, the specific criteria may be a subset or inquiry criteria and be within the tiered service radio and used to filter the information returned from the registry. In further embodiments, specific criteria such as geographic location, tier of the inquiring device, etc., may be passed to the registry as inquiry criteria and the filtering and/or selection of information performed within the registry completely. In yet further embodiments, the selection of information from the registry based upon the specific criteria may be performed on one or both of either the inquiring tiered service radio or the registry apart (or in combination).

Returning to the current description, the only protection a legacy Tier 1 device 4C-10 would have is the registry 4C-70 with a pre-defined exclusion zone associated with a geographic location. Such an exclusion zone within may be defined by one or more center points, and a radius from each center point, or another definable geographic shape such as a rectangle, or an ellipse, or the like. An example of such an exclusion zone is provided in FIG. 4D, associated with exclusion zone 4D-35. Exclusion zone 4D-35 provides for an ellipse as defined within the server 4C-60 and registry database 4C-70. Lower tier devices, such as Tier 2 Devices 4C-30 and Tier 3 Devices 4C-40, connect to server 4C-60 and registry database 4C-70 via network connections 4C-35, 4C-45, and 4C-65, and over an interim network 4C-50 in some embodiments. Such a network 4C-50 may be a private network, or the public Internet, or both. Additionally, Incumbent Tier 1 devices may include a network connection 4C-25 in some embodiments. Incumbent Tier 1 Devices 4C-20 may additionally become a registered radio with the registry database 4C-70 in some embodiments, or may transmit an alert message advertising the Incumbent Tier 1 Device's presence, or perform both registration as well as advertisement. Such an advertisement may be performed in a number of ways including on the so-called common control channels (4B-20, 4B-40) and associated with FIG. 4B. In other embodiments, alerts may be transmitted inband so as to allow for an accurate assessment of the received signal from the Tier 1 device, and to determine an acceptable transmission power so as to ensure no detrimental interference to the Tier 1 Device. An example of Incumbent Tier 1 devices operating utilizing in-band alert transmission is provided associated with FIG. 4D. Incumbent T1 Device (T1-I) 4D-40-A is in communication with T1-I 4D-40-B, both transmitting an alert signal, including information identifying the device and either including the transmitted power within the alert, or retrievable from the registry database. Additional information may be included with the transmission or within the registry as well such as locations of the devices, and frequencies or operation, and mode (TDD/FDD/ZDD) of the device, and the like. More detail related to embodiments of the registry entries are provided associated with FIG. 8A. For example, such information can be used to determine the propagation path loss to the transmitter or to estimate path loss to potential receivers associated with the stations. Tier 2 devices 4D-60-A, 4D-60-B may utilize transmission limits as determined from such parameters so as to operate in closer proximity to the T1-I devices 4D-40-A and B, rather than simply utilizing an exclusion zone.

Referring back to FIG. 4C, Tier 2 Devices are registered users (or registered radios) and are provided with a license, which offers interference protection relative to other Tier 2 devices, and Tier 3 devices. Tier 2 devices (T2), in some embodiments, have no interference protection from Tier 1 devices (Legacy or Incumbent). To receive a license, operators of T2 devices may pay a fee that may be determined by in a number of ways, in various embodiments. Such a fee may be based upon:
  i. number of channels up to a maximum for initial registration, and annual usage per link for a specific geographic region, and/or
  ii. by Auction, and/or
  iii. by Status (such as, for example only, providing a service deemed a public good)

Exemplary rules that may be required for Tier 2 devices include:
  Tier 2 users must not use, or must vacate upon detection, channels occupied by Tier 1 users.
  Tier 2 users must occasionally re-check the registry database (based upon time, duration, or the like).
  Tier 2 devices must advertise their presence by transmitting an Alert signal including a T2 Alert Signature, and registering within the registry data base 4C-70 (or becoming a registered radio), including the start time of their active operation and other details, such as for example, described associated with FIG. 8A.

An example of a T2 device being prevented from operating, as according to the foregoing rules, is provided associated with FIG. 4D, and T2 device 4D-45. The T2 device 4D-45 is geographically too close to T1-I device 4D-40-A, and upon performing a scan of the radio environment detects alerts from the T1 device (for example a signature radio signal in one embodiment), and thus T2 device 4D-45 is prevented from operating on the same channel(s) on which T1-I device 4D-40-A operates. If other unoccupied channels are available, the T2 device 4D-45 would be not be prevented from attempting operation on those alternative channels, unless those channels were otherwise not allowed due to yet another device's exclusion zones, or alert signature transmissions that could be detected.

An example of rules for an embodiment for T2 devices to achieve interference protection from other T2 users is:
  Tier 2 users must not use channels already occupied by other Tier 2 users as either:
    i. Detectable at a threshold with a valid Tier 2 signature, or
    ii. Registered (as a registered radio) in a look up for a geographic location within a Tier 2's exclusion zone, unless
    iii. Existing channel occupant Tier 2 user with "precedence" agrees to accept the presence of the new channel occupant tier 2 user. For these purposes precedence is defined as the device having initiated continuous operation on a channel (s) earlier in time, as entered within the registry.

Just as Tier 1 devices, in the current embodiment, have priority and are protected from interference from Tier 2 devices, Tier 2 devices have priority and are protected from interference from Tier 3 devices 4C-40, of FIG. 4C. In this embodiment, priority indicates that a device may be placed in the presence and cause interference to another device of lower priority, thus causing the lower priority device (or lower Tier device) to modify operating parameters (or adjustable network parameters) such as channel of operation, transmission power, antenna selection, transmit or receive antenna beam patterns, polarization, or the like. Further upon alert detection, registry entry read, or direct notification to the lower Tier device by a higher Tier device, that a tiered service radio is present, the lower tier device as a lower priority tiered service radio must cease operating (in one embodiment) and re-initialize operating according the rules associated with that Tier's operation. In specific embodiments, Tier 2 devices, being licensed and registered (as registered radios), have priority over Tier 3 devices (T3), and receive interference protection from the Tier 3 devices. According to one embodiment, Tier 3 devices must be certified to obey operating rules of their Tier, but would not be licensed to a channel or geographic region and may not be required to pay any type of a fee associated with a license. Example rules for operating Tier 3 devices are as follows, according to one embodiment:
  Tier 3—Unlicensed Users
    Allowed to use up to "unlicensed max" number of channels for a specific geographic region as determined by registry look up, and
      Wherein Tier 3 users must not use, or must vacate upon detection of any Tier 1 or Tier 2 user at any time
      Wherein Tier 3 users must certify:
        i. Detection capability for Tier 1 and Tier 2 signatures, and
        ii. The ability to access the registry prior to transmitting on the ABS channels The various tiers of devices have interference priorities and obey sharing rules. However, specific embodiments may provide for certain channels to be reserved for specific tiers of operation to ensure fair access to the spectrum resources. For example, in one embodiment associated with FIG. 4B, Channels 1,2, 34, 65, 97, 98 plus other channels as designated for any given geographic zone within the registry are Tier 2 Exclusion Channels. Tier 2 products can use such channels but receive no protection from Tier 3 transmitters. This ensures that Tier 3 devices can never be completely precluded from all operation in any given geographic region by a high density of Tier 2 devices.

As described above, in embodiments of ABS services, T1-Incumbent, T2, and T3 devices are required to transmit an alert having a signature sequence. In other embodiments, only T3 devices, or both T3 and T2 devices are required to transmit an alert signature. The alert signature may vary in different embodiments of the invention, and may be transmitted on the common control channels in some cases, or within the band of operation (in-band) in other embodiments. Further, when the alerts are transmitted in-band they may be "in-line" or "embedded". One example of an embedded signature sequence was disclosed associated with co-pending application U.S. Ser. No. 13/763,530, the entirety of which is incorporated herein by reference. The structure of the alert signals and the signatures within them are described in further detail with respect to FIG. 5D, FIG. 5E, FIG. 5F, and FIG. 5G.

In one embodiment, all transmitters required to transmit an alert must transmit signatures having at least 0.01% (or −40 dBc) of the nominal transmit energy in every 1 s period ($P_{NOM} \times 1$ s) based upon relative transmit time and relative transmit power.

In one exemplary embodiment, a signature of duration 100 μs can be transmitted either in-band/in-line, in-band/embedded, or on the common control channel. Further embodiments may include transmitting an alert signature from a receiver antenna, so as to enhance the potential for determining interference potential and accuracy or to aid the estimation of the interference potential from other ABS devices. Such an approach may be applicable for ZDD and/or TDD based devices, or FDD devices any of which may utilize interference cancelation approaches at the receiver to remove the transmitted alert. Alternatively such an approach may utilize in-line bursts of the alert signal in designated non-reception time periods at the receive antenna.

In one example of inline signaling for an in-band/inline alert, a burst signature at P_NOM transmission power level for 100 μs is utilized, one every second. In another example, an alert signature may be transmitted multiple times per second, but at a power level of $$\frac{P_{NOM}}{\frac{T_{SIG}}{100\ us}}$$

so as to result in the same integrated power over the 1-second period. As a result, a receiving device can be sure of the integrated receive power per unit time, relative to the nominal transmission power of the signal carrying information. Such a process of interference estimation further enhances the ability of the detecting device to assess the potential for interfering with the detected device upon beginning transmissions from the detecting device.

In another embodiment where the alert is transmitted on the Common Control Channel (4B-20 and/or 4B-40) one alert will be transmitted at a random time within every 1 ms time period, including a 100 μs burst signature at $P_{NOM}$, again allowing for the estimation of the power level of the detected alert relative to the information signal from that transmitting device.

The common control channel is further available for non-protection signaling broadcasts instead of inline signatures. For example, the common control channel may be utilized for intercommunication between tiered service radios, in contrast to simply advertising the presence of the device so as to make tiered service radios of a relative lower tier refrain from interfering with the instant tiered service radio (e.g. protection signaling).

One embodiment of the common control channel is available for limited frame exchanges for any Tier 2 or 3 transmitters without current registration subject to such exemplary restrictions as:

$P_{LIMIT} = P_{NOM}$, and modulation is only within channel
Max 100 us frame duration that is randomly chosen
Max 1 frame per TX Period of 1 ms
Max 100 frames per TX per second
At least one signature frame per Tx per second One embodiment of a signature and associated payload will now be discussed, which includes a unique 32 bit address assigned as a 16 bit manufacturer code and a 16 bit random address. The alert may also include the transmission or reception channels, and may be modulated utilizing non-coherent DQPSK or DBPSK using a code sequence. In various embodiments, the code sequence is a direct sequence spreading code, and utilize one or more of a Barker, PN, maximal length code, CAZAC, Gold, Zadoff-Chu, and the like.

In one example having 1 signature of length 100 us in a 14 MHz channel results in ≈12.39 Msym/s or 1238+ symbols/100 us when using a root raised cosign filter of 1.13. The information bits may further utilize a ½ rate Reed Muller or Reed Solomon Code (for Parity Check), and be modulated according to DQPSK. One embodiment would then result in at least 37 spreading "chips" per bit, with 32 bits of information.

Alternative embodiments of the structure and processing of alerts and their transmission and associated layered protocols will be provided associated with subsequent figures.

Transmission Power of ABS Signals

Associated with the example embodiment of FIG. 4B, and having 14 MHz channels, the power limit for a given device may be given by:

$$P_{LIMIT} = P_{NOM} + 10 * \log\left[\frac{\text{Aggregate information Rate}}{28 * M_{ACTUAL}}\right]$$

Where $P_{NOM}$ is the nominal power level determined from the registry for the given tier of service, and the geographic operating region.

Further the maximum equivalent (or effective) isotropically radiated power for a given tiered service radio is determined by Max $EIRP = P_{LIMIT} * G_{TxMAX}$ where $G_{TxmAx}$ is max Tx antenna gain limit for a given geographic zone.

Each ABS device must further demonstrate and be certified to perform transmit power control over $P_{NOM}$−10 dB to $P_{MAX}$ (where $P_{MAX} P \le P_{LIMIT}$).

As previously described, the alerts may be utilized so as to determine the potential for interfering with other devices within the area such that antenna and transmission parameters (as adjustable network parameters) may be adjusted so as to reduce the potential for interfering with higher tier devices, or devices of the same tier but with a earlier occupancy of the channel (precedence). As will be discussed further, upon the detection of an alert from a device of the same or lower tier, but with lower precedence if from the same tier, procedures are disclosed by which the two devices may cooperatively reduce the interference levels to acceptable levels, or by which the lower tier or lower precedent device may be forced to discontinue transmission all together. Such cooperative interference mitigation approach will be discussed associated with subsequent figures, in particular FIG. 8C and FIG. 8D.

Figure 4E:
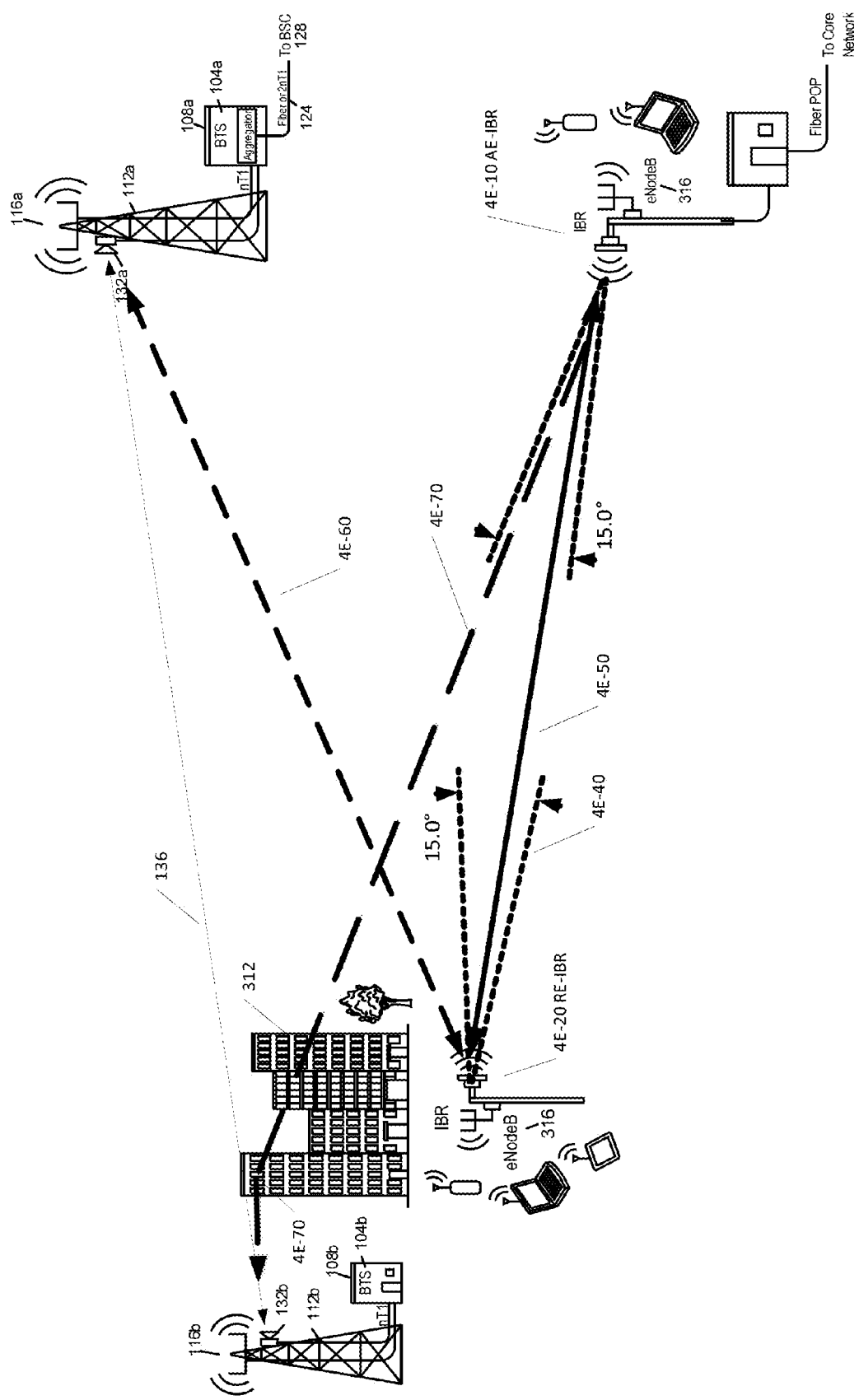
FIG. 4E illustrates exemplary embodiment of a deployment of intelligent backhaul radios (IBRs) is deployed for cellular base station backhaul with obstructed LOS in the presence of Tier 1 Incumbent radios according to an embodiment of ABS services.

Turning now to FIG. 4E, an exemplary embodiment of a deployment of intelligent backhaul radios (IBRs) is deployed for cellular base station backhaul with obstructed LOS in the presence of Tier 1 radios according to an embodiment of ABS services.

FIG. 4E illustrates a deployment scenario according to one embodiment of the invention. In this example, Incumbent Tier 1 device (T1-I) 132*a* utilizes an unobstructed line of sight wireless link 136 to T1-I 132*b*. The T1-Is have a relatively narrow beam (e.g., 3 dB width of 2 Degrees in both azimuth and elevation). A tall building is located between T1-I 132*a* and T1-I 132*b*. The building 312 is short enough that it does not adversely impact link 136 because each T1-I has a relatively narrow beam.

FIG. 4H illustrates a T1-I antenna pattern having a similar main antenna beam width and other antenna pattern attributes as the T1-Is 132*a*, 132*b* of FIG. 4E. It is relevant to note that while the T1-I antenna pattern depicted in FIG. 4H possesses a narrow 3 dB main beam width 4H-40 relative to the peak gain 4H-10 in the antenna bore sight direction, there remains the possibility for signal reception from angles beyond the 3 dB beam width points, but with lesser relative antenna gain levels. For example, the gain level at twice the 3 dB beam width may be as significant as −10 dB or −15 dB relative to the main bore sight gain 4H-10. Furthermore, the gain at side lobe 4H-20 remains within −20 dB, in this example, relative to the peak bore sight gain 4H-10, and is located at roughly 3 times the angular separation from the bore sight direction as the 3 dB main beam radius. In contrast, antenna nulls, including nulls 4H-30, are points where the residual gain from the T1-I antenna is at a significant minimum level and are generally interspersed between side lobes or other higher gain portions of the antenna pattern. The antenna pattern depicted in FIG. 4H represents a typical T1-I antenna pattern, such as one produced by so called parabolic dishes including, generally, a circularly symmetric antenna gain pattern about the bore sight.

As discussed in additional detail in this disclosure and the co-pending applications previously incorporated by reference, the use of multi-element antenna systems, in some configurations, allows an antenna array's beams, side lobes, and nulls to be advantageously directed. By the advantageous angular placement of an antenna array's main gain lobe, and the placement of lower gain portions of the antenna array's gain pattern in specific other directions, a desired link may be maintained while managing the level of undesired signal transmitted to or received from other transceiving radios (including T1-Is) in the area. The antenna arrays may utilize adaptive techniques incorporating transmission null steering or reception null steering approaches. In one embodiment, adaptive antenna array processing, including null steering algorithms, are utilized to allow for the deployment of RE-IBR 4E-20 and AE-IBR 4E-10 of FIG. 4E (as either T2 or T3 devices) in the presence of T1-Is 132*a* and 132*b* so as to not impact the T1-Is 132*a*,*b* receiver performance by reducing interfering signal levels from each IBR impinging upon the T1-I antenna gain patterns. As estimate of the relative interference from the T2 or T3 devices to the T1-I devices may be determined utilizing the detection of the alert signature transmitted from the T1-I devices.

In one embodiment, the antenna elements 352A of FIGS. 3A to 3H (e.g., utilized by IBR 4E-10 and 4E-20) have a 3 dB antenna beam width in elevation of 15 degrees and a 3 dB antenna beam width of 30 degrees in azimuth. Such individual antenna pattern radiation patterns may cause interference to deployed T1-Is in the geographic area. In one example, the signal transmissions from RE-IBR 4E-20 to T1-I 132*a* via propagation path 4E-60 are received at a sufficient level so as to cause a degradation of the T1-I link 136 performance. In another example, a signal transmitted from AE-IBR 4E-10 along a signal propagation path 4E-70 is scattered from building 312 and received in a side lobe of the antenna pattern of T1-I 132*b* at a sufficient level to also impact the T1-I to T1-I link performance.

In one embodiment, the RE-IBR 4E-20 and AE-IBR 4E-10 utilize a multi-element antenna array such as depicted in FIG. 3I. Such an antenna array configuration allow for spatial array processing. Such spatial array processing may include phased array processing, digital beam forming, transmission null steering, elevation and azimuth beam steering, antenna selection, beam selection, polarization adjustments, MIMO processing techniques, and other antenna pattern modification and spatial processing approaches for both the transmission and reception of signals. It will be appreciated that other antenna array configurations may be used, which have more or fewer antenna elements than the exemplary IBR antenna arrays depicted in FIGS. 3I and 3J, and which have different geometrical arrangements, polarizations, directional alignments and the like.

Further exemplary embodiments of alternative antenna elements, and antenna arrays for use with the forgoing embodiments are disclosed in U.S. patent application Ser. No. 14/199,734 and U.S. Pat. No. 8,872,715, entitled "Backhaul Radio With A Substrate TAB-FED Antenna Assembly", the disclosures of which are hereby incorporated herein by reference in their entirety. Examples of embodiments disclosed within the incorporated specification of U.S. patent application Ser. No. 14/199,734 are depicted in FIG. 3J-5C, FIG. 3J-8A, FIG. 3J-8F, FIG. 3J-10A, FIG. 3J-10B, and FIG. 3J-13B. The descriptions of the forgoing figures respectively correspond to the incorporated specification relating to FIG. 5C, FIG. 8A, FIG. 8F, FIG. 10A, FIG. 10B, and FIG. 13B of U.S. patent application Ser. No. 14/199,734.

Embodiments of the invention are advantageous because the impact to the T1-I link performance can be reduced or eliminated completely while allowing for the deployment of the IBR 4E-10 and IBR 4E-20 in the same geographical region as the T1-I devices 132*a* and 132*b* with sufficient inter-IBR link 4E-50 performance. In some embodiments, IBR deployments may be enabled in the same geographical areas and within the same frequency bands, and in further embodiments such deployments may be in a co-channel configuration amongst a T1-I link and an IBR link, while allowing for sufficient performance between IBR 4E-10 and IBR 4E-20.

Figure 4F:
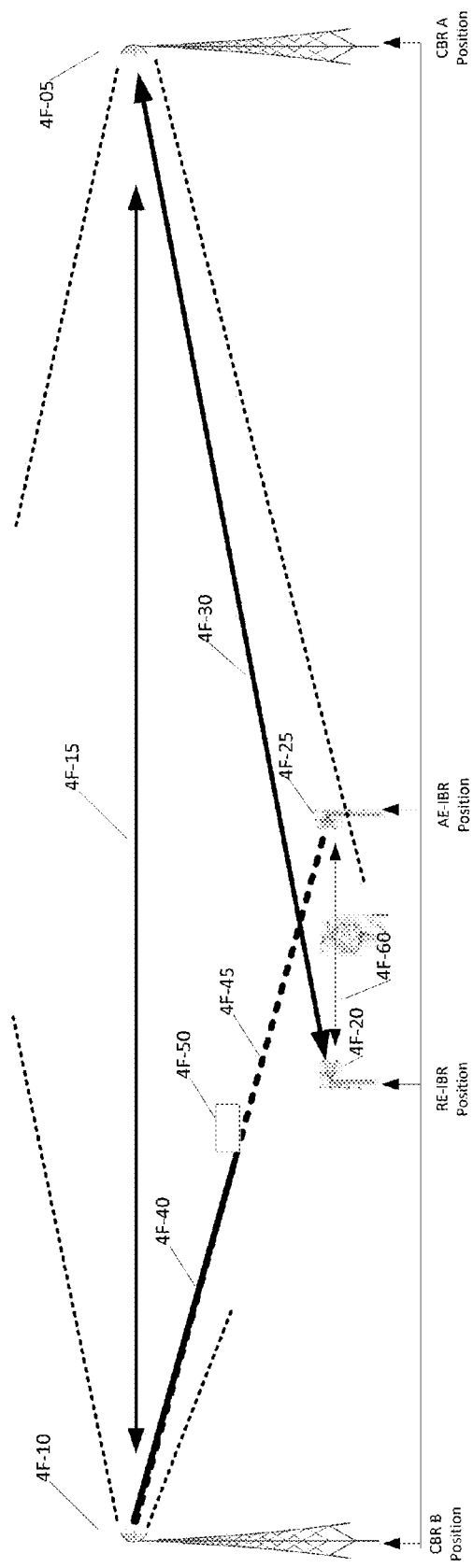
FIG. 4F illustrates an alternative exemplary embodiment of a deployment of intelligent backhaul radios (IBRs) deployed for cellular base station backhaul with obstructed LOS in the presence of Tier 1 Incumbent radios according to an embodiment of ABS services.
Figure 4G:
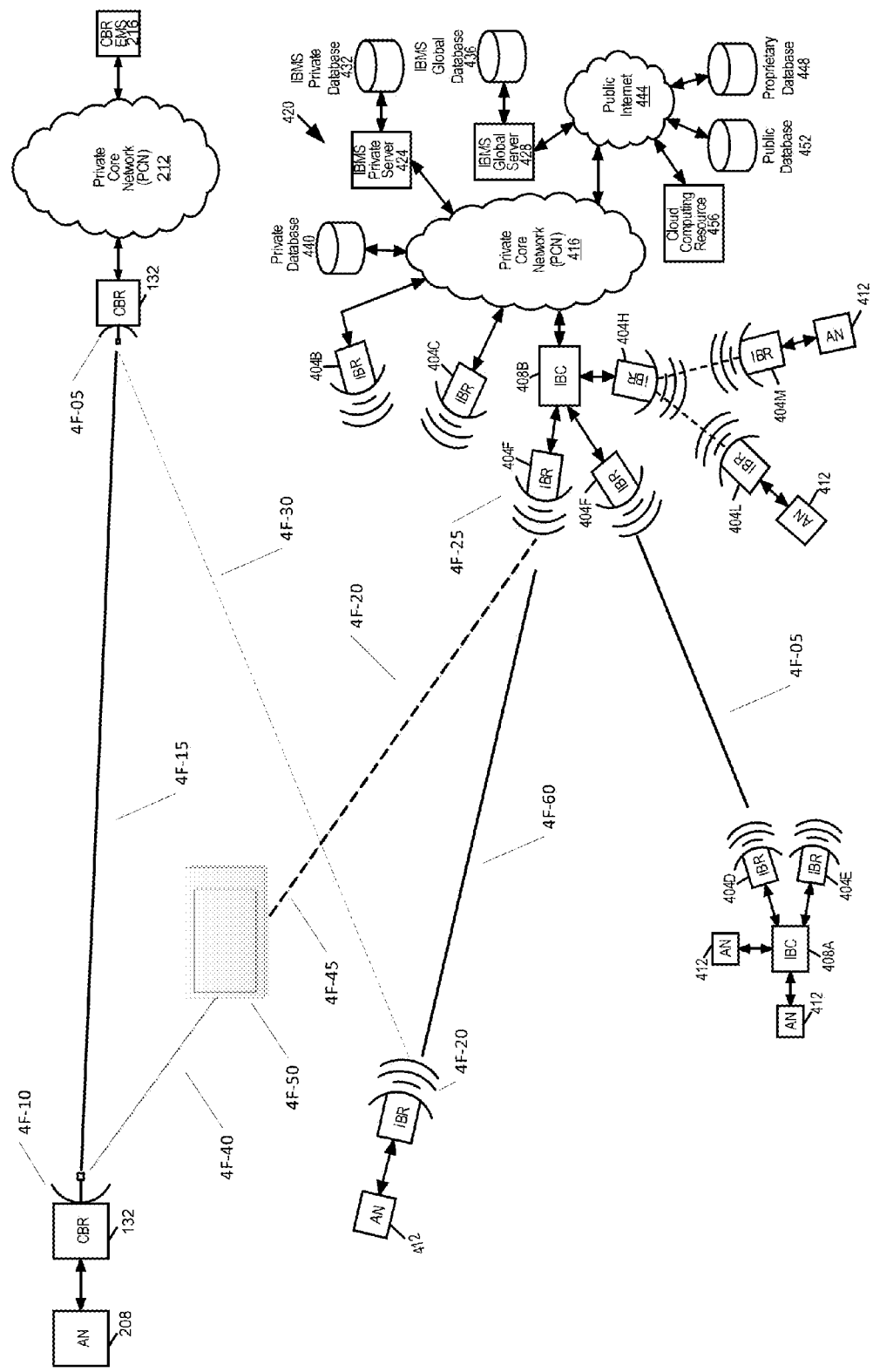
FIG. 4G illustrates an exemplary deployment of an intelligent backhaul system (IBS) in the presence of an existing exemplary deployment of Tier 1 incumbent radios according to one embodiment of the invention.

With reference to FIGS. 4F and 4G, specific embodiments of Tier 2 or Tier 3 devices are described with respect to reducing interference to co-channel Tier 1 devices according to an embodiment of the ABS services.

FIGS. 4F and 4G illustrate additional exemplary deployments of IBRs in the presence of T1-Is. FIG. 4F is a side perspective view of elements of a deployment embodiment example, and FIG. 4G is a top perspective view of the deployment embodiment. It should also be noted that some geometrical differences exist between FIG. 4F and FIG. 4G to provide illustrative descriptions. Where FIG. 4F and FIG. 4G are in conflict or otherwise are inconsistent, the differences should be considered alternative embodiments.

Intelligent backhaul radios RE-IBR 4F-20 and AE-IBR 4F-25 are deployed with configurations as previously discussed in the related embodiments of IBRs 4E-10 and 4E-20. The IBRs 4F-20 and 4F-25 are deployed for cellular base station backhaul with obstructed LOS propagation link 4F-60 according to one embodiment of the invention.

In FIGS. 4F and 4G, T1-I A 4F-05 and T1-I B 4F-10 are deployed for cellular base station backhaul with unobstructed line of sight (LOS) propagation link 4F-15. T1-Is 4F-05 and 4F-10 are deployed within the same geographical region of the IBRs 4F-20 and 4F-25. Each of T1-I 4F-05 and 4F-10 uses an antenna pattern, with 3 dB main beam width.

In the embodiment shown in FIG. 4F, antenna elements 352A (see, for example, FIGS. 3A-H) are utilized by IBR 4F-20 and 4F-25 and have a 3 dB antenna beam width in elevation of 15 degrees and a 3 dB antenna beam width of 30 degrees in azimuth. Such individual antenna pattern radiation patterns may cause interference to deployed T1-Is in the geographic area. In one example, the signal transmissions from RE-IBR 4F-20 to T1-I 4F-05 via propagation path 4F-30 are received at a sufficient level to cause a degradation of performance of the T1-I link 4F-15. In another example, a signal transmitted from AE-IBR 4E-25 along signal propagation path 4F-40 and 4F-45 is scattered and attenuated from building 4F-50 but has a sufficiently low level so as to not cause performance degradation to intended signal reception at either of T1-I 4F-10 or IBR 4F-25.

As explained above, in FIG. 4F, RE-IBR 4F-20 and AE-IBR 4F-25 are deployed for cellular base station backhaul with obstructed LOS propagation link 4F-60. Additionally, with respect to the present embodiments of FIGS. 4F and 4G, RE-IBR 4F-20 and AE-IBR 4F-25 utilize a multi-element antenna array, such as antenna array 348A of FIG. 3A or 3B. The antenna array 348A allows for various spatial array processing. As described above, such spatial array processing may include phased array processing, digital beam forming, transmission null steering, elevation and azimuth beam steering, antenna selection, beam selection, polarization adjustments, MIMO processing techniques, and other antenna pattern modification and spatial processing approaches for both the transmission and reception of signals. It should be noted the current embodiment is only one configuration, and that other embodiments may utilize more or fewer antenna elements and with varying geometrical arrangements, polarizations, directional alignments and the like.

Embodiments of the invention relate to determination of IBR network parameters (including adjustable network parameters) and the installation and commissioning process of remote end IBRs (RE-IBRs) and Aggregation End IBRs (AE-IBRs). A detailed process for installing and commissioning the IBRs (or tiered service radios in general) is described in further detail below. These processes and/or some of the process steps may be may be performed using one more of IBRs (404A-M) and IBCs (408A, 408B) (or Intelligent Backhaul Controller) of FIG. 4G, or elements of an Intelligent Backhaul Management System (or IBMS 420 in FIG. 4G) including IBMS Private Server 424, IBMS Private Database 432, IBMS Global Server 428, IBMS Global Database 436, the Private Database 440, and the processing and storage elements accessible utilizing the public internet such as the Cloud computing resource 456, Public Database 452, and Proprietary Database. Additional details describing the IBC and IBMS and exemplary relationships to IBRs are found in co-pending application U.S. Ser. No. 13/271,051 for the Intelligent Backhaul System (or IBS), the entirety of which is incorporated by reference herein.

During installation or during deployment and operation of the IBRs 4F-20, 4F-25, the IBS, IBMS and other public and private network elements such as the registry server 4C-60 and database 4C-70 (which may collectively include a registry in some embodiments) may use information stored with one or more network elements to determine or aid in the determination of IBR operational parameters (adjustable network parameters for example) for allowing co-band or co-channel operation with manageable interference impact to and from T1-Is 4F-05 and 4F-10 or other aforementioned services within a geographic zone, or within a known radio frequency propagation distance.

Exemplary IBR operational parameters (adjustable network parameters) include but are not limited to: the selection operational frequencies; the modification of transmitter antenna patterns; the modifying or selection of antenna polarization or spatial patterns; the selection of specific antennas from a set of available antennas; the selection of transmission nulls, reducing the interference impinging upon other systems; the selection of receiving or transmission digital beam forming weights, or algorithmic beam forming constraints; the physical movement, placement, alignment, or augmentation of one or more antenna elements or antenna arrays by electrical, or electromechanical control or by a request for manual adjustment or augmentation during or after installation; the modification of transmission power; and the selection of interference margin values for the reduction of the risk in interfering existing systems.

In one embodiment, the determination of the IBR operational parameters (adjustable network parameters) is performed utilizing an algorithm based at least in part on the location of the T1-Is 4F-05 and 4F-10 and their radiation parameters. This information may be stored in the Universal Licensing System (ULS) operated by the Federal Communications Commission (FCC), or on other public or private databases or the registry server as shown in FIG. 4C (4C-60/4C-70). In one embodiment, ULS information and associated radiation parameters in combination with radio frequency propagation models are utilized to determine the level to which operation of an IBR, under various IBR operational parameters would interfere with one or more Tier 1 Incumbent or Legacy services. In another embodiment, reports of received signal are provided by IBRs, possibly in combination with existing IBR operational parameters, to the IBMS for use in IBR operational parameter determination. Such reports may be stored by the IBMS and used alone or in combination with T1-I or T1-L radiation parameter information from public or private databases to perform IBR operational parameter selection.

Further embodiments may include an iterative method. For example, the IBRs may report received spectral measurements and configuration parameters to the IBMS, which performs selection of some or all for the operation parameters, and passing the parameters to respective IBRs. The IBRs may then perform additional or refined scanning upon initial operation prior to the determination of subsequent IBR operational parameters.

Upon initiating the configuration process in this embodiment, the respective IBRs perform a scan of receive channels to detect existing T1-Is. The scan process, in some embodiments, produces scan data. The IBRs then report their respective antenna configurations and scan results (scan data) to the IBMS. Note that in other embodiments, a centralized server may not be used at all, allowing for a distributed decision process based upon rules. Returning to the current embodiment, the IBMS, will determine, assuming another channel may not be used, the level of interference the T1-I will receive. In some embodiments, this determination is based also upon received signatures levels (signature radio signal levels for example) or alert level per the disclosed invention. The interference may be determined utilizing IBR effective antenna pattern adjustments and, optionally, associated information retrieved from a database of T1-I parameters. In some embodiments, the effective antenna pattern adjustments may include the use of transmission beam nulling from the required one or more IBRs to further reduce the interference levels which may be received at the T1-I, while maintaining a minimum required performance between the respective IBRs. In one embodiment, an interference margin is also calculated. The interference margin is used as an additional reduction of the required interference to the target T1-I. The interference margin may be based on a fixed amount; a level of uncertainty of the predicted interference, an amount based upon the reliability or predicted accuracy of interference calculations, or based upon using or the availability of, the specific values of T1-I antenna and operating transmission parameters retrieved from a database.

In some embodiments, the RE-IBRs and AE-IBRs may operate on channels for which no interference is detected, but are within a predetermined distance of T1-Is. The distance is determined based on the geographic location of the IBRs and the T1-Is. The location of the T1-Is may be determined by accessing, for example, the FCC (ULS) database. In such situations, the IBMS may utilize an interference margin value or other operational constraint value based upon propagation models to further reduce the likelihood of interfering with the T1-I.

In some embodiments, co-existence of the IBRs with FDD T1-Is may be required. In these embodiments, interference margins or operational transmission constraints, including transmission beam nulling, may need to be calculated. For example, in one embodiment, the selection of the transmission antennas to utilize for receive during a scan procedure during configuration may allow for enhancement of transmit beam forming and transmit nulling operations and may further aid in the determination of values related to transmission beam nulling.

In some embodiments, received signals transmitted from a T1-I 4F-05 operating in FDD are detected during a scan procedure at an IBR 4F-20. However, the IBR to IBR link, in one deployment, is configured to operate on the specific FDD paired frequency co-channel used for receiving by the FDD T1-I 4F-05 as determined, for example, by the IBMS 420 in FIG. 4G and FCC data base records in a public data base 452, or the registry server 4C-60 and database 4C-70. In this embodiment, transmission beam nulling weighs for the T1-I 4F-05 receiving channel (uplink paired channel used by T1-I 4F-05 for receiving from T1-I 4F-10) or other transmission constraints may be determined based upon the received signals at the IBR 4F-20 in the paired (downlink paired channel as used by T1-I 4F-05 to transmit to T1-I 4F-10) channel, despite the frequency difference for the transmission channel. Such calculations may utilize propagation modeling to determine interference levels, reported measurements by the IBR to determine the level of frequency flat or frequency selective fading, and data base values related to T1-I parameters. In this embodiment, these calculations involve a constrained transmission beam forming calculation for example, including an interference margin based at least in part upon the determined level of flat or selective fading of the scanned signal on the paired band.

Embodiments of the invention allow for IBR adjustable network parameters to be selected to avoid co-channel operation with T1-Is. In deployments where co-channel operation between the IBRs and T1-Is is not avoidable, the impact on link performance to the T1-I 4F-10 and from T1-I 4F-05 can be reduced or eliminated completely while allowing for the deployment of the IBR 4F-20 and IBR 4F-25 in the same geographical region with sufficient inter-IBR link 4F-60 performance. In some embodiments, the IBRs may be deployed in the same geographical areas and within the same frequency bands as T1-Is. In some embodiments, the IBRs and T1-Is may be deployed in a co-channel configuration, while still allowing for sufficient performance between IBR 4F-20 and IBR 4F-25.

Figure 1:
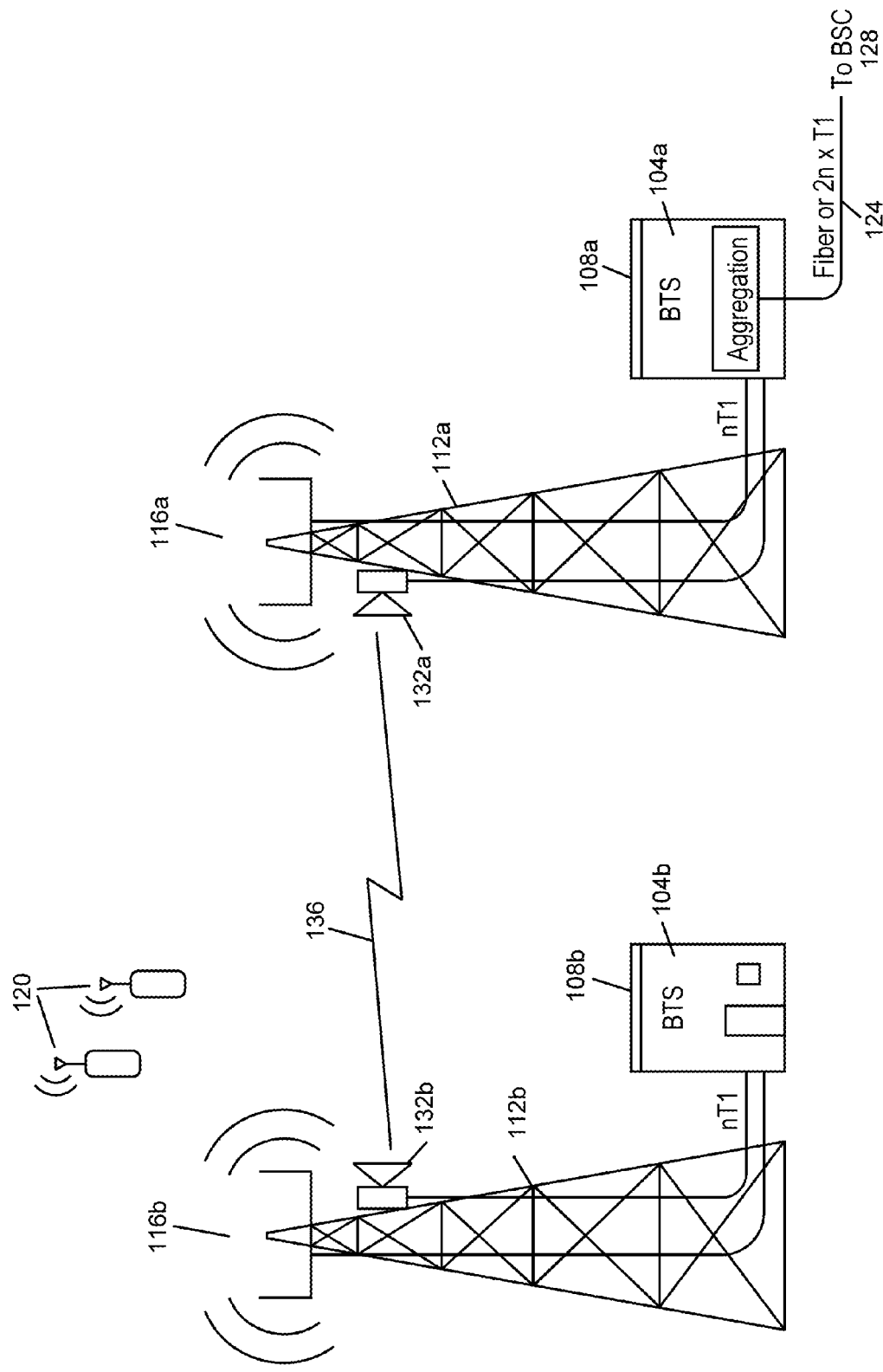
FIG. 1 is an illustration of conventional point-to-point (PTP) radios deployed for cellular base station backhaul with unobstructed line of sight (LOS).
Figure 2A:
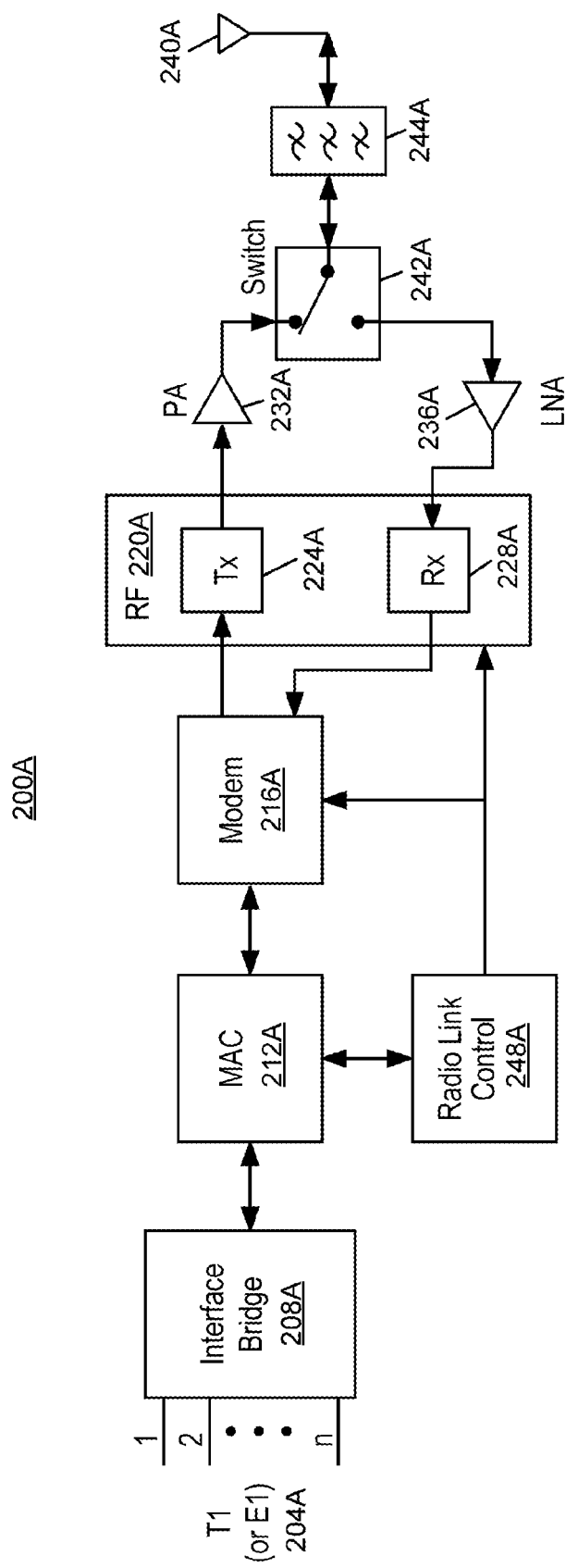
FIG. 2A is a block diagram of a conventional PTP radio for Time Division Duplex (TDD).
Figure 2B:
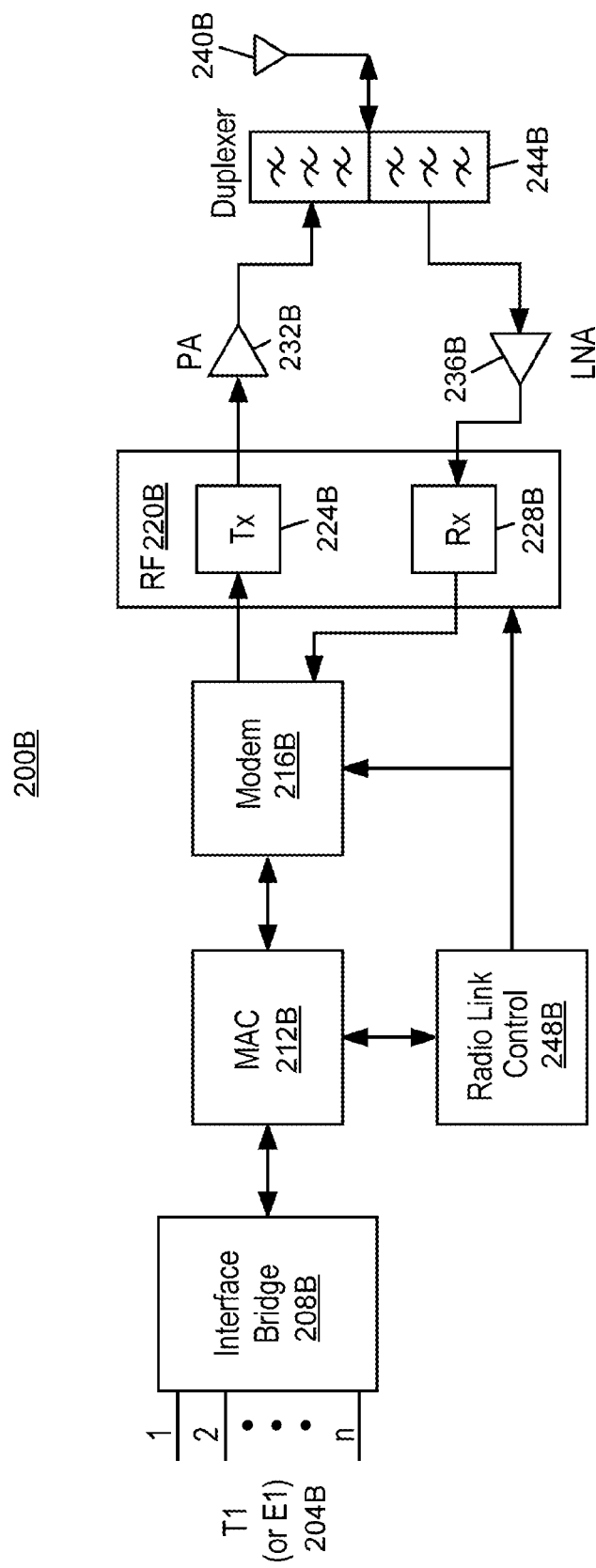
FIG. 2B is a block diagram of a conventional PTP radio for Frequency Division Duplex (FDD).
Figure 3A:
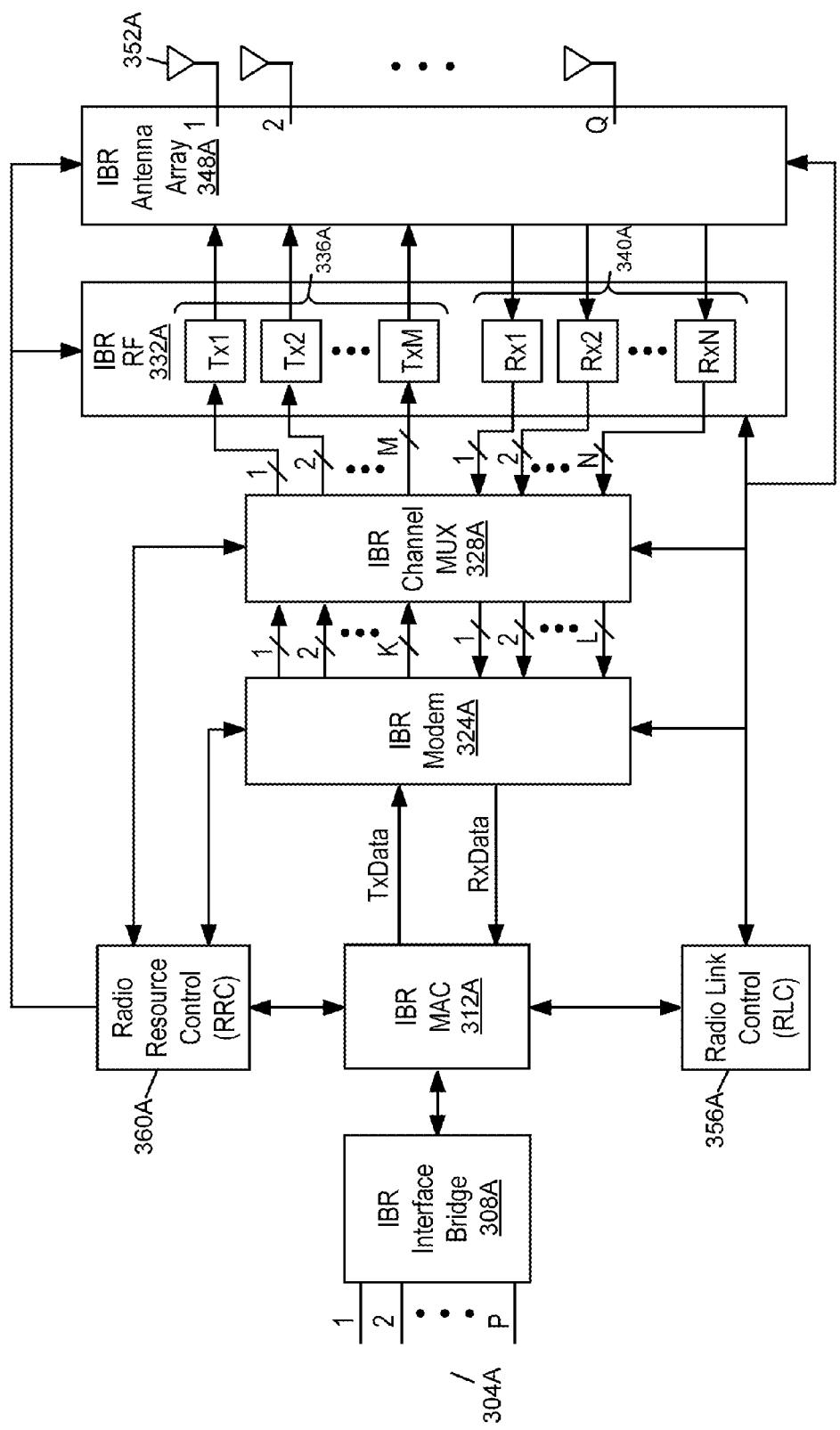
FIG. 3A is an exemplary block diagram of an IBR.
Figure 3B:
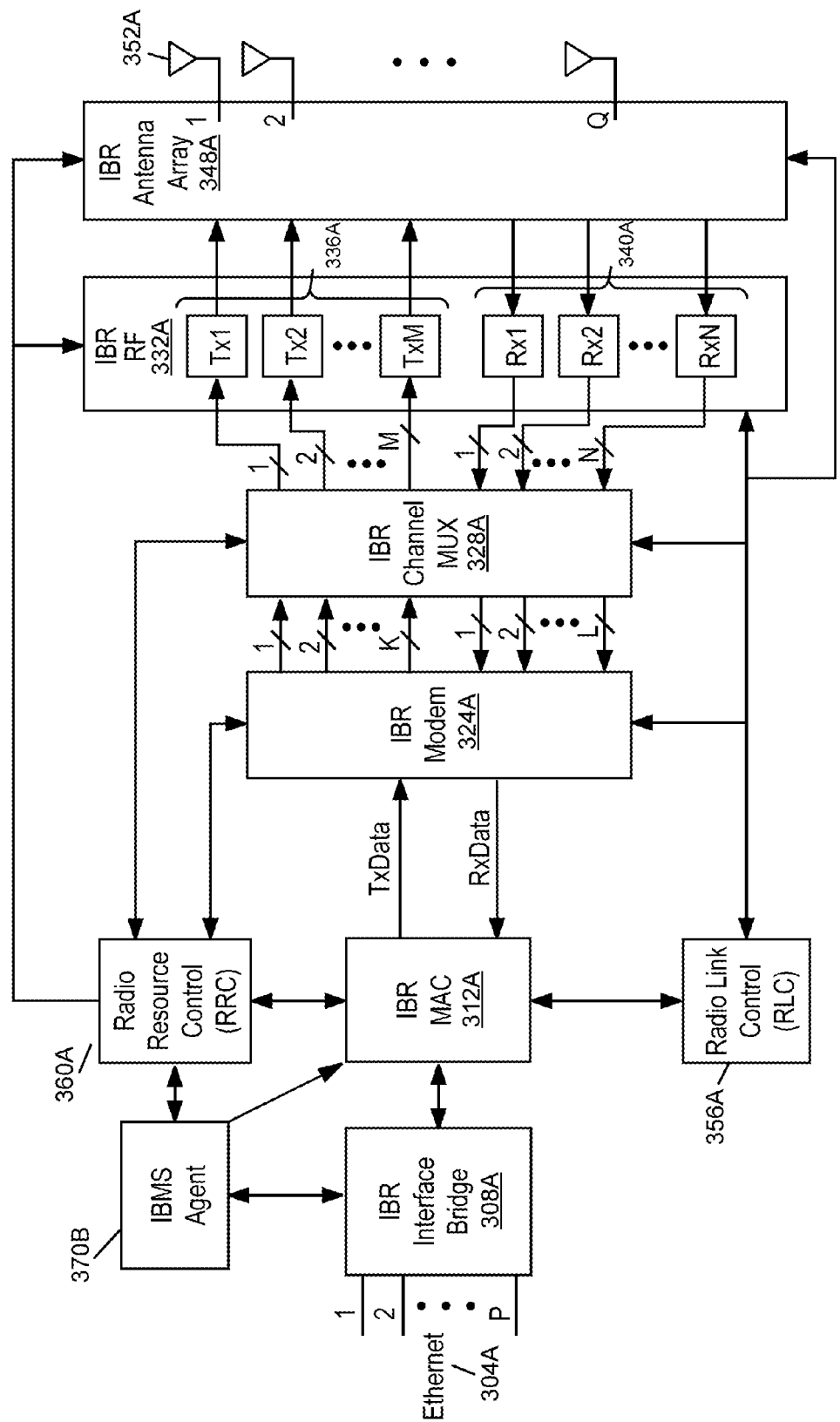
FIG. 3B is an alternative exemplary block diagram of an IBR.
Figure 3C:
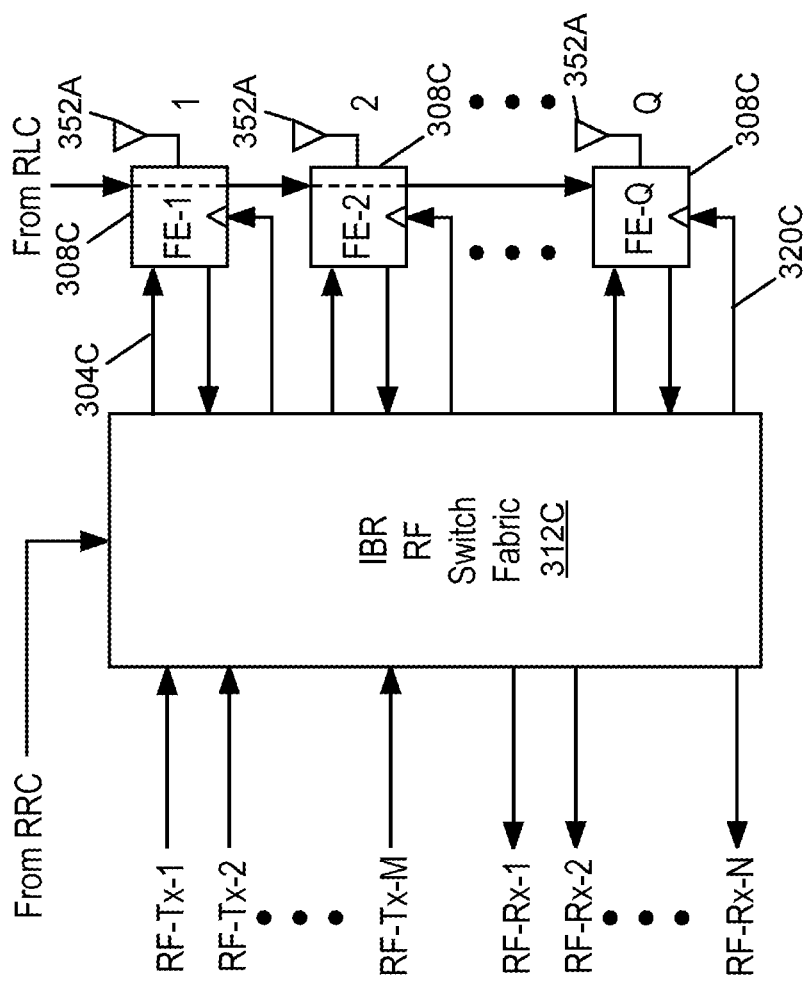
FIG. 3C is an exemplary block diagram of an IBR antenna array.
Figure 3D:
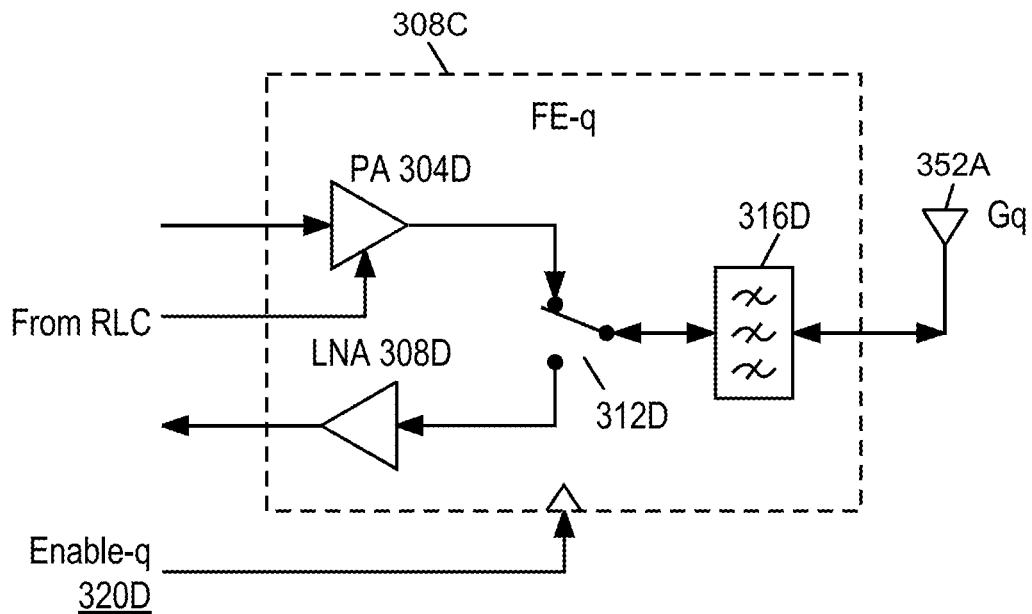
FIG. 3D is an exemplary block diagram of a front-end unit for TDD operation of an IBR.
Figure 3E:
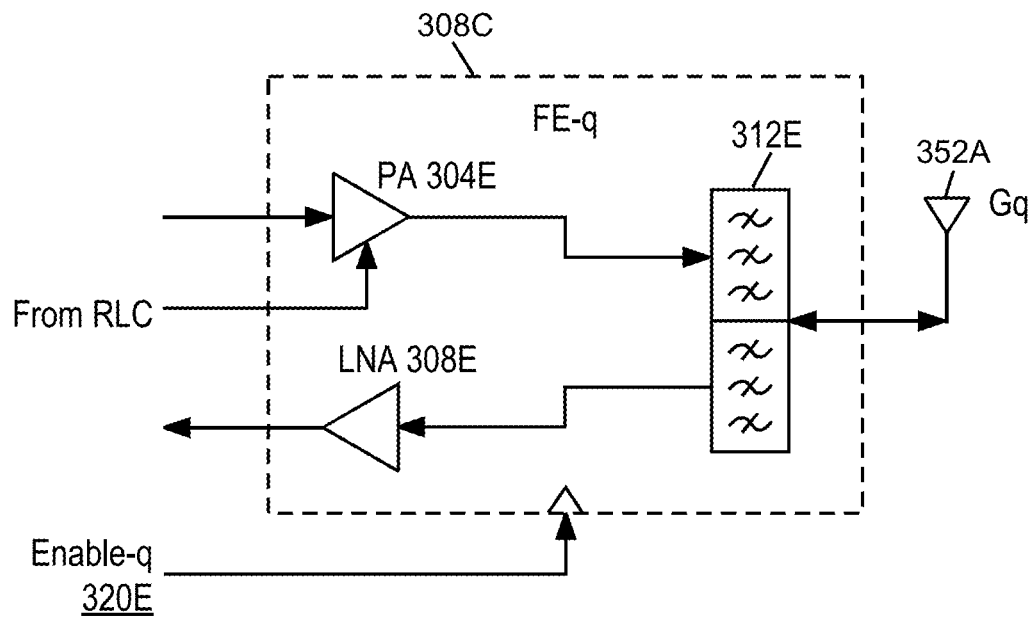
FIG. 3E is an exemplary block diagram of a front-end unit for FDD operation of an IBR.
Figure 3F:
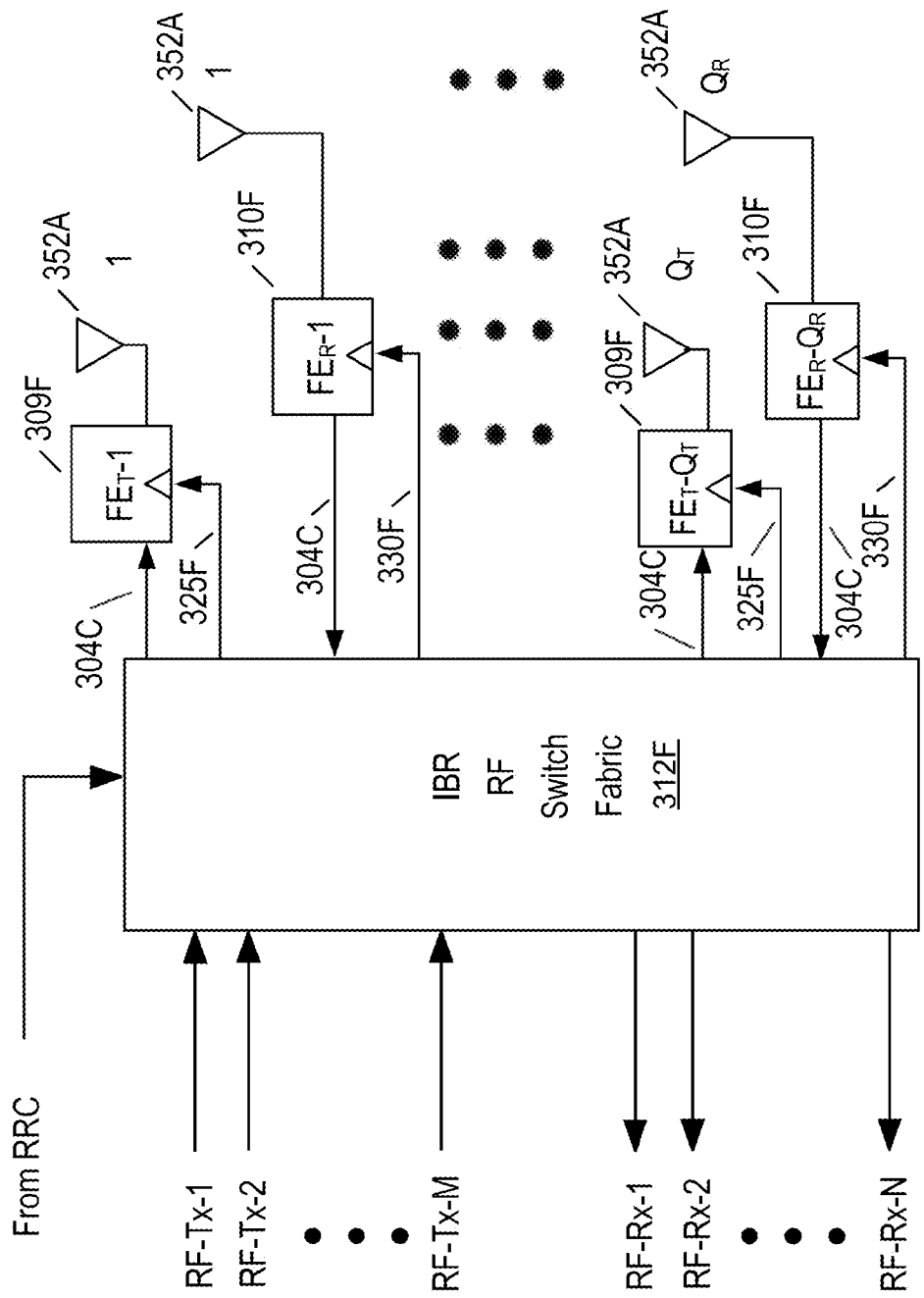
FIG. 3F is an alternative exemplary block diagram of an IBR antenna array.
Figure 3G:
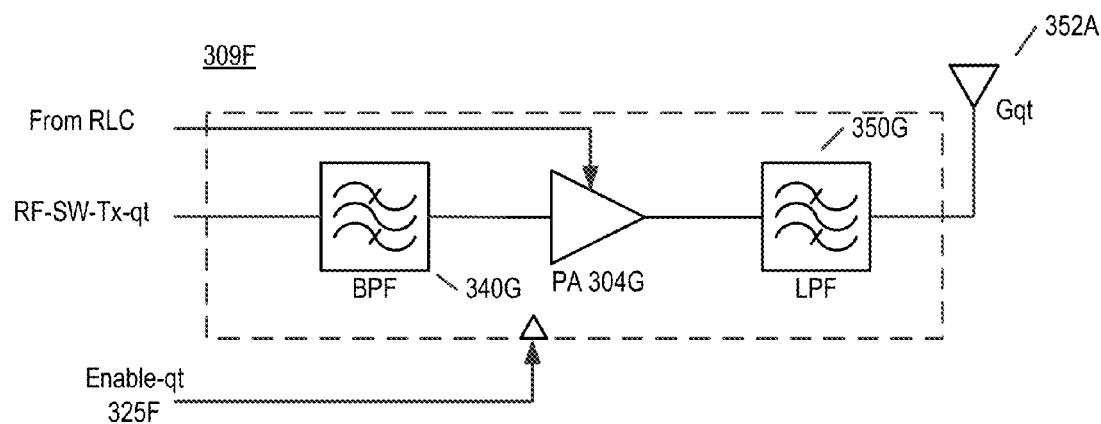
FIG. 3G is a block diagram of a front-end transmission unit according to one embodiment of the invention.
Figure 3H:
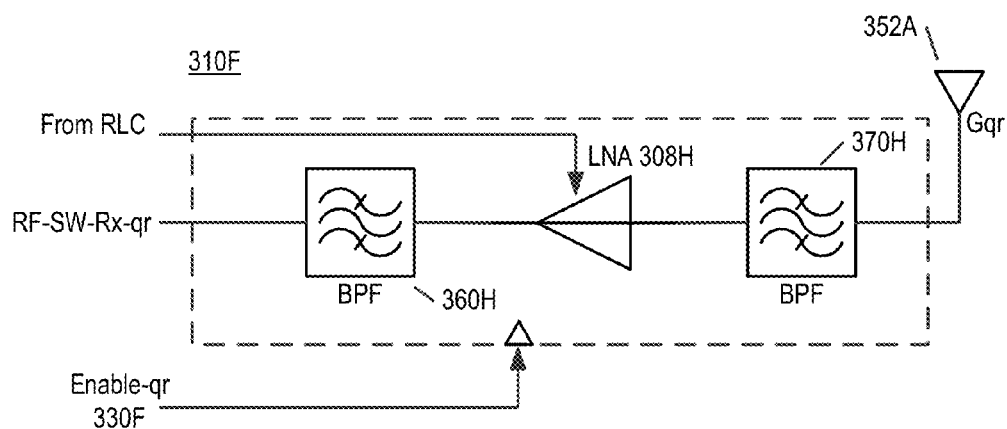
FIG. 3H is a block diagram of a front-end reception unit according to one embodiment of the invention.
Figure 31:
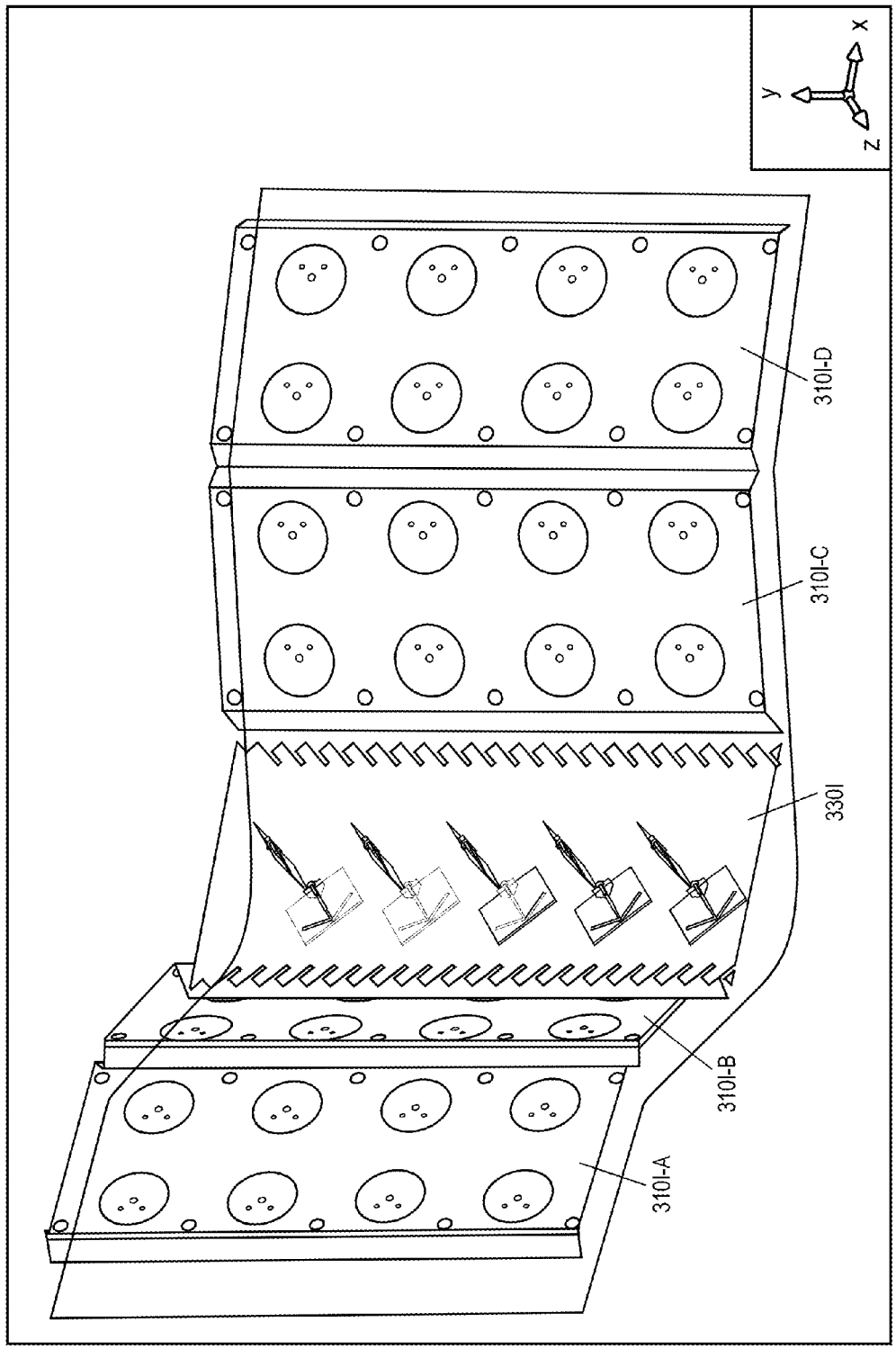
Figure 3J:
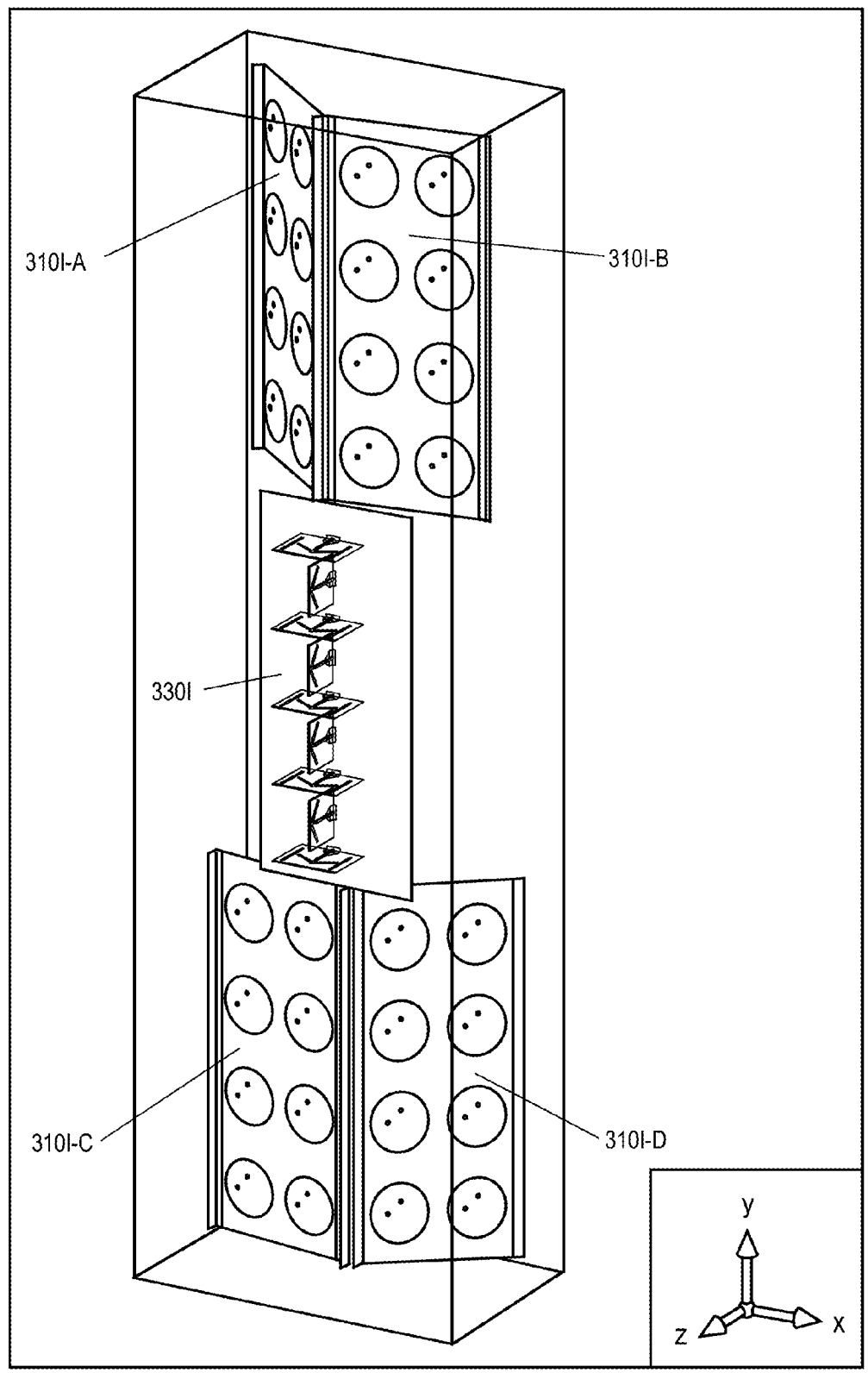
FIG. 3J is a diagram of an alternative view of an exemplary vertically arranged intelligent backhaul radio antenna array according to one embodiment of the invention.
Figure 3K:
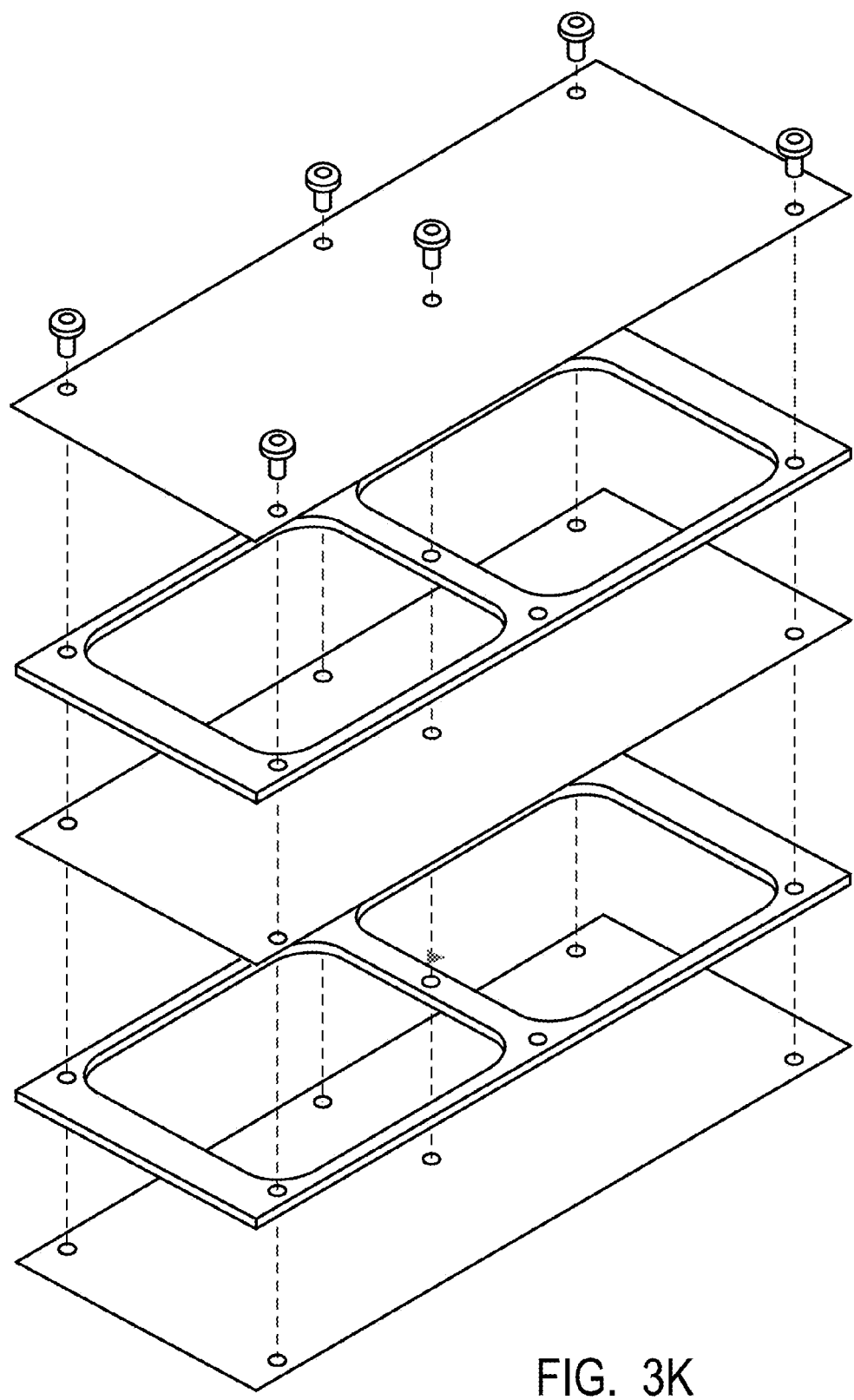
FIG. 3K is an assembly view of an antenna assembly according to an embodiment of the invention.
Figure 3L:
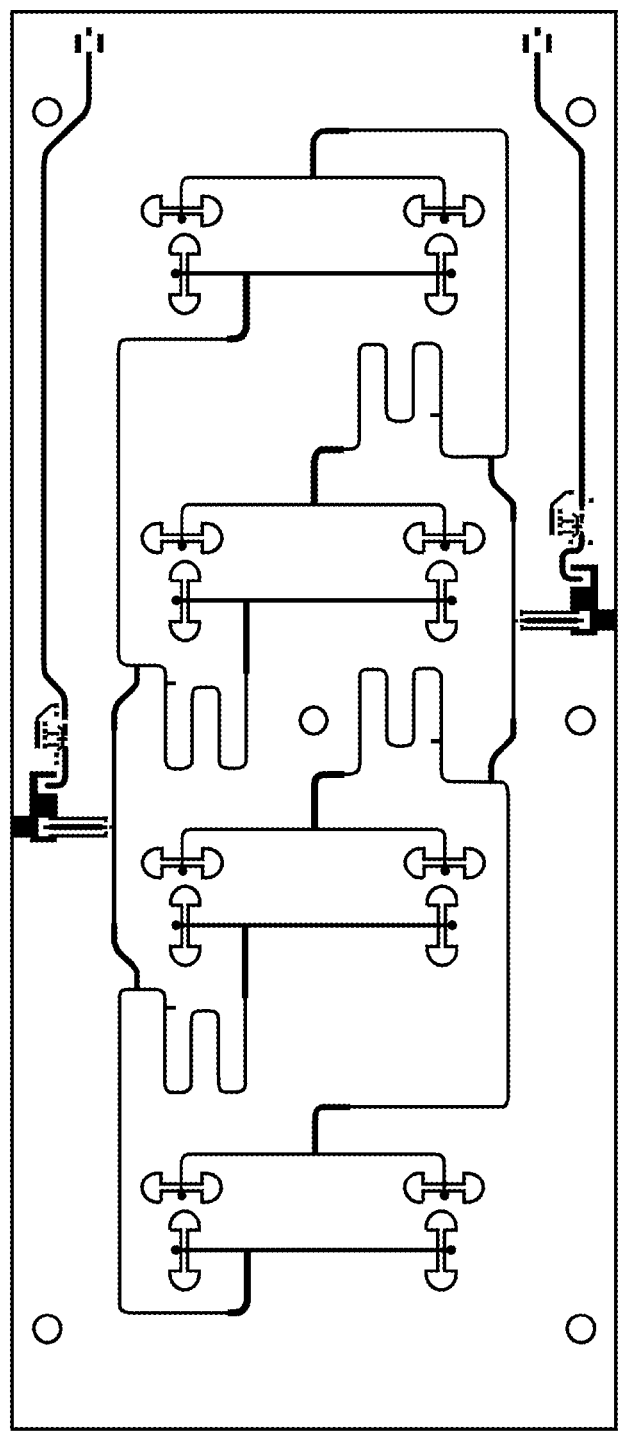
FIG. 3L is a detailed view of both the first layer and the second layer of the second substrate of the antenna assembly according to one embodiment of the invention.
Figure 3M:
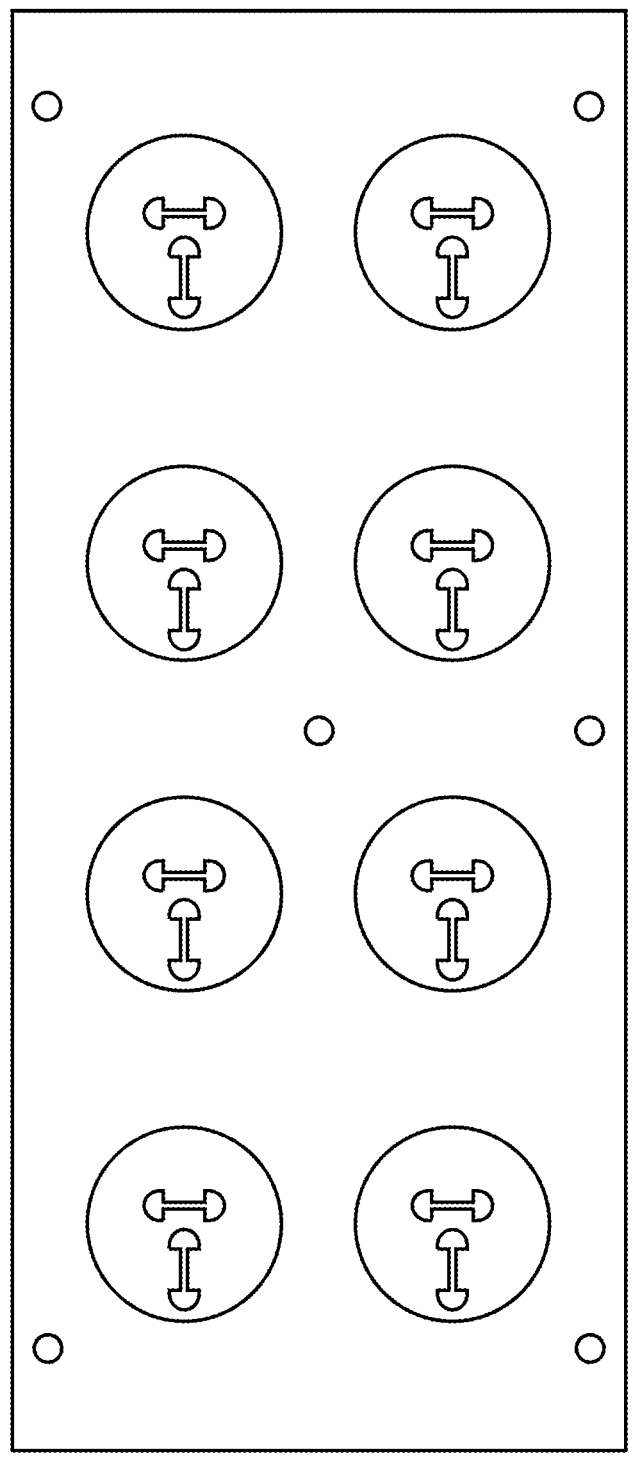
FIG. 3M is a view of the first and second substrates showing how the plurality of pairs of apertures on the first layer of the second substrate align with the plurality of conductive patch elements on the first substrate according to one embodiment of the invention.
Figure 3N:
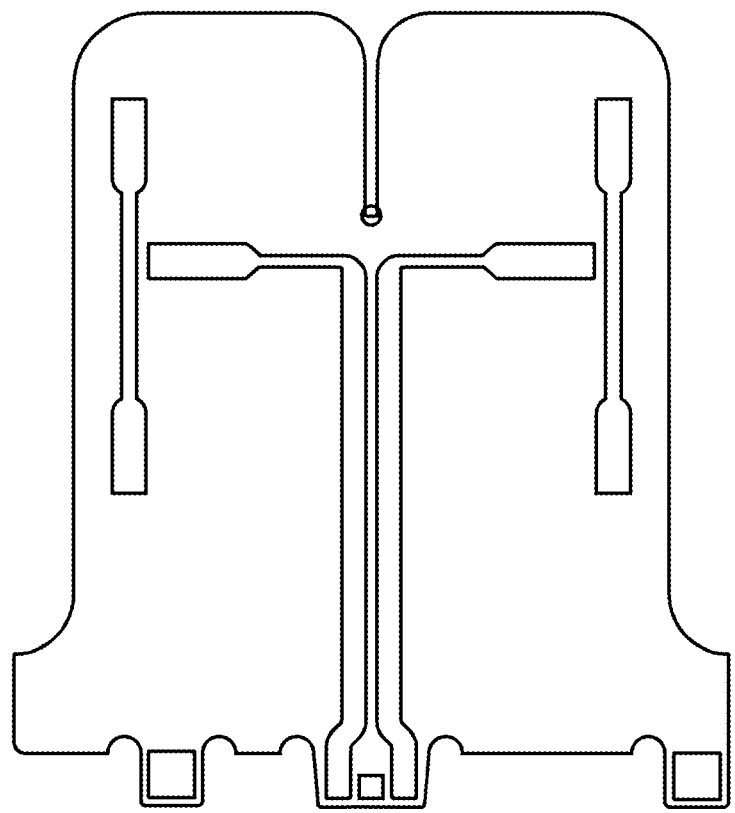
FIG. 3N is a detailed view of a unitary dipole antenna element for a dipole array antenna assembly according to one embodiment of the invention.
Figure 3O:
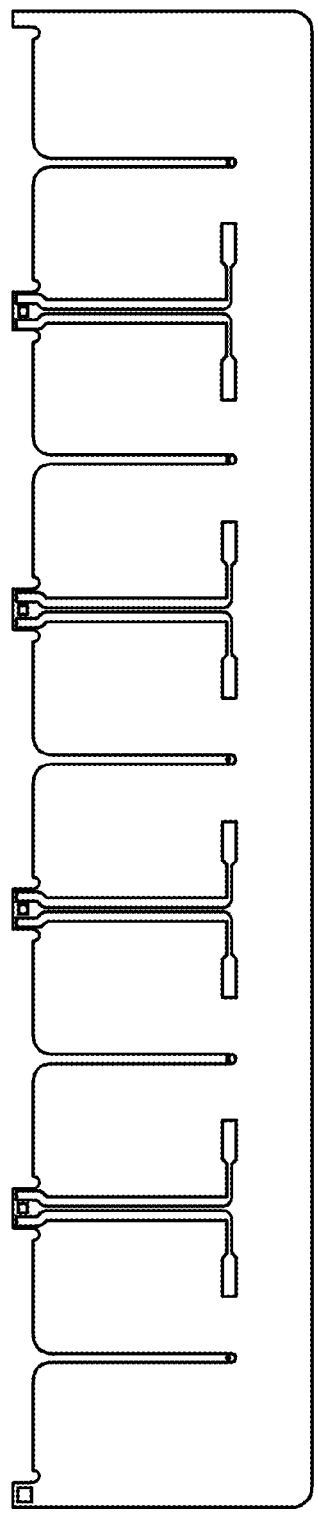
FIG. 3O is a detailed view of a plurality of coplanar dipole antenna elements for a dipole array antenna assembly according to one embodiment of the invention.
Figure 3P:
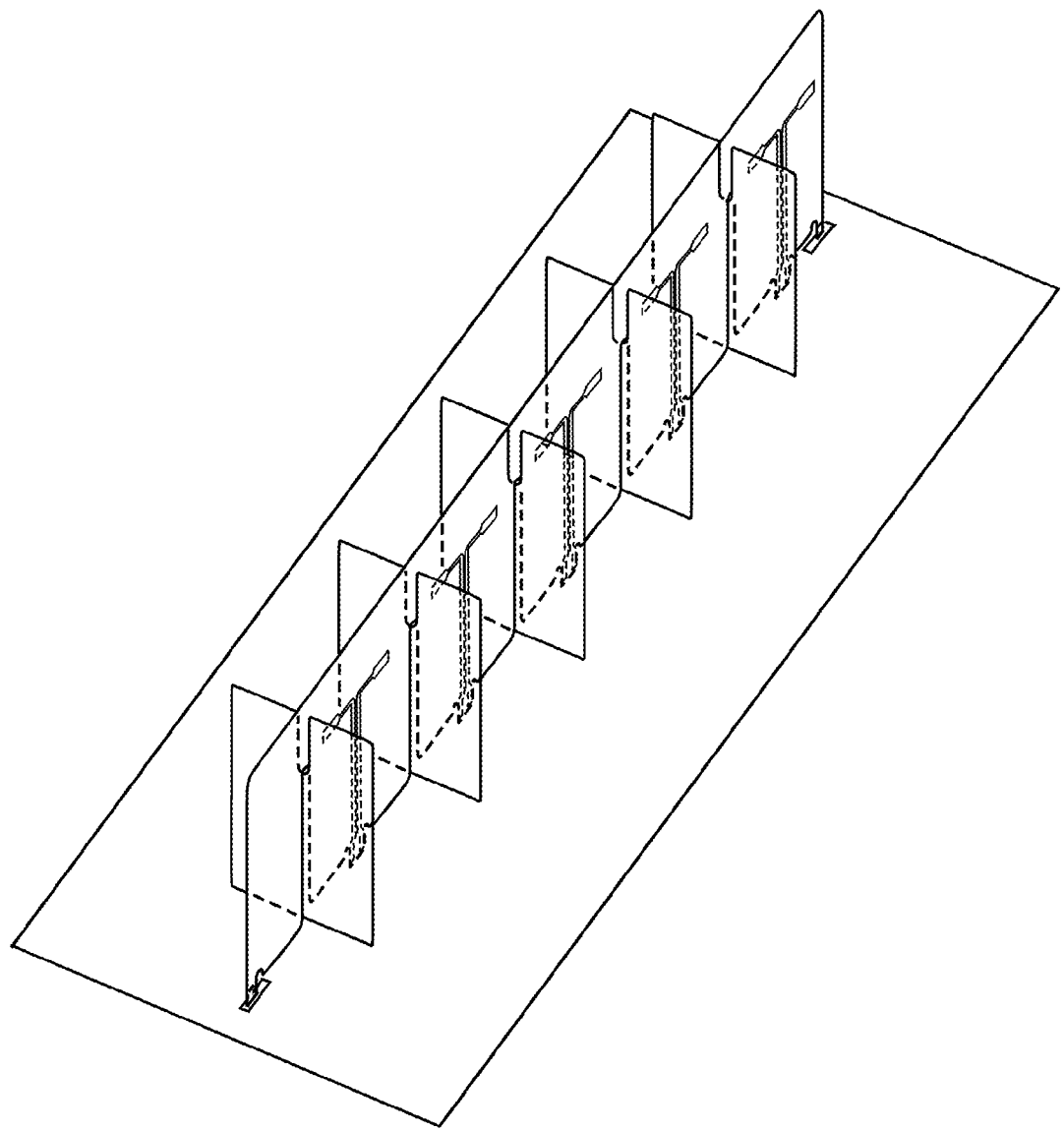
FIG. 3P is an alternative assembly view of a dipole array antenna assembly according to one embodiment of the invention.
Figures 3Q, 3R:
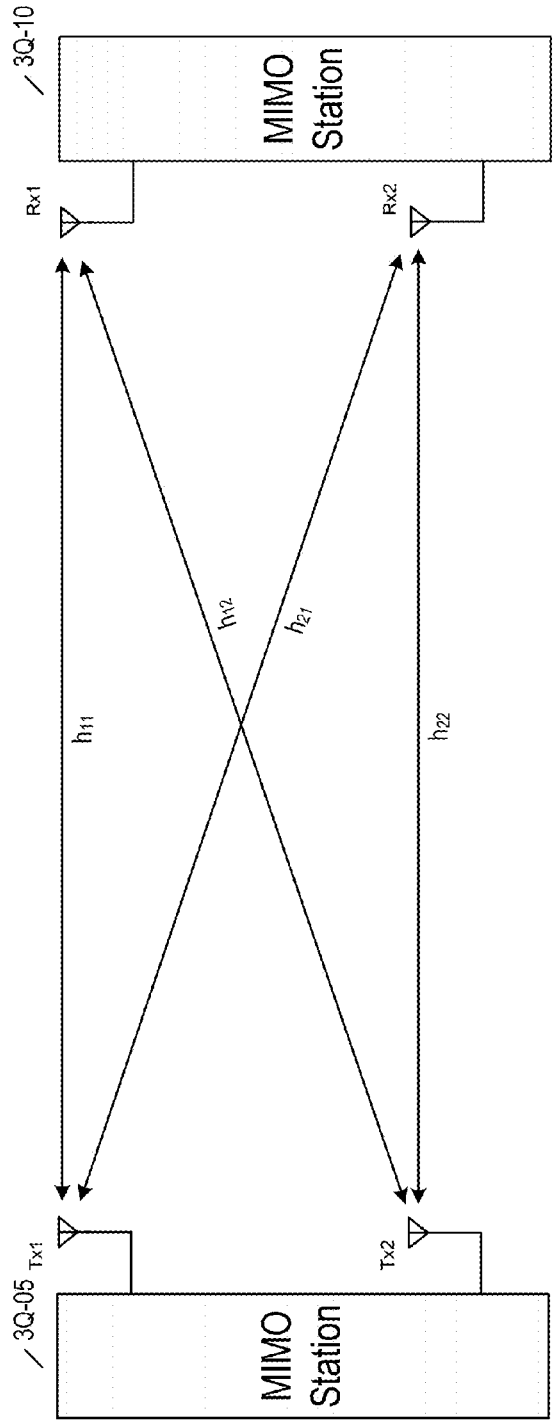
FIG. 3Q is an illustration of the MIMO station propagation matrix elements.
FIG. 3R illustrates the MIMO channel propagation matrix equation and associated terminology.
Figure 3S:
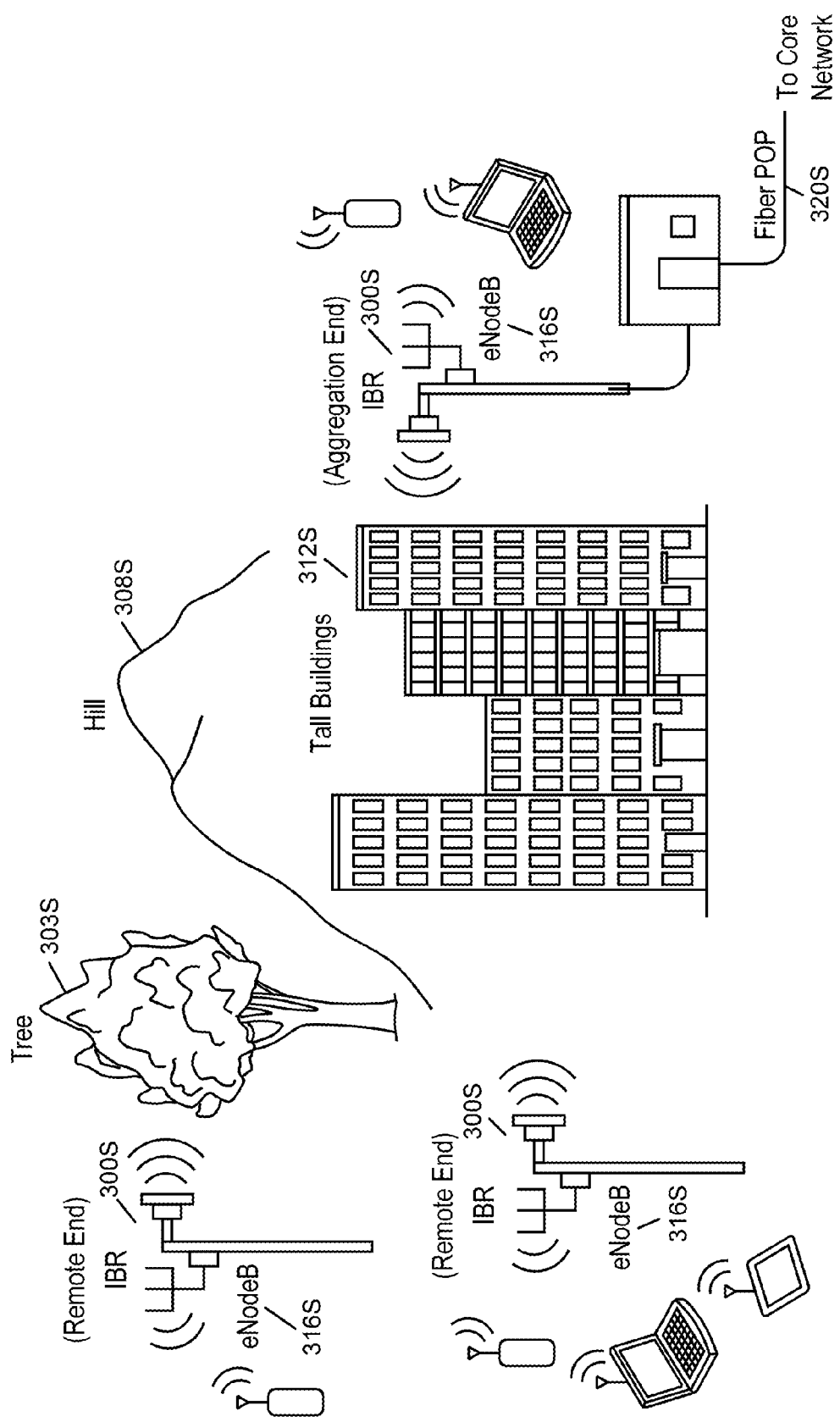
FIG. 3S is an exemplary illustration of intelligent backhaul radios (IBRs) deployed for cellular base station backhaul with obstructed LOS.
Figure 5A:
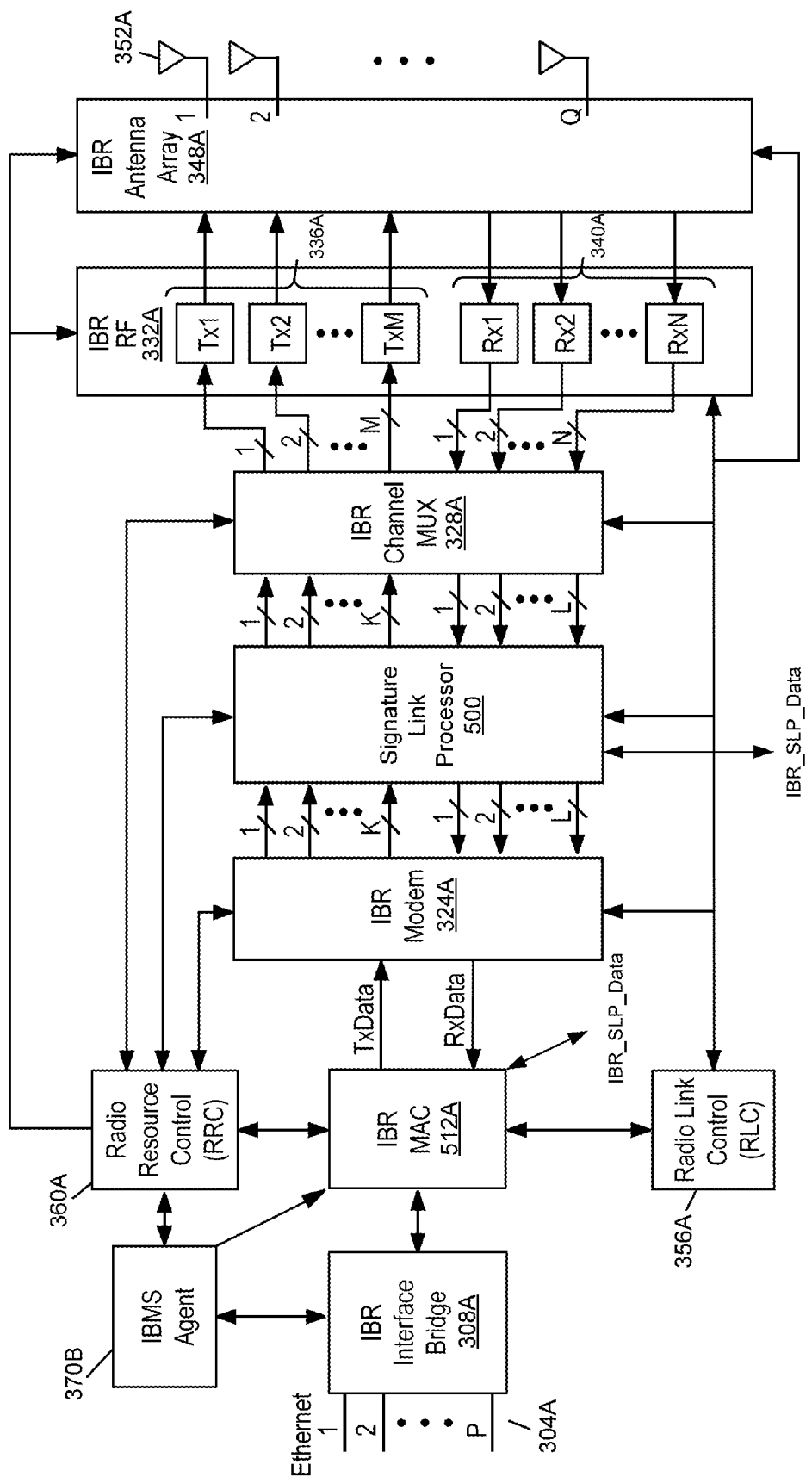
FIG. 5A is an exemplary block diagram of an IBR including a Signature Link Processor (SLP).

Referring now to FIG. 5A, an embodiment of an IBR including a Signature Link Processor (SLP) is depicted. A number of the blocks common with FIGS. 3A and 3B are shown, whose functioning is generally described associated with the foregoing description. Relative to FIG. 3B, FIG. 5A provides for a modified IBR MAC 512A, and an additional block referred to as a Signature Link Processor (SLP) 500.

Embodiments of IBR MAC 512A generally incorporate the functionality of the various embodiments of IBR MAC 312A. Some Embodiments of IBR MAC 512A may additionally include MAC processing supporting the optimization of the wireless links utilizing ECHO devices as described more fully in co-pending application U.S. Ser. No. 13/763,530, the entirety of which is incorporated herein by reference. Additionally some embodiments of IBR MAC 512A will support peer to peer and communications with other devices (e.g. ECHO devices) utilizing a Signature control channel for the transfer of control information.

Embodiments of the Signature Link Processor (SLP) 500 provide for the reception and insertion of an additional wireless communications channel referred to as a Signature control channel in specific embodiments. Associated with IBR transmission, the Signature Link Processor receives transmit symbol streams (1 . . . K) from IBR Modem 324A and provides the same transmit symbol streams (1 . . . K) to the IBR Channel MUX 328A with additional Signature control channels added to the individual streams, if such processing is enabled. In some embodiments where Signature control channels are not actively associated with any specific transmit symbol stream, the transmit symbol streams are passed to their respective with no addition of Signature control channel signal. Embodiments of the SLP may provide for a unique Signature control channel to be added to each of the respective transmit symbol streams. In other embodiments the SLP may provide for the components of the control channel or the control channel in entirety to be added commonly to all transmit symbol stream in a related fashion.

In one exemplary embodiment utilizing a common control channel structure, a direct sequence spread spectrum (DSSS) pilot signal utilizing a first orthogonal code will be added commonly to all streams processed for transmission by the SLP. Additionally, in the instant embodiment, each individual stream will receive a respective second copy of the DSSS pilot signal, but modulated with a differing orthogonal code respectively associated with the individual transmit symbol streams. Such modulation may be accomplished using modulo 2 additions, multipliers, or bi-phase modulators as known in the art. The individual orthogonal codes may additionally be modulated by information bits in the form of the IBR_SLP_Data transmit data interface stream, resulting in a Signature control sub-channel symbol stream. One such reference teaching DSSS and CDMA modulation and demodulation techniques is *CDMA: Principles of Spread Spectrum Communications*, by Andrew J. Viterbi (Addison Wesley Longman, Inc., ISBN: 0-201-63374-1). Some embodiments of the Signature control channel having a specific structure utilizing multiple sub-channels are referred to as a common control channel. The use of either term in specific instances should not be considered limiting, and in some cases is utilized interchangeably.

Embodiments of the Signature Link Processor (SLP) 500 further provide for the reception and demodulation of Signature control channels inserted into one or more transmitted symbol streams by other devices, such as an ECHO device. Associated with IBR reception, the Signature Link Processor 500 receives receive symbol streams (1 . . . L) from IBR Channel MUX 328A and provides the same transmit symbol streams (1 . . . L) to the IBR Modem 324A, with the detection and or demodulation of any associated Signature control channels within the individual streams, if such processing is enabled. The resulting demodulated data from the Signature control channels is provided to the IBR MAC 512A by the SLP 500 as IBR_SLP_Data. Embodiments of the SLP may provide for a unique Signature control channel to be received and demodulated associated with each of the respective receive symbol streams. In other embodiments the SLP may provide for the components of the control channel or the control channel in entirety be detected and demodulated commonly from all receive symbol streams.

In alternative embodiments, with appropriate interfaces, the SLP may be placed between the IBR Channel Mux 328A and the IBR RF 332A so as to allow for a single Signature control channel on a per transmit or receive chain basis rather than on per symbol stream basis.

In yet further alternative embodiments, a similar per chain Signature control channel result may be obtained utilizing the SLP placement as shown in FIG. 5A but with amplitude and phase weightings so as to cause the IBR Channel MUX to achieve the intended result. Such combinations of IBR Channel MUX processing with coordinated SLP processing further allows for additional control of capabilities of mapping specific Signature control streams with specific transmit or receive chains associated with the IBR RF 332A.

Figure 5B:
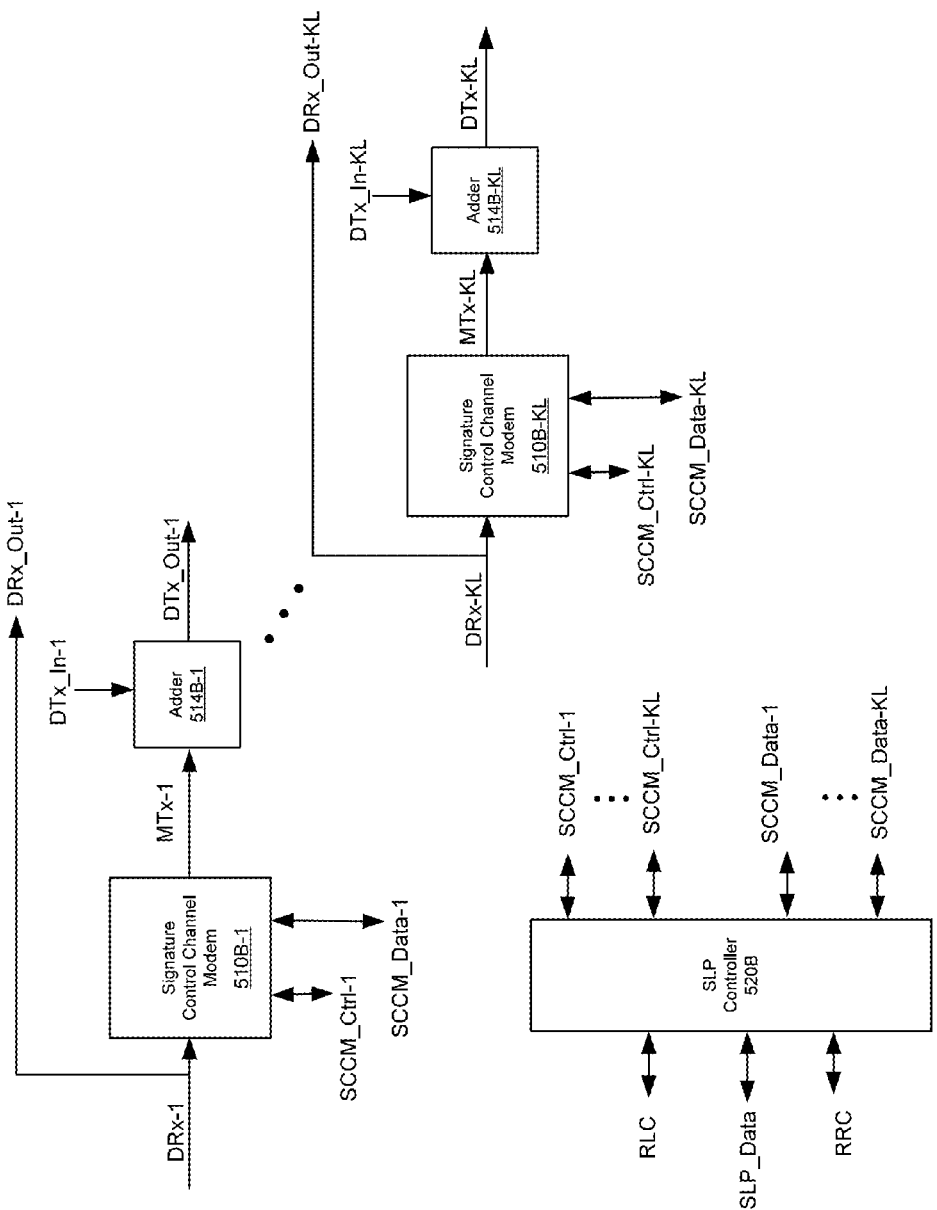
FIG. 5B is an exemplary block diagram of a Signature Link Processor (SLP).

FIG. 5B is an exemplary block diagram of an embodiment of the Signature Link Processor (SLP) 500. The SLP controller provides for interfacing the SLP Data, RRC and/or RLC with the Signature Control Channel Modem (or SCCM) data and control information denoted as SCCM_Data-(1 . . . KL) and SCCM_Ctrl-(1 . . . KL) via communication with the individual Signature Control Channel Modems (510B-1 . . . 510B-KL). Such interfaces allow for the interchange of data, including and control information with the individual modems. For example the relative signal level and timing of the individual per stream Signature control channels and sub-channels within transmit symbol streams may be set utilizing the control information contained within the SCCM_Ctrl-kl signals (where kl varies linearly from 1 to KL). Additionally the correlated signal level of a Signature control channel or sub-channel, the received signal level indication of all the signals, and the timing information of the received signals may be additionally communicated from the individual SCCM Modems to the SLP Controller 520B, and to the RLC, SLP_Data, and RRC subsequently. It should be understood that the SLP_Data signal of FIG. 5B corresponds to the IBR_SLP_Data signal of FIG. 5A. However, as the SLP will be disclosed as being utilized in subsequent embodiments associated with ECHO devices, the naming within FIG. 5B is more generic.

Additionally, the DRx-kl signals (where kl varies from 1 to KL) provide for digitally sampled signals associated with the 1 to L receive symbol streams, in some embodiments. The DRx_Out-kl signals (where kl varies from 1 to KL) are respectively coupled to DRx-kl, to provide for a pass through operation of the respective DRx-kl signals, for example when an SLP is utilized within an IBR. Such a pass through coupling, in some embodiments, allows for the coupling of the receive symbol streams from the IBR Channel MUX 238A to the IBR Modem 324A. In some alternative embodiments where the SLP is utilized within a repeater device, such DRx_Out-kl signals may not be utilized by the repeater device and may not be depicted as external ports to the SLP in such embodiments.

The DTx_In-kl and DTx_Out-kl signals (where kl varies from 1 to KL) provide for a digitally sampled signals associated with the 1 to K transmit symbol streams respectively input and output from SLP 500, in some embodiments. An individual Signature Control Channel Modem 510B-kl, provides a modulated control channel (MTx-kl) to a respective exemplary Adder 514B-kl, which combines MTx-kl with the input transmit symbol stream DTx_In-kl. Adder 514B-kl in turn provides the Signature Control Channel Signal DTx_Out-kl. In embodiments where no input to a particular DTx_In-kl is provided, the MTx-kl signal is provided directly as DTx_Out-kl.

Note that KL need not be equal to either K or L. In some embodiments where there is a one to one correspondence between transmit symbol streams and Signature control channels (or sub-channels in a common control channel structure), KL must be equal to or greater than K. In cases where KL (the number of SCCMs) exceeds K (the number of transmit symbol streams) the excess SCCMs may not be utilized for transmission, or may be used for other purposes. One such purpose would be for use dedicated to a transmit chain, such as might be used with a single high gain antenna panel for example.

Further, when there is a one to one correspondence between the number of receive symbol streams and the number of Signature control channels associated with these streams, KL (number of SCCMs) must be equal to or exceed L (number of receive symbol streams). In the case where KL exceeds L, a number of the SCCMs may remain unused for reception of Signature control channels, or may be utilized for other purposes such as receiving Signature control channels from individual receive chains.

FIG. 5C is an exemplary block diagram of an embodiment of a Signature control channel modem 510B-kl. Digitally sampled receive symbol stream DRx-kl is coupled to Signature Control Channel Detector/Synchronizer block 570C, which preforms timing synchronization with the DSSS signals within the input signal, and detects the presence and associated signal levels (in uncorrelated and correlated levels for example, Io, Ec, Es, Ec/Io and/or, Es/Io), and associated timing information and provides one or more of the determined values to the Modem Timing Controller 550C. The Modem Timing Controller 550C, in one embodiment, utilizes the timing and received Ec/Io information to trigger the demodulation and or transmission of Signature control signals respectively associated with the Digital Demodulator 560C and the Digital Modulator 580C. The digitally sampled receive symbol stream DRx-kl is additionally coupled to the Digital Demodulator 560C, which upon receiving SCCM_Ctrl configuration information, and timing information from the Modem Timing Controller dispreads and demodulates the DSSS signals associated with the Signature Control Channel and any associated pilot, and any data sub-channels for SCCM_Data. The SCCM_Ctrl configuration information, in specific embodiments, may contain a specific PN code, Gold code, or other code to be utilized for spreading and dispreading in the SCCM 510B for use in Digital Demodulator 560C and Digital Modulator 580C. Additionally, the SCCM_Ctrl may contain the identity of values of specific orthogonal codes for use with specific sub-channels of a common control channel structure. Such orthogonal codes may include Walsh Codes, CAZAC Codes, Zadoff-Chu codes and the like. Further, the specific codes may be designated as for use with a pilot channel utilized for synchronization and as a phase and amplitude reference for demodulation, and other codes designated for use with specific data sub-channels carrying BPSK modulated data in one example embodiment. Referring to FIG. 5C, Digital Modulator 580C provides a modulated control channel signal MTx-kl, upon receiving the mentioned configuration information from the SCCM_Ctrl, the SCCM_Data to be transmitted, and the timing from the Modem Timing Controller 550C. Either, or both of the Digital Modulator 580C and the Digital Demodulator 560C may be disabled utilizing the SCCM_Ctrl signal.

As mentioned previously, such DSSS and CDMA transmission and reception approaches and structures are well known in the art including as utilized in the downlink of IS-95, W-CDMA, CDMA-2000 and the like. Further aspects of such art is disclosed in the previously references book *CDMA: Principles of Spread Spectrum Communications*, by Andrew J. Viterbi (Addison Wesley Longman, Inc., ISBN: 0-201-63374-1).

An alternative embodiment, not shown, of the SLP 500 of FIG. 5A may be implemented using in reference to FIGS. 5B and 5C a separate bank of Digital Modulators 580C arranged from 1 to K each with an output MTx-k and respective inputs SCCM_Ctrl-k and SCCM_Data-k, a separate bank of Digital Demodulators 560C arranged from 1 to L each with an input DRx-1, an associated Detector/Synchronizer 570C and timing control signals, and respective outputs SCCM_Ctrl-1 and SCCM_Data-1, as well as associated DRx bypasses, DTx combiners and modified SLP Controller 520B as would be apparent to those skilled in the art.

Figure 5D:
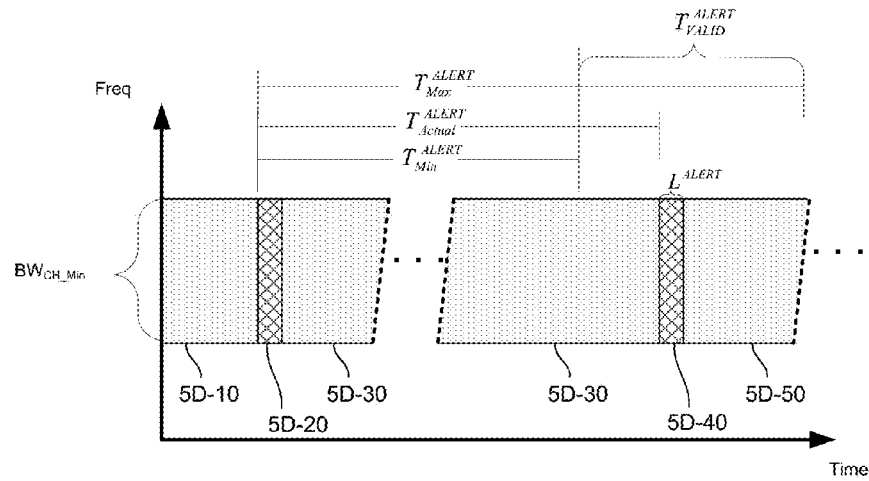
FIG. 5D is an illustration of an exemplary Advanced Backhaul Services (ABS) compliant signal including an in-band and inline signature signal deployed within a single channel.

FIG. 5D is an illustration of an exemplary Advanced Backhaul Services (ABS) compliant signal including an in-band and inline signature signal deployed within a single channel. The vertical (y) axis of the figure corresponds to the frequency spectrum, while the horizontal (x) axis corresponds to time increasing from left to right. The bandwidth of the exemplary ABS signal corresponds to the minimum channel bandwidth for the ABS services, corresponding to $BW_{CH\_Min}$. The bandwidth $BW_{CH\_Min}$ corresponds to the allocated channelization of the ABS system, in some embodiments to $BW_{CH\_Min}$ may also specify the bandwidth of the signal (5D-10,20,30,40,50) occupying the channel as well, while in other embodiment the ABS signal may be fixed at a proportion of this bandwidth, while in yet other embodiments the signal bandwidth may not correspond to the minimum channelization bandwidth in-so-far as the non-signature signal bandwidth does not exceed $BW_{CH\_Min}$. In specific embodiments, the signature based alert signal (5D-20, 5D-40) is related to the minimum channelization bandwidth to $BW_{CH\_Min}$, where the non signature based service signal (5D-10,30,50) may or may not correspond to the minimum channelization bandwidth $BW_{CH\_Min}$. In this context, "in band" indicates that the signature based alert signal 5D-20,40 (or a alert signal in general) is transmitted within the same frequencies of operation as the user payload information signals (5D-10,30,50). Additionally, in the current embodiment, "in-line" indicates that the user payload signal (5D-10,30,50) and the Alert signals (5D-20,40) are time multiplexed together, and transmitted "in-line" with each other. In the current embodiment, specific conventions or rules are followed so as to allow a receiving station adhering to the ABS system to detect and demodulate the alerts from another station. Embodiments of the ABS system allow for such detection and communication even between ABS compliant devices not engaged to direct communication utilizing the user payload signal (5D-10,30,50), or even able to receive and process such user payload signals due to devices being from different manufacturers or having incompatible configurations in hardware software, or management. A pre-determined arrangement of $BW_{CH\_Min}$, and/or other system parameters allow for even non-compatible equipment to detect and receive information to allow for knowledge relating to the presence and potentially operating parameters of other information associated with other ABS stations within the propagation range for which interference may be a problem. Further, as will be discussed further, such ABS compliant stations in some embodiments may be able to not only detect such signatures but also respond with transmissions so as to allow for intercommunications between two ABS compliant stations. This intercommunication can then occur even for stations in which it is either undesirable or even physically impossible to intercommunicate amongst directly using the user payload signal (5D-10,30,50).

In a related embodiment, inline signatures/alerts 5D-20, 40 are sent at the maximum allowable transmission power of the transmitter. In other embodiments, the alerts (inline signatures 5D-20,40) are transmitted at the same average transmission power level as the composite ABS information signal (5D-10,30,50) it is inline with, during the inline transmission period. Other embodiments may provide for the alert transmission power to be set at a ratio relative to the user information signals (5D-10,30,50), or the like.

For some embodiments using inline, in-band communications, timing constraints related to the transmission of the alert signals are required, but may allow flexibility within a pre-defined window. In one embodiment, it is undesirable to require a fixed periodicity for the inline signature. Such an arrangement may be too rigid for specific embodiments. In such an embodiment, inline transmission periods could be:

i. Shorter than $T_{Max}^{Alert}$
ii. Longer than $T_{Min}^{Alert}$,
iii. where $T_{Max}^{Alert} = T_{Min}^{Alert} + T_{VALID}^{Alert}$ Referring again to FIG. 5D, $T_{VALID}^{ALERT}$ represents the period of time in which the transmission, or the detection of an alert is possible. $T_{Max}^{ALERT}$ represents the maximum duration in time since the detection of the last alert (or in other embodiments another time reference or event) that an alert may be received, or expected. $T_{Min}^{ALERT}$ represents the minimum time (e.g. the soonest) for which an alert may be expected or allowable to be transmitted since the last alert (or in other embodiments another time reference or event). $T_{Actual}^{ALERT}$ represents the actual time between alerts (or in other embodiments another time reference or event). Other "events" may include, but are not limited to, the reception of other signals such as alerts for other ABS compliant systems, or an absolute time reference, GPS time, IEEE1588 time references, or the reception of another signature within the ABS compliant transmission signal, which triggers such a relationship to an alert reception timing. The various $T_X^{ALERT}$ parameters may be coded within ABS devices (or known a priori), or retrieved from the registry server (based upon geographic location or region for example, or based upon ABS station identification in another example), broadcast by ABS devices, or retrieved from a look up table. Such parameters may be usable, in one embodiment for both inline alert processing, but also embedded alert processing, while in another embodiment usable for transmission and reception on the common control channel—out of band.

Figure 5E:
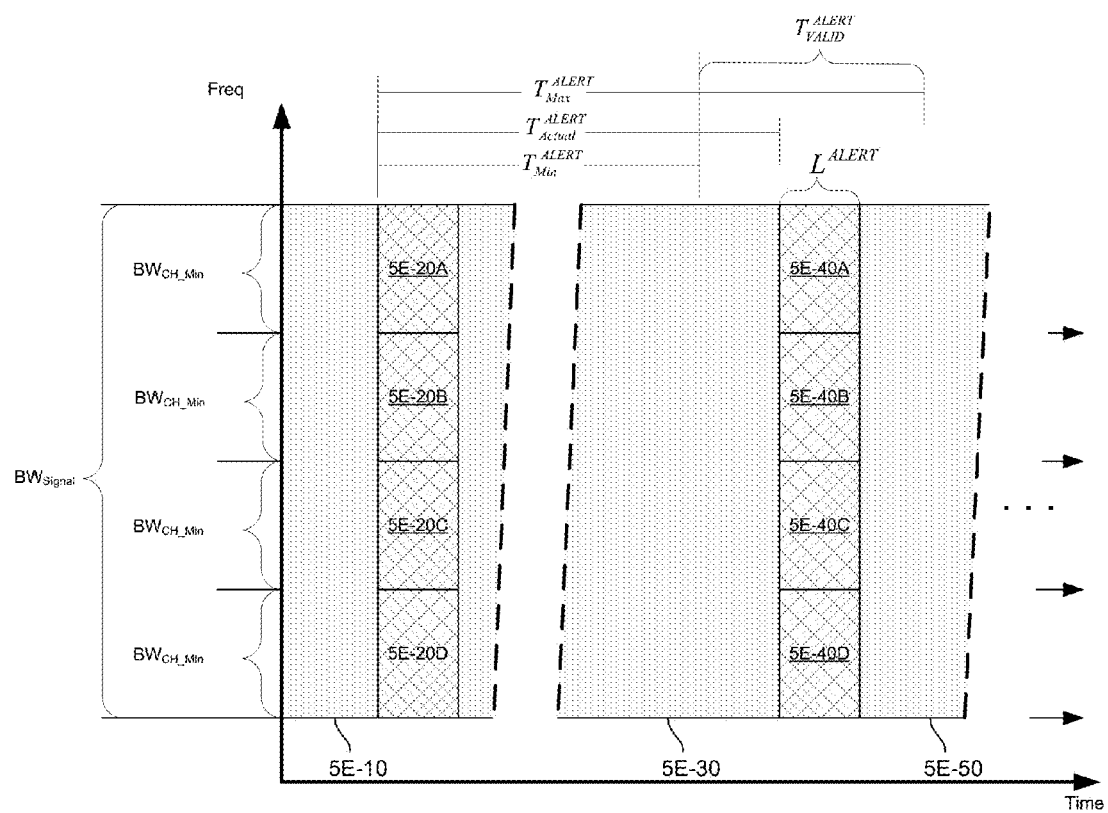
FIG. 5E is an illustration of an exemplary Advanced Backhaul Services (ABS) compliant signal including an in-band and inline signature signal deployed within a multiple channels.

FIG. 5E is an illustration of an exemplary Advanced Backhaul Services (ABS) compliant signal including an in-band and inline signature signal deployed within multiple channels. In this embodiment, an example of an ABS compliant system utilizing multiple channels for transmission and reception is depicted.

$BW_{Signal}$ represents the entire bandwidth, or equivalent number of occupied minimum channels $BW_{CH\_Min}$ in use by a specific ABS compliant system, in one embodiment. In this embodiment, the modulation symbol rate of the user information signal 5E-10,30,50 will be proportionally faster (by the ratio of $BW\_Signal/BW_{CH\_Min}$) than that of the alerts (5E-20A-D,5E40A-D). This is because the individual alert signals (5E-20A-D,5E40A-D) in this embodiment are sent in a manner consistent with those sent for an individual channel as depicted in FIG. 5D, as alerts 5D-20,40, and each will occupy an individual bandwidth $BW_{CH\_Min}$. In the current embodiment, however, the modulated symbols for the information payload signal 5E-10,30, 50 occupy the entire $BW_{Signal}$ and have a proportionally shortened symbol period in a single-carrier modulation scheme or a proportionally increased number of carriers in a multi-carrier modulation scheme. Other embodiments may utilize individual information carrier signals of the same modulation symbol rate as the alerts, and form a multicarrier signal as an alternative, so as to provide a plurality of the signals depicting in FIG. 5D, but in a multiple carrier arrangement of FIG. 5E. In yet other embodiments, a combination of multicarrier information signals and individual information signals of varying bandwidths may be utilized. In one embodiment, despite one or more arrangements of signal information bandwidths within $BW_{Signal}$ the bandwidth of the alert signals will be the same or similar as that depicted in FIG. 5E. In other embodiments, there may be a set of possible alert signal bandwidths.

Figure 5F:
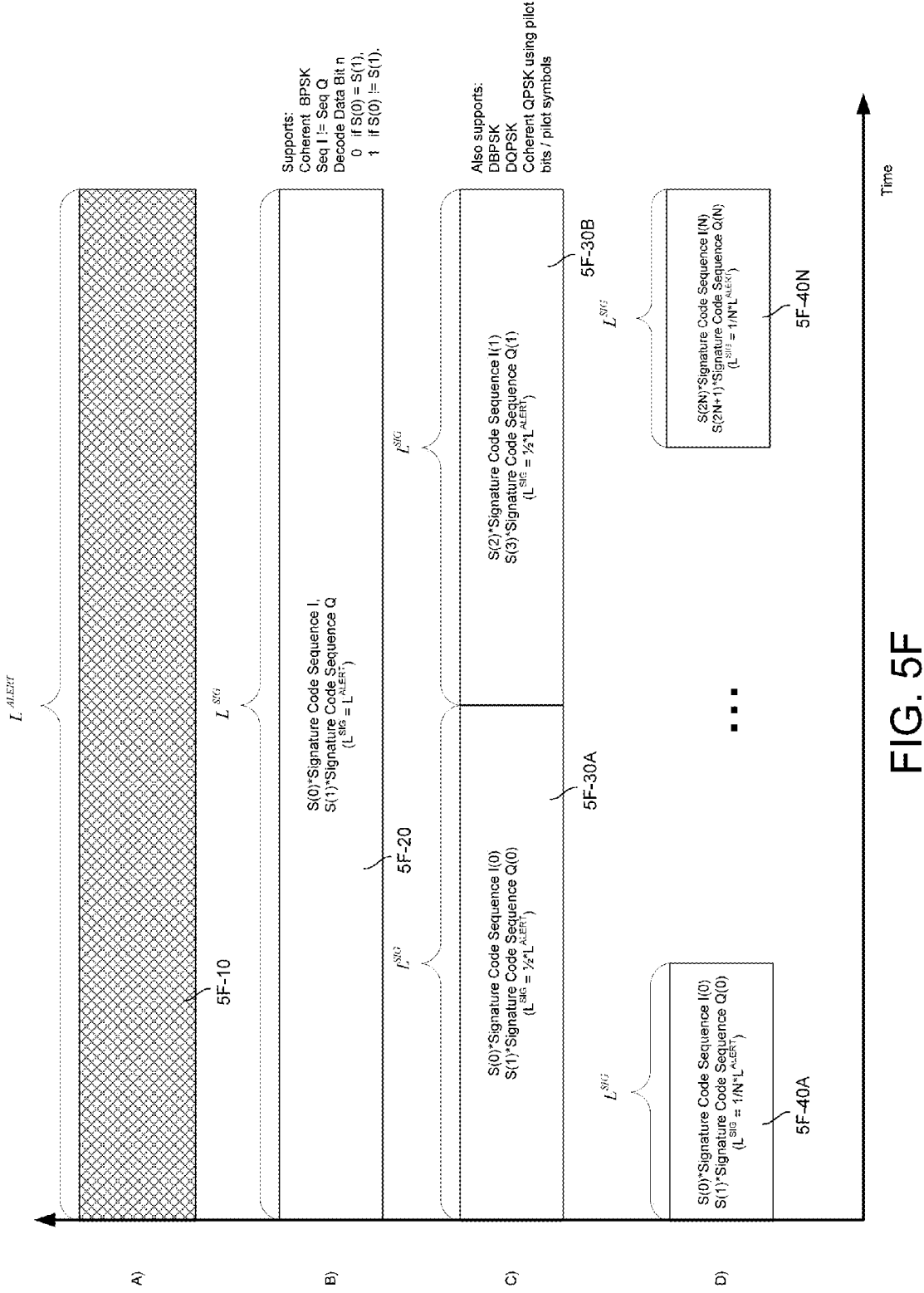
FIG. 5F is an illustration of exemplary embodiments of Advanced Backhaul Services (ABS) signature signals of various structure.

FIG. 5F is an illustration of an exemplary embodiment of Advanced Backhaul Services (ABS) signature signals of various structures. Referring to row A, an alert signal 5F-10 is of length $L^{ALERT}$. In the example embodiment of row B, a single signal 5F-20 is depicted of length $L^{SIG}$. In this embodiment, $L^{SIG}$ is equal to $L^{ALERT}$. In the embodiment of row B, the alert signal 5F-20 includes two signature code sequences, one modulated on the in-phase channel (I) and another modulated on the quadrature phase channel (Q) of a QPSK modulator, as is known by one skilled in the art. Such an arrangement allows for the two sequences to be respectively individually modulated by signature information bits S(0), and S(1). The present embodiment can support a number of different modulations including, for example, coherent BPSK as described herein. In one embodiment, the I code sequence and the Q code sequence are not the same, and allow for detection utilizing individual correlators as will be discussed. For example, when S(0) is equal to S(1), the resulting information bit is interpreted as a "0". On the other hand, when the correlated values of the are opposite sign (for example, when S(0) results in a positive correlation value, and S(1) results in a negative correlation value) the resulting information bit is interpreted as a "1". Many other arrangements and variations may be used as well, consistent with coherent modulation techniques. In one embodiment, the in-phase information bit S(0) may be transmitted as a 1, and treated as a pilot signal or symbol, whereas the quadrature information bit S(1) may be interpreted as the payload information signal. Other arrangements are possible as well, allowing for other modulations such as QPSK, and m-ary QAM modulation. The signature code sequences I and Q may be any number of types of codes as known in the industry and as discussed. In one embodiment, the I and Q codes are two codes orthogonal to each other, such as may be produced utilizing a maximal length code (m-sequence or m-code), and modulated by two different Walsh codes as in known. In yet further embodiments, alternative orthogonal codes may be used such as so called CAZAC codes, or Zadoff-Chu codes. In yet another alternative embodiment, the I and Q codes may be multiple codes, each having a plurality of Walsh codes, where one set for I and Q includes a code division multiplexed pilot reference signal with pre-determined values of ones (for example) for the polarity of both the I and the Q Walsh codes of the pilot channel, and the third and fourth codes are the codes associated with S(i) and S(i+1) for the alert sequence. Of course, the I and Q Walsh codes may be re-used for each of the two I and Q Walsh codes, but with a third Walsh code applied to one of the I/Q sets so as to produce a third and fourth orthogonal code. In the current embodiment, all four Walsh, or other orthogonal codes may then be "covered" or scrambled on a chip by chip basis with an alert code, such as m-sequence, gold code, a portion of these, or the like.

Alternatives not utilizing orthogonal codes are possible as well, for instance using two different m-sequences for each of the I code and the Q code where the length of each m-sequence is equal to $L^{SIG}$ and includes the signature sequence(s). Alternative codes which may be utilized include Barker codes, gold codes, and others and known in the art.

Referring now to the embodiment of row C, two sets of signature sequences 5F-30A, 5F-30B are sent per one alert time period $$\left(L^{SIG} = \frac{1}{2} * L^{ALERT}\right).$$

Each signature information bit S(n), where n=0 to 3, may be utilized so as to produce a number of different modulation formats including both coherent modulations, and differentially encoded modulations. Some example modulations utilized in various embodiments include DBPSK and DQPSK using differential encoding; and BPSK, QPSK, QAM utilizing a phase reference such as a pilot bit, pilot symbol or pilot channel). Various codes and modulation structures may be utilized as described in the foregoing.

Row D of FIG. 5F depicts a similar arrangement as row C, except where N sets of signature code sequences (5F-40A to 5F-40N) are depicted allowing for 2*N information symbols S to be utilized. The current embodiment includes code sequences of length $$L^{SIG} = \frac{1}{2} * L^{ALERT}.$$

Figure 5G:
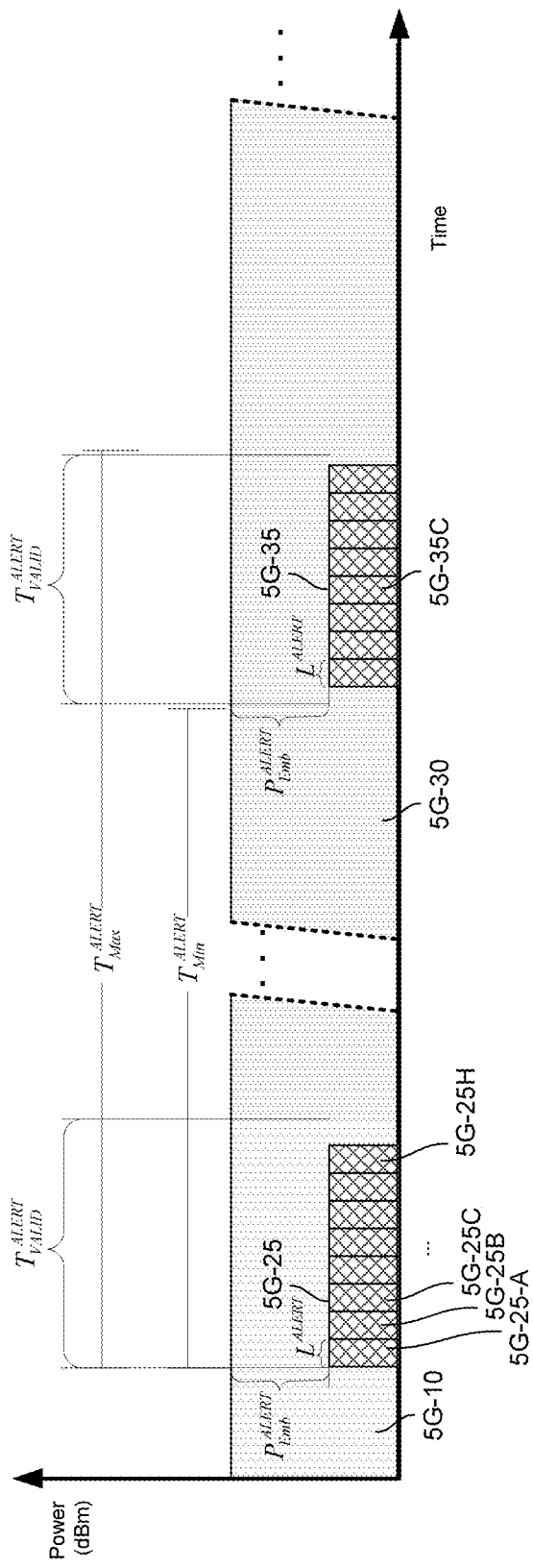
FIG. 5G is an illustration of an exemplary Advanced Backhaul Services (ABS) compliant signal including an in-band and embedded signature signal.

FIG. 5G is an illustration of an exemplary Advanced Backhaul Services (ABS) compliant signal including an in-band and embedded signature signal. The previous figures FIG. 5D, FIG. 5E and FIG. 5F, depicted "inline" alerts as discussed. As an alternative, in band embedded alerts may be utilized. Similar embedded signaling was first introduced in co-pending application U.S. Ser. No. 13/763,530, the entirety of which is incorporated herein by reference. The term embedded is used in the current context to describe an alert signal 5G-25, 5G-35 which is not time multiplexed with the payload information bearing signal 5G-10, 5G-30 but is present at the same time as the payload signals during specific periods of time. In this embodiment, the transmission 5G-25 during a $T_{VALID}^{ALERT}$ period includes a plurality of individual alert signals 5G-25A through 5G-25H, each of length $L^{ALERT}$ such that transmission 5G-25 is referred to as a composite embedded alert signal. Likewise, the composite embedded alert signal 5G-35 includes a plurality of individual alert signals 5G-35A through 5G-35H. The repetition of the identical individual alert signals making up each composite embedded alert signal is performed so as to compensate for a reduced transmission power level $P_{Emb}^{ALERT}$ relative to the transmission power level for the payload information signal 5G-10,5G-30. The time period in which alerts may be received, as explained previously, is denoted $T_{VALID}^{ALERT}$ and encompasses the entire composite alert sequence 5G-25, and respectively 5G-35 in a separate valid period. In the current embodiment, the information carried within 5G-25 and 5G-35 is different. Within a given composite embedded alert signal, the individual alert signals are the same and each individual alert signal includes one or more modulated information bits (such as S(0) through S(2N−1) of FIG. 5F.) Thus, the individual information bits within a given composite alert signal remain the same so as to allow further processing such as coherent combination of the individual alerts 5G-25-A through 5G-25H within composite alert signal 5G-25. Such coherent combination processing results in compensation for the reduction of the transmitted power level of the alerts relative to the payload information bearing signal by the amount $P_{Emb}^{ALERT}$. In one embodiment, N embedded alert signatures may be transmitted at $P_{MAX}-10*\log 10(N)$, or in yet other embodiments, a power level based upon such as calculation. Further in such an embodiment, the N embedded signatures may be transmitted sequentially such that coherent combination is possible over $T_{VALID}^{Alert}$.

In order to prevent the combination of individual alerts of different composite alert signals 5G-25 and 5G-35, a gap of time between the $T_{VALID}^{ALERT}$ periods is defined so as to ensure only individual alert signals of the same composite alert signal are combined together. The spacing between successive $T_{VALID}^{ALERT}$ periods are defined by $T_{Min}^{ALERT}$ and $T_{Max}^{ALERT}$ as previously discussed, and depicted within FIG. 5G. For both the inline and the embedded embodiments of the alert signals, the use of a window of time $T_{VALID}^{ALERT}$ for the transmission of alert signals and/or composite alert signals provides for some flexibility, in some embodiments, as to the exact transmission start time of the alert transmissions allowing for the alignment of the transmissions so as to be convenient with other signaling such as a frame timing, start of frame, end of frame, super-frame, or other structure of the payload carrying ABS signal itself. Alternatively such flexibility may allow for the avoidance of transmitting alert signals at a time when it is not advantageous to the ABS payload signal, such as when particularly time sensitive information is being transmitted, when noise sensitive signals are being transmitted such as channel estimation reference signal(s), or other phase references, or to avoid the disruption of the payload signal framing, segmentation, or other grouping of the information signals. As a result, in one embodiment, valid alert transmission $T_{ALERT}^{VALID}$ periods must be:

i. End prior to $T_{Max}^{Alert}$ from the beginning of the previous alert transmission.
   ii. Begin after $T_{min}^{Alert}$, from the beginning of the previous alert transmission.
   iii. where $T_{Max}^{Alert} = T_{Min}^{Alert} + T_{VALID}^{Alert}$ In embodiments of an ABS system utilizing embedded signatures, the embedded alert signals will act as noise to the user payload bearing signal (5G-10,5G-30). In some embodiments, the alerts have a code length k providing a "processing gain" resulting from a correlation in a receiver of $10*\log 10(k)$, as previously discussed. If k is sufficiently large, the alert signal(s) may be transmitted at a relative power level reduction $P_{Emb}^{ALERT}$ such that the interference resulting form the embedded signal is manageable with no further processing. For example, if the modulation for the ABS payload information signal requires 25 dB of signal to noise and interference $$\left(\frac{S}{N+I}\right)$$

to be demodulated with a reasonable error rate, an interference level 10 to 20 dB below this level ($I_{Margin}$) would be appropriate. Note that within this discussion the term SNR may be understood to include interference as well, and the interference aspect may not be explicitly mentioned in every instance. As a result of the desired SNR for the demodulation of the ABS information payload signal, within this embodiment, the power of the alerts would be set to a value below the payload information signal by $P_{Emb}^{ALERT} = 25$ dB + $I_{Margin}$. This relationship assumes that the "chip rate" of the alerts, is comparable to the symbol rate (or sample rate) of the ABS information signal within the relevant channel bandwidth. In contrast to the SNR considerations for the payload information bearing ABS signal, the received alert signals must also be detected with a sufficient SNR, which is an opposing motivation. In general, for a high probability of detection of the signatures, any metric utilized to perform detection should have a signal to noise ratio allowing for an acceptably high probability of detection and an acceptably low probability of false detection. One approach to achieving a high probability of detection is to transmit the alerts signals at a higher level, thus impacting the SNR of the information-bearing signal. However, the relative transmission power of the alert signals in the current embodiment is set by $P_{Emb}^{ALERT} = 25$ dB + $I_{Margin}$.

A discussion of the signal to noise ratios associated with the probability of detection and false detection may be found in *CDMA: Principles of Spread Spectrum Communications*, by Andrew J. Viterbi (Addison Wesley Longman, Inc., ISBN: 0-201-63374-1) pages 48 to 52 and elsewhere. In some embodiments, the resulting signal used to determine detection of the embedded composite alert signals will be the result of the correlation of the individual alerts, and then the combination of the individual alerts into a signal detection signal, which will be used for a detection hypothesis, against a metric. Just as the alert sequences act as noise to the demodulation and successful detection of the information symbols of the ABS information signal, the information signal will act as noise to the successful detection and demodulation of alert signals. Therefore, the processing gain (e.g. the length of the alert signature k) must be sufficiently long, in some embodiments, so as to provide an alert detection SNR that allows for an acceptable probability of detection and a sufficiently low probability of false alarm, associated with the transmission of the alert signatures $P_{Emb}^{ALERT}$ dB below the information payload signal.

In one embodiment, a detection hypothesis for alert signals is based upon a ratio of the correlated to uncorrelated energy of the alert sequences. Such a test has the added benefit of reducing false detections in the presence of very strong uncorrelated signal levels in contrast to a test based upon correlated energy exceeding a threshold. An example of one such test is based upon the following hypothesis:

Alert detection Det(h), if $$\frac{1}{N_{MaxAlerts}} * \sum_{n=0}^{n=N_{MaxAlerts}} \frac{P_{DET}^{AlertCorr}(h-n)}{P_{DET}^{AlertUncorr}(h-n)} > TH_{DET}^{ALERT}. \quad \text{Eq. 5-1}$$

where,
Receivers must integrate for $N_{MaxAlerts}$, where $N_{MaxAlerts}$ is equal to the maximum number of alerts that are possible within the time window $T_{VALID}^{ALERT}$, and for each h.

h is the alert code sequence(s) start time under the current hypothesis being tested.

The above test allows for the detection of either inline or embedded alerts with a certain probability $P_{Detect}^{Alert}$ of detection, and a certain probability of false detection $P_{False\_Detect}^{Alert}$. Such a process requires performing the above test over all possible start times of the alert signal within $T_{VALID}^{ALERT}$.

While the forgoing discussion includes embodiments for embedded alerts, which balance the transmitted alert signal power with interference to the ABS information signal, alternative embodiments allowing for a higher transmission power of the alerts may be utilized which provide for both a higher alert transmission power, and maintaining the SNR of the ABS information payload signal at the intended receiver(s), through the use of interference cancellation at the intended receivers. Despite such an alternative, the detection hypothesis test of Eq. 5-1 may be utilized with interference cancellation at the receiver as well.

Interference cancellation in this context provides for subtracting a known undesired interfering signal from a total received signal to result in a remaining signal that has an improved SNR. The use of embedded alerts is one such situation allowing for the use of interference cancellation at a receiver attempting to receive the ABS information payload signal because the signature(s) (the exact codes) of the alerts are known a priori to the reception of the signal as having been defined as part of the overall system, or communicated as part of an overhead message of some sort between the transmitter and the receiver. Further, the power level relationship and likely the phase relationship between the information signals and the alert signals may be known as well in some embodiments. In general, each "unknown parameter" such as amplitude, phase, information signal, code sequence, etc., are estimated to allow the generation of an estimated interfering signal to allow for the actual interfering signal to be cancelled utilizing a subtraction of the estimated interfering signals from the total signal where the total signal contains the actual interfering signal (or signals). The more parameters that are known before hand (such as code sequence, amplitude, phase, and timing) the fewer parameters require estimation, thus reducing the complexity and opportunity for error in an implementation at a receiver. Such processing (an interference canceller) may be implemented in some embodiments after down conversation, digitization, and spatial processing, but prior to demodulation of an individual stream. For example referring back to FIG. 5A, an alert signature signal cancellation processor may be implemented, in one embodiment, within the Signature Link Processor 500. Utilizing an interference cancelling Signature Link Processor embodiment would allow for an increased performance of the detection of alert signals as the alert signals may be transmitted at a level relative to the ABS information signal which would not allow sufficient SNR for the demodulation of the ABS signals without interference cancellation in specific embodiments. Further, such an arrangement in embodiments, may allow for an enhanced security between a transmitter and receiver of the same link, providing for known parameters to be shared for use in the interference cancellation "parameter estimation" process. In such an arrangement, one feature of enhanced security comes from the fact that the shared parameters may be modified occasionally, or continuously with such knowledge only being shared between the transmitter and receivers of a trusted link(s), which other receivers would require full estimation, and which may prove challenging in specific embodiments. Further, the use of such parameters by a receiver may be used, in specific embodiments, as a form of authenticity check to confirm the continual identity of the transmitting station.

Embodiments of structures for receiving and transmitting alert signatures, and signals were, in part, described associated with FIGS. 5A, 5B, and 5C. Further details, and embodiments of functions associated with the Signature Control Channel Detector/Synchronizer 570C and the signature Control Channel Digital Demodulator 560C of FIG. 5C will now be described. Additionally, embodiments capable of detecting and demodulating either inline or embedded signatures within a single receiver structure are also described. Alternative embodiments requiring a dedicated receiver for one or both the inline and the embedded alert signals are contemplated as well.

In some embodiments where a device must be able to detect both an inline and an embedded signature signal using a single receiver structure, it is contemplated that the chip rates of the inline and the embedded are to be the same, and only the power level versus repetition number be different. In related embodiments, the detected alert power ideally would result in the same or a substantially similar level, independent of the alerts being embedded or inline. Such embodiments may allow for determining information relating to the received level of the ABS information payload signal based upon the detected alert signal level. Such information, in specific embodiments allow for an assessment of the potential for interference with or from the transmitting ABS station as discussed previously.

FIG. 5H is an exemplary block diagram of an embodiment of a Sliding Correlator (CS). The depicted embodiment of the sliding correlator 5H-10 is implemented within a finite impulse response filter (FIR) 5H-20, whose correlated output is effectively the channel impulse response of the wireless propagation channel between a transmitted signature and the sliding correlator's associated receive symbol stream from IBR Channel MUX 328A of FIG. 5A or associated receive chain output from IBR RF 332A of FIG. 5A. The sliding correlator 5H-10 additionally outputs noise as a result of correlation with "uncorrelated" inputs such as signal from the ABS information payload signals (5D-10, 5D-30, 5D,30 5E-10, 5E-30, 5E-50, 5G-10, 5G-30), and uncorrelated interference from other transmitters, as well as from receiver front end thermal noise sources and the like. This input to the sliding correlator may be, in one embodiment, the DRx-kl of FIG. 5C, and the sliding correlator is within one or more of blocks 560C, and 570C of FIG. 5C. In the current embodiment, FIR 5H-20 is a complex FIR, receiving complex input, and FIR filter coefficients from Code Register/Input 5H-30. To the extent that the alert signature code(s) are real valued, the code provided by 5H-30 may be real valued as well. For complex values codes such as Zadoff-Chu codes, the code register 5H-30 provides the complex valued code to the FIR filter 5H-30. In one embodiment, a complex code provided by code register 5H-30 includes one Walsh code chosen from a set of orthogonal Walsh codes for the real portion of the code input to the FIR 5H-20, and another Walsh code, different from the first Walsh code but from the same set of Walsh Codes as the imaginary input to the complex FIR filter 5H-20. In another embodiment, two different Barker codes of the same length are provided to the real and imaginary code inputs. In another embodiment, two different m-sequences of the same length, or portions of a longer code of the same length are provided to the real and imaginary code inputs. In one embodiment, the output of the sliding correlator 5H-10 as described above will provide the complex impulse response of the correlated signal transmitted through a wireless channel to the receiver as modified by the instant multiplexing settings of IBR Channel MUX 328A of FIG. 5A.

FIG. 5I is an exemplary block diagram of an embodiment of a Complex Sliding Correlator Block (CSCB). In one embodiment, two sliding correlators 5H-10A and 5H-10B are used with a single complex valued input, but with different codes including a pilot channel based upon a in-phase and quadrature set of Walsh codes (for example, W0 and W1), and a data channel having two other Walsh codes (for example, W2 and W3), wherein the set of Walsh codes is chip by chip covered by a gold code to form Sequence Set j (SSj). Two of the codes within SSj, denoted as S1 and S2 (for Pilot I and Q, and respectively including W0 and W1) are provided to SC 5H-10A, and the the other two codes, denoted as S3 and S4 are provided to SC 5H-10B (for the data channel). The complex output of the two sliding correlators (SCs) are provided as respective outputs, as well as respectively squaring them (utilizing blocks 5I-20 and 5I-30) to determine the magnitude squared of each, which are then summed together at 5I-40 for use in the detection hypothesis of Eq. 5-1 (as Mag^2 or alternatively as Mag via SQRT—square root—block 5I-50). The Mag^2 produced by block 5I-30 provides a value proportional to the power term "P" required by EQ. 5-1. Compensation for the proportionality may be made by adjusting the $TH_{DET}^{ALERT}$ value appropriately to compensate for any impedance value of the Mag^2 measurement, relative to a value required for an exact power measurement. In alternative embodiments, for instance, where the S(0) provides the phase reference and S(1) provides the data values (as described associated with FIG. 5F Row B for example) the code sequence set (SS(j)) is composed of only two codes, one for each of the two sliding correlators. The sliding correlators, in this embodiment are correlating an incoming complex signal with a single real code (each of which includes two real FIR filters for performing correlations in this embodiment.)

FIG. 5J is an exemplary block diagram of an embodiment of a Sliding Detector (SD). Sig(n) are time samples of the complex (I and Q) values indexed by the variable n of receive signal. In one or more embodiments, Sig(n) are DRx-kl of FIG. 5B and FIG. 5C, where kl may vary from 1 to KL. In some embodiments Sliding Detector 5J-10 includes functionality included within signature Control Channel Modem 510B-kl. In other embodiments, Sliding Detector 5J-10 is within signature Control Channel Modem 510B-kl.

Sliding Detector 5J-10 includes CSCB 5I-10. The sequence set (SSj) is provided by the Sliding Detector Control input, which provides additional control inputs in various embodiments. The Mag and Mag^2 outputs of 5I-10 are provided, in one embodiment, as outputs of Sliding Detector (SD) 5J-10, and as outputs of the CSCB 5I-10. Other embodiments of a Sliding Detector 5J-10 and/or CSCB 5I-10 may have only one or neither of such outputs, potentially depending upon the embodiment of detector/demodulator, such as 5K-00 of FIG. 5K, 5L-00 of FIG. 5L, or Signature Control Channel Modem 510B-1 of FIG. 5B. Other outputs of the CSCB 5I-10 of Sliding Detector 5J-10 include the complex output XC_Si_A(n), which is a function of the discrete time index n, and is coupled to conjugate block 5J-40, via in-phase and quadrature (real and imaginary) lines to a complex numerical representation (in the current embodiment). Such a conversion (5J-20) is often ignored in general block diagram representations, and may be considered inherent in some embodiments, or integrated with another functional block.

Additionally, in the current embodiment, output XC_Sj_B (n) is provided to complex multiplier 5J-50. In certain embodiments, the conjugated signal from 5J-40 represents the phase (mathematically conjugated) of the received signal for a pilot CDMA channel derived from a correlation with the CSCB using one or more orthogonal codes (as described above in one embodiment), and providing for a demodulation of a pilot code channel. Further, the signal resulting from 5J-30 may represent a data CDMA channel resulting from the CSCB 5I-10 utilizing one or more other orthogonal CDMA codes, potentially including one or more "cover" PN scrambling codes (again as described in the foregoing on one or more embodiments). In such an embodiment, using a CDMA pilot code channel and CDMA data code channel, the de-spread and de-multiplexed information symbol SMj (n) is provided as an output of the Sliding Detector 5J-10.

In another embodiment, where a coherent pilot signal is provided to the in-phase portion of the transmit signal (as S(0) of FIG. 5F of Row B for example), and a modulated (BPSK) symbol is provided to the quadrature signal during modulation (as S(1) of FIG. 5F of Row B for example) only the imaginary portion of the de-spread, and phase re-rotated signal is provided to the output of the Sliding Detector 5J-10, for further processing. In another embodiment shown in FIG. 5J, the demodulated and phase de-rotated signal is provided to the Sign function 5J-70 prior to output as Dj(n), which may be considered a "slicer" providing for any value greater than or equal to zero as a positive 1 digital output, and any value less then zero as a digital zero output. The configuration of the specific codes and associated processing is configured by the Sliding Detector Control input.

Figure 5K:
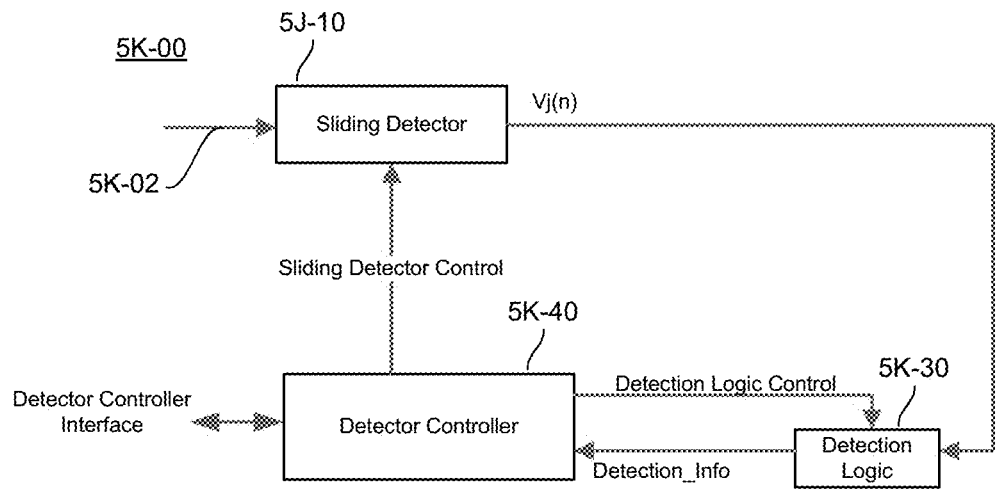
FIG. 5K is an exemplary block diagram of an embodiment of an inband inline signature detector.

FIG. 5K is an exemplary block diagram of an embodiment of an inband inline signature detector, wherein the forgoing embodiments may be demodulated and detected. The set of signals provided by the Sliding Detector is designated as Vj(n), where n is a discrete time index for the resulting "convolution" of the FIR filter codes in Code Register/Input 5H-30, with the input signal 5K-02, and the associated processing of the various embodiments discussed. In one embodiment, the Vj(n)=Dj(n), SMj(n), Magj(n), Mag^2j(n). Other embodiments may provide a subset, or a superset of the signals included as Vj(n). V(j) is then passed as an input to the Detection Logic block 5K-30, where the Magj(n), and/or Mag^2j(n) is utilized (or even locally derived in some embodiments) so as to perform the detection of the signal, and identification of the signal or signal multipath components for use with demodulation. For example, one approach to detection would be to determine the first signals to exceed a threshold. Another example embodiment uses the maximum or "peak" signal above a threshold. A yet further embodiment, with more optimal performance, provides for the coherent integration (simple real values summed, and imaginary values summed respectively of SMj(n), or Dj(n) for embodiments where the Sign 5J-70 is not performed on the signal) of all values having a magnitude or Mag^2 above a threshold. Such an embodiment may be considered an optimized form of a so-called "rake receiver", or matched channel filter. Such an arrangement is advantageous as all the values of SMj(n) which are above a threshold have been de-rotated and aligned in phase allowing for coherent integration. There are a number of approaches that are contemplated for detection within the processing of 5K-30 Detection Logic. In one embodiment, all the values of Vj(n) are stored, and information useful for determining the threshold for the current and/or future values of Vj(n) (or $V_{(j+1)}(n)$ for example) are utilized alone or by interacting with Detector Controller 5K-40. In other embodiments, only a subset of values of Vj(n) are stored and/or values derived from Vj(n) associated with statistics for setting the detection thresholds, and the resulting detection values. Additionally, the demodulation "slicing" of an information symbol resulting from processing of SMj(n) for example may be performed to result in demodulated bit(s) associated with M-ary QAM modulation (including BPSK, QPSK, and higher order modulation symbols).

In one embodiment, the slicing of the detected modulation symbol is not performed within 5K-30 but performed in a subsequent block, such as Detector Controller 5K-40 or elsewhere in the IBR.

Coherent demodulation has been described in forgoing embodiments, but in various embodiments, Detector Controller 5K-40 and/or Detection Logic 5K-30 may perform differential demodulation as well, such as DQPSK, DBPSK. For example, the Detection Logic 5K-30 may store symbols for differential processing. In yet additional embodiments, a single code may be used rather than two in some embodiments of differential modulations.

Figure 5L:
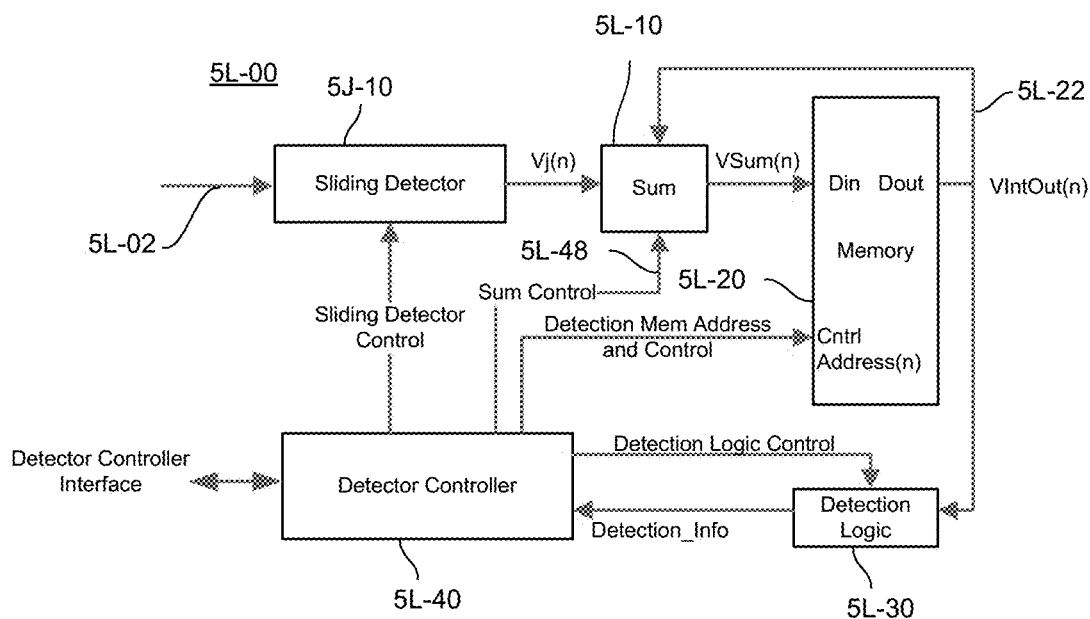
FIG. 5L is an exemplary block diagram of an embodiment of an inband embedded signature detector.

FIG. 5L is an exemplary block diagram of an embodiment of an in-band detector Signature detector useful for either inline or embedded alert signals using repeated codes as described associated with FIG. 5G and related embodiments. The blocks of FIG. 5L are capable of operating in an analogous manner to the blocks of FIG. 5K for inline signature operation. For embedded alert signal operation with the repeated signature codes (such as depicted in FIG. 5G) the replicated blocks of FIG. 5K will operate in a similar way in some embodiments. However, for embedded and repeated signatures, a coherent integration of each phase de-rotated symbol will be performed utilizing Vj(n) summed, via summer 5L-10, with the contents of Memory 5L-20. Upon initiation of the receive detection process, Detector Controller 5L-40, in one embodiment, will clear the contents of Memory 5L-20 to all zeros. Alternatively, Summer 5L-10 may be controlled so as to not include the output VIntOut(n) 5L-22 during a first integration pass effectively adding zeros to the incoming Vj(n) values and outputting VSum(n) to be stored in respective memory locations of Memory 5L-20 indexed by n, and under the address control of Detector Controller 5L-40. In one embodiment, the Memory 5L-20 is of sufficient size so as to store all values from the repetition of the signature, within directly using the summer 5L-10 during real time processing. In alternative embodiments, the phase de-rotated, "matched filter outputs" are stored in Memory 5L-20, and iteratively summed with the previously de-rotated matched filter outputs so as to perform coherent integration on a repeated code by code time scale (as described associated with FIG. 5G and for example using repeated codes 5G-25-A through 5G-25-H), thereby repeating through the addresses in the memory once for each signature repetition as aligned to the beginning of each corresponding output of the Sliding Detector 5J-10. In an alternative embodiment, phase de-rotation by complex multiplier 5J-50 may be bypassed and the CSCB 5I-10 XC_Si_A, and B may be coherently integrated within the Memory 5L-20, and phase de-rotation performed after integration, by detection logic 5L-30 for example. Additionally, in the various embodiments, Detection Logic 5L-30 would perform the Mag or Mag^2 function period to the detection processing and threshold determination processing associated with the discussion relating to embodiments of Detection Logic 5K-30, and should be considered applicable to the current embodiment. Such processing, in some embodiments, includes the channel matched filter coherent integration processing associated with the forgoing discussions. The threshold processing in specific embodiments may be performed utilizing equation Eq. 5-1. The determination of the uncorrelated values may be achieved by summing values below a specific threshold from a peak or maximum value, or may be based upon correlating with a code that is known not to be utilized. In some embodiments, the uncorrelated values may be based upon the output of the sliding correlator or related processing for times in which the reception of alerts is determined to be unlikely, for example between $T_{VALID}^{ALERT}$ periods. In yet further embodiments, statistical methods to determine periods without alerts and periods including alerts so as to set a threshold for detection.

The timing of the addressing may be determined and may be adjusted by monitoring detections performed by the Detection Logic 5L-30 in combination with Detection Controller 5L-40, thereby allowing for the synchronization and tracking of the $TT_{VALID}^{ALERT}$ periods and the appropriate aligning of the associated times so as to allow for coherent integration. Further, an intermediate threshold, in some embodiments, may be performed so as to allow for a determination of the current number of alert signature repetitions to include within the coherent integration, thereby individually detecting each repetition, or a subset of repetitions. Some embodiments may include a more robust information field allowing for the explicit signaling of the number of repeated signatures to be determined form the signal itself. In at least one embodiment, the number of repetitions is known a priori, and in yet other embodiments, the number of repetitions and other information related to the modulation format or timing of transmission is determined from the central registry (4C-60 and/or 4C-70 of FIG. 4C) or another data base (such as Private Database 440, IBMS Private Server 424, IBMS Global Server 428, Public Database 452, or Proprietary Database 448 of FIG. 4G).

Figure 6A:
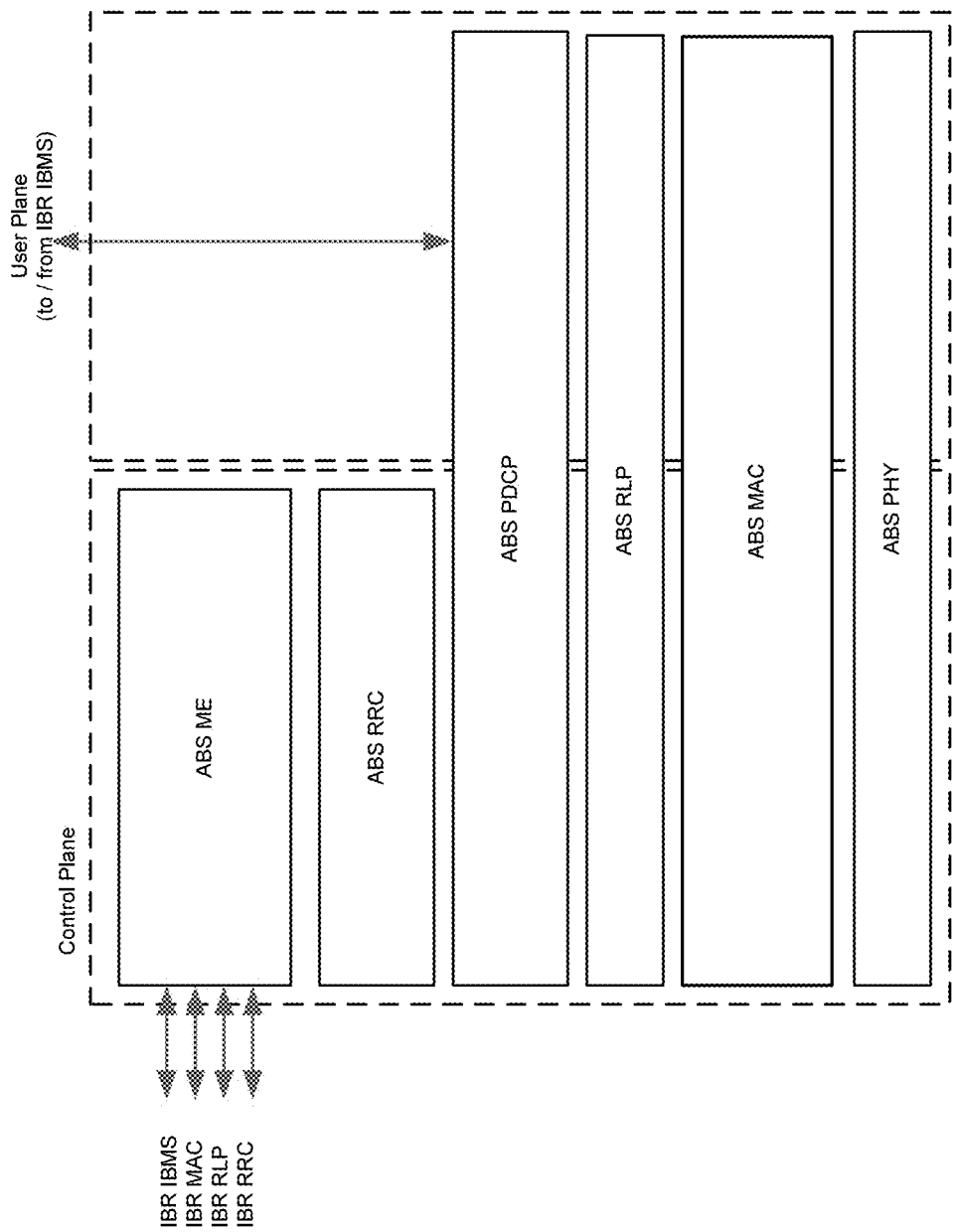
FIG. 6A is an illustration an exemplary Advanced Backhaul Services layered control link communication protocol stack.

FIG. 6A is an illustration of an exemplary Advanced Backhaul Services layered control link communication protocol stack. The figure is divided into two vertical columns, denoted by Control Plane and User Plane. The User Plane is for use by the IBR and/or the IBMS, in various embodiments, for the delivery of messages to peer entities (or their equivalents). One example of the use of the User Plane is interfacing to the Registry via other ABS devices. In another example, generic IP packets are passed over the User Plane Protocol. The User Plane's ABS protocol stack of FIG. 6A begins with the ABS Packet Data Convergence Protocol (ABS PDCP). In some embodiments, the operation of the Control Plane and the User Plan is generally similar from the PDCP layer and below with a few exceptions. The ABS PDCP will be discussed below.

The Control Plane is responsible for ABS relegated operation involving the procedures and associated messaging required to be compliant with the ABS Rules as previously discussed, and will be discussed in specific examples associated with subsequent figures.

ABS-ME (management entity) is the highest portion of the ABS Control Plane, and is responsible for topology management, processes management, configuration, and interfacing to other ABS peers. The ABS ME interfaces to various "host" radio entities (IBR/IMBS entities in some embodiments), including interfaces to IBR-RLC, IBR-RLP, and even IBR-MAC for timing in some embodiments.

The ABS ME further interfaces to other ABS stack entities as well to perform required functions in some embodiments. In some embodiments the ABS ME interfaces to other layers directly, while in other embodiments associated sub-layers are called upon to interface to the required ABS stack sub-layer. For example the ABS-ME configures/controls MAC to scan for interference, in one embodiment directly, and in other embodiments utilizing the ABS RRC. In the non-limiting subsequent example discussion, it will be assumed that each layer interfaces with the layers directly above or below the layer under discussion. It should be noted that other embodiments may interface in various other ways, including directly between non adjacent layers.

Returning now to the discussion of the ABS ME, example functions performed include: configures/controls MAC to broadcast signature, interfaces to IBR IBMS Agent, interfaces to ABS-RRC to send standardized messages to other ABS-RRC entities, requests ABS specific procedures from the ABS-RRC, such as so-called—"progressive interference" or "blooming". These procedures will be discussed in more detail associated with subsequent figures.

The ABS Radio Resource Control (RRC) interfaces with the ABS-ME and the ABS PDCP to perform services including control/peer messaging, state management, ABS message composition, and interfaces with other ABS-RRCs.

The ABS Packet Data Control Protocol (PDCP) interfaces with the ABS RRC to: arbitrate user plane and control plane priority for access to the ABS-RLC, perform "RLC "Framing" by adding a ABS-RLC header, "whitens the payload" (no 6 sequential is in a row for example), and Ciphering (encryption). The ABS-PDCP Message header addition includes a synchronization field (for example "111111") and a logical channel index of 2 bits. The logical channel indication includes (as one example embodiment):
  00—EOP (End of Packet)
  01—ABS RRC (Control Plane)
  10—ABS UP (User Plane)
  11—reserved The ABS Radio Link Protocol (ABS-RLP) interfaces to the ABS-PDCP and the ABS-MAC to provide services to the ABS_PDCP and higher layers. Functions performed by the ABS-RLP include:
  Fragmentation into N bit PDUs, where in one embodiment N=1 for inband and N>1 for out-of-band fragmentation. Other embodiments may provide for inband signaling utilizing N>1 through the use of higher order modulation, and/or multiple alert sequences such as embodiments as described associated with FIG. 5F rows C and D.
  Forward error correction (FEC)
  Cyclic Redundancy Check (CRC)

Figure 6B:
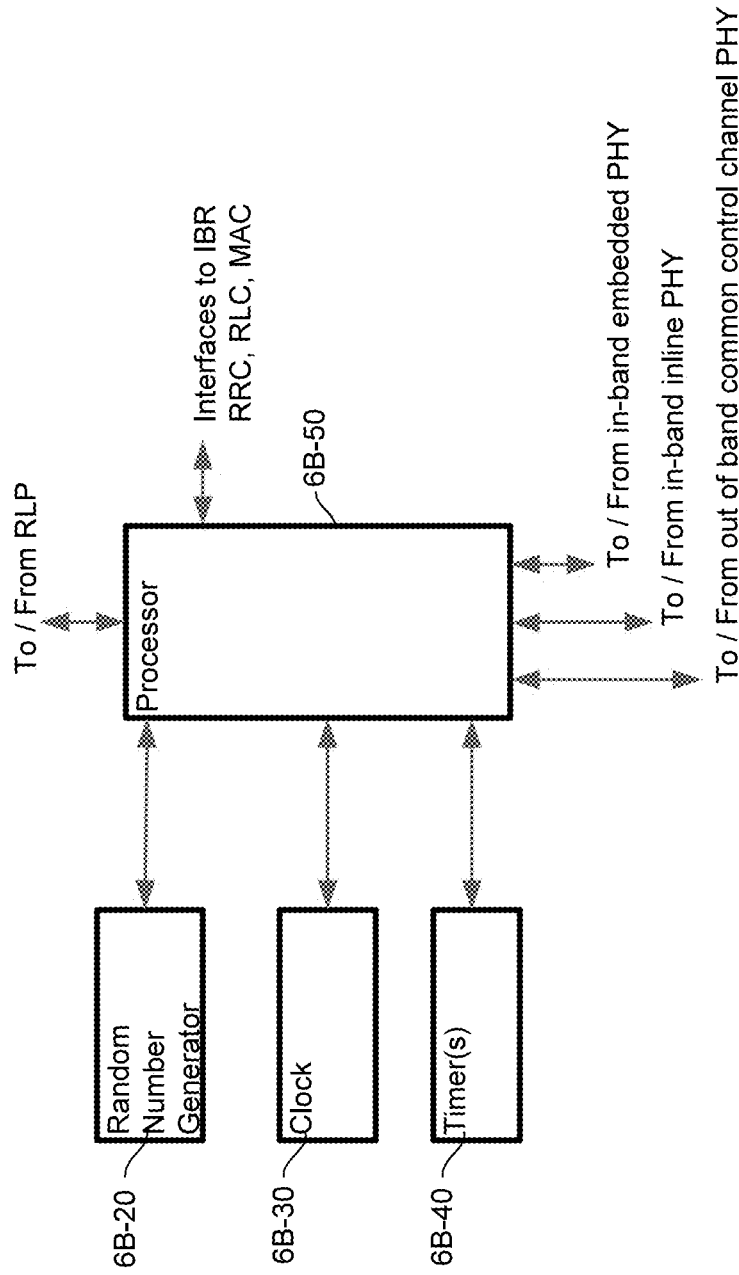
FIG. 6B is an exemplary block diagram of an embodiment of an Advanced Backhaul Services control link protocol processor

The ABS Media Access Control (ABS-MAC) interfaces with the ABS-RLP and ABS-PHY layers to provide services to the higher layers. The ABS MAC, in specific embodiments, performs the following example functions:
  Transmission/reception timing
  Out of band access to the media (listen before talk for out of band)
  In-band signaling access to the media The ABS physical layer (ABS-PHY) interfaces with the ABS MAC to perform (in one embodiment) the following example functions:
  Transmission/reception
  Modulation/Demodulation
  Interfacing with one or more of channels/formats:
    Out of band: Common Control Channel
    In-band inline
    In-band embedded FIG. 6B is an exemplary block diagram of an embodiment of an Advanced Backhaul Services control link protocol processor. In one embodiment of the control link processor, the ABS-MAC is within processor 6B-50, which interfaces to various other entities including the IBR RRC, IBR RLC, and IBR MAC to derive timing and coordinate activities. In one embodiment, the ABS-RLP is contained with a separate processor, and an interface to and from the RLP is provided. In alternative embodiments, several or all the stack functional entities are within Processor 6B-50. In an exemplary embodiment wherein at least the ABS-MAC is contained within the Processor, additional functional entities are interfaced, including a Random Number Generator 6B-20, Clock 6B-30, and one or more timers within Timer module 6B-40. The Clock and Timer functions, in various embodiments, are used to determine transmission timing such as $T_{VALID}^{ALERT}$, and the Alert transmission periods for example, as well as being utilized for other functions. The Random Number Generator 6B-20 is used in one embodiment for random transmission time determination associated with the common control channel transmission timing procedure. The ABS-MAC within Processor 6B-50 further interfaces to and from one or more Physical Layer entities/MODEMs including in-band embedded, in-band-inline, and out of band, common control channel.

Figure 6C:
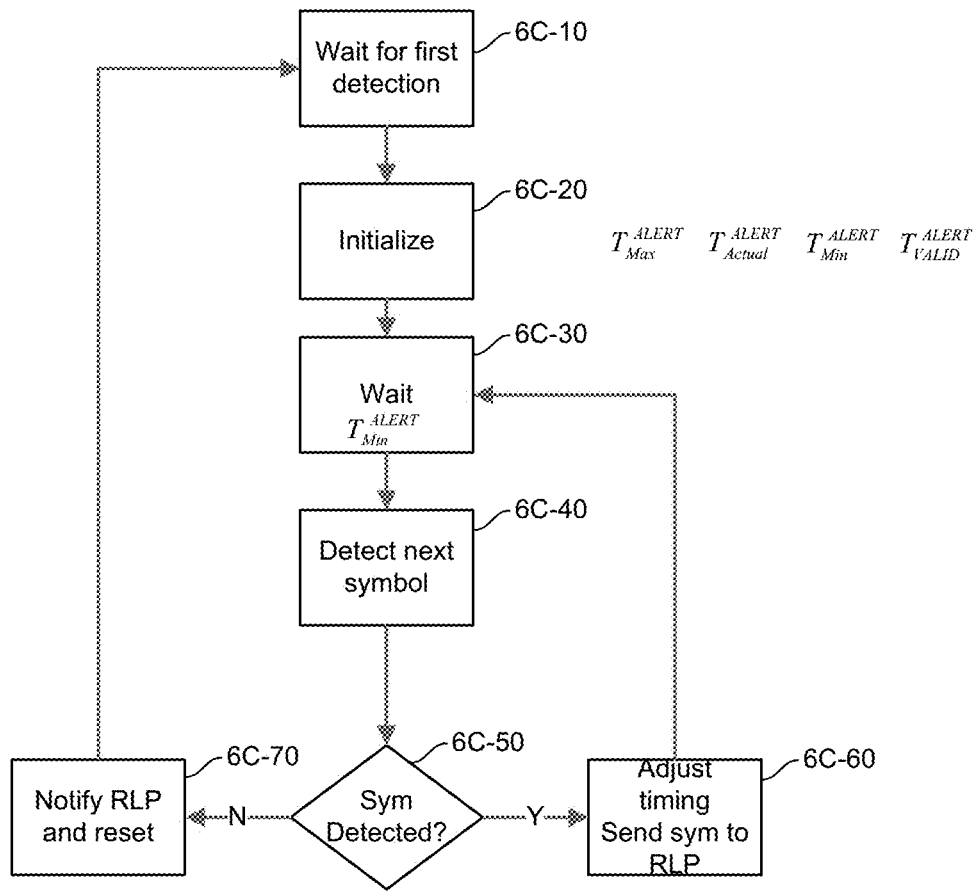
FIG. 6C is a flow diagram of the MAC receive process for an Advanced Backhaul Services control link protocol processor according to one embodiment of the invention.

FIG. 6C is a flow diagram of the MAC receive process for an Advanced Backhaul Services control link protocol processor according to one embodiment of the invention. During the MAC receive processing, the process begins, in the current embodiment, with Step 6C-10 waiting for the PHY to detect a first alert signature.

Once the first detection has occurred, the timing variables are set in Initialize step 6C-20. In some embodiments, one or more of the variables may be set during initial system configuration as well. In the current embodiment, these variables include in the current embodiment, $T_{Max}^{Alert}$, $T_{Actual}^{Alert}$, $T_{Min}^{Alert}$, $T_{VALID}^{Alert}$. Next, the MAC link processor waits for $T_{Min}^{Alert}$, in Step 6C-30, and then begins waiting for the next PHY indication of a subsequent valid detection in Step 6C-40. If no symbol is detected within $T_{VALID}^{Alert}$, (step 6C-50) then processing proceeds to step 6C-70 where the higher layer RLP is notified and reset. Such an occurrence may happen is signal is lost, of if the end of the current RLP frame is received. Alternatively, if an alert is detected for the specified peer MAC (as determined in the current embodiment by a property of the alert code set (SSj) such as a secondary orthogonal code for example), the appropriate timer values are adjusted (in Block 6C-60) and processing returns to step 6C-30 (the wait for $T_{Min}^{Alert}$ step). In the current embodiment, various alerts may be received, and for each alert signature which is distinguishable from those from other ABS-MACs, a separate ABS-MAC receive process may be instantiated, along with individual timer values.

Figure 6D:
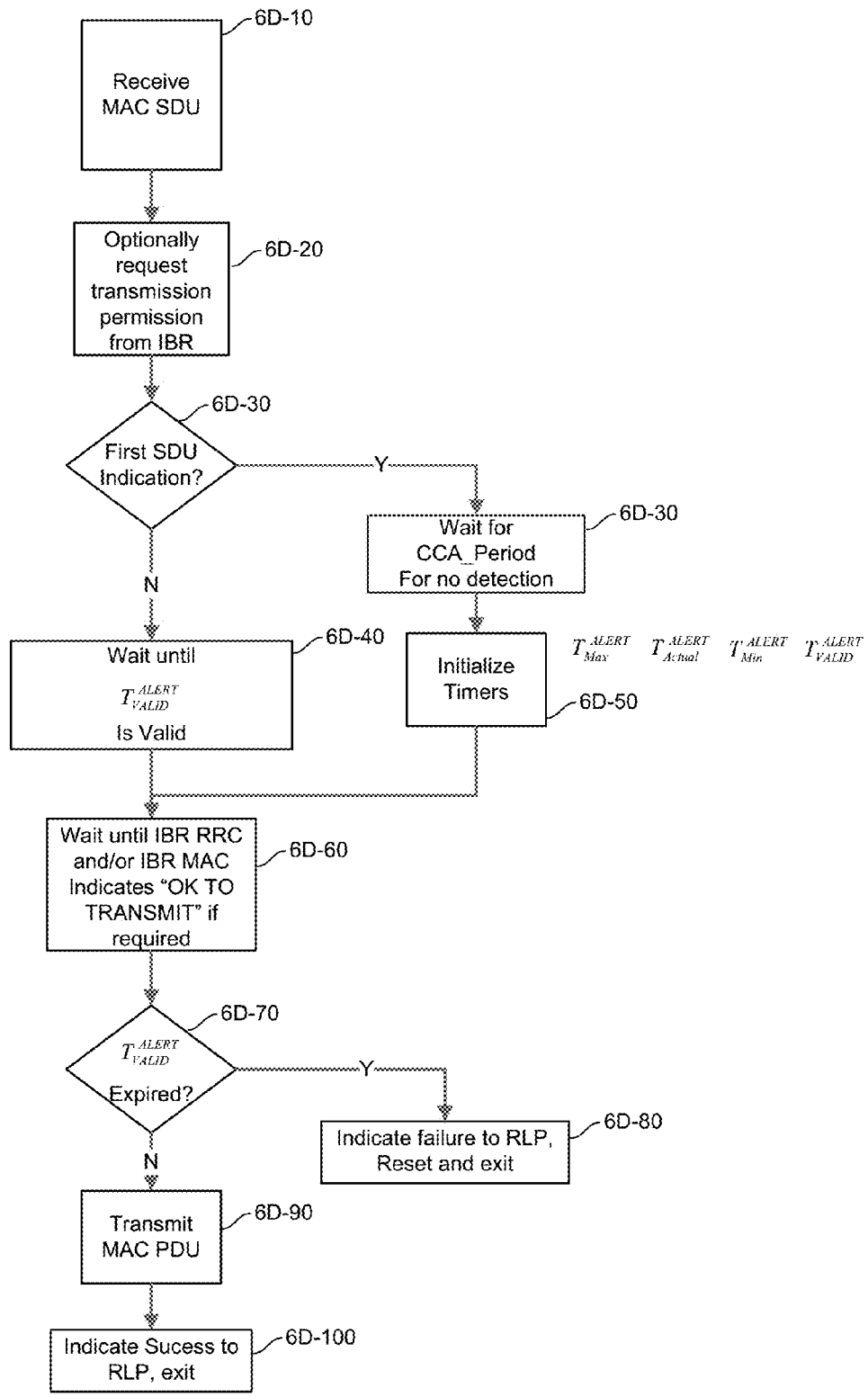
FIG. 6D is a flow diagram of the MAC transmit process for an Advanced Backhaul Services control link protocol processor according to one embodiment of the invention.

FIG. 6D is a flow diagram of the MAC transmit process for a Advanced Backhaul Services control link protocol processor according to one embodiment of the invention. The MAC transmit process begins in step 6D-10 where a MAC service data unit (SDU) is received. The SDU may be a single bit wherein the modulation is BPSK and the segmentation size is n=1. Alternatively, the segmentation size may be 2 bits, and the modulation may be QPSK. As is known by one or ordinary skill in the art, higher order modulations such as m-ary QAM, and discussed above may be used as well. Once a specific SDU is received by the MAC, permission to transmit may be requested for inline transmissions associated with step 6D-20, so as to coordinate with the transmission of the IBR symbols in time. In step 6D-30 if the SDU indicates that a first SDU indication is present, a clear channel assessment (CCA) will be performed in some embodiments (for example when transmitting on the common control channel in one embodiment, though not limited to such an embodiments). In step 6D-50, the timers are initialized, and processing proceeds to 6D-60. Alternatively if there is not first SDU indication, in step 6D-30, step 6D-40 is performed wherein the process waits for $T_{VALID}^{ALERT}$ to be come valid, for example by comparing a timer or a clock value in different embodiments to the valid time frame $T_{VALID}^{ALERT}$.

Processing then proceeds to step 6D-60 wherein the MAC waits for an indication from the RRC (in control of the fine scale timing in the current embodiment) to indicate authorization to transmit, if such authorization is required (associated with specific embodiments). Next, decision step 6D-70 directs processing based upon $T_{VALID}^{ALERT}$ being valid. If expiration has occurred, an indication to the RLP is performed wherein a failure is signaled in step 6D-80. Alternatively if $T_{VALID}^{ALERT}$ remains valid, processing proceeds to step 6D-90 wherein the MAC PDU is transmitted. The format of the MAC PDU in some embodiments is a simple pass through to the PHY. In other embodiments a MAC header, or other information may be added to the MAC SDU prior to the MAC PDU being provided to the PHY. Finally, successful transmission is indicated to the RLP, and the process is exited in step 6D-100.

Figure 6E:
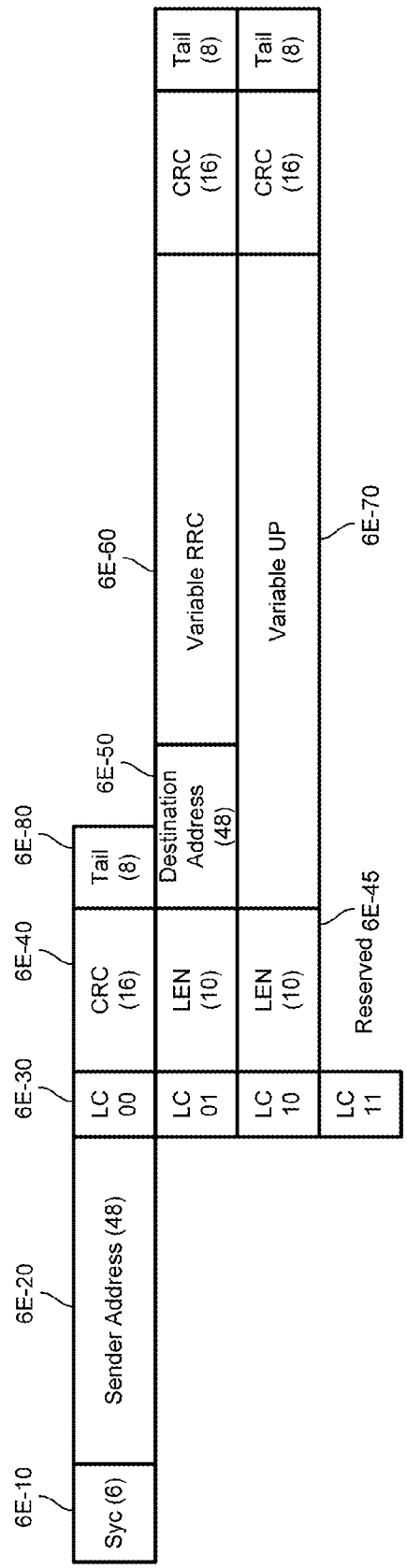
FIG. 6E is an illustration of the radio link protocol (RLP) message format of Advanced Backhaul Services control link control link according to one embodiment of the invention.

FIG. 6E is an illustration of the radio link protocol (RLP) message format of Advanced Backhaul Services control link control link according to one embodiment of the invention. As previously described in specific embodiments, the RLP receives a service data unit (SDU) from the ABS Packet Data Control Protocol (PDCP), including fields 6E-30 (Logical Channel) at least, and in some instances 6E-45 (the length of the remaining PDCP payload), 6E-50 (the destination address to which the packet is to be sent), 6E-60 (a variable length RRC message), and 6E-70 (a variable length user plane message from higher layers of an IBR for example. Other embodiments may also include the Sending MAC address 6E-20. In other embodiments, the MAC address may be added within the RLP layer or another layer.

The RLP then next adds the Sync field 6E-10, the CRC field 6E-40, and performs FEC processing adding tail bits 6E-80. The result is passed to the MAC as a RLP PDU/MAC SDU.

Figure 7A:
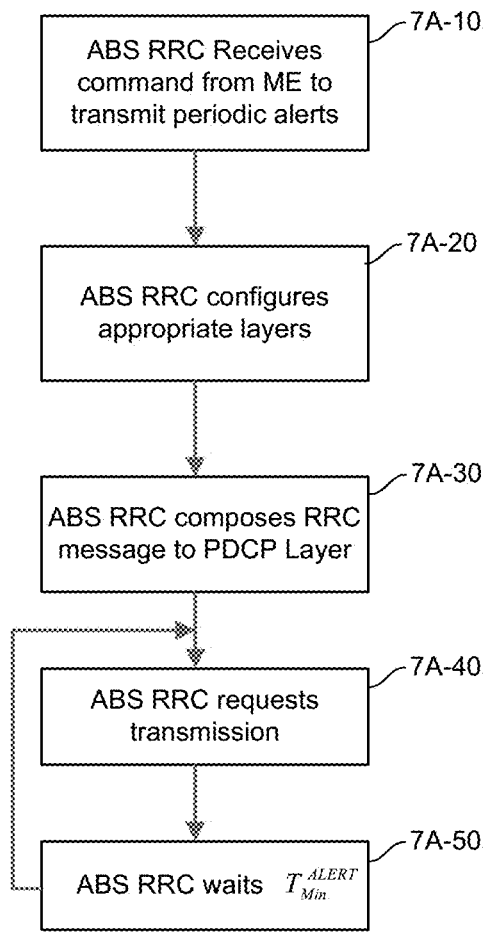
FIG. 7A is a flow diagram of the RRC transmit process for an Advanced Backhaul Services control link protocol processor according to one embodiment of the invention.

FIG. 7A is a flow diagram of the RRC transmit process for a Advanced Backhaul Services control link protocol processor according to one embodiment of the invention. When the RRC has information to transmit to a peer, or to broadcast alerts in general, the process begins in step 7A-10 wherein the ABS RRC receives a command from the Management Entity (ME) to transmit periodic alerts for example. In step 7A-20, the RRC performs configuration of the various layers so as to transmit periodic alerts such as, in one example, setting the timer values, modulation formats, number of alert code sequences per alert signal transmission, RLP segmentation bits (n), and other associated parameters. In step 7A-30, the RRC composes a message (PDU) for the PDCP layer and requests the transmission of an alert (7A-40). Next in the current exemplary embodiment, the RRC waits for $T_{MIN}^{ALERT}$ (in Step 7A-50), and then returns to step 7A-40 to transmit another alert.

Figure 7B:
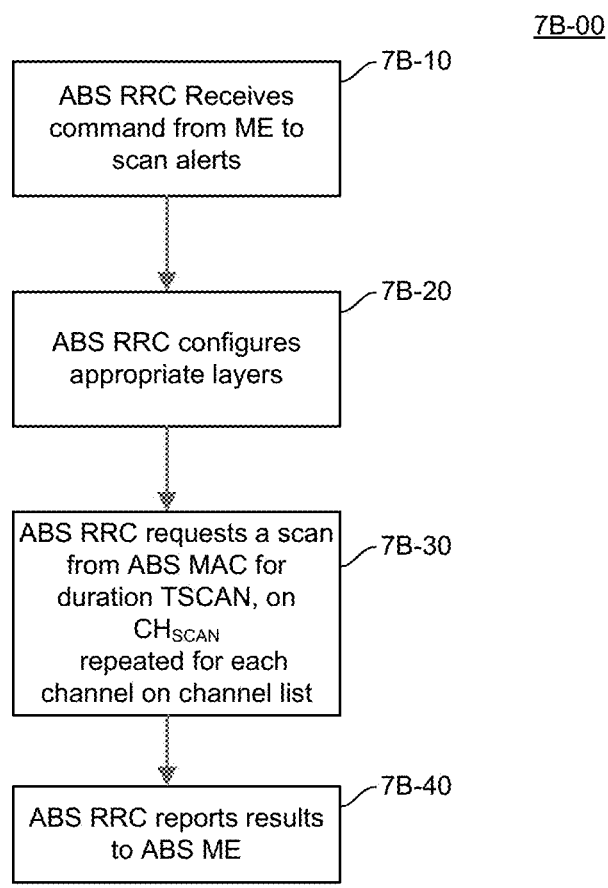
FIG. 7B is a flow diagram of the RRC scan process for an Advanced Backhaul Services control link protocol processor according to one embodiment of the invention.

FIG. 7B is a flow diagram of the RRC scan process for a Advanced Backhaul Services control link protocol processor according to one embodiment of the invention. In the embodiment of FIG. 7B, the ME requests the RRC perform a scan function (step 7B-10). The RRC then configures the appropriate layers using pre-determined information stored within the ABS system, or determined form received information form a registry for example in one embodiment. Other embodiments may receive information form the IBR or IBMS, or another source (step 7B-20). The specific parameters to be configured vary in different embodiments, but may include those described associated with step 7A-20 and elsewhere. In step 7B-30, the RRC requests a scan from the ABS MAC for a specific duration TSCAN, and on a list of channels defined by $CH_{SCAN}$. Finally, the RRC receives a report for each scan from the MAC, and once complete, reports the result to the ME in step 7B-40.

Figure 7C:
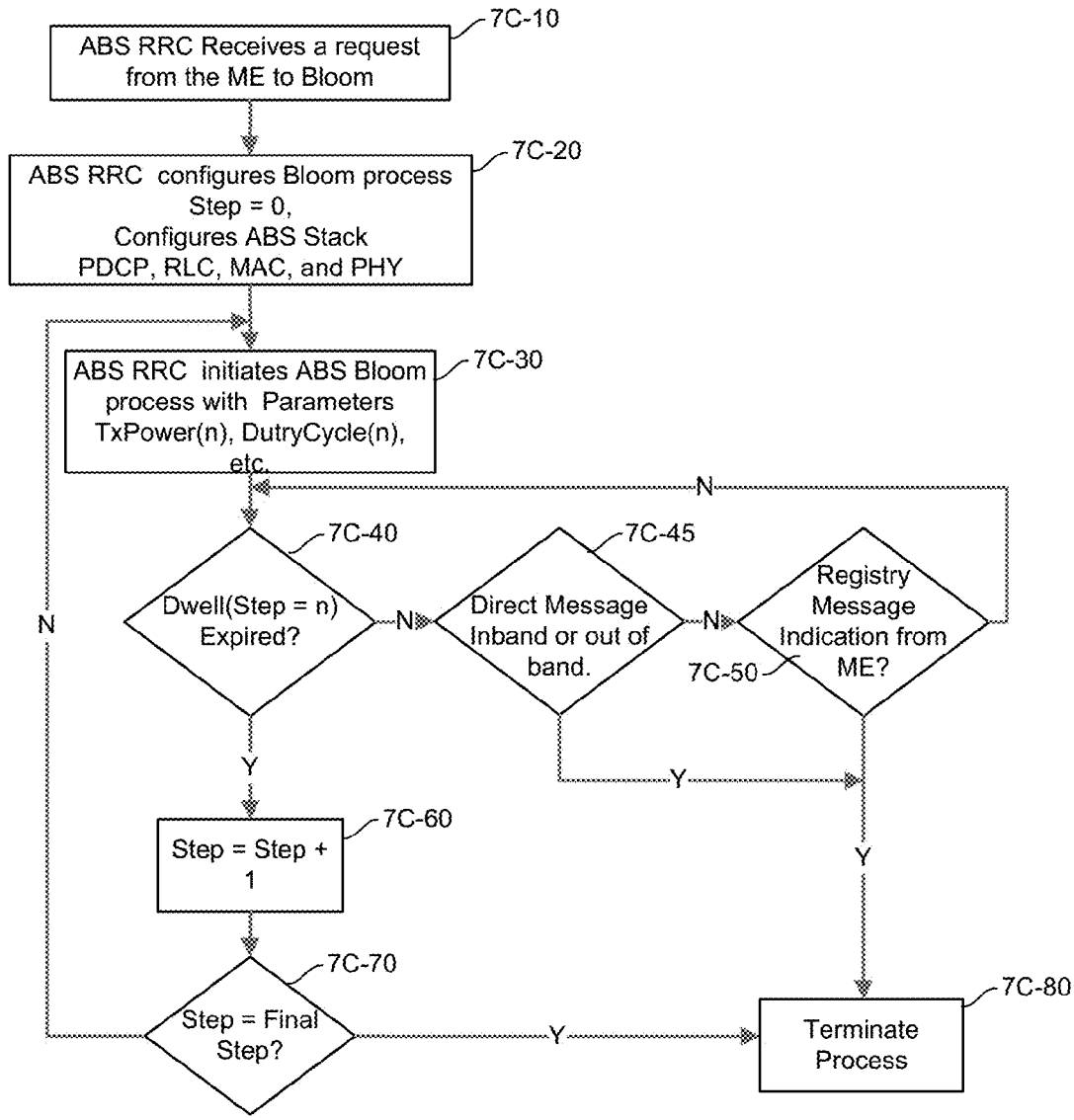
FIG. 7C is a flow diagram of the RRC Bloom process for an Advanced Backhaul Services control link protocol processor according to one embodiment of the invention.

FIG. 7C is a flow diagram of the RRC Bloom process for an Advanced Backhaul Services control link protocol processor according to one embodiment of the invention. The ABS RRC, in one embodiment, receives a request form the ME requesting the "Bloom" process (step 7C-10). Some embodiments the process includes entering the Bloom process register with the registry that it is entering the Bloom process. Other embodiments include the requirement, or option for the station performing the Bloom process to notify one or more stations which may receive interfering transmission of the state of entering the Bloom process, and optionally update such stations of that process.

Embodiments of the Bloom process include incrementally "progressive interference", so as to initially have a lower impact in terms of interference to any existing ABS devices which happen to be with the propagation range of a new ABS device being brought up for operation. For example, a Tier 2 device being brought up in the vicinity of a Tier 1 Incumbent device with settings in the registry allowing for other devices to operate in the region but with limitations so as to not interfere with the T1-I device require, in one embodiment, a Bloom process. In fact, in some embodiments, any device having a lower tier, or same tier and having a lower priority or right to operate in the vicinity of other devices either as reported by a registry, or detected directly in some cases use a Bloom process. Such a process allows for the higher tier, or priority device (one having been operating in the area longer but of the same tier) an opportunity to detect interfering transmissions from a device performing a Bloom process. Such a process allows the level of interference to be detectable, but not necessarily catastrophic to the link of the existing devices. Step 7C-20 provides for the RRC to configure the Bloom process, defining in one embodiment a variable "Step" with a value of 0, initially. Additionally the other layers of the ABS stack are configured as well. Next, in step 7C-30, the RRC initiates the ABS Bloom process utilizing parameters TXPower(n), and DutyCycle(n), where n is the step in the progressive Bloom process. After each step in the process, as the process returns to step 7C-30, the setting will be retained for a period of time referred to as Dwell. The process stays in 7C-40 until the Dwell process for Step n has expired. In one embodiment, the transmit power will be the full Tx power expected for operation of the link, and the duty cycle as determined by DutyCycle(n) for each step n of the Bloom process, will be varied in increasing percentages of a predetermined repetition time for the Dwell time, which may be varies as well on a per Bloom step process. In other embodiments, both the transmission power and the duty cycle will be varied progressively. In yet further embodiments, only the power will be varied, for a given duty cycle, or in any linear, or non-linear combination. In one embodiment of the Bloom process, only the basic alert signature is sent with no identifying information. In another embodiment, the alert signature is sent with a code unique, or another property unique to station in the Bloom process. In yet further embodiments, the Bloom process includes the identity of the transmitting station in the transmissions, and potentially additional information.

During the dwell process, prior to the expiration of the Dwell timer, or counter, the ABS station monitors communications channels (in various embodiments one or more of the common control channel, the inband control channel, or another out of band link) in step 7C-45 for any "direct messages" from another station notifying the Blooming ABS station of detected interference. Additionally, in step 7C-50 the Blooming ABS station checks the registry periodically for notification of detected interference due to the Bloom process. If either step receives an indication of detected interference, the process proceeds to step 7C-80 and the process (and the transmissions) are terminated in one embodiment. Note that in some embodiments, the process may be begun again, with adjusted transmission parameters so as to minimize interference to the station that detected the Bloom interference. In some embodiments, the indication of interference from another ABS station will include information usable to aid the Blooming station to avoid interfering with the detecting station with higher priority (either higher tier, or more seniority for example). Examples of the type of information usable to set interfere avoiding transmission settings were discussed previously in this disclosure associated with FIGS. 4C, 4D, 4E, 4F, and 4G, and elsewhere. Additionally similar processing was discussed in co-pending application U.S. Ser. No. 13/371,346, the entirety of which is incorporated herein by reference. Note that based upon initial scans, prior to beginning the Bloom process, such interference avoiding techniques may be utilized based upon channel modeling and interference prediction techniques prior to beginning the transmission process in step 7C-30, or configured in step 7C-20. Such a step may also take input from any direct messages received related to detected interference or similar information receiving in the registry (4C-60/4C-70 for example) as a result of previous attempts at the Bloom process.

Returning now to step 7C-40, once the Dwell time has expired, and no interference indication has been detected, the Bloom process Step is incremented in 7C-60, and processing proceeds to step 7C-70. If the Step is the Final Step, the process is terminated in 7C-80, otherwise the process continues with new transmission settings in step 7C-30.

Further details of the "bring up" of an ABS station, and the associated management of the Bloom process will be discussed associated with FIG. 8C.

FIG. 8A is an illustration of exemplary ABS registry entries according to one embodiment of the invention. Parameters associated with entries in the various embodiments of the registry 4C-60 are discussed in many locations in this disclose.

The table includes example registry entries for several different tiers of stations operating under the proposed ABS rules. The first column defines possible entries for one aspect of one embodiment of the registry. The FCC ID is typical of devices registered with the FCC, and is also required as noted with the white spaces rules.

The MAC Address is a 48-bit IEEE assigned address which can be used to identify a station from transmissions in one embodiment.

Lat, and Long provide the geographic latitude and longitude of the location of the ABS transmitter station.

In addition to Lat/Long, the Address may be entered as well and may be mandatory for a fixed station in some embodiments.

The Tier entry defines the class of service the ABS station is operating under as define in forgoing sections.

Tx Power defines the transmitter power of the ABS station. In some embodiments, it is the maximum allowable transmit power, while other embodiments include the actual transmitter power, or transmitter power the station is capable of transmitting.

Antenna Type indicates the type of antenna. For Tier 1 devices, this is more likely a fixed dish type antenna similar to entries for FCC Part 101 licenses. The Azimuth (Deg) and Elevation (m) relate to the antenna directivity and center pointing direction of a fixed antenna. Further examples include, but are not limited to azimuth beamwidth, elevation beamwidth (in degrees, not m), polarization, antenna height, azimuthal and elevation bearings at center of the pattern, etc. For devices of other tiers, or potentially for Tier 1 incumbent devices is some cases, the antenna type may further include whether the antenna is an antenna array, and any associated array attributes such as the array geometry (number of elements, and their relative geometric position), the number of receiver and/or transmitter elements, array capabilities such as receiver and transmitter null steering capacities, and the like.

Equipment ID is the FCC certification ID of the equipment being used and having been certified under ABS rules.

"Using Common Control Channel" is an entry for defining which common control channel, if any, a particular station is utilizing.

M-ACTUAL, M-TOT, M-REG, and Registered Channels(1 . . . M-REG) as discussed previously relate to the allowable and in use channels for operation under the ABS rules.

Duplexing Mode defines time division, frequency division, or so called zero division duplexing methods (or other such methods as may become applicable).

Licensed C/I (dB) is an entry of an embodiment in which the fees paid, and/or the license received (Tier 2 in one embodiment) defines a C/I for which the station receives interference protection assuming it is the highest tier, and has the seniority in that location. Further detail will be provided relating to "cooperative" interference mitigation and the Bloom process associated with the ME in FIG. 8C.

The SIP Address entry is an example address in some tiered service radios by which a station may be contacted with a so-called direct message. For example, in a Blooming process when notification that the Blooming station is causing interference to another protected ABS device, a directed SIP message is sent to the Blooming station in one embodiment.

The P-MAX (dBm), P-NOM (dBm), P-Allow (dBm) are associated with the cooperative interference process for non-Tier 1 devices, and in one exemplary embodiment, are discussed in more detail elsewhere.

The Date Occupied (or optionally also Time Occupied) and Date Licensed fields are related to determining seniority between ABS stations of the same tier. The Geographic Region field defines the specific region in which a device is operating. Geographic regions were discussed in more detail relating to FIG. 4D.

Figure 8B:
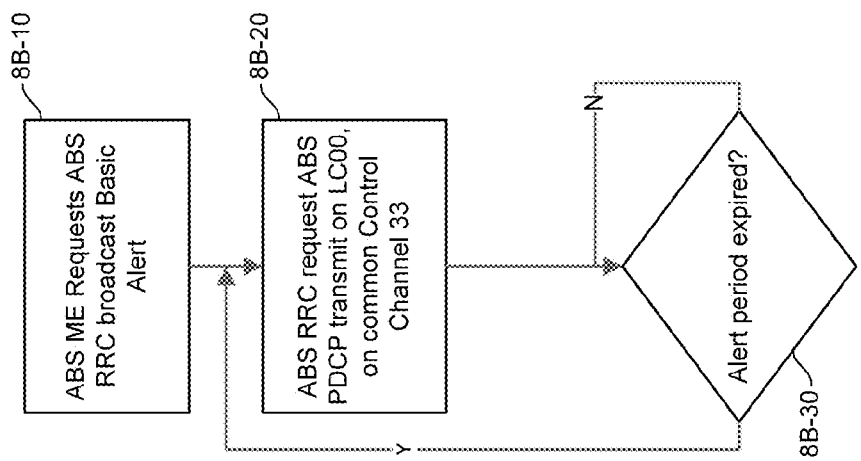
FIG. 8B is a flow diagram of the Common Control Channel basic broadcast alert process for an Advanced Backhaul Services control link protocol processor according to one embodiment of the invention.

FIG. 8B is a flow diagram of the Common Control Channel basic broadcast alert process for an Advanced Backhaul Services control link protocol processor according to one embodiment of the invention. In step 8B-10, the ABS ME requests the ABS RRC broadcast a basic Alert. In step 8B-20 the ABS RRC requests the ABS PDCP to transmit on logical channel (LC) 00, indicating a "basic alert", which may also, in some embodiment be interpreted as an "end of packet". In this embodiment, it is transmitted on common control channel 33. In other embodiments, the transmissions are transmitted in band as well, or in place of the common control channel transmissions. The process waits in step 8B-30 for the alert period to expire ($T_{MIN}^{ALERT}$ in some embodiments). Once the period has expired, processing returns to step 8B0-20, and continues.

Figure 8C:
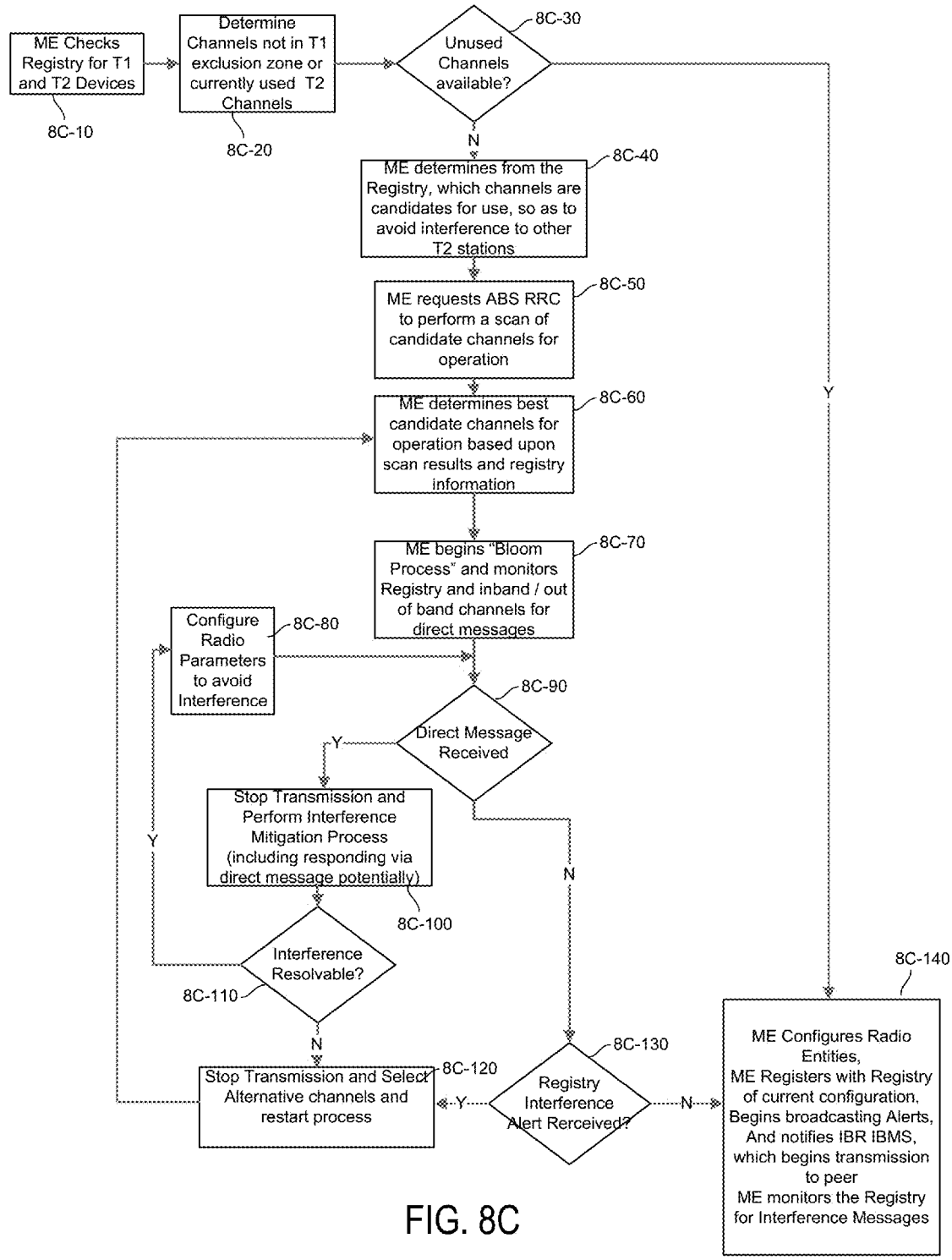
FIG. 8C is a flow diagram of the Management Entity (ME) Tier 2 channel selection and link initialization process for an Advanced Backhaul Services control link protocol processor according to one embodiment of the invention.
Figure 8D:
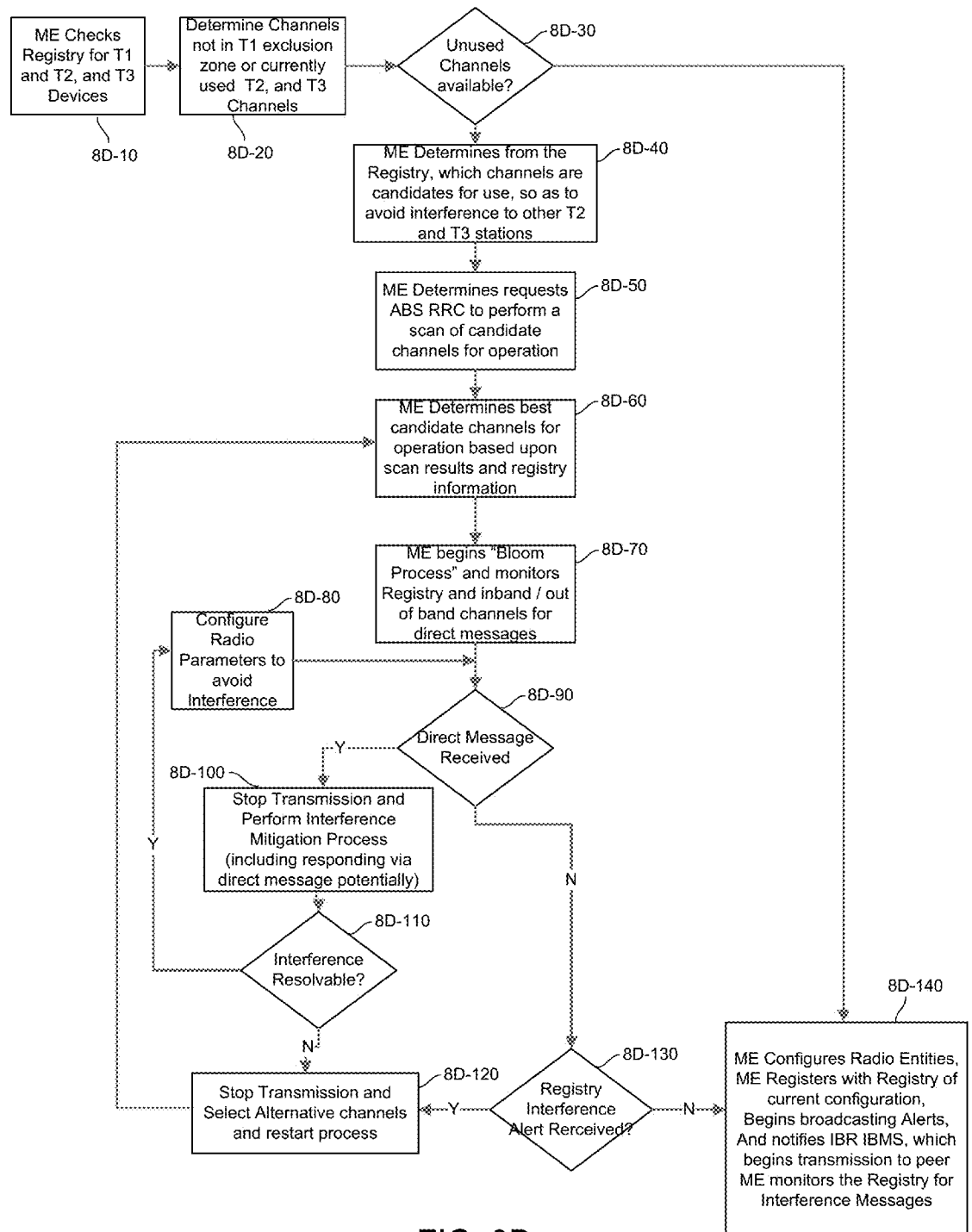
FIG. 8D is a flow diagram of the Management Entity (ME) Tier 3 channel selection and link initialization process for an Advanced Backhaul Services control link protocol processor according to one embodiment of the invention.

FIG. 8C is a flow diagram of the Management Entity (ME) Tier 2 channel selection and link initialization process for a Advanced Backhaul Services control link protocol processor according to one embodiment of the invention. FIG. 8D is a flow diagram of the Management Entity (ME) Tier 3 channel selection and link initialization process for a Advanced Backhaul Services control link protocol processor according to one embodiment of the invention. FIG. 8D is, in some embodiments, a very similar process to that of FIG. 8C and can be assumed to be the same, with exceptions as noted in the figure.

Referring now to Step 8C-10 the ME of the ABS device, checks the registry for any T1 (Tier 1) or T2 (Tier 2) devices in the local proximity for which in must consider interference and previous discussed. Of course for a Tier 3 device, other T3 devices are also checked in the registry as well (see step 8D-10). In step 8C-20 the ME determines channels not in T1 exclusion zones or currently used as T2 Channels. For T3 devices, other T3 devices must be considered as well. In step 8C-30 if no unused channels are available, step 8C-40 is performed, otherwise processing proceeds to step 8C-140. In step 8C-140, when clear channels are determined to be available, the ME configures the radio entities (layers), and registers the current configuration of the ABS station with the registry. The ME then begins broadcasting alerts, and notifies (in some embodiments) the IBR IBMS, which begins transmission to peer point to point radios or point to multipoint radios for payload traffic. The ME additionally begins to monitor the Registry and/or control channels for interference messages or any direct messages.

If no "clear" channels are available, step 8C-40 is performed and the ME determines from the Registry, which channels are candidates for use, so as to avoid or minimize interference to other T2 stations in the current embodiment. In step 8C-50, the ME requests ABS RRC to perform a scan of candidate channels for operation so as to assess the interference potential of using these channels. Processing then proceeds to step 8C-60, where the ME determines the best candidate channels for operation based upon scan results and registry information. Such a determination will, in some embodiments, involve propagation modeling and interference mitigation techniques as discussed. The Bloom process is then begun in step 8C-70. ME begins "Bloom Process" and monitors the Registry and in-band and out-of-band channels for direct messages. The decision as to whether direct messages are received or not is performed in step 8C-90. If no direct messages are received, the registry is checked for interference notifications in step 8C-130. If no interference notification is received, the processing proceeds to step 8C-140 as previously discussed. Returning to step 8C-90, if a direct message is received, step 8C-100 is performed where the ME will stop transmission and perform an interference mitigation process in one embodiment. Such an interference mitigation process, in some embodiments, includes responding to the "interfered with" station via direct message to negotiate cooperative interference mitigation interaction and measurements. Such mitigation may also include adjustments and "trial" test transmissions with iterative feedback from the partner "interference mitigation" station. If the interference is resolvable (8C-110) the processing proceeds to 8C-80 where the radio is configured with the determined radio parameters to avoid interference, and operation returns to 8C-90.

If the interference is not resolvable in step 8C-110, processing proceeds to step 8C-120 and transmission is halted and alternative channels are selected, and the process is restarted at step 8C-60.

The "Bloom process" as discussed allows for progressive interference without initially being catastrophic to the station being interfered. In one embodiment, the process is a time division process wherein less than 100% transmit duty cycle is employed. For example, the Blooming ABS station may start at 10% and proceed to 20% and so on in the current embodiment. This is less damaging, and should not "shut off" the victim station. In one embodiment, if at any point the Blooming station receives a direct message indicating unacceptable interference, then the lower tier or lower priority Blooming ABS station has to cease and desist if requested to do so. The stations performing the Bloom process must be certified, as do the stations indicating they are being interfered to allow for the transmission of messages ordering another station to vacate certain channels.

In one embodiment, using the Registry, the registry control and arbitration processes between stations serves to order interfering stations to vacate certain channels. The registry time stamps registration so as to document the specific chronology of the ABS stations in a geographic area and can determine "priority" for same tier devices so as to arbitrate disputes and enforce rules. A station may send an "interference notification" message when interfered with, which is valid only if that station has been in the location earlier than the blooming stations. To ensure this process is legitimate, the Registry, as mentioned, can act as a policy arbitrator and enforcer based on the time of registration of the individual stations, or as a general process following procedural rules and steps. In some embodiments, there may be a requirement to accommodate others reasonably and work with them via the "cooperative interference mitigation process". Such a requirement may be conditional based on the tiers of the stations, or the density of the stations within the area. For example, if one station can accommodate another station without affecting the performance of their link, they may be required to do so, or report that they cannot make adjustments. In some embodiments, the Registry may provide a benefit to that station in making accommodations for other stations in terms allowing more capability or an increase in the priority registration, for example.

In one embodiment the station notifying another station of harmful interference has the obligation to inform the interfering station of the level of interference and potentially other helpful information so as to aid in the reduction of interference and to verify that the interfering station is the correct one or that the message is not fraudulent, for example. Such an indication may be considered a "hint" as to how much of a change needs to be made, or if resolution is possible at all. Such information may include the frequencies the interference is occurring on, and the level of the interference as two examples. Other embodiments may include the channel state information or angle of arrival of the interfering signal.

In another embodiment, where an interfering station is being evicted from the currently Blooming or operating frequencies, the station must be given a interference mitigation time to resolve the interference in terms of adjustment of RF parameters as discussed. In one embodiment, a "notice message" or interference notification includes the specific overlapping channels, and by the specific amount of power. The mitigation may be considered a "cure time" from the first notice. Upon a second notice the station, in one embodiment, turns off transmissions immediately, unless a cooperative interference mitigation process is deemed to be ongoing.

An example of such a cooperative interference mitigation process follows:

1) When an ABS station detects another is interfering, it may invoke the eviction process.

2) The "interfering" station has 1 second to "cure" and must be informed by how much the interference must be reduced.

3) If direct messaging is implemented, one set of rules apply, if a "mail box" approach using the Registry is performed a second set of rules are utilized, which are less interactive and cooperative (in the current embodiment). Such a process is designed to "align interests".

4) If there is a direct message, and notice, but not response from the interfering station, they are required to immediately terminate transmissions (which may be based upon the registry mail box notification process).

5) If there is notice to an interfering station via a direct message, and the interfering station responds, then that station will get an opportunity to fix the interference by adjusting RF parameters. For example, if a station wants to have the opportunity to stay and attempt to adapt, it must send a response to the registry in one embodiment, or directly to the notifying station (in the current embodiment).

6) If a notified ABS station estimates that it can cure the interference problem, and makes adjustment but does not respond to the notifying station, then if such adjustment has resolved the issue, no termination occurs as the secondary notice will not occur.

7) However, if a notified station does not respond, and attempts to fix the issue unsuccessfully, and receives a secondary interference notification it must cease transmission immediately in the current embodiment.

8) If a station does respond to the first direct interference notification, that station will receive multiple opportunities to resolve the interference cooperatively.

In some embodiments, the registry may need be to monitored and document the process so as to allow for review at a later time, allowing for an appeal process with a supervisory authority such as the FCC. If the rules are not followed, the registry may indicate directives to the stations up to and including revoking licenses, or adjusting "occupied" priority status.

In one embodiment, when a dedicated "Bloom" signal is detected (for example with a unique signature and no user payload), the detecting ABS station may look in the registry to determine which other stations are in the area and in the Bloom process so as to either determine identity or confirm identity. Such an embodiment requires that the "state" of a station be updated within the Registry.

In some embodiments, the "interfered with" ABS station judges an interference threshold based upon one or more of: BER impact, C/I impact, the power density of the interferer.

In one embodiment, licenses are paid for by station owners based upon the licensed "Carrier to Interference ratio" (C/I) that is desired or required at that location. Having licensed a specific C/I, and when interference impinges upon them damaging the C/I beyond the level of their license, there are several embodiments operable to resolve the problem. First, and most simply, the forgoing notification procedures may be followed. Secondly, in another related embodiment, a registered station gets a fixed amount of protection, and based upon the interference level being received, the licensed ABS station is allowed to increase its transmitter power by the amount of licensed C/I degradation that are currently receiving. For example, if you purchase a license, for 40 dB C/I, you are guaranteed 40 dBi or the maximum your equipment can do, up to the permissible transmission power limit in the band. In such an embodiment, a licensed station only transmits as much power as required for the target receiver to achieve the maximum C/I it can operate at, above the noise floor plus a nominal margin amount in some embodiments. Notification may only be provided, in the current embodiment, once a licensed station reaches a "conditional maximum". The conditional maximum is the lower of the amount that that you are interfering with someone else, or all you can transmit.

In related embodiments, the C/I protection affects the license cost. For example, it might cost $1K for a 20 dB T2 license, or $2K for 25 dB T2 protection license, and so forth.

In one embodiment, the allowable transmit power follows the equation:

$$P_{Allow} = \text{Min}(P_{MAX}, P_{INTERFERENCE}, P_{R,C/I}) \qquad \text{EQ. 8-1}$$

For example, if interference encroaches within the C/I you have purchased, the licensed station may increase its power to regain the licensed C/I. If the licensed ABS station has increased its power up to either $P_{MAX}$ or $P_{INTERFERENCE}$, then the offending (interfering) station may be notified to cease, or to follow the interference mitigation process described previously in various embodiments.

In one embodiment, if the owner of a device wants 45 dB C/I, then they need to pay more money to get cleaner spectrum. Associated with such rules they may be an occupancy requirement to retain the rights, as well as a requirement that no license may exceed the certified capability of C/I performance of the equipment being utilized for a given license. In one embodiment, one cannot purchase more protection than one's equipment can actually use. In another embodiment, the "notification" message must include, and the equipment generating the message must be able to measure the interference level at a C/I level and accuracy to which the notification indicates.

In a related embodiment, any device owner may purchase what every C/I level they want, but if the device cannot measure a specific C/I with sufficient accuracy, then it is not within the rules to notify an interferer of a level of C/I and as a result such a C/I is not enforceable by that equipment. Such equipment must, in specific embodiments, be certified that it can perform the specific measurements.

In one embodiment, the interference notification message is limited to a fixed interference back off step, such as 5 dB. If such a back off by the offending station does not cure the interference problem, another message may be sent.

FIG. 9A is an exemplary embodiment of a Self-Organizing Backhaul Radio Network and system including a plurality of Self-Organizing Backhaul Radio (SOBR) enabled IBR links and associated network elements.

FIG. 9A is an exemplary embodiment of a self-organizing backhaul radio network and system including a plurality of SOBR-enabled IBR links and associated network elements. The following discussion will often, but not exclusively, use the terms "primary" link to indicate the IBR link between an aggregation end IBR (AE-IBR) and a remote end IBR (RE-IBR). The term SCC link will refer to the signature control channel link in embodiments related to the SOBR enabled radios, and may also exist between an AE-IBR and a RE-IBR in specific embodiments. One goal of some embodiments of the SOBR-enabled IBR radios is to allow transmit beam forming between SOBR-enabled IBR radios without damaging other friendly radios within the propagation distance of the transmitted signals.

In specific embodiments, in which two SOBR enabled IBRs intercommunicate using a primary link, a so-called "in-band" and "embedded" signature control channel may be included related to some ABS embodiments in the foregoing sections (see the discussion associated with FIG. 5G as one non-limiting example). Further, aspects disclosed elsewhere in the foregoing, associated with the use of signature control channels in general, by that specific term or another similar term, should be considered as non-limiting and exemplary embodiments for use with currently disclosed exemplary embodiments and associated variations an combinations. It should be noted that to the extent a signature control channel is discussed as being embedded within a specific primary link symbol stream, as will be discussed associated with FIG. 5A, FIG. 5G, and will be discussed further associated with FIG. 10A, FIG. 10B, FIG. 11A-D, and elsewhere, subsequent processing during the transmission and propagation processes will apply equally to both the primary stream, and the SCC stream. Therefore, as one example, any transmit beam forming being applied to a specific primary link stream will also effect an associated embedded SCC stream in the same manner. Similarly, radio transmission and radio propagation effects, and will also affect the primary and associated embedded SCC streams equally as well in specific embodiments. It should therefore be understood that in such embodiments, the detection of an embedded SCC stream will provided information directly applicable to the associated primary link stream, such as for example the radio frequency (RF) propagation path loss between the transmitting SOBR IBR and the receiving SOBR IBR, where such IBRs are engaged in a primary link or not.

For example a plurality of SOBR-enabled backhaul links are depicted in FIG. 9A, and operated by several different wireless operators. The designations "C1", "C2" and "C3" in the various callouts within FIG. 9A are intended to indicate specific wireless operators associated with the IBRs. For example, the backhaul link within the area designated by 9A-C1-1 indicates "Carrier" or operator "C1" is in control of this enclosed network elements. Likewise the area designated by 9A-C1-2 further designates the same operator "C1" is in control of a second designated area including the enclosed network elements 9A-C1-RE1, and 9A-C1-AE1. In contrast, the area designated by 9A-C2, and 9A-C3 specify enclosed network elements under the control of a second and a third wireless operator respectively.

Referring to again to 9A-C1-2, Remote IBR (RE-IBR) 9A-C1-RE1 has a backhaul link (including a "primary" link and SCC link) to aggregation end (AE) IBR 9A-C1-AE1. Within the same wireless propagation range, a second SOBR-enabled backhaul link is present between RE-IBR 9A-C2-RE1 and AE-IBR 9A-C2-AE1, but under the control of a different wireless operator ("C2"). Each of the two backhaul links in specific embodiments may be operated by different wireless operators.

It is desirable when two operator's networks are in proximity to each other that they coordinate their operations so as to not interfere with each other allowing for optimized performance of each of the two backhaul links. As discussed above, and associated with embodiments of the advanced backhaul services, a primary backhaul link between an AE-IBR and a RE-IBR may have an embedded in-band signature control channel (SCC). For SOBR-compliant systems having compliant in-band embedded signature control channels of predetermined formats, the carrier operating one link within 9A-C1-2 and the carrier operating the second backhaul link within 9A-C2 may allow their equipment to utilize the signature control channels so as to coordinate interference between their respective links.

Generally speaking, prior art wireless network elements (including backhaul radios) within separate wireless operator's networks will not intercommunicate. However, allowing for appropriate intercommunication may provide distinct advantages in terms of avoiding mutual interference. One potential problem some of the specific information is may be desirable to share between different wireless operators, may also be sensitive in nature disclosing confidential performance information, data rates or network capacities, robustness levels, operating parameter information, link budgets, performance margins, received interference information, and the like. This same information may in specific embodiments, be the most helpful to share between operators to cooperatively accommodate each other's networks. Therefore, in some embodiments, the sharing of such information between the respective backhaul devices of different operators, but with the ability to restrict the dissemination of the same information beyond the equipment itself would be of significant benefit. In specific embodiments, the SOBR enabled radios are capable of making self-organizing adjustments so as to make their respective links performance mutually optimized. For example, avoiding mutual interference as one backhaul link adapts in the present of another backhaul link of different operators.

As one example, if SOBR equipment were provided by a single vendor, and provided to different operators by that vendor, the SOBR equipment in specific embodiments is able to share the SOBR operating information between their devices using a SCC link so as to allow coordinated activities. In the single vendor example embodiment, the vendor can restrict the sharing of the potentially sensitive information collected by a particular operators SOBR enabled equipment from SOBR devices of other operators but allow for the individual SOBR radios to benefit from the use of the shared information. In making use of the shared information relating to the wireless performance and environment of each of the respective operators equipment and associated primary links, mutual optimization of the respective links may be achieved, and benefit may be gained.

Further, if multiple vendors utilized a common SOBR approach, potentially including knowing predetermined parameters, and each vendors equipment were to perform in a similar way so as to utilize an SCC link for such sharing link and environment information, a network of such devices could see substantial benefit. In one embodiment, backhaul devices from multiple vendors are certified by a common organization or company to perform such a predictable, interoperable, and common SOBR operating procedures and specification, including in various embodiments: information sharing, information restriction and filtering approaches, and other techniques disclosed herein.

Therefore it is useful for the SOBR-enabled IBRs within embodiments depicted in FIG. 9A to communicate with each other so as to optimize their individual performance and coordinate interference between different links. Such coordination may further allow for currently operating paired SOBR enabled IBRS to make changes effecting their transmitted signals which may cause a change in interference levels to other SOBR enabled devices. As one example a change in the transmit beam forming parameters from one SOBR device may be "tried" initially using SCC stream not associated with currently operating primary link streams, prior to making a change in the transmitted primary link streams, allowing for testing of the new settings to determine if the interference to other SOBR devices of the performance of the link in general is acceptable in embodiments. Similar approaches, as described associated with the "Blooming process" of the advanced backhaul services described herein may be performed for initial "bring-up" of a new SOBR-enabled IBR, or to identify the specific AE-IBR to which a particular RE-IBR is authorized to establish a primary link.

In some embodiments of SOBR-enabled backhaul networks, the communication between the individual operator's IBRs and the IBRs of other operators may be limited to the detection of each other's transmissions. This detection may additionally be limited to the detection of known formats of the signature control channels embedded within their respective primary links. In other embodiments, the signature control channels may be utilized to intercommunicate between the SOBR IBRs of the different wireless operator's networks, allowing for messaging to be performed between the IBRs. In some embodiments, utilizing such messaging information may be shared between the IBRs of the different wireless operators which may be sensitive in nature, as discussed above; for example the available data rates supported by their respective primary links, the wireless channels and channel state information of their respective links, the number of degrees of freedom that their respective links may include and other aspects. Additionally, aspects related and discussed associated with the advanced backhaul services of foregoing embodiments may be communicated. In such embodiments, where information is shared between SOBR IBRs of different wireless operators or other operators, the information may be held within the SOBR IBR and not distributed or available to higher layers of the IBR, such as the IBMS. In some embodiments, some information may be available to higher layers, while other portions of the shared information may be restricted from the higher layers. Such policy may be enforced by the equipment vendor providing the SOBR IBR to the wireless operators.

As discussed previously and in some embodiments, a SOBR IBR will be certified according to specific rules for information collection and information privacy allowing for wireless operators to use the SOBR-enabled IBRs for their primary links but have limited visibility to the underlying exchange of information over the signature control channels of the SOBR IBR equipment. In such embodiments, the operators may receive the benefit of coordinated optimization of their individual primary links, despite not having access to the complete shared information. Such optimization, in some embodiments, allows for the avoidance of interference from other backhaul links both within their own networks and the backhaul links of other wireless operator's networks.

Specific embodiments including the data filtering associated with the SOBR communications, as well as other aspects of SOBR signature control channel communications, will be discussed associated with FIG. 9C.

Returning to FIG. 9A, various network elements are present, including a TP SOBRS (third party self-organizing backhaul server) designated by 9A-10. The TP SOBRS is connected through, in one embodiment, a public internet (9A-20), while in other embodiments a private internet may be used. In one embodiment, the third party SOBRS 9A-10, may be used to coordinate communications between SOBR-enabled IBRs of the same or different wireless operators, as will be discussed further.

In some embodiments, a Gateway depicted as GW within rectangle 9A-C3 is utilized to interface between AE-IBR (9A-C3-AE1) and third party SOBR server 9A-10. In other embodiments, third party SOBR server (9A-10) utilizes the Gateway within network 9A-C3 to communicate with the private SOBRS within network 9A-C3. Such intercommunication between operators may be achieved with a SOBRS or utilizing the SCC capabilities.

As discussed, FIG. 9A depicts an example of multiple wireless operators (or carrier) networks, their network elements and exemplary interactions between backhaul networks. Each rectangle within FIG. 9A is intended to illustrate a regional network provided by a carrier or operator. In one embodiment of FIG. 9A, three different wireless carriers operate regional networks. As an example, Rectangle 9A-C1-1 depicts an operator's network who is utilizing SOBR-enabled backhaul links to backhaul cellular-base station signals. Such cellular-base station signals are backhauled from RE-IBR 9A-C1-RE3 to AE-IBR 9A-C1-AE3. Further, RE-IBR 9A-C1-RE3 is interfaced to an access node (AN), an eNodeB, a NodeB, and a BTS. As it's known in the art, a BTS represents a cellular-base station, which may be a GSM cellular-base station or a CDMA cellular-base station. A NodeB represents a W-CDMA cellular-base station, as defined by the well-known 3GPP standards organization. An eNodeB represents an LTE cellular-base station, also defined by the 3GPP standards organization. An Access Node (AN) may represent a number of different radio access network technologies including IEEE 802.16 or other technologies, for example, IEEE 802.11.

RE-IBR 9A-C1-RE3 has a primary link for backhaul with AE-IBR 9A-C1-AE3, which is in communication with a radio network controller (RNC). The RNC is in communication with a Serving GPRS Service Node (SGSN) and a Gateway GPRS Service Node (GGSN). Further, AE-IBR 9A-C1-AE3 is in communication with other network elements, known in the art, within 2G and 3G networks, including an MSC HLR/VLR.

AE-IBR 9A-C1-AE3 may also be in communication, as depicted via a private core network, with LTE core network elements, such as a Serving Gateway (S-GW), a Mobility Management Entity (MME) and a HSS as examples. Various other network elements attached to the private core network may include a P-GW for connecting to packet data networks, including the internet or other private internets; an MGW for connecting to circuit switch voice services; a PCRF (Policy and Charging Rules Function), an IMS (IP Multimedia Subsystem) network, which may interface via another P-GW; a Call Session Control Function (CSCF) as a portion of an IMS network; and a private SOBRS.

Additionally within the network depicted by 9A-C1-1, a second primary link for backhaul between AE-IBR 9A-C1-AE3 and RE IBR 9A-C1-RE4, which may be connected to other network elements including cellular-base stations or other devices. In such a topology, AE-IBR 9A-C1-AE3 is acting in a Point to Multipoint (PMP) mode, as depicted. A similar PMP arrangement within the regional network of Carrier 3 (C3), consists of AE-IBR 9A-C3-1, as an Aggregation End IBR, having primary back haul links with two Remote End IBRs (RE-IBR) 9A-C3-RE1, and RE-IBR 9A-C3-RE2.

In contrast to the PMP links just described, a Point to Point (P2P) mode primary link is present within area 9A-C1-1, between RE-IBR 9A-C1-RE2 and AE-IBR 9A-C1-AE2. All three primary backhaul links within this area, for this exemplary embodiment, are SOBR-enabled IBR links with included Signature Control Channels (SCC) that are SOBR compliant. Further, all three primary backhaul links are within radio propagation distance of each other, and are operated by the same network operator (as indicated by being within the same rectangle (9A-C1-1) of FIG. 9A, and including the designation "C1" within their respective callouts).

The Signature Control Channels of the primary links may be of significant benefit, allowing for the detection and optimization of the primary links even among the same operator, based upon the detection of the Signature Control Channels. The SCCs associated with each primary link may be utilized for optimizing performance within the same operator's network.

The regional network within rectangle 9A-C1-2, in this example, is operated by the same network operator as that operating 9A-C1-1. The two regional networks are interconnected by an Alternative Access Vendor (AAV) 9A-30, which may be a Metro-Ethernet service provider (for example see www.metroethernetforum.org). Such networks may operate at layer two over Ethernet or may operate utilizing other technologies such as MPLS.

While all of the links within the same operator's network may be under the control and manageable by that operator by direct connections to specific network elements, the use of the Signature Control Channels associated with the primary links may be used to optimize the performance of the links. The SCCs, in specific embodiments, further allow intercommunication between the nodes or to facilitate the identification and addressing of a particular node by wired connections between the network elements (the respective SOBR IBR) in various embodiments.

As previously mentioned, the two regional networks depicted by 9A-C1-2 and 9A-C2 are operated by different wireless operators, whose depicted backhaul links are in relatively close proximity to each other. In some embodiments, these backhaul links and associated operators do not have a method of intercommunicating by wired means and therefore must rely on coordinating their primary links by utilizing the Signature Control Channels associated with each of their SOBR-enabled IBRs. In other embodiments, an agreement may be in place so as to allow wired coordination in addition to the detection of Signature Control Channel transmissions. In yet other embodiments, a combination of Signature Control Channel communications as well as wired communications via a private core network or public internet, a Gateway, third party SOBRS, or over an Internet Packet eXchange (IPX) such as 9A-40. In one embodiment, the carrier operating regional network 9A-C1-1 and the carrier operating regional network 9A-C3 are different operators and have an agreement to share information and to coordinate interference mitigation utilizing communications enabled by IPX 9A-40. Such communications may be via direct communication between SOBR IBRs or by intercommunication between private SOBRS, such as those depicted within 9A-C3 and 9A-C1-1.

Additionally, in some embodiments, communications coordinating the performance of individual SOBR primary links may be enabled by so called direct messaging, as discussed previously, associated with the Advanced Backhaul Services in various embodiments. Such direct messaging may further be enabled utilizing a SIP (Session Initiation Protocol) over a public internet such as 9A-20, or an IPX such as 9A-40, and in some embodiments, utilizing an IMS network.

Utilizing a combination of wireless detection of Signature Control Channels with wired direct messaging, a private SOBRS, and/or direct IBR to IBR communication may allow for the sharing of a greater amount of information more efficiently than passing all of the information over the Signature Control Channels directly between the SOBR-enabled IBRs. However, it is contemplated embodiments will share information directly over the Signature Control Channels exclusively in some embodiments.

As discussed above, one goal of the present invention relating to Self-Optimizing Backhaul Radios (SOBR) is to allow for the provisioning and continual optimization of a primary link. Utilizing multiple SOBR-enabled IBRs, including in some embodiments the use of transmit beamforming allows for minimizing damaging interference to other local SOBR-enabled links. In some embodiments those links will be on different frequency channels to avoid the interference. In other embodiments, the same frequency channel will be used and power may be adjusted. While in yet further embodiments, transmit beam forming may be used to avoid the radiation of interference toward specific other SOBR-enabled IBRs, while optimizing reception to an IBR associated with a specific primary link. It is further contemplated that any and all interference mitigation and link optimization techniques discussed elsewhere within the ABS embodiments would be included as options for interference management and link optimization within SOBR-enabled radios. Advance Backhaul Services, as disclosed previously in specific embodiments, include primary links comprised of primary link streams and each primary links stream having an associated embedded Signature Control Channel stream.

Figure 9B:
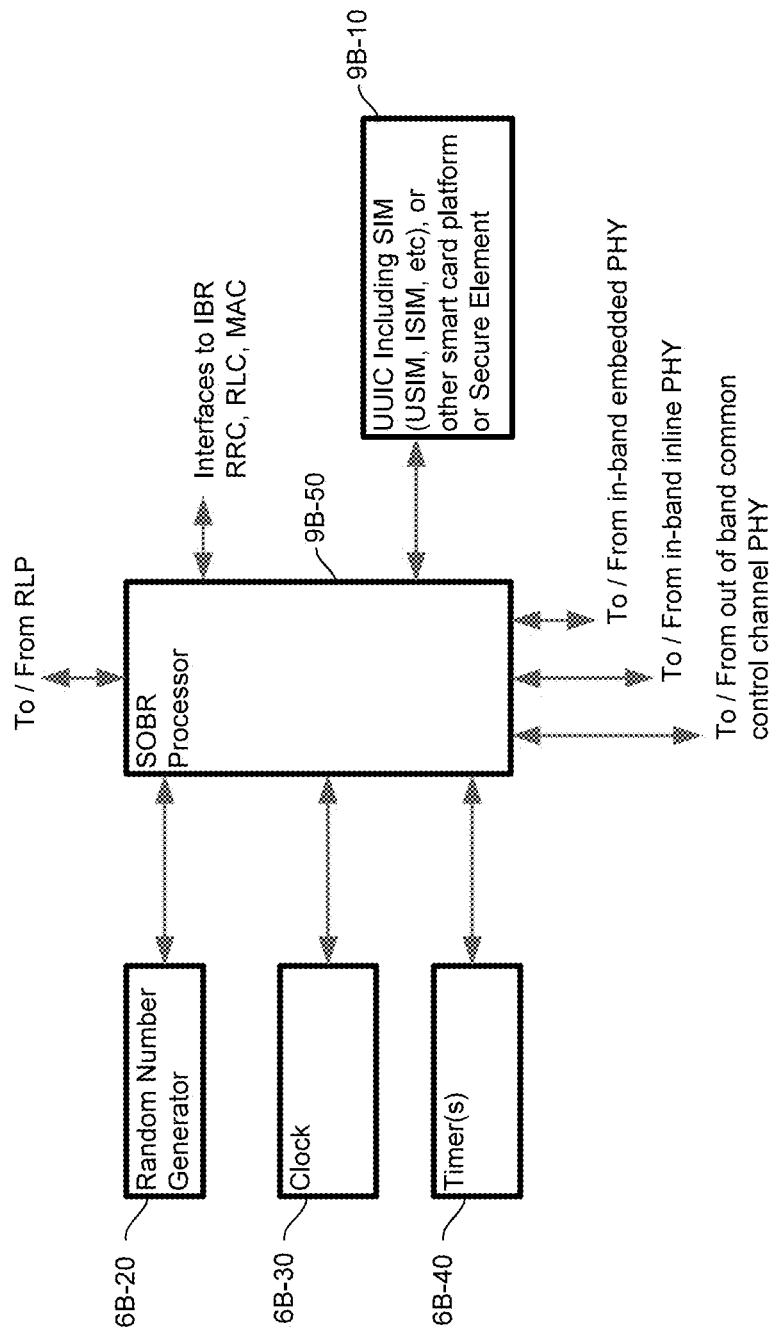
FIG. 9B is an exemplary block diagram of an embodiment of a Self-Organizing Backhaul Radio signature control link protocol processor.

FIG. 9B is an exemplary block diagram of an embodiment of a Self-Organizing Backhaul Radio signature control link protocol processor.

Referring now to FIG. 9B an exemplary block diagram of an embodiment of a self-organizing backhaul radio Signature Control Link protocol processor is depicted. In one embodiment the blocks of FIG. 9B operate as described associated with FIG. 6B, while in other embodiments additional capability is contemplated.

FIG. 9B, in addition to elements present in FIG. 6B, includes a UICC (Universal Integrated Circuit Card) 9B-10, including one or more of a subscriber identity module (SIM), a USIM (Universal Subscriber Identity Module), or an ISIM (IP Multimedia Services Identity Module). Other embodiments may include alternative smart card platforms or secure elements as known in the industry.

Such unique identity modules (such as a SIM, USIM or ISIM, etc.) may be used for authentication and authorization, and for registration with one or more other SOBR-enabled IBRs or other network elements described or depicted in FIG. 9A.

As discussed, such network elements of FIG. 9A may include a Mobility Management Entity (MME) and HSS, an MSC (mobile switching center) and HLR/VLR (Home Location Register and Visitor Location Register) and a SGSN/GGSN, a Call Session Control Function (CSCF) or other network elements for authentication, signal plane communications, provisioning communications, and alike. Additionally, a SOBRS (SOBR Server) may be used to register and manage individual SOBR-enabled IBRs.

As one example, authentication methods known in the art and associated with the use of SIM card may be used between SOBR servers and SOBR-enabled IBRs. Such approaches may, in some embodiments, include so-called mutual authentication where the network authenticates the wireless device (a SOBR-enabled IBR in one embodiment) and the device authenticates the network (utilizing an SGSN, MSC, MME, CSCF, or a SOBRS in various embodiments).

Further SIM-based authentication may be used between AE IBRs and RE IBRs enabled with the SOBR protocols and utilize mutual authentication in specific embodiments. Additionally the use of encryption as known in the standards, or other encryption techniques, may be used associated with the SIM cards so as to allow 802.1X security (See EAP-SIM, EAP-AKA, EAP-TLS) or IP-SEC (See RFC 4301 and associated) communications between individual SOBR-enabled IBRs of the same network operator or different network operators, or to other network elements of various operators.

Such encryption may include IP-SEC but may also include alterative standards compliant encryption techniques known in the industry as well. In specific embodiments of a Self-Organizing Network, a SOBR-enabled IBR placed within the network must have the capability, in some embodiments, to identify other IBRs of the same networks to which it is authorized to communicate. Further, it is beneficial that an IBR wishing to connect with other IBRs is able to validate that a target IBR is authentic and not a fraudulent device attempting to violate the privacy of the data to be carried on the network or for other nefarious reasons. The use of protocols associated with a SIM can address such fraud, authenticity, registration, encryption and other issues in a known way associated with mobile networks. Utilizing SIM cards within a backhaul network that is self-organizing, in some embodiments, may allow for distinct advantages. In one embodiment, where radios which advertise being SOBR compliant must be certified, the credentials stored within a SIM card may be issued by the certifying entity. In some embodiments, the certifying entity may be the manufacturer of all SOBR-enabled radio. In other embodiments there may be multiple vendors and an independent certification facility or entity, which issues the credentials associated with the SIM card. These credentials may be shared with individual operators or may be private with respect to some data stored within the SIM and other data may be provisioned by the operators themselves. In some embodiments the SIM card will further ensure and verify SOBR compliance certification.

The SIM credentials may also be utilized to certify inter-operator authentication as well as information encryption as discussed. In some embodiments, the rules associated with information sharing collected by the individual SOBR compliant IBRs via their Signature Control Channel radios may be managed per rules associated with a certified SOBR device adhering to specific requirements. In some embodiments the SIM card authenticates the specific hardware and software platform, and confirms the SOBR-IBR as certified device adhering to specific filtering requirements, or other requirements, enforced by an operator agreement or by a specific de-facto standard or other agreements.

Such authentication, in some embodiments, would be able to verify that an operator to whom a first operator would like to share information is authenticated and authorized such that the sharing of sensitive information to third parties who are not authorized may be prevented. Such an arrangement allows for, in some embodiments, two levels of authentication, including "vendor level" authentication which may be referred to as SOBR certification and "operator level" authentication. Utilizing disclosed embodiments, it would be possible to use existing IMS/IPX private carrier interchanges (those provided by Syniverse for example) to exchange information. For example the exchange of information via an IPX (or other network) may include dynamic key exchange, encryption key revocation lists, cooperative accommodation approval, alerts to operators, etc.

As with LTE, in some embodiments, it would allow for P2P and PMP two-way (mutual) authentication such allowing for the admission by the operator of a new radio into the network, and device authenticity verification of a particular vendor and operator to which a device is attempting to gain access. One example of the use of SIM cards is discussed in the third generation partnership program 31 Series of Standards that define the Cu interface and other aspects of the use of a SIM card.

Figure 9C:
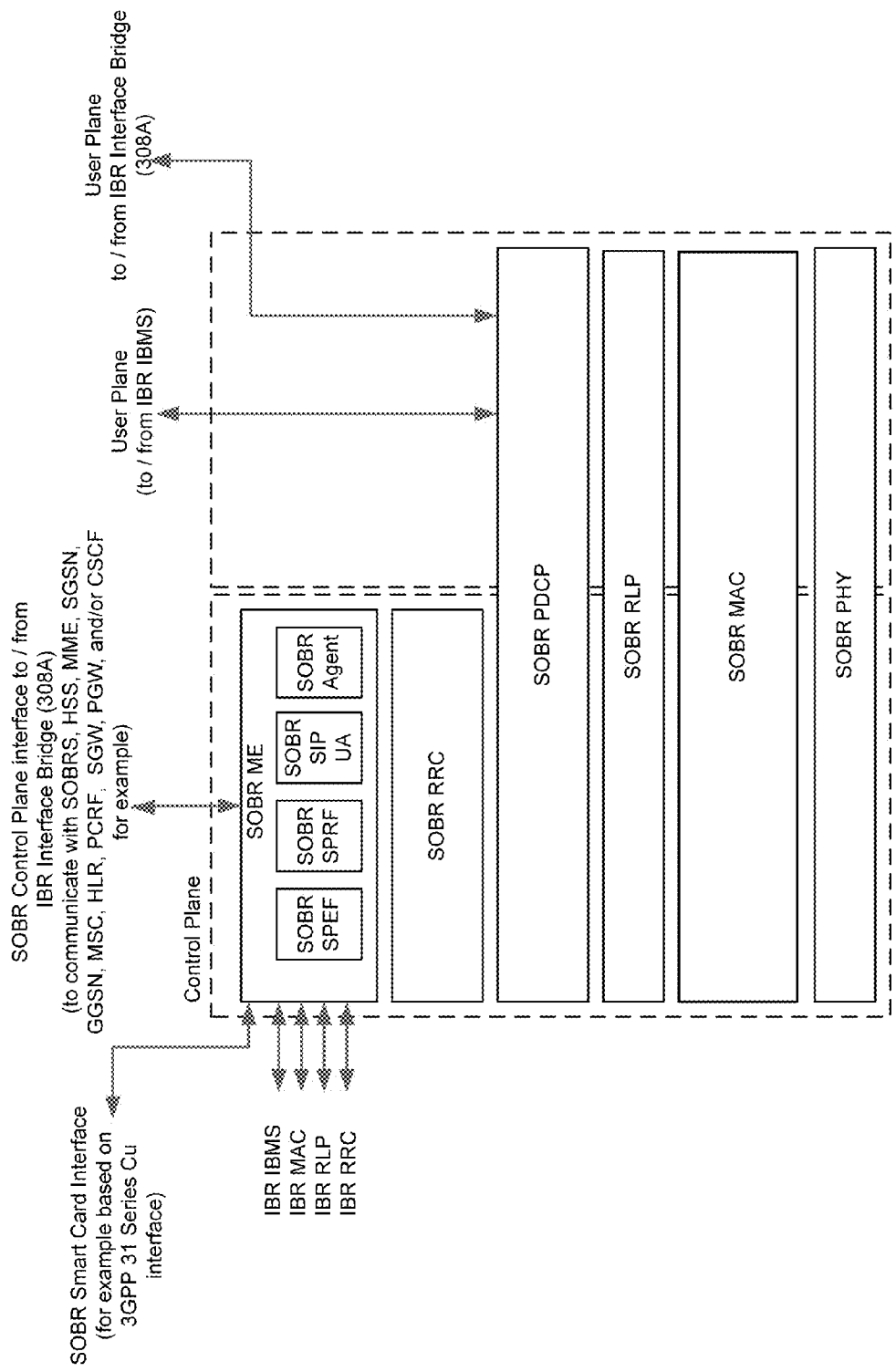
FIG. 9C is an illustration an exemplary Self Organizing Backhaul Radio layered signature control link communication protocol stack.

Referring now to FIG. 9C, an exemplary illustration of a self-organizing backhaul radio layer signature control link communication protocol stack is depicted. Some embodiments of the layers of FIG. 9C operate similarly to those of the Advanced Backhaul Services layered signature control link stack depicted in FIG. 6A. Notable differences between FIG. 6A and FIG. 9C include the addition of an interface to the SOBR management entity to the SOBR smart card interface for example based on 3GPP 31 Series Cu interface in some embodiments. Additionally, an interface between the SOBR PDCP and the user plane to/from the IBR interface bridge 308A has been provided to allow for intercommunication with other network entities and SOBR MEs of other IBRs as well as SOBR servers without the use of the IBR IBMS.

Further specific functional entities within a SOBR ME will now be described in more detail. For example the SOBR SPEF (SOBR policy enforcement function) is included. The enforcement function is, in some embodiments, utilized as a filter, which prevents information that must remain isolated from higher layers of the IBR, from being disseminated. It may be considered to be a firewall in some embodiments or a traffic flow template (as described in 3GPP standards) in other embodiments. In some embodiments the SPEF is a general enforcement function, which polices the specific information passing from the SOBR management entity to other entities. In some embodiments, the SPEF has the capability to prevent the transmission of specific information to the IBMS, the IBR RRC, the IBR RLC, or the like. In other embodiments, the SPEF prevents information from the foregoing entities, or from within the SOBR ME itself from being transmitted externally to other SOBR MEs. While the enforcement function performs the actual enforcement, the "rules function" (or SPRF—SOBR Policy Rules Function) includes a database, in some embodiments, which stores the specific policies associated with information dissemination or other policies that may be implemented. Some policies may be required based upon vendor level certification such as being SOBR certified while other roles may be dependent upon inter-operator agreements for information sharing or cooperative accommodation rules between specific vendors or specific devices, including past history of cooperative actions between devices.

The SOBR SIP-UA is a SIP User Agent for use in generating and receiving SIP protocol messages. Some embodiments of the SIP-UA are for use within an IMS network or other SIP network for intercommunication with other SIP agents that may include a SOBR server or other SOBR-enabled IBRs or other entities within the network.

Finally a "SOBR agent" in some embodiments, is a functional entity that includes state machines and process control capabilities. For example, in specific embodiments the SOBR Agent stores operating information for use in cooperative accommodation, and dictates procedures for use in executing such processes.

An interface to the SOBR control plane between the SOBR ME to and from an IBR interface bridge 308A allows for the SOBR ME to communicate with other entities. Such entities, in various embodiments may include on or more of various SOBR servers, an HSS, an MEE, an STSN, a GGSN, MSC, HLR, PCRF, SGW, PGW, and/or CSCF in some embodiments. Any of these entities may communicate via internet protocol and in some embodiments SIP messaging, radius messaging or other protocols known in the industry.

The filtering function associated with the SPEF (or elsewhere in alternative embodiments) may operate based upon a number of parameters such as:
1) parameters or values set by the transmitting device and an associated back haul operator (BHO),
2) the specific BHO of the other device (for example if it is "your" IBR-same BHO),
3) a third party arbitrating agency, or policy, vendors manufacturer, licensor, organization, etc.

The following outline provides details related to specific embodiments incorporating details of "Cooperative Accommodation" (CA) and in specific embodiments relate to the shared information between SOBR-enabled IBRs.

Backhaul Operator (BHO) may set parameters (including cooperative accommodation parameters (CA)) for example:
  i. Performance Requirements (throughput, delay, jitter) of primary links
  ii. Configuration and Accommodation Settings:
    1. Per BHO settings
    2. Per vendor settings
    3. Per link settings
    4. Per link or BHO accommodation "reciprocity" history settings
    5. Per link or BHO accommodation "good will" desire factor
    6. Criticality Rating (1 to 10 (highest)) of the importance of the specific BH link
    7. for use in a "cost function" for a trade.
    8. Configuration and Performance cost weighting function
      a. May be based upon the robustness of one or more primary links or SCC links
      b. May be based on excess margin in primary link wireless parameters, or
      c. May be based upon the impact to parameters levels directly effecting the performance of the primary link or SCC link themselves
      d. Parameters associated with each or individual primary or SCC streams
      e. Parameters as an example may include link budget, noise floor, SNR, C/I, Eb/No, Eb/Io, Es/Io, FER, BER, throughput, data rate, jitter, link or stream latency, interference level, rank of spatial propagation matrix, the number of usable spatial streams, path loss, available transmitter power level, impact to other networks in interference, and the like as known by one skilled in the art,
      f. Allowable frequency channels of operation, prioritized channels of operation,
      g. Authorized SOBR IBRs (by vendor, by certification, by operator) with which interaction is allowable
      h. Authorized SOBR IBRs with which the establishment of a primary link is allowable
      i. Preferred SOBR IBRs including priority for the establishment of primary links, or a cost function associated with such a priority for use in cooperative accommodation procedures.
  iii. Robustness Requirements
    1. Margin in parameters for performance requirements
    2. Existence of alternative configurations/backup configurations for "fall back"
    3. The number of fall back alternative configurations
    4. Potential of primary link impact (transitory or continual) in making such accommodations Intra-BHO procedures
Inter-BHO procedure
SIM/SE in the IBRs for vendor/SOBR compliance certification authentication and inter operator authentication/information encryption
  i. Public/private key as one approach
  ii. Known codes tied to the public key (vendor, version, operator, etc—in some embodiments)

"Alert codes", vendor/compliance codes, operator codes, used together—easy detection within a limited set of codes to search, then more detailed searches—or just use payload for identification and authenticity check (public/private key and hash)
  i. Register information related to a "vendor name" or vendor ID.
  ii. A hash of vendor identification information to produce a value usable for a vendor code and searchable within SCC channels.

URL or IP address to a Vendor or other third party data base to allow for determination of vendor ID (or IEEE MAC addresses for example to determine the UID (vendor) and the specific device (including embodiments discussed associated with ABS examples).

It should further be noted that a portion of the forgoing parameters, attributes and rules may be settable by the back haul operator in some embodiments, while other portions are under the control of a vendor or other entity. In one embodiment, none of the above parameters are settle by the backhaul operator, while in other embodiments all of the above parameters are settable. Further, the foregoing attributes are not intended to be an exhaustive list, but only examples.

Figure 9D:
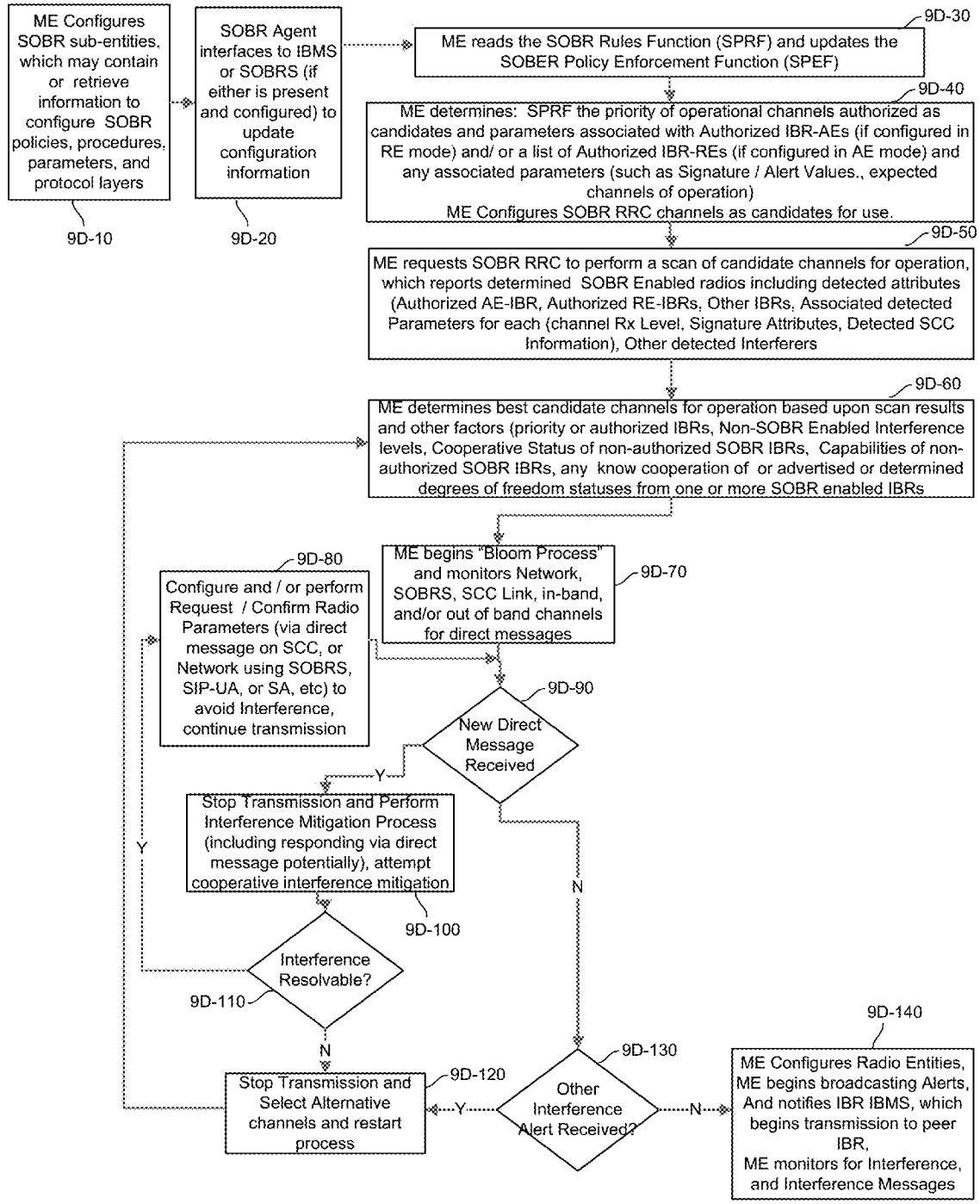
FIG. 9D is a flow diagram of the Management Entity (ME) channel selection and link initialization process for a Self-Organizing Backhaul Radio signature control link protocol processor according to one embodiment of the invention.

FIG. 9D is a flow diagram of the Management Entity (ME) channel selection and link initialization process for a Self-Organizing Backhaul Radio signature control link protocol processor according to one embodiment of the invention. FIG. 9D describes one embodiment of a so-called "bring up" or "boot strap" approach SOBR-enabled IBR. Other embodiments for bring-up include alternative orders of the steps of FIG. 9A.

For example several alternative embodiments include bring up scenarios:
1) Bootstrap in primary link, then turn on SCC
2) Listen for a period of time, then bootstrap primary link
3) Boot strap in SCC mode and then bring up the primary link (as shown in FIG. 9A)

The steps and procedure of FIG. 9A, and associated alternative embodiments will now be described. In Step 9D-10, the SOBR ME (Management Entity) configures SOBR sub-entities, which may contain or retrieve information to configure SOBR policies, procedures, parameters, and protocol layers.

In step 9D-20, the SOBR Agent interfaces to IBMS or SOBRS (if either is present and configured) to update configuration information. Specific embodiments will not perform this step. Further alternative embodiments may include the SOBR Agent retrieving configuration information form locally stored databases, or non-volatile memory as examples.

Next, in step 9D-30 and in specific embodiments, the ME reads the SOBR Rules Function (SPRF) and updates the SOBR Policy Enforcement Function (SPEF). In some embodiments, the specific rules may be updated within the SPEF based upon the identity or other identifiers associated with detected non-peered SOBR enabled IBRs. For example, in one exemplary embodiment, and during continual operation associated with Step 9D-140, the detection of a new interfering SOBR IBR may enable the identification of one or more attributes associated with the detected IBR including:

The vendor of that IBR,
The certification of that IBR to adhere to policies associated with the confidentiality and dissemination of shared information,
The identity of the operator of the detected IBR,
The identity and validity of an agreement for information sharing between a detected device and/or operator and the present operator or device, or the like.

Rules associated with the foregoing attributes may also be loaded into the enforcement function at the time of initialization in step 9D-30. Alternatively, some rules may be loaded initially, while others are loaded in response to the need to use them, or other events in various embodiments. Other attributes include those listed in the foregoing in further embodiments. For example in some embodiments, the parameters described associated with the forgoing Backhaul Operator settable parameters (including cooperative accommodation parameters (CA)) may be valid attributes. In various embodiments, the foregoing attributes may be settable by the backhaul operator as described, or may be partially or entirely exclusively settable by the vendor of the equipment or another entity (such as a certification authority).

Following the completion of step 9D-30, processing proceeds to step 9D-40 in the current embodiment. In various embodiments the order of specific steps may be interchanged where possible, subdivided into different groups of operations, performed by different entities, or skipped entirely.

Proceeding in the current embodiment to step 9D-40, the ME determines:

The priority of operational channels authorized as candidate channels
Parameters associated with Authorized IBR-AEs (if configured in RE mode) and/or a list of Authorized IBR-REs (if configured in AE mode)
Any associated parameters (such as Signature/Alert Values, expected channels of operation) generically, per IBR, per lists of IBRS, etc.

In step 9D-50, the ME requests the SOBR RRC to perform a scan of candidate channels for operation, which reports determined SOBR Enabled radios including detected attributes as described in various embodiments.

In some embodiments such attributes may include:
AE-IBRs, and/or RE-IBRs
Authorized AE-IBRs, and/or Authorized RE-IBRs,
Other IBRs,
Associated detected Parameters for each, for example:
  i. Frequency channel, channel Rx Level,
  ii. Signature Attributes,
  iii. Operator, and/or Vendor,
  iv. Detected SCC Information
  v. Authentication Information
  vi. Detected Interferers
  vii. Channel Stability information (Doppler, channel fading attributes, reliability estimates)
  viii. Channel propagation information (RSSI, Advertised TX Power of SCC, SNR, C/I, Channel Propagation matrix attributes, number of usable spatial channels or supportable streams, channel capacity estimates).

Based on the foregoing, and authorized and preferred settings form step 9D-40, the ME (in the current embodiment) configures SOBR RRC channels as candidates for use. In other embodiments, other entities may perform the function of configuration.

In step 9D-60, the ME determines best candidate channels for operation based upon scan results and other factors including: priority or authorized IBRs, Non-SOBR Enabled Interference levels, Cooperative Status of non-authorized SOBR IBRs, Capabilities of non-authorized SOBR IBRs, any known cooperation of or advertised or determined degrees of freedom statuses from one or more SOBR enabled IBRs, or other factors.

In step 9D-70, the ME begins "Bloom Process" and monitors Network, SOBRS, SCC Link, in-band, and/or out of band channels for direct messages. In some embodiments, one or more SCC channels will be monitored, while in other embodiments, wired sources of direct messages will be monitored as well. In some embodiments, an interfered with SOBR IBR may broadcast a "interfered with" message generically rather than using a message directed to, or otherwise addressed for the present IBR. In some embodiments, such broadcast alerts should be considered to take the place of direct messages for the purpose of the discussion herein.

Following step 9D-70, the processing proceeds to a decision step, 9D-90, in which it is determined if a new direct message has been received. Such a step may also include a delay sub-step encompassing the "dwell time" at a particular transmitted interference level. In specific embodiments, step 9D-70 and the detection of a new interference notification of step 9D-90 may be combined so as to halt the Bloom Process and an associated progressively increasing interference level based upon the notification or determination of the interference impacting other SOBR-enabled IBRs. In some embodiments, the Bloom process may consist of, or be replaced by simply initiating full target power transmission of the primary link, and/or initiation of the full target power SCC, and their respective streams.

Within step 9D-90, if a new direct message is has been received, the process proceeds to step 9D-100, otherwise the process proceeds to 9D-130 in the current embodiment.

Assuming a direct message has been received, or another determination of the Bloom process interfering with other IBRS, step 9D-100 is performed and the current IBR embodiment will stop transmission and perform an interference mitigation process. Embodiments and aspects of such mitigation processes have been described associated with the ABS embodiments and elsewhere. In some embodiments, the interference mitigation process may include responding to received direct messages via direct message, and the performance of a cooperative interference mitigation procedure.

In step 9D-110, if it is determined that the presence interference is resolvable processing proceeds to step 9D-80, otherwise if the interference is determined to not be resolvable step 9D-120 is performed.

In Step 9D-120, in the case the interference is not resolvable, the SOBR enabled IBR will stop transmission and select alternative channels if possible, proceeding to step 9D-60, in the current embodiment. Other embodiments may follow alternative interference mitigation procedures.

If, in step 9D-110, it was determined that the interference was resolvable, processing in the current embodiment proceeds to step 9D-80. In step 9D-80, the modified radio parameters will be configured in some embodiments, and/or request alternative radio parameters from another SOBR enabled IBR and confirm such radio parameters (via direct message on SCC, or on the network using SOBRS, SIP-UA, or SA, etc) as to attempt to avoid Interference. Next, one modified radio parameters have been adjusted, either locally, or remotely to the interfering or interfered with IBR the current IBR will continue transmission. Such transmission may reset and resume the Bloom process, or resume at another transmission power level where the process terminated.

Processing, in the current embodiment, then returns to step 9D-90, in which the SOBR IBR determines if any additional direct messages have been received. Either 9D-80 and/or 9D-90 may include a "dwell time" in which a time period is waited, following the transmission of step 9D-80, or 9D-70. In an alternative embodiment, processing of step 9D-80 may proceed to the "Bloom Process" and continue at the re-start, or continue the process. In an additional embodiment, Steps 9D-70, and 9D-90 may be combined such that at any point during the progressive interference process (Bloom Process) and an accompanied dwell time at a specific transmission interference level, if a direct message is received, the Bloom process will be halted and processing will proceed to step 9D-100 in some embodiments. If the Bloom process is completed without the reception of a direct message, the processing in one embodiment proceeds to step 9D-130.

In Step 130, a final check is performed, in a current embodiment, to determine if any other notifications of interference have been received or "posted" as a message to be read by the present SOBR IBR, as an interference alert for example. An interference alert may take a number of forms including a broadcast signature control channel alert from another SOBR enabled IBR, or a check of a registry, server, IBMS, SOBR Agent, SNMP database, network management server, or the like in different embodiments. If it is determined an interference alert has been detected or received, processing proceeds to step 9D-120 as discussed above.

Alternatively, in the current embodiment and is not alert of interference is received, processing proceeds to step 9D-140 where the ME configures the radio entities, and begins (or causes the beginning of) the broadcasting of Alerts on the SCC. In the present embodiment, the Alerts are the signature control channel information. Further, the ME, in some embodiments, notifies IBR IBMS, or another IBR functional entity, which begins transmission to the peer IBR on the primary link.

In various embodiments, the term "primary" link refers to the information flow between the IBR MAC entities 512A, and may include backhaul payload information, and may utilize a plurality transmit information streams (primary link streams) from the IBR Modem 324A.

In some discussions, individual transmits streams of the primary link, may also referred to as the primary link or as primary link streams to distinguish them from the Signature Control Channel transmissions (SCC link and SCC streams). Further aspects associated with the composition of a primary link stream and a signature control channel stream are discussed below related to FIG. 10B and elsewhere.

Finally, in step 9D-140, during ongoing operation and in specific embodiments, the ME monitors for interference, and interference messages. If interference is detected from non-SOBR enabled IBR, appropriate interference mitigation or avoidance processes will be performed in some embodiments. As the transmitting interferer is not SOBR enabled, utilizing embodiments of the SOBR processes to coordinate with the transmitter is not possible. However in adapting parameters of the paired SOBR IBRS associated with the primary link, SOBR procedures may be followed so as to avoid creating interference to other SOBR devices as the present SOBR IBRs adapt respective transmission parameters.

The types of parameters which may be adapted are discussed herein, and include those associated with the ABS embodiments, including but not limited to frequency channels, transmit beam former parameters, selection of specific antennas, antenna elements, polarizations, power levels, modulations, automatic re-transmissions (ARQ) parameters, Hybrid ARQ parameters, Forward Error Correction (FEC), Modulation and Coding Selection (MCS), transmit or receive null steering settings, the selection and exclusion of specific spatial propagation paths, adjustment of so-called "water filling" settings associated with spatial multiplexing, channel transmission and reception timing, the adjustment of target bit or frame error rate, and the like.

In the case where other SOBR enabled radios are detected as causing the interference in step 9D-140, or in some embodiments during the Bloom Process of Step 9F-70/9D-90, cooperative interference mitigation techniques may be employed, also referred to as cooperative accommodation, and are discussed above.

In the case of the present SOBR IBRs changing transmission parameters, and in specific embodiments, when new transmission parameters are selected and prior to changing the transmission parameters associated with the primary link, additional signature control channel streams may be utilized with the new transmission parameters for a period of time so as to determine if the new parameters will cause interference to another SOBR enabled IBR. Such a determination may be based upon receiving a direct message or interference alert from the interfered with SOBR-enabled IBR.

If such a message is received, new alternative transmission parameters may be selected, or cooperative accommodation with the interfered with SOBR IBR may be employed until it is determined that transmission of the primary link with the resulting parameters will result in acceptable mutual performance. In some embodiments, the "changing" SOBR IBR will be required to sacrifice more performance in accommodation, or to accommodate "first" to attempt to prevent a cascading of transmission parameter adjustments from multiple SOBR IBRs across a regional area.

One approach for reducing the likelihood of such as cascading effect, is to require the "changing" or a new SOBR IBR being brought on-line (for example as described associated with FIG. 9D) to only request an interfered with, or a "would-be" interfering SOBR IBR to change parameters if all the "degrees of freedom" of the changing SOBR IBR have been exhausted.

In another embodiment, an indication of the available degrees of freedom, specific operating margins of utilized links and streams, channel propagation parameters, interference profiles, and operating requirements of a specific SOBR IBRs may be shared between SOBR IBRs, allowing for a determination of a reasonable solution for both SOBR IBRs.

Ideally in one embodiment, a cooperative accommodation utilizing shared parameters would allow for minimal impact to a currently operating SOBR IBR, and a "changing" SOBR IBR would propose a solution minimizing impact, but allowing acceptable operation for primary links of both SOBR-enabled IBRs. The "filter function" of the SOBR SPEF of FIG. 9C may be used to prevent the sharing of sensitive "inter carrier" information, as such as operating requirements, and remaining link margins, and other parameters including those described above, but allow for an ME SOBR Agent (or other entity) to make reasonable proposed solutions for cooperative accommodation between SOBR IBRs of different operators while retaining privacy. Such proposals, and negotiations may be made in various embodiments utilizing the Signature control Channel directly between SOBR enabled IBRs, or may be sent utilizing a SIP messaging and the SOBR SIP User agent. Other embodiments may use one or more SOBR servers and an intermediary.

Specific embodiments allow for purely anonymous cooperative accommodation between SOBR devices, where other embodiments allow for the sharing of detained information as discussion above. The decision as to share specific operating parameters and requirements is also the responsibility of the SOBR SPEF in some embodiments, while in other embodiments the capabilities of the SOB enabled IBR may be limited. In other embodiments, differing amounts of information may be shared between SOBR IBRs depending upon the rules determined in the SOBR "Rules function" (SOBRF), and may be based upon the relationship between the operators of the interacting SOBR IBRs.

Additionally, the information which is visible to the IBMS of a SOBR IBR may also depend upon such inter operator relationships. In some embodiments, the level of cooperation may be based upon an "accommodation equity" associated with past inter-operator or device-level accommodation. In some embodiments, the level of cooperation extended to other devices or operators depends upon an accommodation level received in return, or in some embodiments governed by agreements between the operators, or required by the SOBR certification process.

Specific agreements may be put in place between operators and allow for the sharing of specific operating parameters useful for cooperative accommodation, and the privacy of those parameters to the higher layers (IBMS for example). Associated with such agreements, the aforementioned SIM card may be used to determine the authenticity of one or more of:

the identity of the operator of a SOBR IBR,
    a valid agreement governing the sharing of information,
    the vendor of a SOBR IBR,
    and the valid certification of a SOBR IBR,
    or other aspects.

Such agreements may be registered with a third party who certifies the validity, or provisions the SIM cards with credentials. Such credentials may include IMSI, a subscriber authentication key (Ki), a cyphering key (Kc) private keys, shared keys, public keys, or Hashed values, Host passwords, SIP credentials (for example sip:user:password@host:port:uri-parameters?headers) or other credentials, and associated authentication server information.

It should be noted that the use of the term SIM is used generically in this context and in different embodiments may be an ISIM, USUM, GSM SIM, DOSIS Identity Module, or Secure Element, UICC, Smart Card, or the like. The SIM may further store the identity of the authentication servers of various operators, or third party authenticating servers, for use in performing authentication with other SOBR IBRs.

For example, in one embodiment, public keys for various authentication levels may be included. As another example, a cryptographic hash (MD5, SHA1, etc.) of a value from a private key with other information (a random value, an operator ID, a device serial number, a certification ID, etc.) may be received or sent via the SOBR SCC between IBRs, and the pubic key associated with a private key may be used to verify authenticity.

Likewise a public key may be used to hash a value so as to allow the receiving party to use a matching private key to decrypt and very a value (similar to RES, or XRES from 3GPP Standards). Such approaches are well known in the public key infrastructure, and RSA algorithms.

A SIM may further include information allowing for the establishment of IP-SEC, SSL (SSL certificates, X.509) and information related to certification authorities. In yet further embodiments, information in a SIM may include SOBRS addresses, SOBRS domain names, Access Point Names (APN), DNS addresses, server domain names, CSCF or IMS proxy addresses or domain names and the like useful in determining addresses and for establishing communications.

Figure 10A:
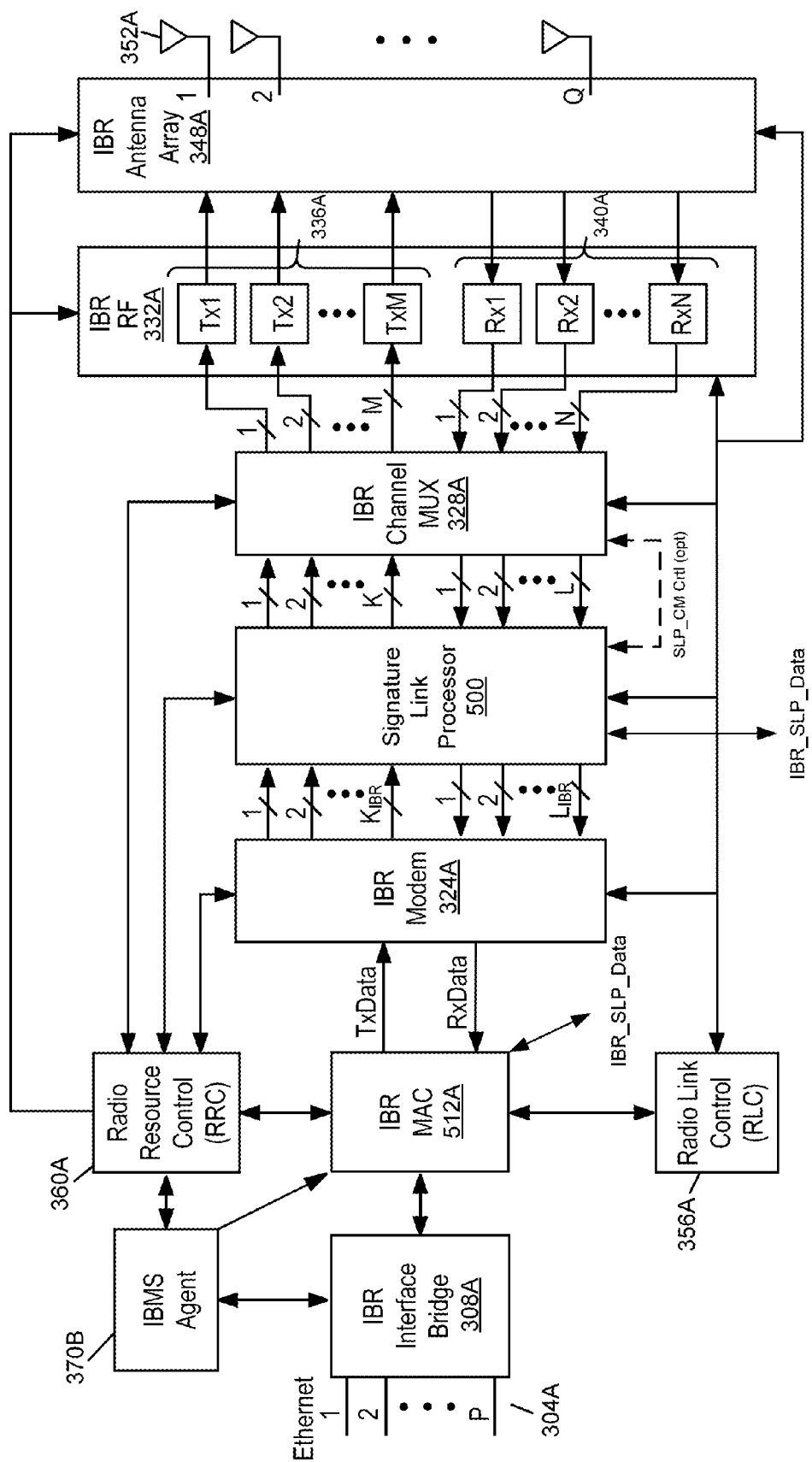
FIG. 10A is an exemplary block diagram of an SOBR enabled IBR including a Signature Link Processor (SLP).

FIG. 10A is an exemplary block diagram of an SOBR enabled IBR including a Signature Link Processor (SLP). FIG. 10A is, in specific embodiments, the same as FIG. 5A, with the exception that IBR Modem 324A provides $K_{IBR}$ streams to Signature Link Processor 500, and IBR Modem 324A receives $L_{IBR}$ streams from the Signature Link Processor 500. In some embodiments, where $K_{IBR}$ is equal to K, the functioning of the transmission path is similar to embodiments described associated with FIG. 5A. Likewise, in some embodiments, where $L_{IBR}$ is equal to L, the functioning of the reception path is similar to embodiments described associated with FIG. 5A.

However, in other embodiments, $L_{IBR}$ may be less than L, or $K_{IBR}$ may be less than K. In other embodiments both $K_{IBR}$ and $L_{IBR}$ both may be less then K and L respectively.

Figure 12A:
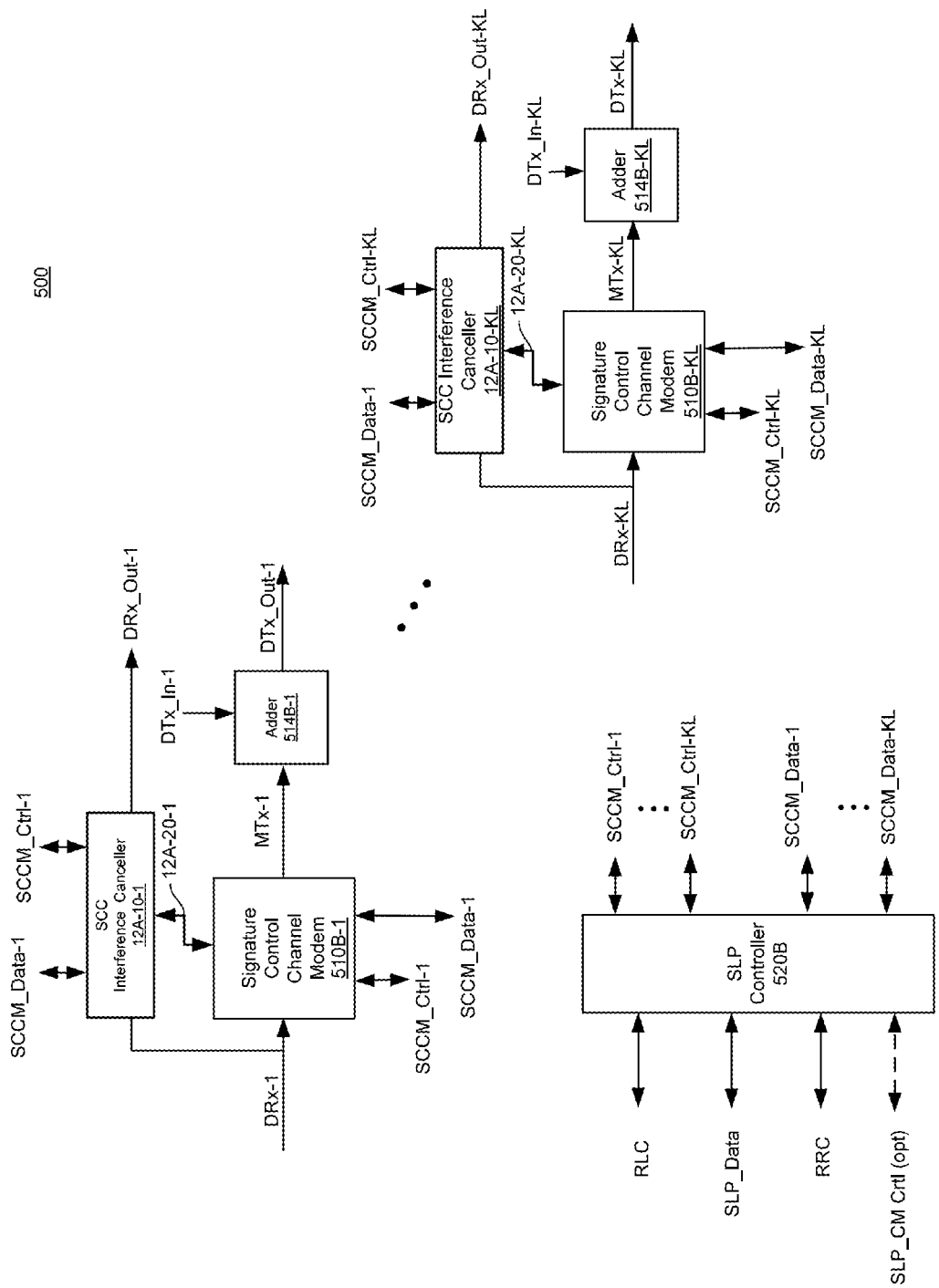
FIG. 12A is an exemplary block diagram of a Signature Link Processor (SLP) of a Self-Organizing Backhaul Radio (SOBR).

In embodiments where $L_{IBR}$ is less then L, dedicated SCC streams may be passed from the IBR Channel Mux 328A to the SLP 500 which are not associated with any primary link stream, and which are passed to a signature control channel modem (SCCM) of FIG. 12A, and not passed for processing to the IBR Modem 324A. Such SCCM streams are usable, in some embodiments during initial scanning associated with FIG. 9A, or for going scanning for interference. In further embodiments, such SCC streams, unrelated to a primary link stream may be usable for interaction with other SOBR enabled devices, including for example, receiving so-called direct messages. Such SCC "independent" streams may also be used associated with the "trying out" of candidate primary link and primary link stream parameters for both receive processing alone, or coordinated with a paired primary link SOBR-IBR. In embodiments, potential candidate transmission settings may be tried with an independent SCC stream (where K is greater than $K_{IBR}$) to test alternative transmission parameters prior to the adjustment of the primary link itself. In such an embodiment, the transmitting and paired SOBR-IBR may make transmission parameter adjustments to a transmitted SCC stream(s) not associated with a primary link (in embodiments where K is greater than $K_{IBR}$). As a result, both SOBR IBRS engaged in a primary link (or a further primary link) may determine if the candidate transmission and reception parameters cause interference to other SOBR-IBRS, and if those settings will be acceptable for the primary link operation. Such a determination may be made prior to the change of the transmission settings associate with an active primary link. The "tested" and acceptable parameters may then be applied to the primary streams of the primary link in some embodiments.

In some embodiments, there may be L and K physical or logical connections between the IBR Modem 324A and the Signature link processor 500, but with only $K_{IBR}$ and/or $L_{IBR}$ actually active, allowing for K-$K_{IBR}$ and/or L-$L_{IBR}$ streams for use with the SLP.

In some embodiments, parameters associated with the IBR Channel Mux weights are independently controlled for streams with only SCCs (e.g. no primary steams). Such control may be performed via coordination with the IBR RRC or IBR RLC and the SOBR ME or other SOBR entities. In alternative embodiments an optional SLP_CM Ctrl interface between the SLP 500 and the IB Channel Mux 328A may be used for such configuration.

In some embodiments, as an optional configuration and structural arrangement, the additional control interface (input and/or output) to the IBR Channel MUX (328A) (SLP CM Crtl) may be provided from the Signature Link Processor 500, for the conveyance of control information including but not limited to: timing information, channel weights, preamble detection information, frame or superframe timing information, start of frame or superframe triggers, end of frame or superframe triggers, signature detection information, SCCM payload data information (on a SCCM link or SCCM stream basis), channel estimates for one or more streams, and the like.

In one embodiment, the SLP_CM Ctrl interface provides input to control the channel weights utilized by the IBR Channel MUX (328A) for streams to be utilized exclusively by the SLP. In at least one embodiment, such control is initially received by the SLP 500, and then forwarded to the IBR Channel MUX. In other embodiments the IBR Channel Mux receives input from independent SCC stream via the optional interface, and the inputs related to combined stream(s) (those having Primary and SCC stream) via the RRC interface. Other embodiments utilize the RRC interface for all IBR Channel Mux inputs, wherein the RRC entity has received SCCM stream related IBR Channel Mux inputs from the SLP.

In such an embodiment, the SLP 500 provides control requirements to the IBR RRC, which then directly controls the IBR Channel MUX. In one embodiment the IBR channel MUX receives control inputs from both the IBR RRC, and the SLP 500 (as generated by the SLP RRC in one embodiment) and the IBR channel MUX provides the required weights for each stream based upon the inputs. Such control from the SLP (whether directly supplied, or indirectly via the IBR RRC) would, in some embodiments, utilize IBR control inputs for the $K_{IBR}$ and $L_{IBR}$ streams interfacing with the IBR Modem 324A, and utilize SLP 500 control (again, either directly or indirectly) for any streams without active IBR Modem related inputs or outputs. For example for the K-$K_{IBR}$ streams, by the SLP 500, and not associated with any IBR Modem generated streams (e.g. not embedded within a primary stream).

Likewise, as a further non-limiting example, related to the L-$L_{IBR}$ streams received by the SLP 500, and not associated with any IBR Modem generated streams (e.g. not embedded within a primary stream) the control information will provided between the SLP 500 and the IBR Channel Mux.

It should be noted that in cases where independent SCC streams are utilized by the IBR Channel Mux, independent timing (e.g. preamble synchronization, CP removal, pilot symbol removal, and frame/superframe timing, etc.) may be derived from the received SCC links, rather than the paired primary links for the independent streams. In some embodiments, the IBR Channel Mux may be capable of simultaneously synchronizing to different timings based upon the superframe preambles of "independent" and "not independent" SCC streams (e.g. those associated respectively associated with and not associated with primary links and paired with the current IBR).

The use of additional streams, not associated with IBR Modem streams may be useful in specific embodiments where communications to or from a IBR engaged in a primary link with a separate IBR is desired, or when no primary link or associated IBR Modem Streams are present at all, and it is desired to transmit SSC streams (not embedded) to other IBRs or to receive transmission form other IBR, not associated with the current IBR.

A more detailed description of FIG. 10A will now be provided; depicting an exemplary block diagram of a SOBR enabled IBR including a signature link processor. The functioning of the blocked diagram associated with FIG. 10A is largely similar in some embodiments to the functioning of the blocks associated with FIG. 5A with the exception that IBR Modem 324A provides $K_{IBR}$ streams to the Signature Link Processor 500 and receives $L_{IBR}$ streams from Signature Link Processor 500, as discussed above. It should be noted; however, that IBR Channel Mux 328A continues to provide L streams to IBR to Signature Link Processor 500 and receive K streams from the Signature Link Processor 500.

In such an embodiment when $K_{IBR}$ and K are not equal, specific streams may be added by the signature link processor which only contain signature control channels which may be directed with different transmit beam forming weights than those associated with the $K_{IBR}$ primary link streams received by the signature link processor. For the primary information streams, (primary link streams 1 through $K_{IBR}$) the processing within the signature link processor includes the addition of signature control channels, in some embodiments, such that 1 through $K_{IBR}$ primary links with embedded signature control channels are passed within the 1 to K streams to IBR Channel Mux 328A.

Any weighting and combination for transmit beam forming or other techniques that apply to the primary links also apply similarly to the signature control channels associated with those streams. Likewise, the 1 through L streams received at the signature link processor from IBR Channel Mux 328A will be comprised of 1 through $L_{IBR}$ primary links in some embodiments, where L is greater than $L_{IBR}$. Some SCC streams may be utilized for searching or receiving signature control channels associated with other IBRs and not associated with a primary link stream to which the instant SOBR enabled IBR is paired.

Additionally, IBR Channel Mux 328A as disclosed in U.S. patent application Ser. No. 13/212,036, now U.S. Pat. No. 8,238,318, and Ser. No. 13/536,927, the entireties of which are hereby incorporated by reference, performs the function of adding, in some embodiments, a preamble to the information stream prior to the transmission of information streams (1 through K) received by the IBR channel Mux. The IBR channel Mux 328A also removes the preamble within the 1 through L received streams. Further processing includes the insertion or removal of pilot symbols in some embodiments as well as other header information as required in the form of pilot training bits. As a result, in one embodiment no preamble or pilot bits (training or running pilot bits) are present from the signature link processor to the IBR channel Mux, where they are inserted then transmitted out the 1 through M transmit chains.

Likewise, on the receive side the 1 through N receive RF chains include, in at least one embodiment, a preamble (including pilot training bits as well as pilot running bits). The IBR channel Mux will then channel equalize based upon the detection of the preamble and drive frame (or super frame) timing that may be used for superframe, frame, block and symbol, even sample synchronization in embodiments. Such timing may be passed to the Signature Link Processor utilizing the radio link control (RLC), the radio resource control (RRC), or the optional SLP CM Crtl between the IBR channel Mux and the Signature Link Processor (as discussed above). The result of equalization and spatial de-multiplexing, preamble removal, and pilot bit removal, in the IBR Channel Mux, is passed as the 1 through L receive streams to the Signature Link Processor (where L may be larger than $L_{JBR}$). The Signature Link Processor may begin receiving Signature Control Channel information from any desired Signature Control Channel links based upon the detection of the preambles and the derived timing of the superframe, and individual symbols within the superframe, achieved by the IBR Channel Mux. Such timing in some embodiments is communicated to the Signature Link Processor 500. In SOBR enabled IBR devices, the detection of a preamble may be used for equalization within the IBR channel Mux as well as to derive timing that is passed to the Signature Link Processor, such that synchronization and timing does not need to be derived solely on its own using the processing and simplifying the architecture, relative to embodiments disclosed in ABS embodiments.

In some embodiments where streams only including signature control channels are received (e.g. where L is greater than $L_{JBR}$), some embodiments may utilize an independent preamble detection, equalization and pilot symbol removal separate from that of the primary link preamble detection synchronization and pilot removal. In other embodiments, no preamble detection may be performed for "SCC only" streams and link. For SCC only reception not utilizing preamble detection, the detention and synchronization must be performed within the signature link processor in manner similar to that described associated with the ABS signature link processor embodiments or other embodiments as described in SOBR.

In embodiments where synchronization is not performed for SCC only reception streams by the IBR channel Mux, the preamble removal and pilot symbol removal as well as cyclic prefix removal may not be performed, and as a result, the sequence used to perform correlations within the signature link processor (e.g. the code segments or correlation codes) must account for the cyclic prefix and inserted pilot bits in specific embodiments. Such embodiments may simply modify the signature codes to include a cyclically shifted version such that correlation is possible. However, as described previously, embodiments of the IBR Channel Mux may perform the detection of the preamble, independently of the detection of preambles for the primary links associated with embedded SCC channels. In such embodiments, the superframe timing, preamble removal, CP removal and pilot symbol removal may be performed by the specific embodiments of the IBR Channel Mux for both SCC only streams and for embedded SCC streams, but with potentially asynchronous, or synchronous but offset timing as examples.

Figure 10B:
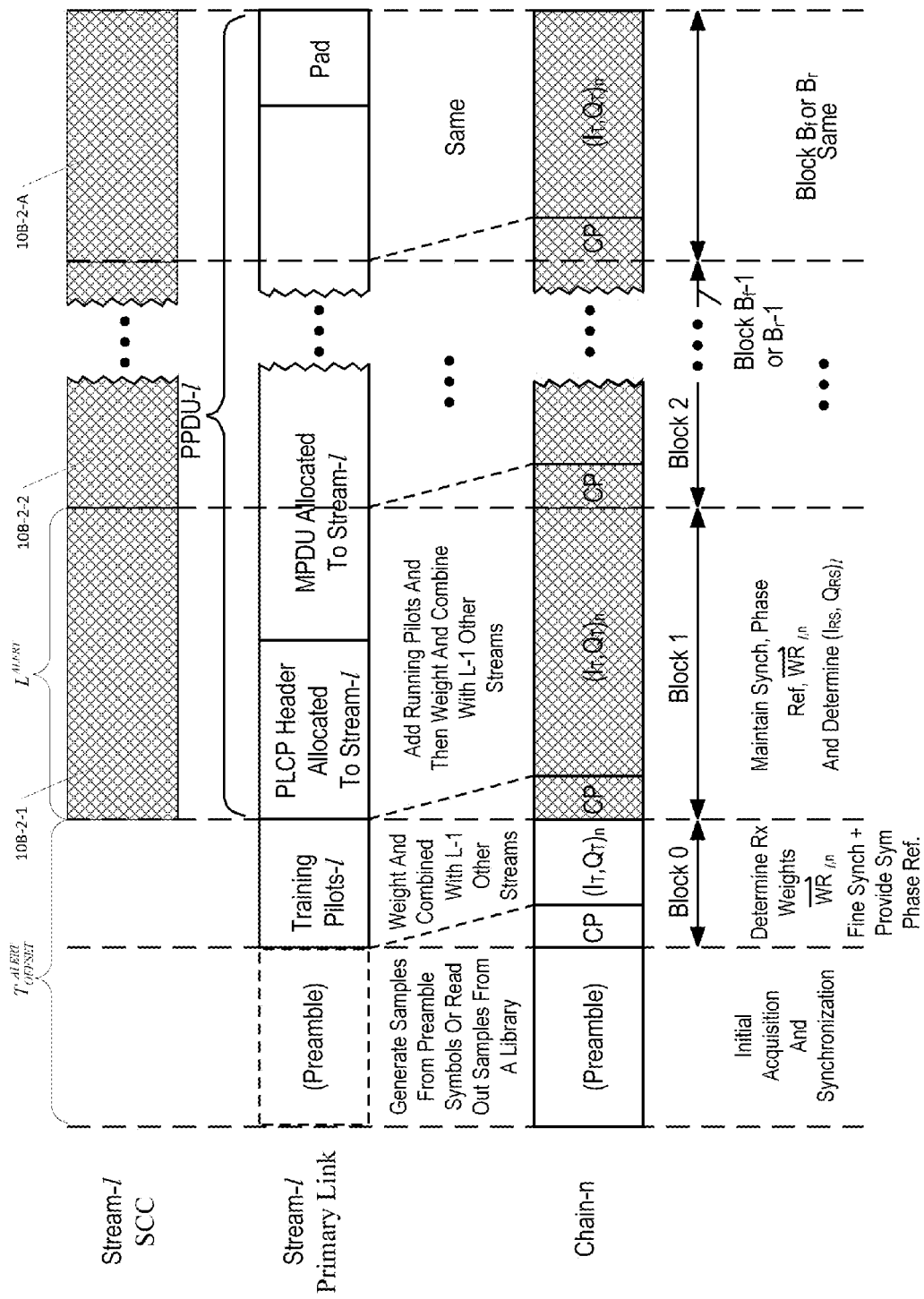
FIG. 10B is a timing diagram illustrating processing of Signature Control Channel and PPDU-1 with Tx-path and Rx-path of respective IBR channel MUXs according to one embodiment of the invention.

FIG. 10B is a timing diagram illustrating processing of Signature Control Channel and PPDU-1 with Tx-path and Rx-path of respective IBR channel MUXs according to one embodiment of the invention.

Referring now to FIG. 10B, a timing diagram illustrating processing of Signature Control Channel and PHY protocol data unit for stream 1 (PPDU-1) with TX path and RX path of respective IBR channel multiplexors, according to one embodiment of the invention is depicted. The top row of the FIG. 10B depicts a Signature Control Channel sequence of alerts for Steam-1. The second row of the figures depicts a transmit "superframe" for Stream-1 for the primary link (a primary link stream). As discussed associated with FIG. 26 of the "IBR Patent", U.S. patent application Ser. No. 13/212, 036, now U.S. Pat. No. 8,238,318, incorporated herein by reference, the Stream-1 (in this embodiment a primary link stream) is processed by the IBR Channel Mux to add a Preamble, training pilots, to the PPDU for Stream-1. Additionally, cyclic prefixes (CPs) are added to segmented portions of the stream (including in some embodiments the training pilots), are referred to as "blocks". Such blocks are useful in physical layer processing during demodulation so to allow for frequency domain equalization prior to demodulation in specific embodiments using specific types of modulations. Two such modulation formats for the IBR are (1) Orthogonal Frequency Division Multiplexing (OFDM) and (2) Single-Carrier Frequency Domain Equalization (SC-FDE). Both modulation formats are well known, share common implementation elements, and have various advantages and disadvantages relative to each other.

As discussed associated with ABS embodiments, and SOBR embodiments, the Signature Link Processor 500 in some embodiments linearly combines PPDU-1 with the Stream-1 Signature Control Channel blocks. It will be noted in one embodiment, the "composite" Stream-1 begins with a preamble and optional training pilot bits. However, the Stream-1 Signature Control Channel does not begin until after the preamble and training pilots have completed. In specific embodiments, the combination of the symbols of the SCC stream with the symbols of the PPDU-1 stream offers in the SLP 500, prior to the processing of the composite Stream-1 processing of the IBR channel Mux 328A, where the preamble addition and related processing occur. It is additionally advantageous for the SCC stream symbols to not be including in the preamble of the transmitted superframe as the preamble and optionally the training pilot symbols are used for receive processing. In such embodiments, the quality of the preamble and the training pilot symbols (if present) are critical for performing detection, and channel estimation, used associated with receive processing. As the presence of the SCC stream symbols in preamble and training pilot symbols degrades the signal to noise ration (SNR) of the received preamble and training pilot symbols (initial superframe reference symbols). Such degradation will reduce the estimates of these initial superframe reference symbols, and potentially result in degradation in the performance of the recovery and demodulation of the primary link stream symbols. It is also important to note that in some embodiments of the SCC stream level cancellation from the primary link streams discussed herein, there is a dependence upon the detection and channel estimation derived from the initial superframe reference symbols. As a result, in some embodiments, avoiding the requirement for cancellation during these initial superframe reference symbols simplifies the implementation and improves the reliability of the resulting cancellation and demodulation performance.

In other embodiments, the signature control channel may begin after the preamble but before the training pilots while yet in other embodiments the signature control channel may begin right away and at the same time of the preamble.

The delay in time between the beginning of the preamble and the beginning of the Signature Control Channel sequences (Alerts in the current embodiment) is referred to as $T_{OFFSET}^{ALERT}$. The length of a particular transmitted alert in this embodiment is $L^{ALERT}$ where the first transmitted signature is labeled 10B-2-1, the second signature 10B-2-2, and the last signature prior to the transmission of another preamble of the next superframe is 10B-2-A. (e.g. the transmitted signatures are labeled 10B-2-(1 through A)). The primary link for Stream-1, again, consists of a preamble followed by training pilots. The training pilots are utilized by the receiver for separating spatial streams as well as equalization of the received stream with frequency.

The preamble is followed by a series of symbols comprising the PHY Protocol Data Unit PPDU for Stream-1 that is comprised of a PHY Layer Convergence Protocol header (PLCP) allocated to Stream-1 and then one or more MAC Protocol Data Units (MPDUs), or a fragment thereof within a given superframe.

To generate the preamble, the IBR Channel Multiplexor, in one embodiment, generates samples from a sample library or other methods known in the art. Then, the training pilots are processed so as to add a cyclic prefix (as a training block). Each subsequent block is a fixed duration of transmit symbols in some embodiments, and are processed to add the CP as well.

For a specific transmit RF chain, the IBR channel multiplexor will "weight" (or multiply in some embodiments) a copy of each transmit stream (independent SCC streams, composite streams with SCC stream and PPDU stream symbols, and in some embodiments only PPDU stream symbols) with the appropriate transmission weights and combine them together as a transmit chain input signal. The combined and weighted streams (transmit chain input signals) are coupled to transmit RF chains and convert to a plurality of respective transmit RF signals.

The streams that are combined into transmit chain input signals will include, in specific embodiments, composite streams including primary links for Stream-1, combined with Stream-1 Signature Control Channels. As mentioned above, the composite stream therefore each receive a common transmit weighting.

Additionally, Signature Control Channels not associated with a primary link will receive transmit weighting and be combined with other transmit streams to produce the individual transmit chain input signals.

On the receive side, each RF chain will receive an receive RF signals and provide a respective receive chain output signal to the IBR channel multiplexor (including a frequency selective receive path channel multiplexer in embodiments) which will perform detection of the preambles associated with each stream and perform synchronization.

The synchronization will allow the timing to be resolved such that individual blocks may be determined, cyclic prefixes may be removed, receive weights may be applied, and fine synchronization may be improved as well as determining phase reference signals. The result will be individual receive streams output from the IBR channel multiplexor into the Signature Link Processor.

Again, some of those output streams numbered 1 through L will include, in some embodiments, primary links in summation with Signature Control Channel stream symbols, and potentially Signature Control Channel only streams.

In specific embodiments, it is possible that the same Signature Control Channel information may be utilized on all streams, or it may be that only one primary link may be associated with a signature control channel and specific primary link streams may not include the addition of a signature control channel within the signature link processor of a paired IBR.

It is important to note that the signature control channels associated with 1 through K streams, being received by the IBR Channel Mux, in some embodiments, will not have a preamble associated with it, training pilots, or CPs as thy were removed within the IBR Channel Mux 328A. Further, specific embodiments will not have running pilots, which are added to the 1 through L streams associated with both Signature Control Channel only streams as well as composite Signature Control Channel and primary link streams in summation for each stream. Likewise, when receiving, the IBR channel Mux will remove the preamble training pilots and running pilots as well as cyclic prefixes leaving only the signature control channel streams in summation with primary link streams.

Figure 11A:
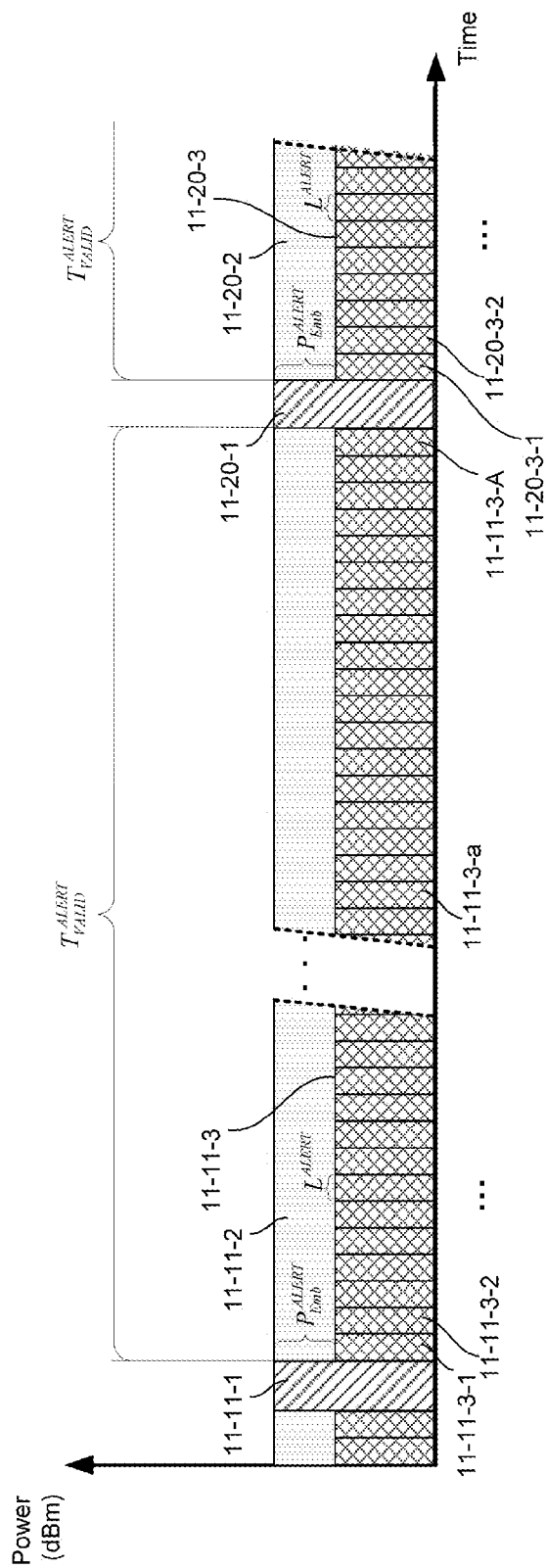
FIG. 11A is an illustration of an exemplary Self Organizing Backhaul Radio (SOBR) compliant signal including an in-band and embedded signature signal (Signature Control Channel (SCC)).

Referring now to FIG. 11A, an illustration of an exemplary self-organizing back call radio compliant signal including an in-band and embedded Signature Control Channel (SCC)) signal is depicted. The signal in one embodiment is comprise of a single SCC stream, whereas in other embodiments it may be the combined streams of a signal SCC link.

Signal 11-11-1 is the preamble of a first super frame, as discussed previously associated with FIG. 10B, and in one embodiment is equal in length to a single block time (for example, 20 microseconds). 11-11-1 may represent a single stream's preamble, or the combination of collective stream's preambles in other embodiments. In some embodiments, the preamble may comprise a Zadoff-Chu code as is used in the LTE standards of 3GPP. Such Zadoff-Chu codes may act as synchronization codes, as well as pilot symbols usable for the separation and training of the received spatial multiplexor and frequency equalization (for example for use with a frequency selective receive path channel multiplexer).

In other embodiments, pilot training symbols may follow the preamble(s) and utilize any number of spatial multiplexing techniques such as Walsh codes as used in 802.11 in standards.

The collective transmitted signatures or alerts in FIG. 11A comprising a first super frame are labeled 11-11-3, whereas the primary link symbols associated with at least one primary link stream are collectively labeled 11-11-2.

In an embodiment having a single "composite" stream, the individual transmitted signatures within 11-11-3 are labeled 11-11-3-1 through 11-11-3-A. An arbitrarily referenced transmit signature is labeled 11-11-3-$a$. The time when the transmitted alerts are valid beginning with 11-11-3-1 through 11-11-3-A is referred to as $T_{VALID}^{ALERT}$. The ratio of the transmitted power of the primary link symbols to the individual transmitted signatures is referred to as $P_{Emb}^{ALERT}$. The duration of an individual transmitted alert is equal to the length of a signature in a current embodiment, and this duration is referred to as $L^{ALERT}$.

As one example of a primary link having a radio frequency spectrum bandwidth of 40 MHz, each primary link stream symbol, in some embodiments, would be 25 ns in duration when utilizing a single carrier modulated signal such as SC-FDE. For a system having a fixed size block of 512 payload symbols, and a roughly 10% cyclic prefix, each block would include 512+52=564 symbols, which would result in an exemplary block duration of 14.1 us. In the current embodiment, the preamble would also be of this same duration, thought there is no requirement for this, and other embodiments may include preambles of durations that differ from the duration of the transmission blocks.

As, in the current embodiments, the preamble is comprised of a Zadoff-Chu (ZC), a sequence comprised of 564 ZC symbols in duration may be utilized, so as to match the duration of the fixed transmission block size in the current embodiment. As ZC codes generally are of a length different from a a particular block size. Therefore, a ZC code of a shorter length and in some embodiments of a prime number in length, cyclically extended to the desired duration (or number of symbols) may be utilized as the preamble sequence in some embodiments. Such an approach is used in the LTE standard for example.

Such a sequence may further be used as the specific signature sequence in the current embodiments. In some embodiments, a cyclically shifted, then cyclically extended version of the same ZC "base" code sequence may be used for each preamble, as well as for the signature sequences, with each sequence being orthogonal to the other sequences utilized for other SCC streams.

In one embodiment, the preamble sequence may be of one type of code, where the alter sequence may be of differing codes. For example, the preambles and the alert sequences may be of differing root SC code sequences in one embodiment. In other embodiments, the preamble may be of a ZC code family, where the alter codes may be of so-called Maximal Length PN codes, Gold codes, Barker Sequences, or other codes as known in the industry.

For a Signature Control Channel comprised of a transmitted spread spectrum signal utilizing direct sequence spread spectrum, the chipping rate for the period of one individual chip of an alert sequence would have the same time duration of 25 nanoseconds, in the forgoing example. As a result the transmit symbol rate and the chip rate would be equal in one embodiment. Thus, the processing gain associated with correlation of an individual alert (excluding the CP) would be equal to $10*\log_{10}(L^{ALERT})$ or $10*\log_{10}(512)$ which is equal to roughly 27 dB in gain in the current embodiment. For example, an individual primary stream being transmitted at 0 dBm and a signature control channel of the same composite stream being transmitted at −10 dBm, following correlation by the signature link processor would result in a Signature Control Channel Es/Nt (Energy of a Symbol relative to the energy of the interference) of 17 dB.

Such an SNR (or Es/Nt) is reasonable for the detection of the signature control channel utilizing BPSK, QPSK, or possibly higher order modulations. However, in receiving the primary stream, the primary link signal would be at 10 dB SNR, which is insufficient for higher performance modulation and coding selection levels, and therefore may also damage the reception of the primary link.

In order to improve the SNR of the primary streams, as will be discussed subsequently, a novel interference cancellation technique may be utilized to effectively remove the presence of the Signature Control Channel streams from the primary link streams. Additional detail and discussion of the processing gain related to a Signature Control Channel may be found in forgoing discussions.

Figure 11B:
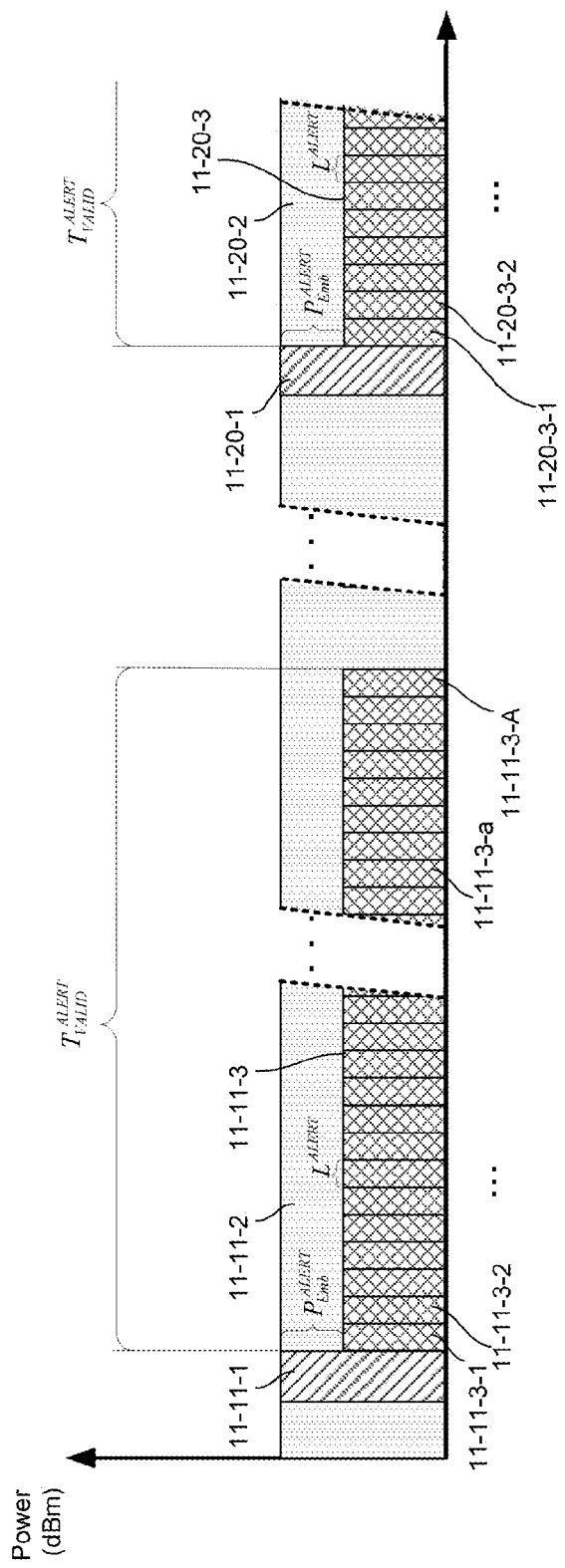
FIG. 11B is an illustration of an alternative exemplary Self Organizing Backhaul Radio (SOBR) compliant signal including an in-band and embedded signature signal (Signature Control Channel (SCC)).

FIG. 11B is an illustration of an alternative exemplary Self Organizing Backhaul Radio (SOBR) compliant signal including an in-band and embedded signature signal (Signature Control Channel (SCC)).

FIG. 11B is similar to FIG. 11A except that the $T_{VALID}^{ALERT}$ time duration ends prior to the arrival of the next transmitted primary link preamble. As can be seen in the figure, Signature 11-11-3-A is not adjacent to Preamble 11-20-1. Therefore, it is contemplated that some embodiments may have limited time durations of the SCC sequences per superframe, (e.g. $T_{VALID}^{ALERT}$ termination times prior to the super frame duration). It should also be noted associated with both FIGS. 11A and B as well as FIG. 11C that no signature sequences are present during the preamble transmission periods in the current embodiment.

Figure 11C:
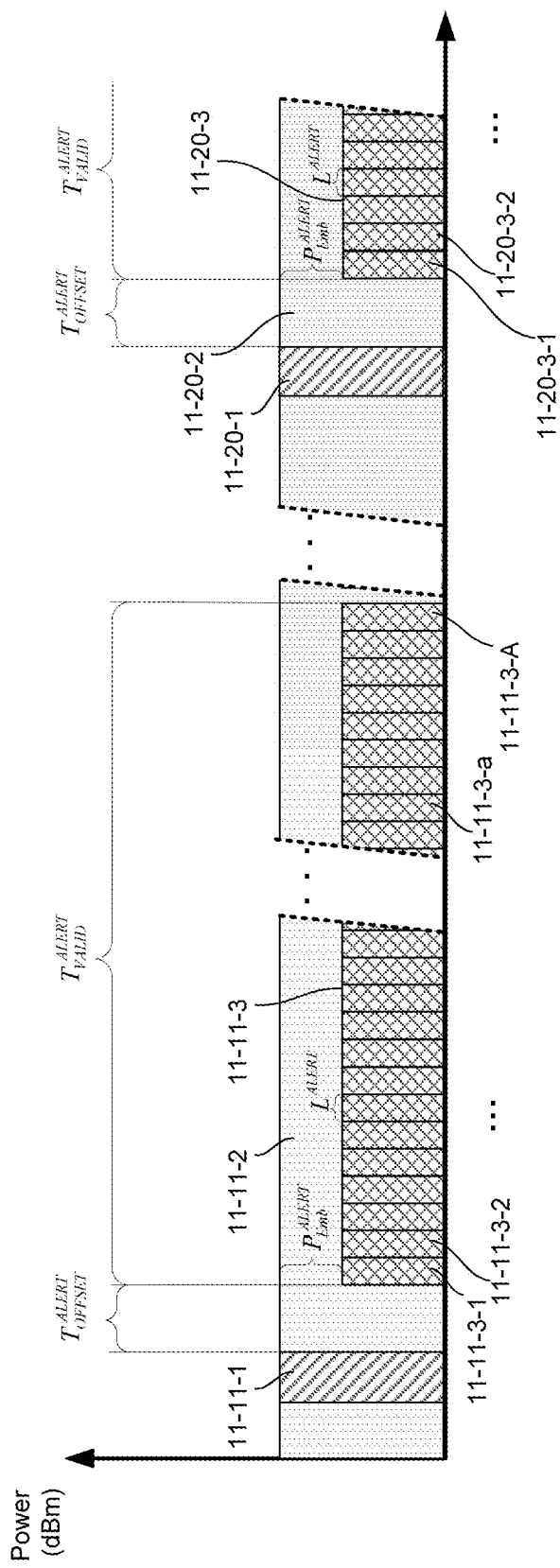
FIG. 11C is an illustration of a further exemplary Self Organizing Backhaul Radio (SOBR) compliant signal including an in-band and embedded signature signal (Signature Control Channel (SCC)).

FIG. 11C is an illustration of a further exemplary Self Organizing Backhaul Radio (SOBR) compliant signal including an in-band and embedded signature signal (Signature Control Channel (SCC)). Referring now to FIG. 11C, the first transmitted signature 11-11-3 associated with the $T_{VALID}^{ALERT}$ period is not adjacent to Preamble 11-11-1 as was the case with FIGS. 11A and 11B. A set value of $T_{OFFSET}^{ALERT}$ delay between the preamble and the first transmitted signature is present. In the current embodiment, the $T_{VALID}^{ALERT}$ period also terminates prior to the end of the primary link super frame. Therefore time periods before and after $T_{VALID}^{ALERT}$ exists during the superframe with valid primary link stream symbols, but with transmitted alerts.

Figure 11D:
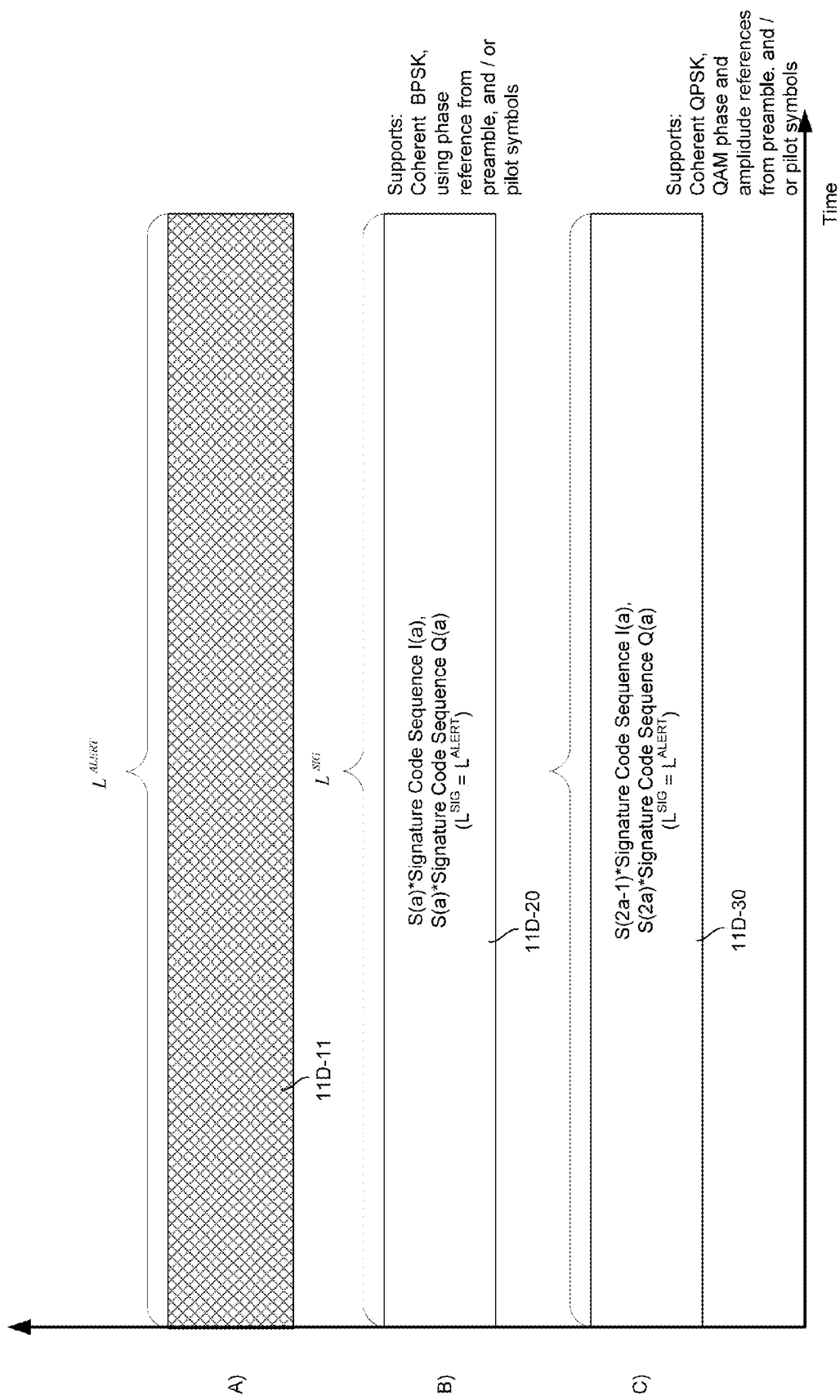
FIG. 11D is an illustration of exemplary embodiments of Self Organizing Backhaul Radio (SOBR) compliant signals of various structures.

Referring now to FIG. 11D, an illustration of an exemplary embodiment of self-organizing backhaul radio compliant signals of various structure are depicted. For an individual transmitted alert, in the current embodiment, the length of a signature is equal to the length of an alert as depicted in the present figure. The SCC sequence 11D-11 is labeled as having a duration of $L^{ALERT}$. Additionally the length of the signature sequence is also $L^{ALERT}$, and is equal to $L^{SIG}$, in contrast to some previously disclosed ABS embodiments.

Because equalization and a phase reference may be derived from the IBR channel multiplexor (form the preamble for example in some embodiments) the superframe timing synchronization information as well as phase references may be passed to the signature link processor. Such information may be utilized to support coherent BPSK using the phase reference from the preamble and/or pilot symbols derived within the IBR channel multiplexor. In such an example, depicted as 11D-20, the same information bit would be used to modulate the phase on both the in phase and quadrature sequences as is the case with BPSK.

The same signature code sequence may be used for an in phase code and a quadrature phase code, or different ones may be utilized depending upon specific implementations on various embodiments. Referring to signature sequences associated with 11D-30, such a structure supports coherent QPSK. In this embodiment, the demodulators within the SCCMs may use phase and amplitude references derived from the preamble and/or pilot symbols determined (in one embodiment) by the IBR channel mux and passed to the signature link processor. The same or different signature code sequences may be used on the in-phase and quadrature signals. The resulting symbols, of which there is one per alter in the current embodiment, may have various amplitudes and be mapped into a constellation supporting QPSK or QAM. Such an implementation where a phase, amplitude and/or timing references are derived from the primarily link preambles allows for a simpler implementation of the signature link processor and a more efficient modulation scheme in some applications.

It should be further noted that the in some embodiments of the SCC, a "format" field may be inserted as the first byte (as an example) indicating the length of the $T_{VALID}^{ALERT}$ symbols (e.g. sequences and blocks in the current embodiment). The first format field may be of a known modulation, and additionally indication the modulation used in subsequent symbols in some embodiments, and even FEC coding of the information carried by the SCC link or stream in other embodiments.

FIG. 12A is an exemplary block diagram of a Signature Link Processor (SLP) of a Self-Organizing Backhaul Radio (SOBR).

In one embodiment of the present invention, wherein the SCC streams are cancelled form the primary link streams, MAC frames may be sent from the ME entity of one IBR to the peer ME entity of another paired SOBR IBR entity containing the next, or a future SCC link data superframe for use in canceling such data and the sequences cancelling such data from the primary link streams to be received at a later time. Such SOBR MAC frame data may be transferred via the primary link for use in cancellation related to the SCC streams, prior to the arrival of the SCC stream to be removed. Such a cancellation process allows, in some embodiments, for an improved performance of the primary link streams.

In one such embodiment, the SLP 500 receives "IBR_SLP_Data" prior to reception of the signature sequences of a future superframe, based upon MAC 512A providing the known and "to be transmitted" sequence to the SLP 500 for use in the receive cancellation process.

In some embodiments where the sequences, and/or associated payload are not known to the public, and for example, continually changing, the presence of SCC streams may act as a physical layer security mechanism. Such a mechanism in some embodiments may reduce the SNR of the primary link stream to a point where the information is not retrievable within additional and potentially difficult processing. As a result, the presence of a SCC link may act as a physical layer security approach, in some embodiments.

Also, as mentioned, in one embodiment, there may be a set of known superframe formats, which would allow for blind detection of other (non-paired) superframes. Such an approach may also include a "signal" field (for example 2 bytes) defining a protocol version number, and a format ID indicting the overall format for the SCC data, and associated streams. A similar approach was discussed associated with embodiments of the SCC frame formats in ABS embodiments.

Referring now to FIG. 12A, the blocks of this figure are similar to those of FIG. 5B with some notable exceptions. An additional Block 12A-10-1 has been added to the Signature Control Channel Modem 5-10-B-1 and likewise for each individual stream SCCM through 12A-10-K-L.

The additional blocks 12A-10-1 through 12-10-K-L are Signature Control Channel interference cancelers. The purpose, in one embodiment of these cancelers, is to subtract the signature control channel modulated information from the receive primary streams outputting a stream which only includes a primary link stream.

For example, Interference Canceler 12A-10-1 would output receive Stream-1, whereas Interference Canceler 12A-10-K-L would output receive stream DRX-Out-KL.

It is notable that one purpose, in specific embodiments of the SOBR IBR radios, is to alert other radios as to which SOBR radio (and potentially streams of those radios) is interfering. The Signature Control Channels will allow such identification in specific embodiments. As a result, the information carried on the Signature Control Channel between two paired SOBR IBRs during normal operation is not useful, in specific embodiments, to the receiving paired SOBR IBR. This is because the primary link between the paired IBRs may be used to communicate MAC-level information both between SOBR and ME entities as well as IBR agents. Because of this, a transmitting SOBR IBR may communicate the planned Signature Control Channel information to the receiving paired SOBR IBR over its primary link prior to the transmission of that same information on the Signature Control Channel. As a result, the SCC may be used to advertise/broadcast information (or send directed messages) to the unpaired SOBR IBRs.

Embodiments allow for the Signature Control Channel interference canceler 12A-10-1 to be aware of the data bits associated with a received super frame prior to the need to cancel the Signature Control Channel modulated signatures associated with that super frame. Therefore, one novel aspect of embodiments of the SOBR IBR is pre-communicating information over a primary link from a transmitting IBR to the receiving IBR prior to that transmission of the same information on the Signature Control Channel. Such embodiments allow for the receiving IBR to use the known data sequence, and known signature sequences together in the cancellation process within the Signature Link Processor 500.

Figure 12B:
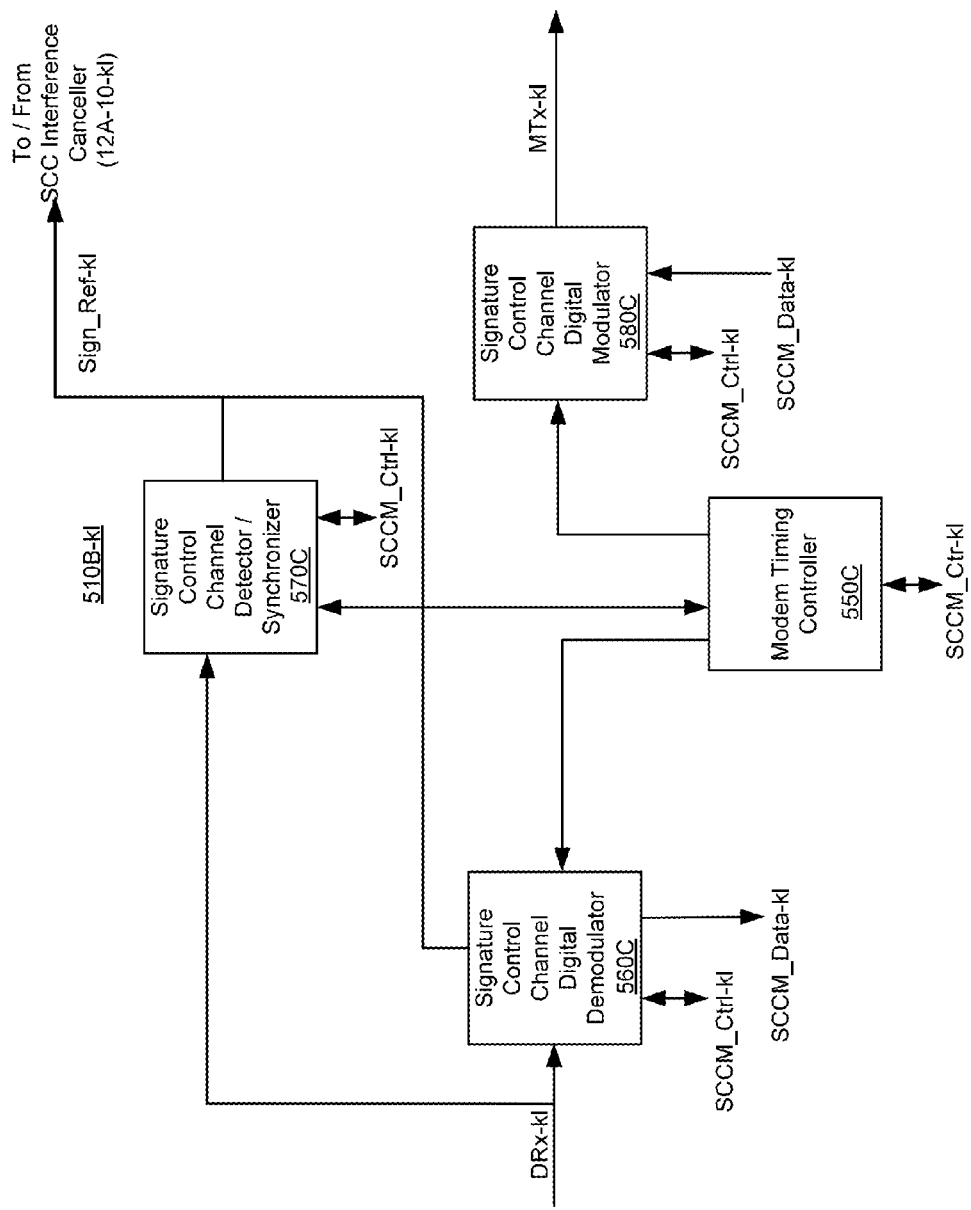
FIG. 12B is an exemplary block diagram of a signature control channel modem of a Self-Organizing Backhaul Radio (SOBR).

FIG. 12B is an exemplary block diagram of a Signature Control Channel Modem of a Self Organizing Backhaul Radio (SOBR).

Referring now to FIG. 12B, the blocks are similar to implementations and various embodiments associated with FIG. 5C, with at least one exception that information from the Signature Control Channel Detector, Synchronizer 570C and/or information from signature control channel digital demodulator are passed (Sign REF-kl) to the signature control channel inference canceler in one embodiment. While in other embodiments, no such information is required to be passed, only requiring the DRx-kl receive stream. The use of the predetermined SCC information and the use of synchronization to the preamble of a superframe eliminates the need, in some embodiments, for the use of the Sign_Ref-kl signal.

Additionally and yet in other embodiments, Modem Timing Controller 550C passes control information to the signature control channel interference canceler including superframe timing, phase and amplitude references, and other information required for cancellation of the signature control channel from a current primary link stream.

Figure 12C:
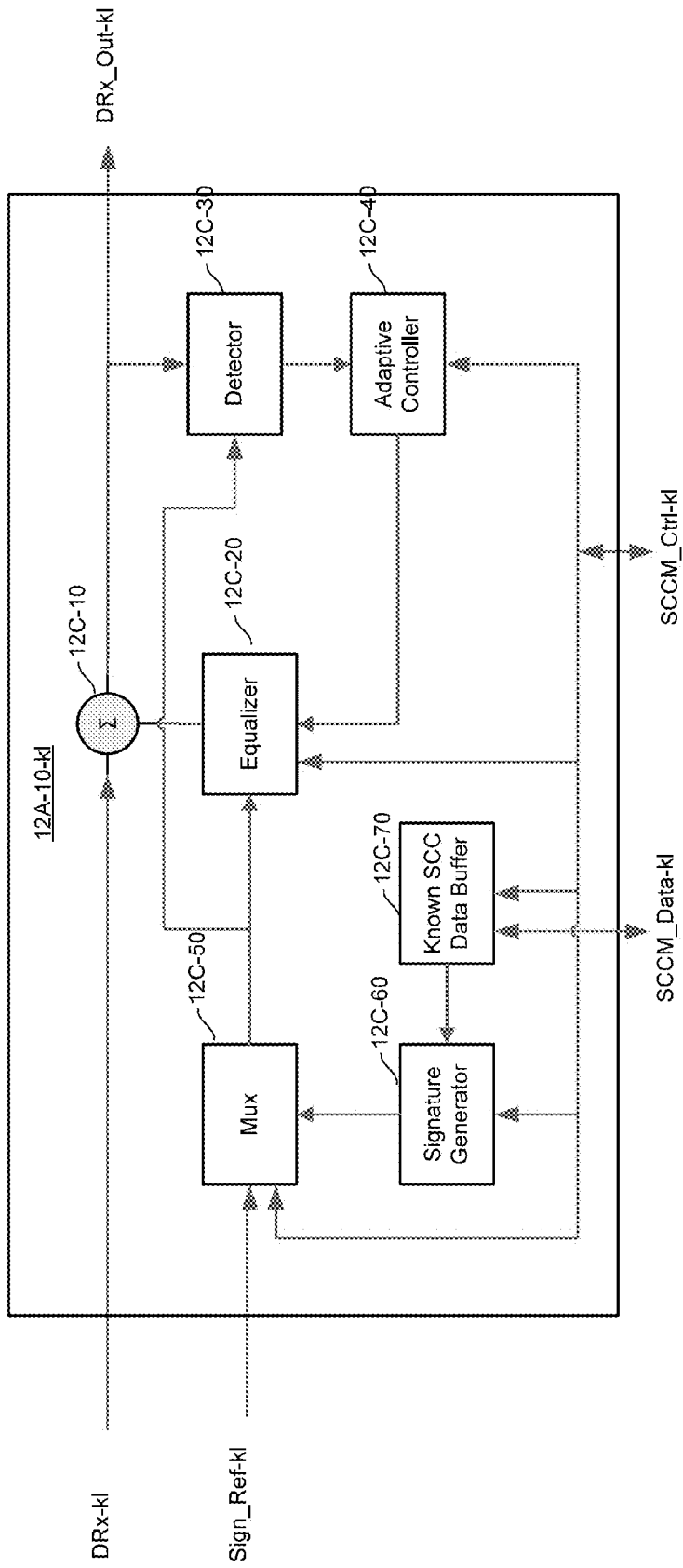
FIG. 12C is an alternative exemplary block diagram of a Signature Control Channel (SCC) Interference Canceller of a Self-Organizing Backhaul Radio (SOBR).

FIG. 12C is an exemplary block diagram of a Signature Control Channel (SCC) Interference Canceller of a Self-Organizing Backhaul Radio (SOBR).

Referring now to FIG. 12C, an embodiment of the signature control channel interference canceler is depicted. The receive data stream DRx-kl is passed to Canceler combiner 12C-10 which may be implemented as a summer or in other embodiments as a subtractor while in other embodiments may be another form of combiner which outputs DRx OUT-kl.

The data to be cancelled is passed to the known signature control channel Buffer 12C-60 over the SCCM_Data-kl. The signature Generator 12C-60 receives the known data bits and modulates the generated signatures so as to match the incoming equalized symbol stream. The reference signature sequence symbol stream is then passed to a Multiplexor 12C-50. Multiplexor 12C-50 may derive the cancellation signal of combined signatures with known data from either the signature Generator 12C-60 or from Sign Ref-kl which was derived through direct detection and demodulation means as depicted within FIG. 12B.

In one embodiment Equalizer 12C-20 is an adapted equalizer matching the cancellation weights allowing for the cancellation of the signature control channel from Combiner 12C-10. Detector 12C-30 monitors the presence of remaining signature control channel symbols, and passes such information to adaptive Controller 12C-40 which then adapts Equalizer 12C-20 so as to increase the cancellation of the signature control channel symbol stream from the primary link stream.

While in other embodiments, the equalizer may be used only partially or not used at all. In embodiments, when the primary link is equalized in the IBR channel multiplexer 328A, so too is the signature control channel equalized accordingly. The equalizer 12C-20 may then be a set value in time or frequency.

In such an embodiment, it may not be necessary to adapt the equalizer 12C-20 at all, or the equalizer may be adaptive at its lower rate than would otherwise be possible.

SCCM_CTRL-kl is the signature control modem control and is utilized to communicate equalization, timing, and other information from the SLP Controller 520 which may derive such superframe timing, symbol timing, sample timing, equalization, and other aspects including phase and amplitude references from the RRC interface, the RLC interface or the SLP_CM control optional interface in some embodiments.

Figure 12D:
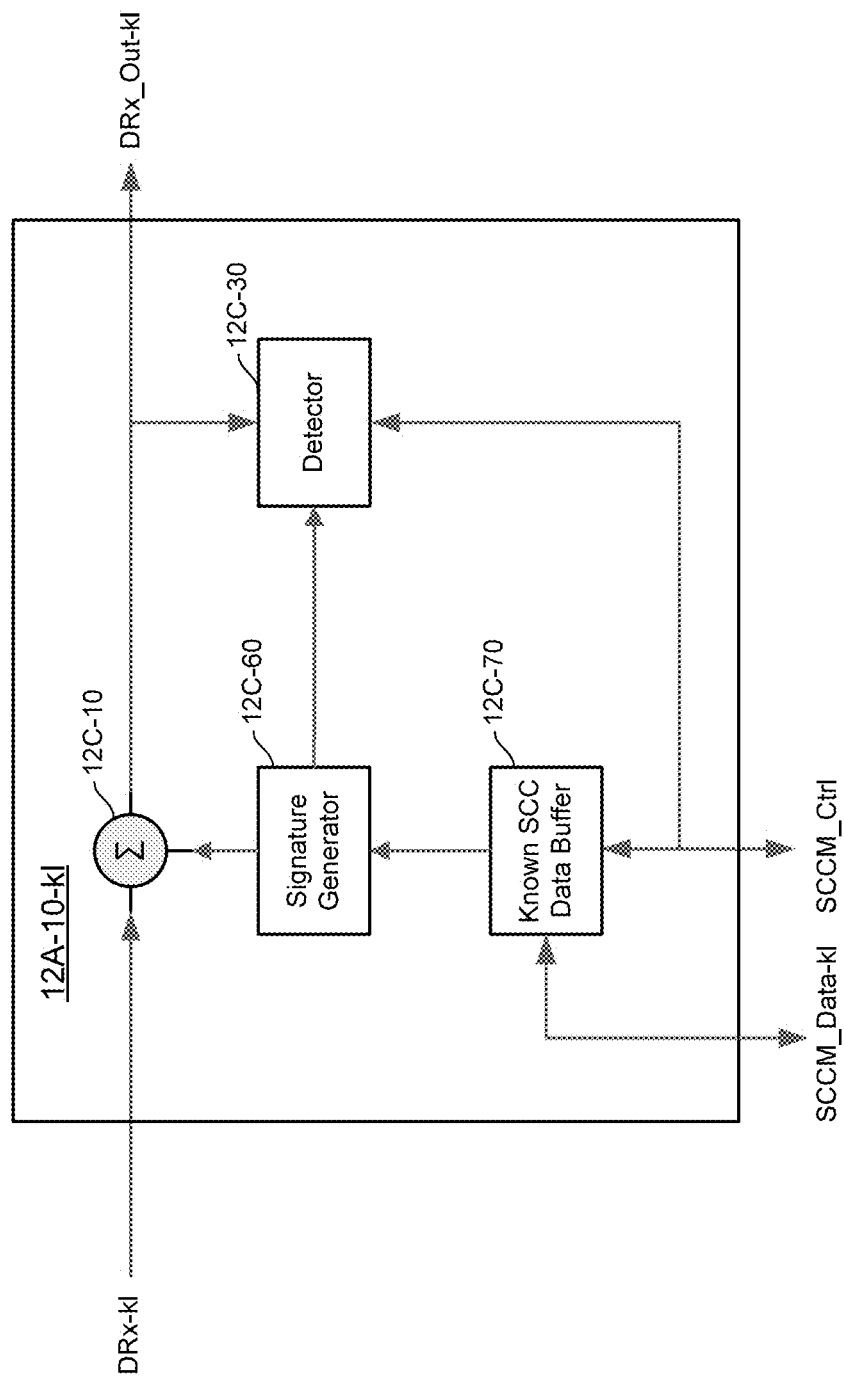
FIG. 12D is a further alternative exemplary block diagram of a Signature Control Channel (SCC) Interference Canceller of a Self-Organizing Backhaul Radio (SOBR).

FIG. 12D is an exemplary block diagram of a Signature Control Channel (SCC) Interference Canceller of a Self Organizing Backhaul Radio (SOBR).

Referring now to FIG. 12D, an alternative embodiment of a signature control channel interference canceller is depicted. 12B-10-*kl* shows the alternative implementation in which DRx-kl is received by Combiner 12C-10 and outputs DRx-Out-kl. The known SCC data Buffer 12C-60 performs buffering of the data to be cancelled at the alert rate and passes information of the data bits to be cancelled, modulation, and other required information related to the signature control channel symbol stream to signature Generator 12C-60.

The Signature Generator 12C-60 then utilizes the information form the Data Buffer 12C-70 to generate the appropriate cancellation signal including modulated information bits (symbols) to Combiner 12C-10.

In such an embodiment, Signature Generator 12C-60 may also include an equalization function as described previously.

Figure 12E:
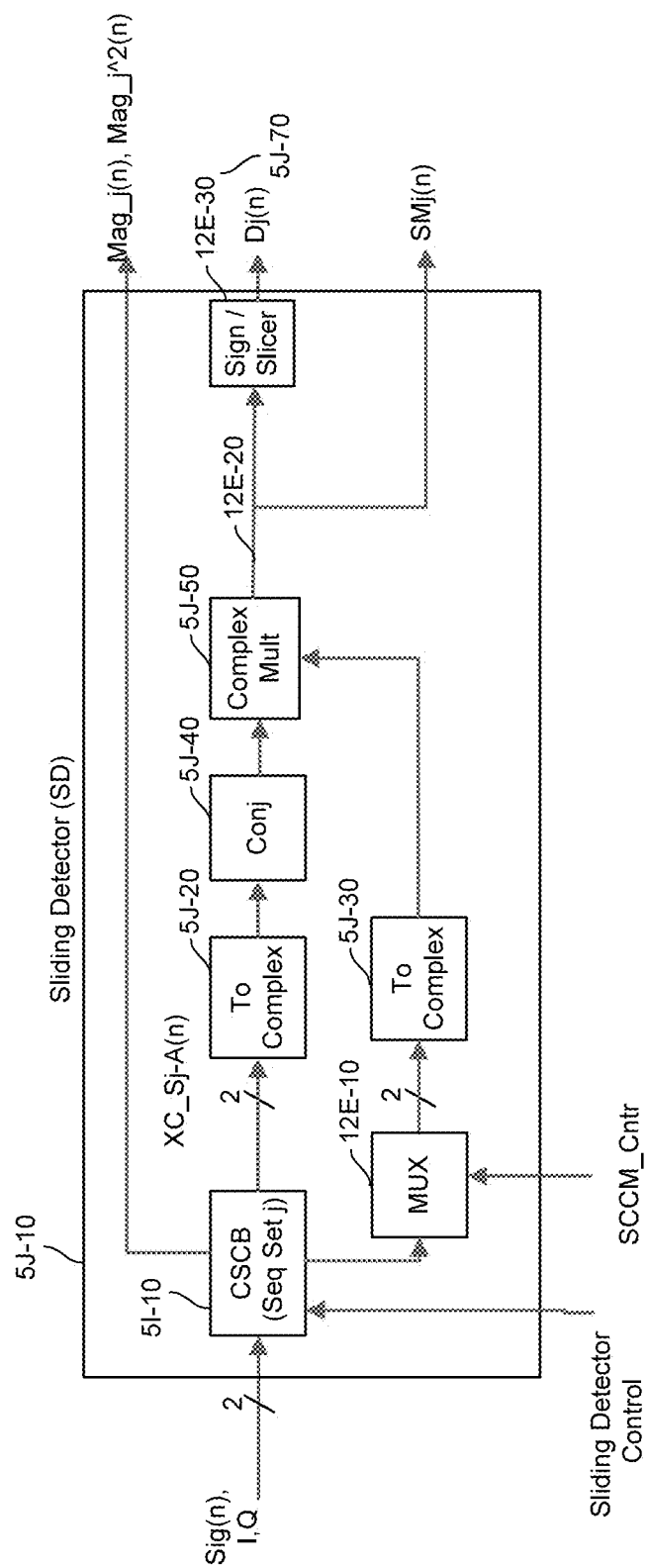
FIG. 12E is an exemplary block diagram of an embodiment of a sliding detector 5J-10 for use with an embodiment of SOBR SCCM demodulation.

FIG. 12E is an exemplary block diagram of an embodiment of a sliding detector 5J-10 for use with an embodiment of SOBR SCCM demodulation.

Referring now to FIG. 12E, the SCCM_Cntr interface, provides a phase reference to MUX 12E-10 for use in BPSK demodulation in one embodiment. The CSCB 5I-10 performs a correlation of a single signature sequence, with timing alignment as provided by the Sliding detector Control interface. In other embodiment, a phase reference signature may be present in the SCC composite stream as well, and the resulting correlation provided to another input of MUX 12E-10. The resulting phase, and or amplitude information may then be selected form the MUX 12E-10 and utilized to "De-Rotate" the de-correlated information at Complex Multiplier 5J-50. The correlated information is derived form the CSCB using a (or multiple) signature code(s) corresponding to the data symbols of the SCC stream. The output of the CSCB is converted from I and Q into a complex representation by block 5J-20, conjugated by block 5J-40, and provided to the complex multiplier (5J-50) as discussed. In some embodiments, where the IBR Channel Multiplexer has already equalized the SCC link stream sufficiently, and de-rotated the phase of the signal to a pre-determined value, the complex multiplication my be omitted, or comprise a fixed complex "Rotation Vector". The output of the complex multiplier 5J-50 is then provided in the current embodiment to the slicer 12E-30 for conversion into "hard" values (for example 1s and 0s). In other embodiments where a soft decision FEC decoder is utilized, the output of the phase-rotation, and amplitude scanning performing in embodiments of 5J-50 are provided to output SMj(n). SMj(n) may be utilized per prior embodiments, or utilizing approaches known to those skilled in the art, for example to a FEC decoder utilizing soft symbol input, such as a trellis decoder, Viterbi decoder, turbo decoder or the like.

One or more of the methodologies or functions described herein may be embodied in a computer-readable medium on which is stored one or more sets of instructions (e.g., software). The software may reside, completely or at least partially, within memory and/or within a processor during execution thereof. The software may further be transmitted or received over a network.

The term "computer-readable medium" should be taken to include a single medium or multiple media that store the one or more sets of instructions. The term "computer-readable medium" shall also be taken to include any medium that is capable of storing, encoding or carrying a set of instructions for execution by a machine and that cause a machine to perform any one or more of the methodologies of the present invention. The term "computer-readable medium" shall accordingly be taken to include, but not be limited to, solid-state memories, and optical and magnetic media.

Embodiments of the invention have been described through functional modules at times, which are defined by executable instructions recorded on computer readable media which cause a computer, microprocessors or chipsets to perform method steps when executed. The modules have been segregated by function for the sake of clarity. However, it should be understood that the modules need not correspond to discreet blocks of code and the described functions can be carried out by the execution of various code portions stored on various media and executed at various times.

It should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The invention has been described in relation to particular examples, which are intended in all respects to be illustrative rather than restrictive. Those skilled in the art will appreciate that many different combinations of hardware, software, and firmware will be suitable for practicing the present invention. Various aspects and/or components of the described embodiments may be used singly or in any combination. It is intended that the specification and examples be considered as exemplary only, with a true scope and spirit of the invention being indicated by the claims.

What is claimed is:

1. A self-organizing backhaul radio comprising:
    one or more demodulator cores, wherein each demodulator core is capable of demodulating one or more primary receive symbol streams to produce one or more receive data interface streams;

a plurality of receive radio frequency (RF) chains, wherein each receive RF chain is capable of converting from one of a plurality of receive RF signals to a respective one of a plurality of receive chain output signals;

an antenna array comprising a plurality of directive gain antenna elements, wherein each directive gain antenna element is couplable to at least one receive RF chain;

a frequency selective receive path channel multiplexer to produce one or more composite receive symbol streams from the plurality of receive chain output signals, wherein each respective one of the one or more composite receive symbol streams comprises a linear combination of a respective primary receive symbol stream and a respective signature control channel symbol stream, and wherein each respective signature control channel symbol stream is a spread spectrum modulated signal that carries a respective signature control channel information; and a signature link processor, interposed between the one or more demodulator cores and the frequency selective receive path channel multiplexer, to produce the one or more primary receive symbol streams provided to the one or more demodulator cores from the one or more composite receive symbol streams;

wherein the signature link processor comprises one or more respective signature control channel stream cancellers each for:

receiving the respective one of the one or more composite receive symbol streams;

receiving the respective signature control channel information as pre-communicated respective signature control channel information, wherein the pre-communicated respective signature control channel information is derived from information communicated to the self-organizing backhaul radio prior to the receiving of the respective signature control channel symbol stream that carries the respective signature control channel information;

cancelling the respective signature control channel symbol stream from the respective one of the one or more composite receive symbol streams to produce the respective primary receive symbol stream based upon the pre-communicated respective signature control channel information.

2. The self-organizing backhaul radio of claim 1, further comprising:

a radio resource controller, wherein the radio resource controller is capable of setting or causing to be set specific selective couplings between the certain of the plurality of directive gain antenna elements and the certain of the plurality of receive RF chains.

3. The self-organizing backhaul radio of claim 1, wherein each one of the one or more demodulator cores comprises at least a decoder and a soft decision symbol demapper; and wherein each one of the plurality of receive RF chains comprises at least a vector demodulator and two analog to digital converters that are capable of producing the respective one of the plurality of receive chain output signals, each said respective one of the plurality of receive chain output signals comprised of digital baseband quadrature signals.

4. The self-organizing backhaul radio of claim 1, wherein the set of receive RF chains that can accept receive RF signals from the one or more selectable RF connections is divided between one subset that accepts receive RF signals from directive gain antenna elements with a first polarization and a second subset that accepts receive RF signals from directive gain antenna elements with a second polarization.

5. The self-organizing backhaul radio of claim 1, wherein the directive gain antenna elements that can be selectively coupled to receive RF chains are arranged on a plurality of facets with one or more directive gain antenna elements per facet, and wherein each facet is oriented at a different azimuth angle relative to at least one other facet.

6. The self-organizing backhaul radio of claim 1, wherein the frequency selective receive path channel multiplexer comprises at least one of a Space Division Multiple Access (SDMA) combiner or equalizer, a maximal ratio combining (MRC) combiner or equalizer, a minimum mean squared error (MMSE) combiner or equalizer, an Eigen Beam Forming (EBF) combiner or equalizer, a receive beam forming (BF) combiner or equalizer, a Zero Forcing (ZF) combiner or equalizer, a channel estimator, a Maximal Likelihood (DL) detector, an Interference Canceller (IC), a VBLAST combiner or equalizer, a Discrete Fourier Transformer (DFT), a Fast Fourier Transformer (FFT), or an Inverse Fast Fourier Transformer (IFFT).

7. The self-organizing backhaul radio of claim 1 wherein the antenna array further comprises:

one or more selectable RF connections for selectively coupling certain of the plurality of directive gain antenna elements to certain of the plurality of receive RF chains, said certain of the plurality of receive RF chains including at least one receive RF chain coupled to the frequency selective receive path channel multiplexer, wherein the number of directive gain antenna elements that can be selectively coupled to receive RF chains exceeds the number of receive RF chains that can accept receive RF signals from the one or more selectable RF connections; and wherein the backhaul radio is capable of determining an opportunity for a performance enhancement that derives from setting specific selective couplings between the certain of the plurality of directive gain antenna elements and the certain of the plurality of receive RF chains.

8. The self-organizing backhaul radio of claim 7 wherein at least one of the one or more selectable RF connections comprises at least one RF switch.

9. The self-organizing backhaul radio of claim 7 wherein at least one of the additional certain of the plurality of receive RF chains is coupled to the frequency selective receive path channel multiplexer.

10. The self-organizing backhaul radio of claim 7 wherein said performance enhancement includes one or more of a reduced interference level within one or more of the receive symbol streams, an increased data throughput rate, an improved link diversity, an increased channel efficiency, or an increased signal to interference and noise ratio (SINR).

11. The self-organizing backhaul radio of claim 1 further comprising:

one or more transmit RF chains, and wherein the self-organizing backhaul radio is configured to perform each of the following:

scan one or more radio frequency channels for the presence of signature radio signals transmitted from one or more other self-organizing backhaul radios to generate scan data, and wherein the radio comprises at least one adjustable network parameter that is adjustable based on the scan data, wherein said scanned one or more radio frequency channels are selected, at least in part, based upon the scan data, wherein the at least one network parameter is adjusted to reduce a potential of interference of the self-organizing backhaul radio with the other self-organizing backhaul radios,
wherein the adjusting the at least one network parameter comprises one or more of:
selecting a frequency channel utilized between the self-organizing backhaul radio and a second self-organizing backhaul radio;
adjusting the effective radiation pattern of the self-organizing backhaul radio;
selecting one or more of the plurality of directive gain antenna elements; and
adjusting the physical configuration or arrangement of the one or more of the plurality of directive gain antenna elements.

12. The self-organizing backhaul radio of claim 11, wherein the adjusting the effective radiation pattern comprises one or more of:
steering the effective radiation pattern in elevation;
steering the effective radiation pattern in azimuth.

13. The self-organizing backhaul radio of claim 11, wherein the adjusting the effective radiation pattern comprises calculating digital beam former weights based upon at least one constraint related to the potential of interference; and applying the digital beam former weights.

14. The self-organizing radio of claim 13, wherein the constraint comprises one or more of:
properties related to or derived from said scan result;
a direction in which signal transmission is to be limited;
parameters which reduce the potential for interfering with one or more of said registered radios meeting said specific criteria;
parameters which increase the likelihood of said self-organizing radio and a second self-organizing radios meeting performance goals with respect to an interposed wireless communication link;
a restriction of use of specific transceivers or specific antennas of a plurality of transceivers or antennas;
a use of specific polarizations for transmission;
attributes of a collective transmission radiation pattern associated with a plurality of transmitters;
a frequency or geometric translation of beam forming weights between receiver weights and transmitter weights;
a change in antennas used or selected;
a change in operating frequency.

15. The self-organizing backhaul radio of claim 11 wherein at least a portion of the signature radio signals are transmitted from a self-organizing backhaul radio of the one or more other self-organizing backhaul radios for which no interposed primary link is established with the instant self-organizing backhaul radio.

16. The self-organizing backhaul radio of claim 1 wherein a chip rate of the respective signature control channel symbol stream is equal to a symbol rate of the respective primary receive symbol stream of at least one of the one or more composite receive symbol streams, for at least a portion of time.

17. The self-organizing backhaul radio of claim 1 wherein a chip rate of the respective signature control channel symbol stream is equal to a symbol rate of the respective primary receive symbol stream of each of the one or more composite receive symbol streams, for at least a portion of time.

18. The self-organizing backhaul radio of claim 1 wherein the respective signature control channel symbol stream is not present during a respective preamble period of the respective primary receive symbol stream of at least one of the one or more composite receive symbols streams.

19. The self-organizing backhaul radio of claim 1 wherein a timing of the respective signature control channel symbol stream is synchronized in time with a preamble period of the respective primary receive symbol stream of at least one of the one or more composite receive symbol streams.

20. The self-organizing backhaul radio of claim 19 wherein a timing of a signature sequence of the respective signature control channel symbol stream is further synchronized in frequency and phase with the preamble period of the respective primary receive symbol stream of the at least one of the one or more composite receive symbol streams.

21. The self-organizing backhaul radio of claim 19 wherein a timing of a signature sequence of the respective signature control channel symbol stream is offset by a pre-determined amount of time from the preamble period of the respective primary receive symbol stream of the at least one of the one or more composite receive symbol streams.

22. The self-organizing backhaul radio of claim 19 wherein a phase reference of the respective primary receive symbol stream is usable as a phase reference associated with the cancellation of the respective signature control channel symbol stream of the at least one of the one or more composite receive symbol streams.

23. The self-organizing backhaul radio of claim 1, wherein the frequency selective receive path channel multiplexer further produces one or more receive non-composite symbol streams from the plurality of receive chain output signals, wherein each respective one of the one or more non-composite receive symbol streams comprises a respective primary receive symbol stream and does not comprise a respective signature control channel symbol stream.

24. The self-organizing backhaul radio of claim 23 wherein the at least one of the respective primary receive symbol streams of the one or more non-composite receive symbol streams are coupled to a respective demodulator core of the one or more demodulator cores.

25. The self-organizing backhaul radio of claim 23 wherein at least one of the one or more non-composite receive symbol streams is coupled to the signature link processor.

26. The self-organizing backhaul radio of claim 25 wherein the signature link processor further provides at least one primary receive symbol stream derived from the at least one of the one or more non-composite receive symbol streams to at least one of the one or more demodulator cores.

27. The self-organizing backhaul radio of claim 1 wherein the frequency selective receive path channel multiplexer further provides at least one of said one or more primary receive symbol streams directly to at least one of the one or more demodulator cores.

28. The self-organizing backhaul radio of claim 1 wherein the linear combination associated with at least one of the one or more composite receive symbol streams is performed at least partially simultaneously in time.

29. The self-organizing backhaul radio of claim 1, wherein a plurality of primary receive symbols associated with at least one respective primary receive symbol stream and a plurality of signature control channel symbols associated with at least one respective signature control channel symbol stream are linearly combined simultaneously in time.

30. The self-organizing backhaul radio of claim 1, wherein the information associated with the pre-communicated respective signature control channel information is derived from at least one of the one or more primary receive symbol streams.

* * * * *